(12) United States Patent
Bjontegard

(10) Patent No.: US 10,412,210 B2
(45) Date of Patent: Sep. 10, 2019

(54) MULTI-LEVEL CONTROL, VARIABLE ACCESS, MULTI-USER CONTEXTUAL INTELLIGENT COMMUNICATION PLATFORM

(71) Applicant: Bernt Erik Bjontegard, San Diego, CA (US)

(72) Inventor: Bernt Erik Bjontegard, San Diego, CA (US)

( * ) Notice: Subject to any disclaimer, the term of this patent is extended or adjusted under 35 U.S.C. 154(b) by 0 days.

(21) Appl. No.: 15/899,311

(22) Filed: Feb. 19, 2018

(65) Prior Publication Data

US 2018/0288213 A1 Oct. 4, 2018

Related U.S. Application Data

(60) Continuation of application No. 15/660,915, filed on Jul. 26, 2017, which is a continuation of application
(Continued)

(51) Int. Cl.

| | | |
|---|---|---|
| *H04M 1/725* | (2006.01) | |
| *H04L 12/24* | (2006.01) | |
| *A63F 13/213* | (2014.01) | |
| *A63F 13/216* | (2014.01) | |
| *A63F 13/217* | (2014.01) | |
| *A63F 13/32* | (2014.01) | |

(Continued)

(52) U.S. Cl.
CPC ....... *H04M 1/72569* (2013.01); *A63F 13/213* (2014.09); *A63F 13/216* (2014.09); *A63F 13/217* (2014.09); *A63F 13/32* (2014.09); *A63F 13/332* (2014.09); *A63F 13/65* (2014.09); *A63F 13/79* (2014.09); *A63F 13/92* (2014.09); *G06T 19/006* (2013.01); *H04L 29/06034* (2013.01); *H04L 41/044* (2013.01); *H04L 67/18* (2013.01); *H04L 67/22* (2013.01); *H04L 67/306* (2013.01); *H04L 67/38* (2013.01); *H04W 4/029* (2018.02); *H04W 4/185* (2013.01); *H04M 1/72572* (2013.01); *H04W 84/042* (2013.01); *H04W 84/12* (2013.01); *H04W 88/02* (2013.01)

(58) Field of Classification Search
CPC . H04M 1/72569; A63F 13/216; A63F 13/213; A63F 13/217; A63F 13/32; A63F 13/332; A63F 13/65; A63F 13/79; A63F 13/92; H04W 4/029; G06T 19/006; H04L 29/06034; H04L 41/044; H04L 67/18; H04L 67/22; H04L 67/306; H04L 67/38; H04L 4/185
See application file for complete search history.

(56) References Cited

U.S. PATENT DOCUMENTS

| | | | |
|---|---|---|---|
| 8,677,505 B2 * | 3/2014 | Redlich | G06F 21/577 713/166 |
| 2002/0010679 A1 * | 1/2002 | Felsher | G06F 19/328 705/51 |

(Continued)

*Primary Examiner* — Qun Shen
(74) *Attorney, Agent, or Firm* — Lewis Brisbois LLP

(57) ABSTRACT

An interactive, electronic network that enables multi-level control, variable access, multi-user communications of real-time contextually relevant data or information among network-connected devices, and actions based on those communications, as the network-connected devices move from one location to another and/or the data/information flow among those devices change over time.

2 Claims, 140 Drawing Sheets

Related U.S. Application Data

No. 15/408,151, filed on Jan. 17, 2017, now abandoned, and a continuation-in-part of application No. 15/025,853, filed on Feb. 24, 2016, now abandoned, which is a continuation of application No. 14/040,677, filed on Sep. 28, 2013, now Pat. No. 9,338,622, said application No. 15/408,151 is a continuation-in-part of application No. 15/052,859, filed on Feb. 24, 2016, now abandoned, and a division of application No. 14/040,677, filed on Sep. 28, 2013, now Pat. No. 9,338,622, said application No. 15/408,151 is a continuation-in-part of application No. 15/052,868, filed on Feb. 24, 2016, now abandoned, and a division of application No. 14/040,677, filed on Sep. 28, 2013, now Pat. No. 9,338,622, said application No. 15/408,151 is a continuation-in-part of application No. 14/433,267, filed as application No. PCT/US2013/062504 on Sep. 29, 2013, now abandoned.

(60) Provisional application No. 62/379,150, filed on Aug. 24, 2016, provisional application No. 62/324,283, filed on Apr. 18, 2016, provisional application No. 61/882,593, filed on Sep. 25, 2013, provisional application No. 61/709,710, filed on Oct. 4, 2012.

(51) Int. Cl.
*A63F 13/332* (2014.01)
*A63F 13/65* (2014.01)
*A63F 13/79* (2014.01)
*A63F 13/92* (2014.01)
*H04W 4/029* (2018.01)
*G06T 19/00* (2011.01)
*H04L 29/06* (2006.01)
*H04L 29/08* (2006.01)
*H04W 4/18* (2009.01)
*H04W 84/04* (2009.01)
*H04W 84/12* (2009.01)
*H04W 88/02* (2009.01)

(56) References Cited

U.S. PATENT DOCUMENTS

| | | | |
|---|---|---|---|
| 2009/0254572 A1* | 10/2009 | Redlich | G06Q 10/06 |
| 2010/0262464 A1* | 10/2010 | Monteforte | G06Q 10/00 |
| | | | 705/7.29 |
| 2011/0066646 A1* | 3/2011 | Danado | H04M 1/72569 |
| | | | 707/770 |
| 2012/0122476 A1* | 5/2012 | Lee | H04W 4/02 |
| | | | 455/456.1 |
| 2013/0080447 A1* | 3/2013 | Ramer | G06Q 30/02 |
| | | | 707/748 |
| 2014/0040977 A1* | 2/2014 | Barton | H04L 63/20 |
| | | | 726/1 |
| 2015/0154431 A1* | 6/2015 | Skaaksrud | H04W 12/06 |
| | | | 340/10.1 |

* cited by examiner

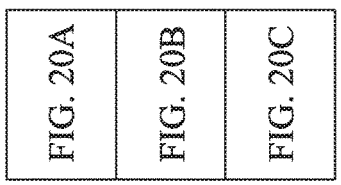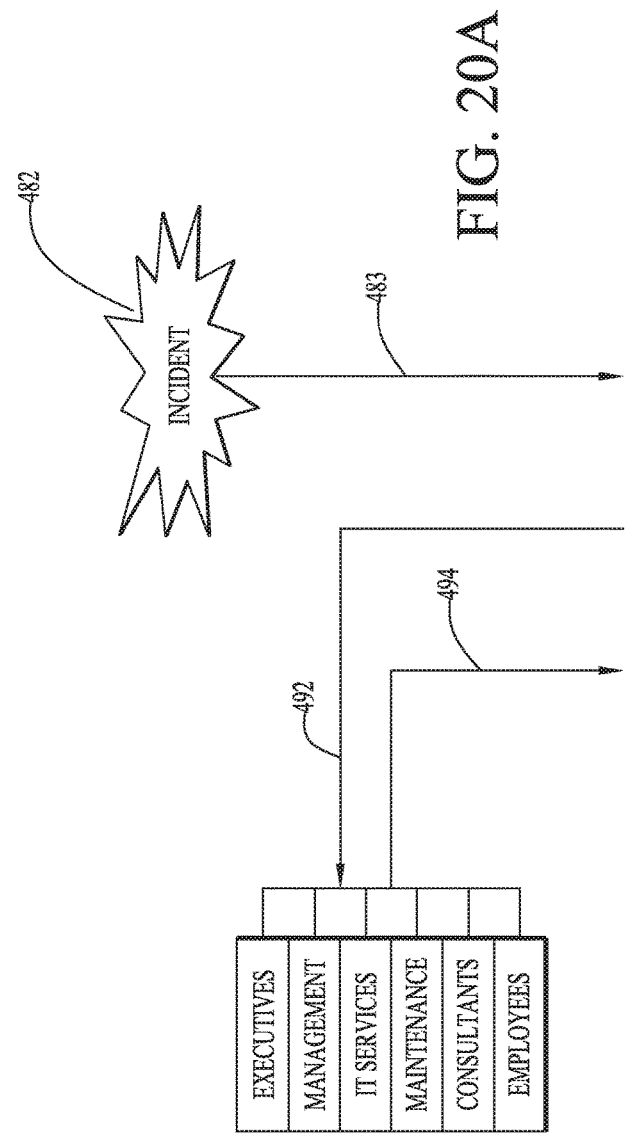

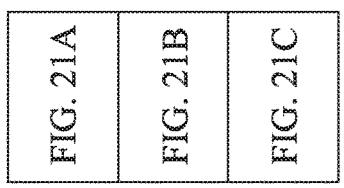
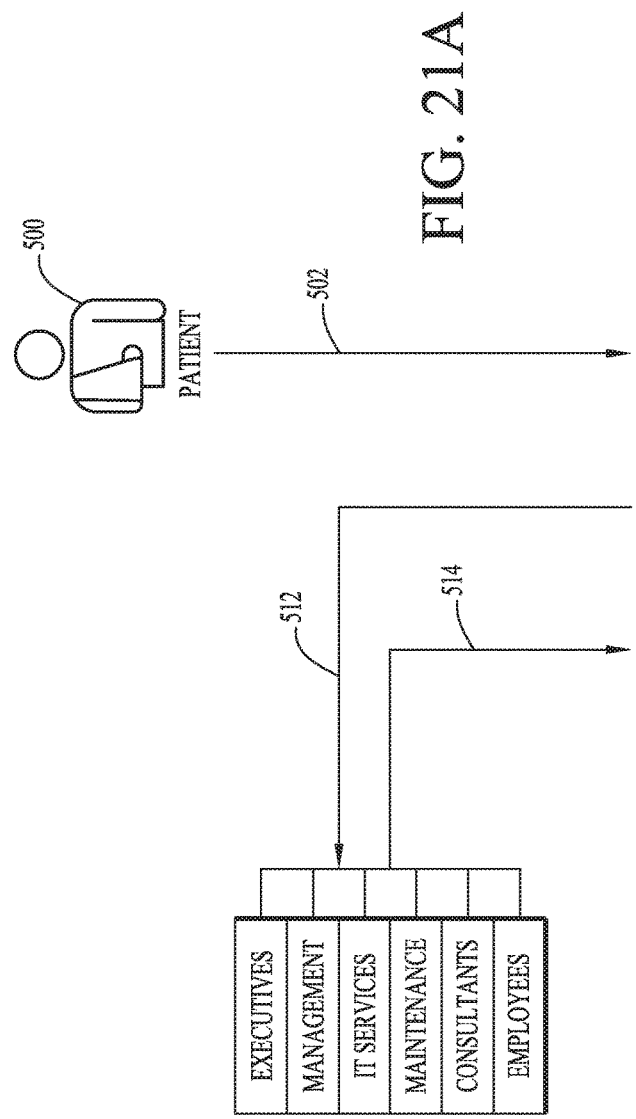

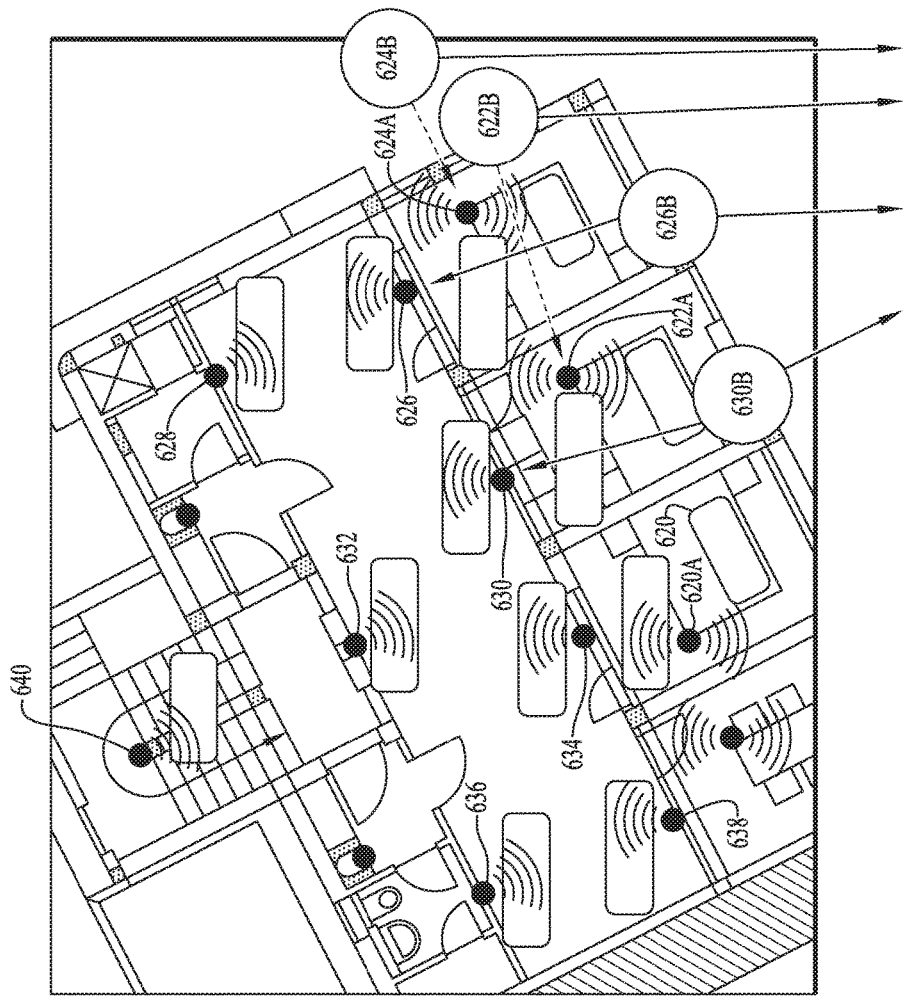

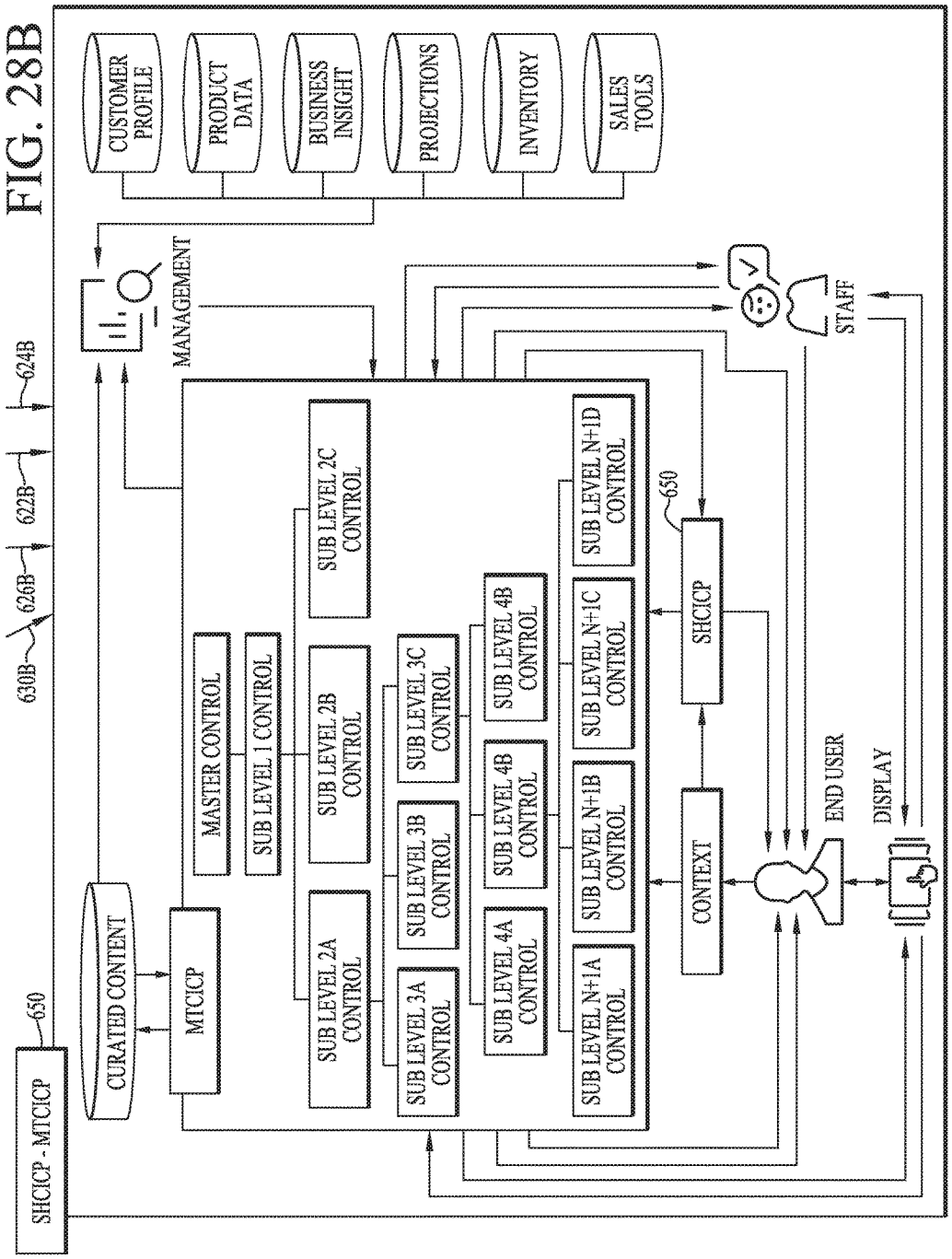

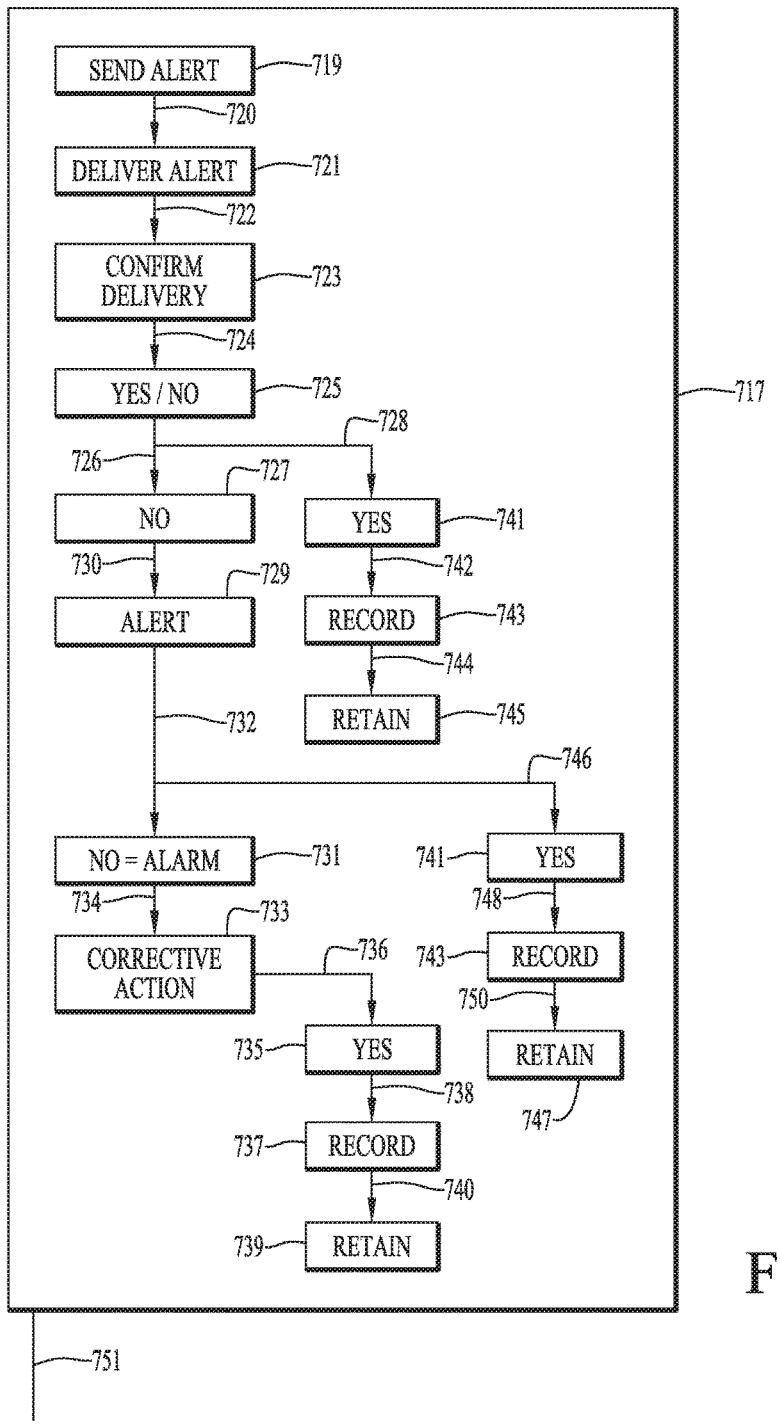

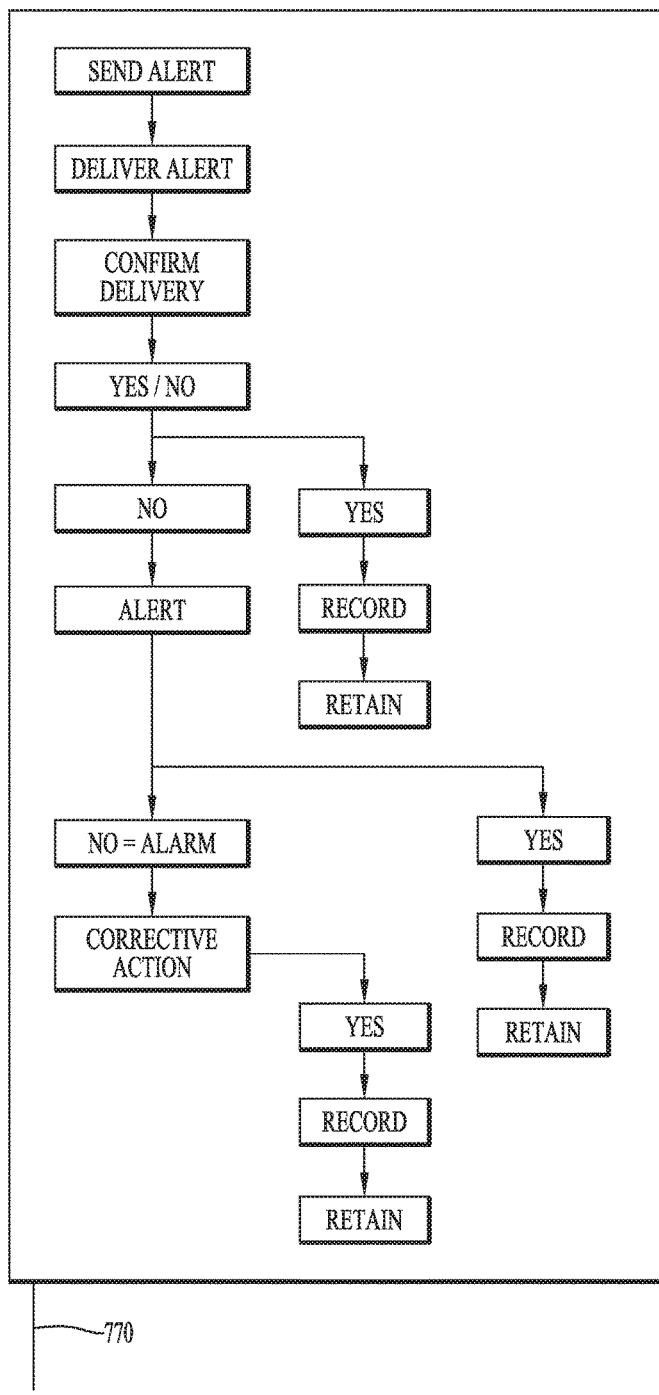
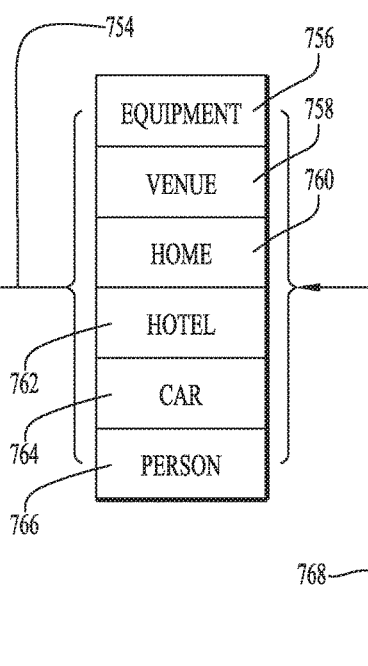
FIG. 39A
FIG. 39

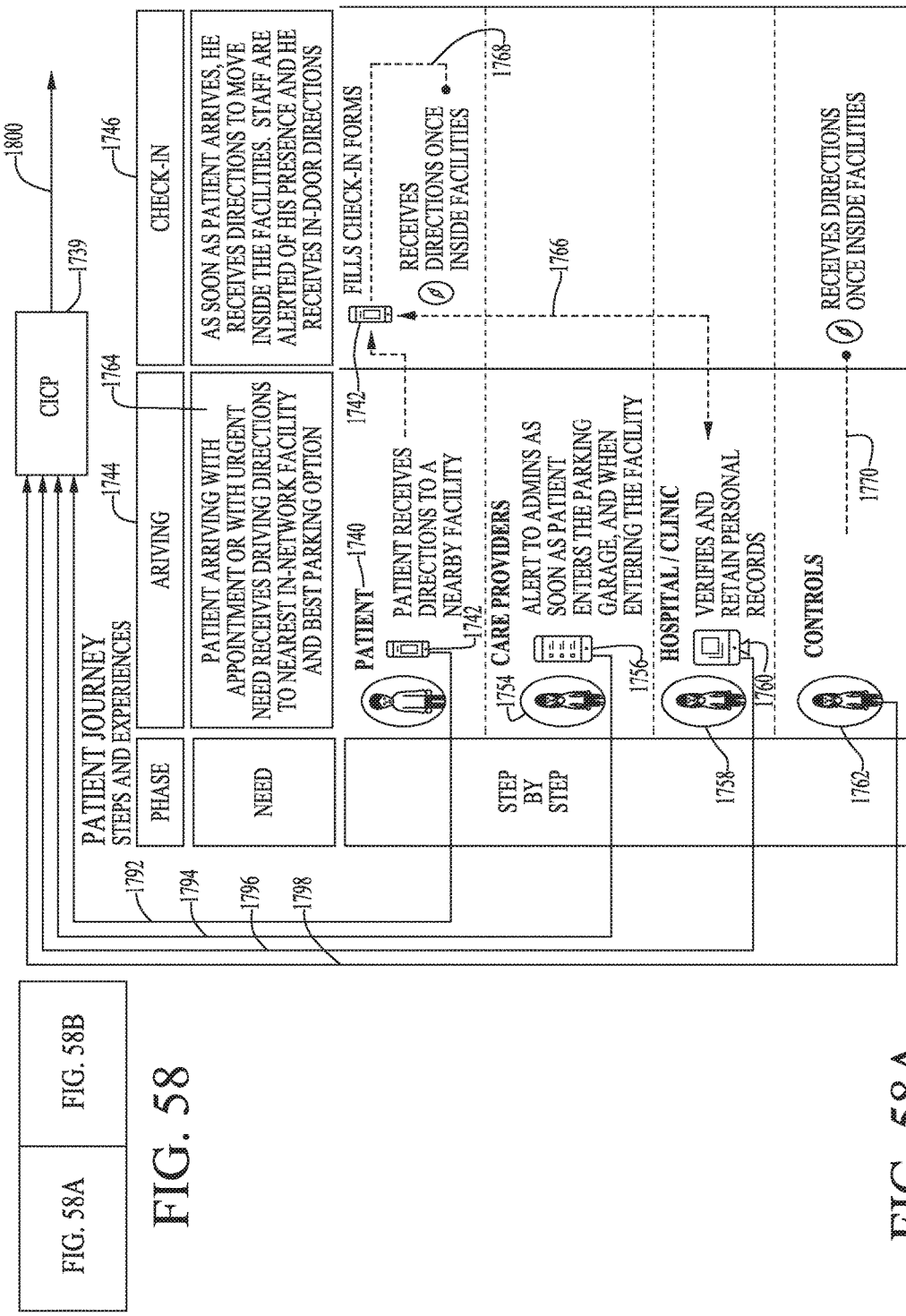

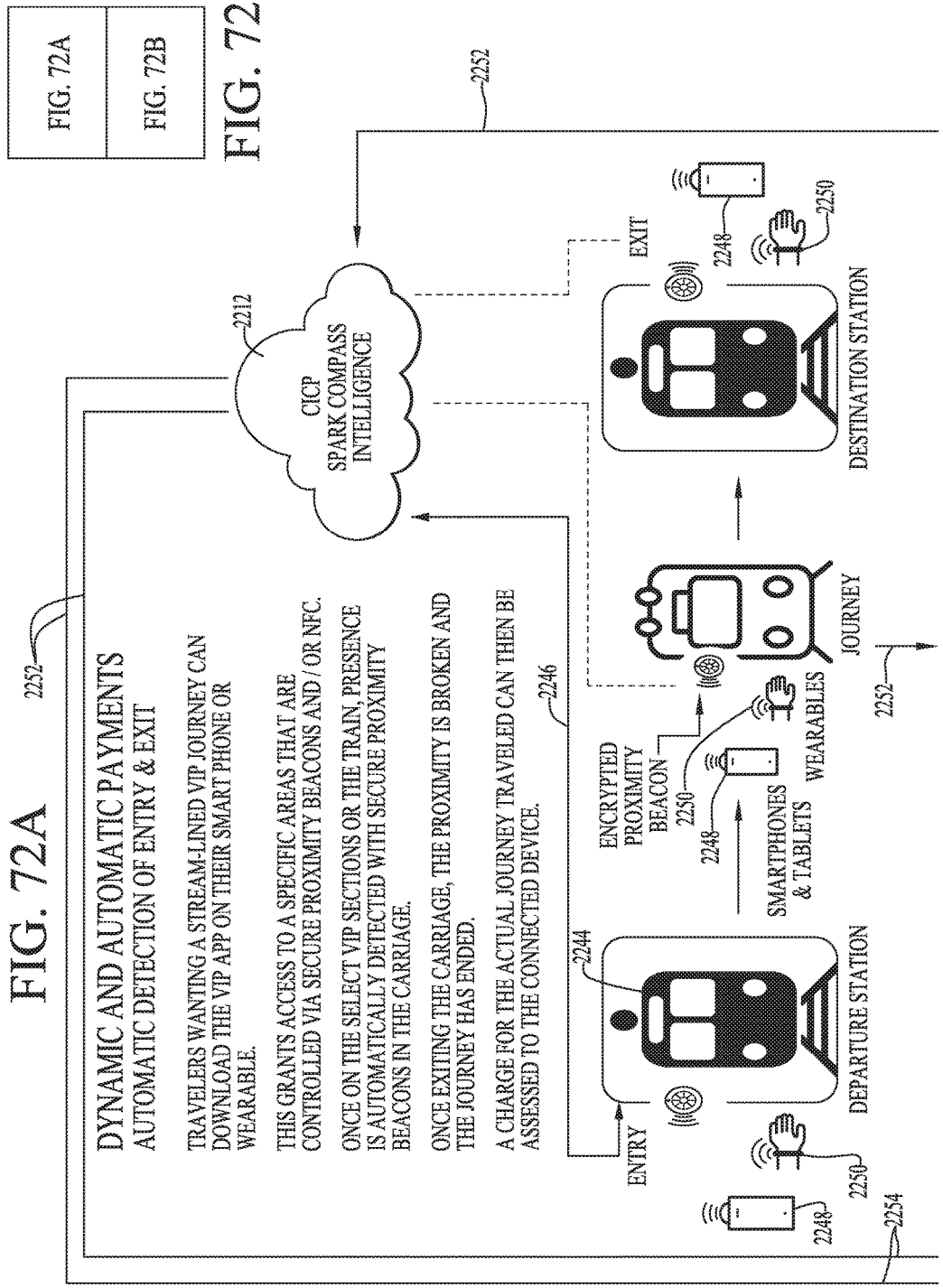

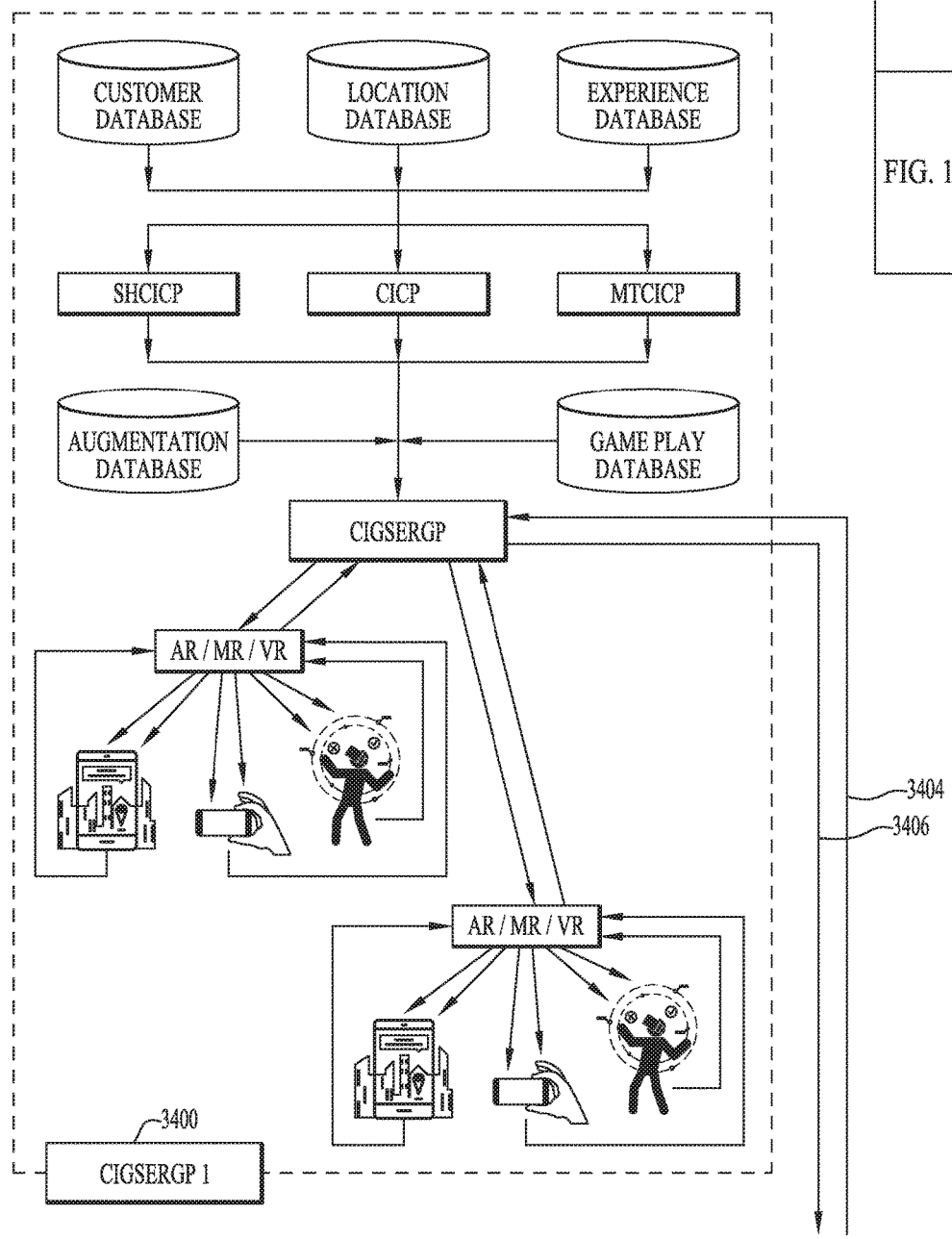

MULTI-LEVEL CONTROL, VARIABLE ACCESS, MULTI-USER CONTEXTUAL INTELLIGENT COMMUNICATION PLATFORM

FIELD OF INVENTION

The invention relates generally to interactive, electronic networks that enable multi-level control, variable access, multi-user communications of real-time contextually relevant data or information among network-connected devices, and actions based on those communications, as the network-connected devices move from one location to another and/or the data/information flow among those devices change over time.

SUMMARY OF INVENTION

The interactive, electronic networks according to the present disclosure overcome the drawbacks of known electronic networks by providing multi-level control, variable access, multi-user communications of real-time contextually relevant data or information among network-connected devices, and actions based on those communications as the network-connected devices move from one location to another and/or the data/information flow among those devices change over time. The networks described herein are intended, preferably, to work in conjunction with and may incorporate features of the contextually intelligent communication platform(s) (CICP(s)) described, for example, in International application PCT/US13/062504, U.S. application Ser. No. 14/040,677, filed 28 Sep. 2013, U.S. provisional application 61/882,593, filed 25 Sep. 2013, and U.S. provisional application 61/709,710, filed 4 Oct. 2012. However, the networks described herein do not depend on or rely uniquely on those CICPs. One aspect of the present disclosure may be referred to as a multi-tenant contextual intelligent communication platform (MTCICP). The MTCICP is described herein with reference to several preferred embodiments that include delivery of real-time contextually relevant content, offers and experiences while gathering and recording real-time performance data to multiple administrators from multiple organizations and various level of access at the same time. Additionally the MTCICP is described herein with reference to several preferred embodiments that include systems to promote a healthy lifestyle, wellness encouragement, verification and reward for healthy behavior while improving medical care, including pre- and post-surgical operation care with verification of medication and activity compliance. In yet another aspect, the MTCICP is described herein with reference to several preferred embodiments that include combinations of CICPs systems with sensors and devices that combines on-board, on-device computation algorithms with calculation results communicated via aggregation hubs that along with other CICP computing hubs, together communicate with the same common CICP central data gathering and computation site that is optionally integrated into a common interface, preloaded onto numerous connected devices and/or included as a part of an operating system that can enable the interactions of the physical environment or world with the digital environment or world.

In yet another aspect, the MTCICP is described herein with reference to several preferred embodiments that include a centralized system that functions to identify the location of devices, products and assets within a physical space through use of listening devices, active transmitters, mobile devices, network-connected equipment, including connections through use of, for example, relatively low cost proximity beacons, NFC tags and/or other sensors.

In yet another aspect, the MTCICP is described herein with reference to several preferred embodiments that include a centralized system that functions to identify the location of devices, products and assets within a physical space through use of listening devices, active transmitters, mobile devices, network-connected equipment, to present curated experiences and curated content to the user of such connected devices to enhance their actions whether in an augmented reality game or content deliver with a specific game associated with that specific location, game play or user's activity, to an activity to is representative of a pre-recorded action by someone else at another location, to passive activities performed by the user such as riding on a bus—all activities are connected to the MTCICP which presents the curated content to enable the curated experience.

Specific embodiments, examples, features, aspects, and advantages of the present disclosure will become better understood with regard to the following description, appended claims and accompanying drawings.

BRIEF DESCRIPTION OF THE DRAWINGS

The foregoing aspects and the attendant aspects of the present disclosure will become more readily appreciated by reference to the following detailed description, when taken in conjunction with the accompanying drawings, wherein:

FIG. 20 is a three part schematic that illustrates an exemplary, curated experience that includes the capability of an additional action, such as an incident, in the vicinity of the end user for use with the FIG. 1 platform.

FIG. 20A is a partial schematic illustration of the incident as related to the initial actions of executives and managerial staff in response to the FIG. 20 incident.

FIG. 21 is a three part schematic that illustrates an exemplary use of the FIG. 1 platform as an end user communication tool, with a patient being the end user.

FIG. 21A is a partial schematic illustration showing communications from the patient and to and from managerial staff in the FIG. 21 example.

FIG. 28 is a two part schematic view that depicts the FIGS. 26, 27 floorplan, and with the beacon sensors in the hallways, beacon sensors in the stairwell and beacon sensors attached to the beds.

FIG. 28A is a partial view that depicts the beacons in the hallways, stairwell and attached to the beds.

FIG. 28B is a partial view that depicts the connections of the FIG. 28A beacons to the FIG. 21B platform.

FIG. 38 depicts a 2-part schematic outline decision tree for delivery of messages, content and actual delivery.

FIG. 38A depicts the first partial view of the FIG. 38 decision tree.

FIG. 39 depicts a 2-part schematic outline of the FIG. 38 decision tree for an exemplary decision input from a variety of devices and venues.

FIG. 39A depicts the first partial view of the FIG. 39 exemplary decision tree.

FIG. 45 depicts in two parts a subset of the FIG. 44 infrastructure.

FIG. 47 is a three part schematic overview of the infrastructure of FIGS. 44, 44A, 44B, 44C, 45, 45A, 45B, 46, 46A, 46B and 46C.

FIG. 58 is a two part overview of a user's journey as the user interacts with a facility, checks in, stays in the facility for a period, checks out and communicates with the facility after leaving the facility.

FIG. 58A depicts the first partial view of the FIG. 58 overview.

FIG. 68 is a three-part extension of the flow illustrated in FIG. 67, depicting the consideration and interactions between the various vertical use cases for a master city wide SHCICP-MTCICP with sub-tenant SHCICP-MTCICP system installations in various areas.

FIG. 72 is a two part schematic drawing that illustrates additional details of the FIG. 71 system, such as how many people are in each wagon and an alert before entering a specific wagon.

FIG. 72A is the first partial view of the FIG. 72 schematic.

FIG. 87 depicts the FIG. 86 system with a feedback loop back into the central SHCICP.

FIG. 88 is a two part schematic that depicts a system based on the FIG. 87 system, but with numerous systems providing feedback, that is, reporting back to the originating SHCICP.

FIG. 88A is the first partial view of the FIG. 88 schematic.

FIG. 88B is the second partial view of the FIG. 88 schematic.

FIG. 89 depicts a CICP system in a building or venue that is connected with a digital display, monitor or TV that delivers wayfinding, location, navigation and asset location information on the display.

FIG. 90 depicts the FIG. 89 system, but instead of location information itself, it illustrates delivery of information relevant to a specific location.

FIG. 91 depicts a CICP based system that can be used to enhance work flow for workers across a facility on the basis of events at the facility.

FIG. 92 depicts use of the FIG. 91 system, but with multiple workers.

FIG. 93 depicts use of the system of FIGS. 91-92, and with the CICP connected to various displays, sensors and equipment located in the facility.

FIG. 94 depicts use of a CICP system to determine and provide information re movement of a user from one location to another location, and re the destination location.

FIG. 95 depicts use of a CICP system by a sports team or training facility for comparing activity data for athletes.

FIG. 96 illustrates shows use of the FIG. 95 system to provide the activity information in various ways, to various uses and for various purposes.

Figure 97:
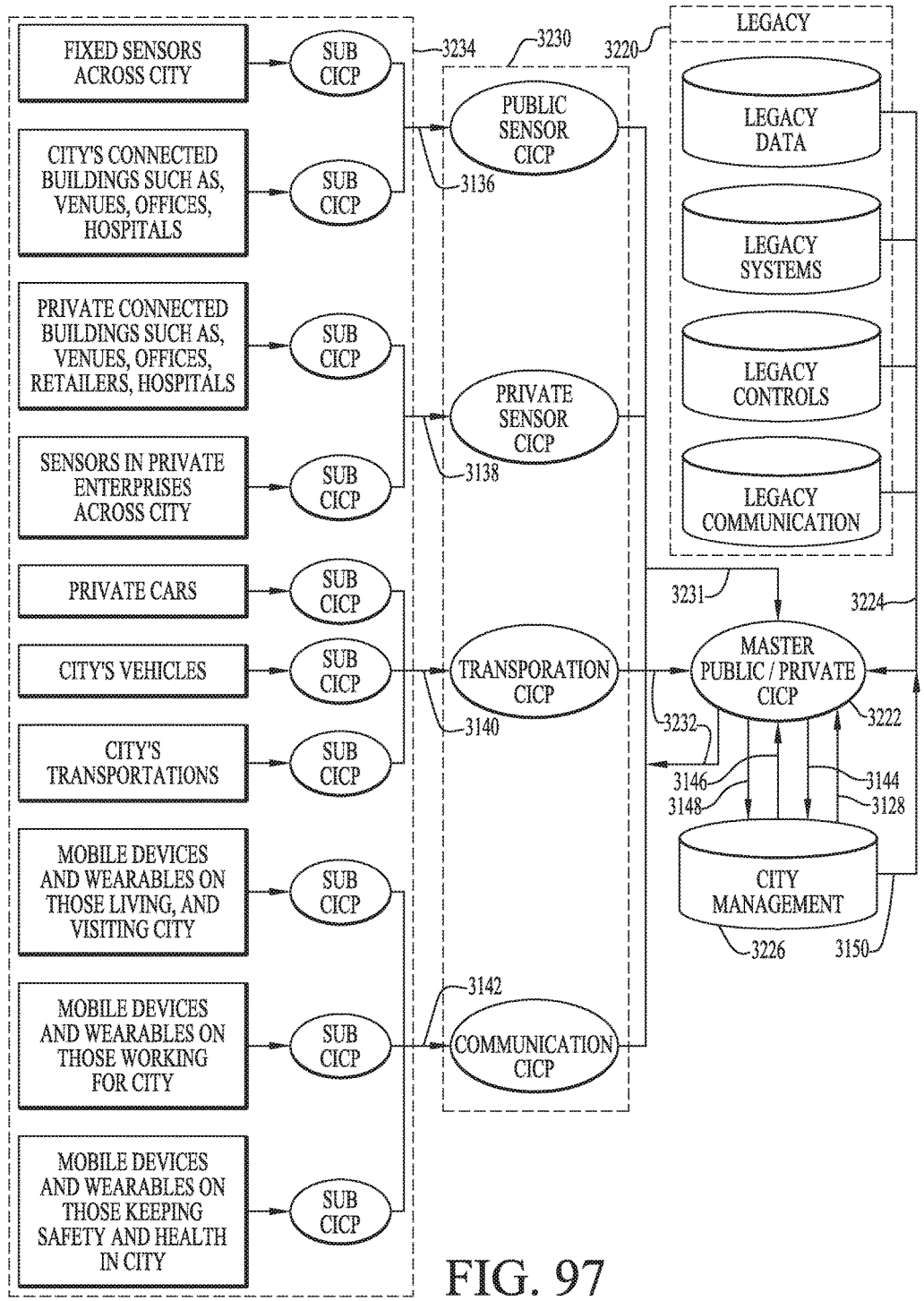

FIG. 97 is a schematic overview of a CICP-based system used to change behavior.

Figure 98:
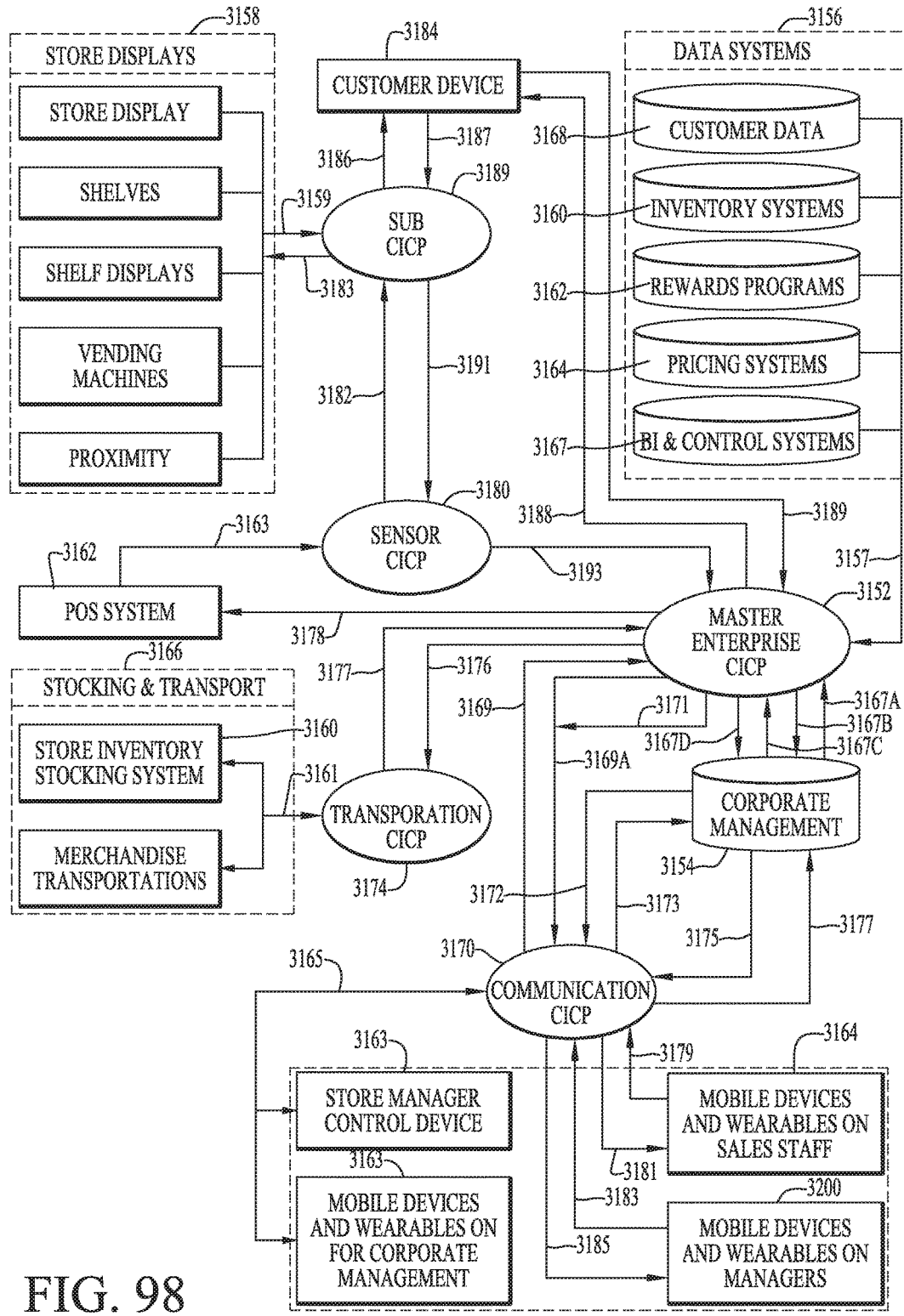

FIG. 98 depicts an exemplary CICP infrastructure for use by a city for managing its interactions and communications.

Figure 99:
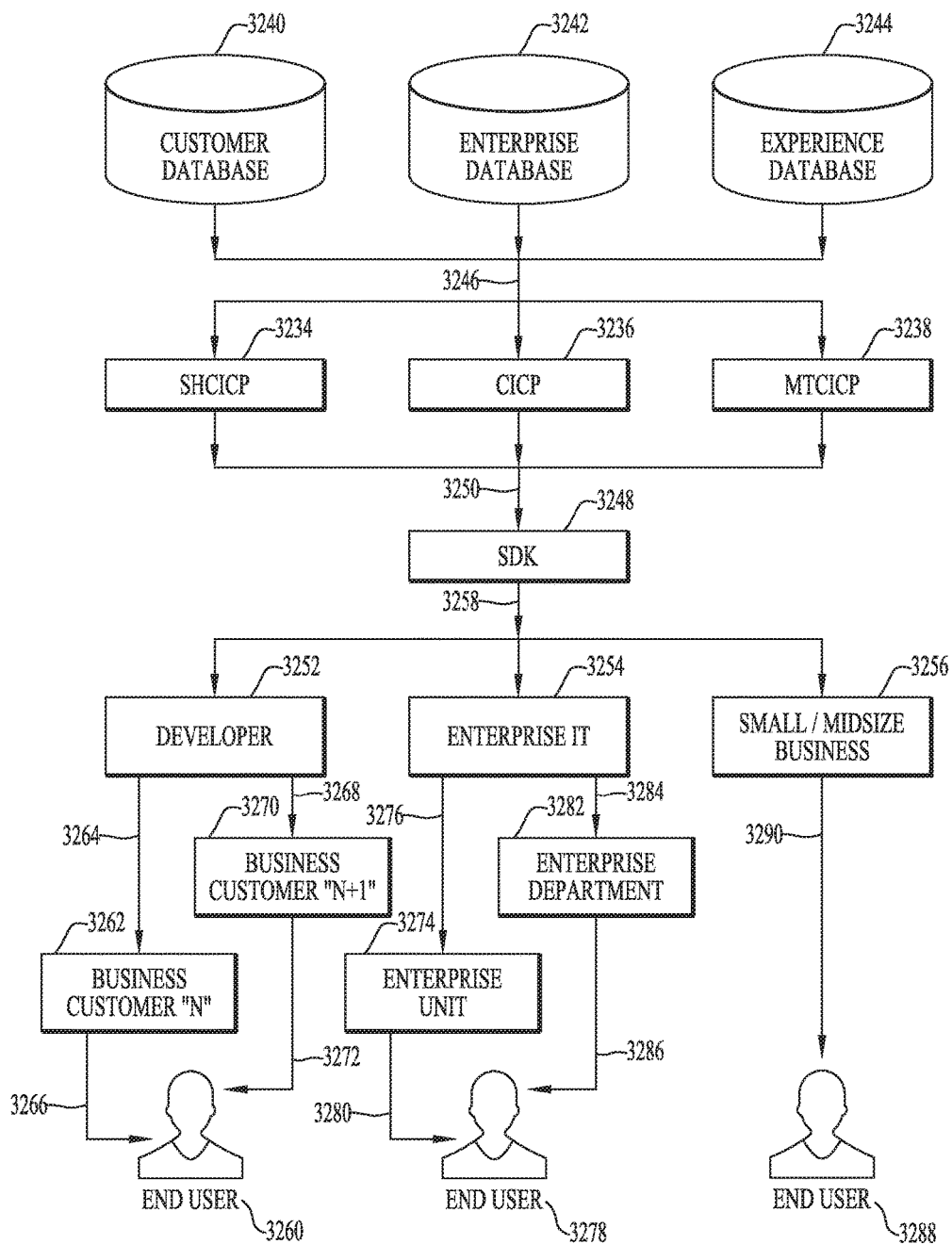

FIG. 99 is a schematic overview of a master CICP system for an enterprise such as a national retailer, grocery chain, hotel chain etc.

Figure 100:
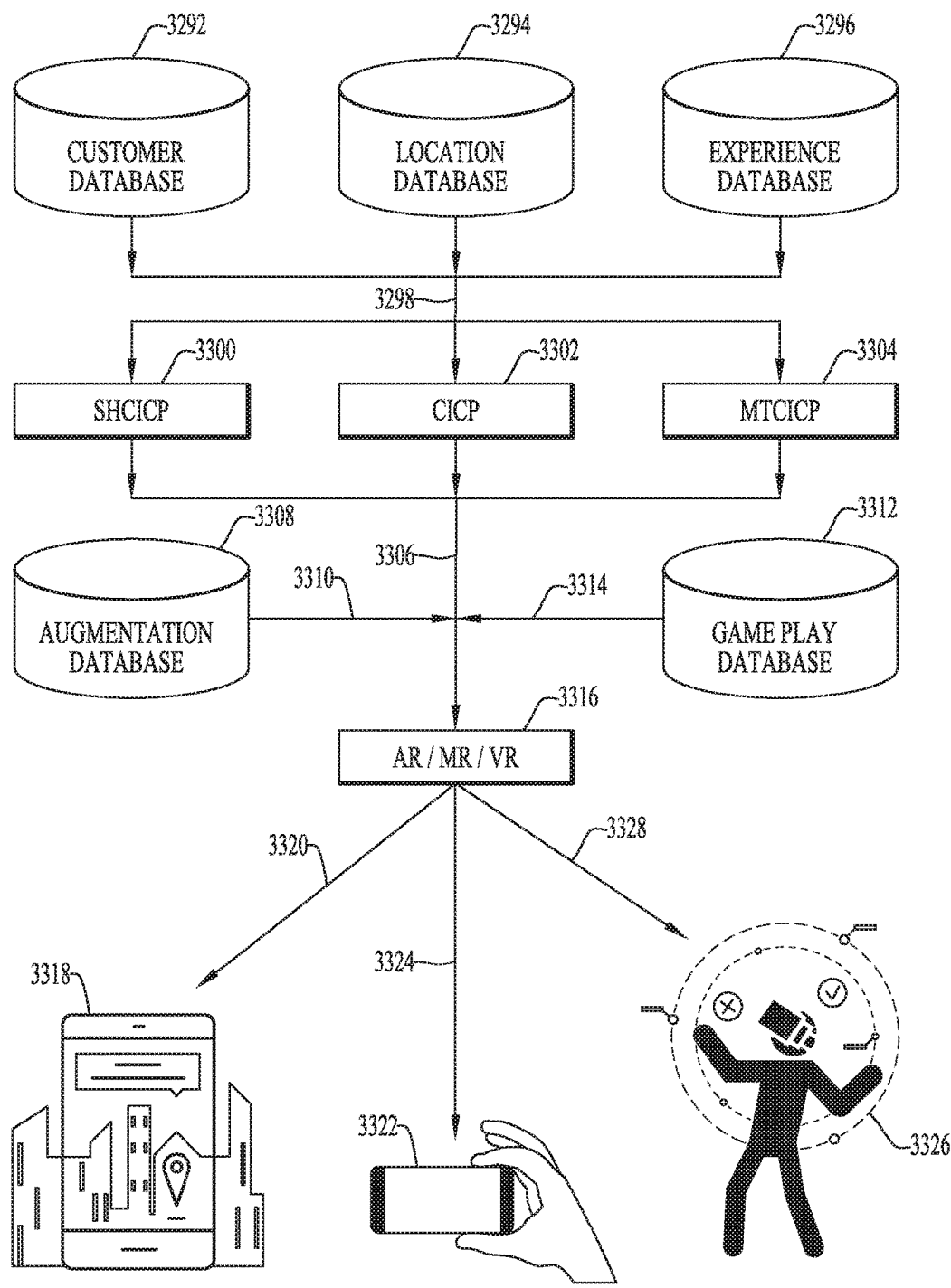

FIG. 100 is a schematic overview of a master CICP system distributed via a Software Developer Kit (SDK) to various levels of developers.

Figure 101:
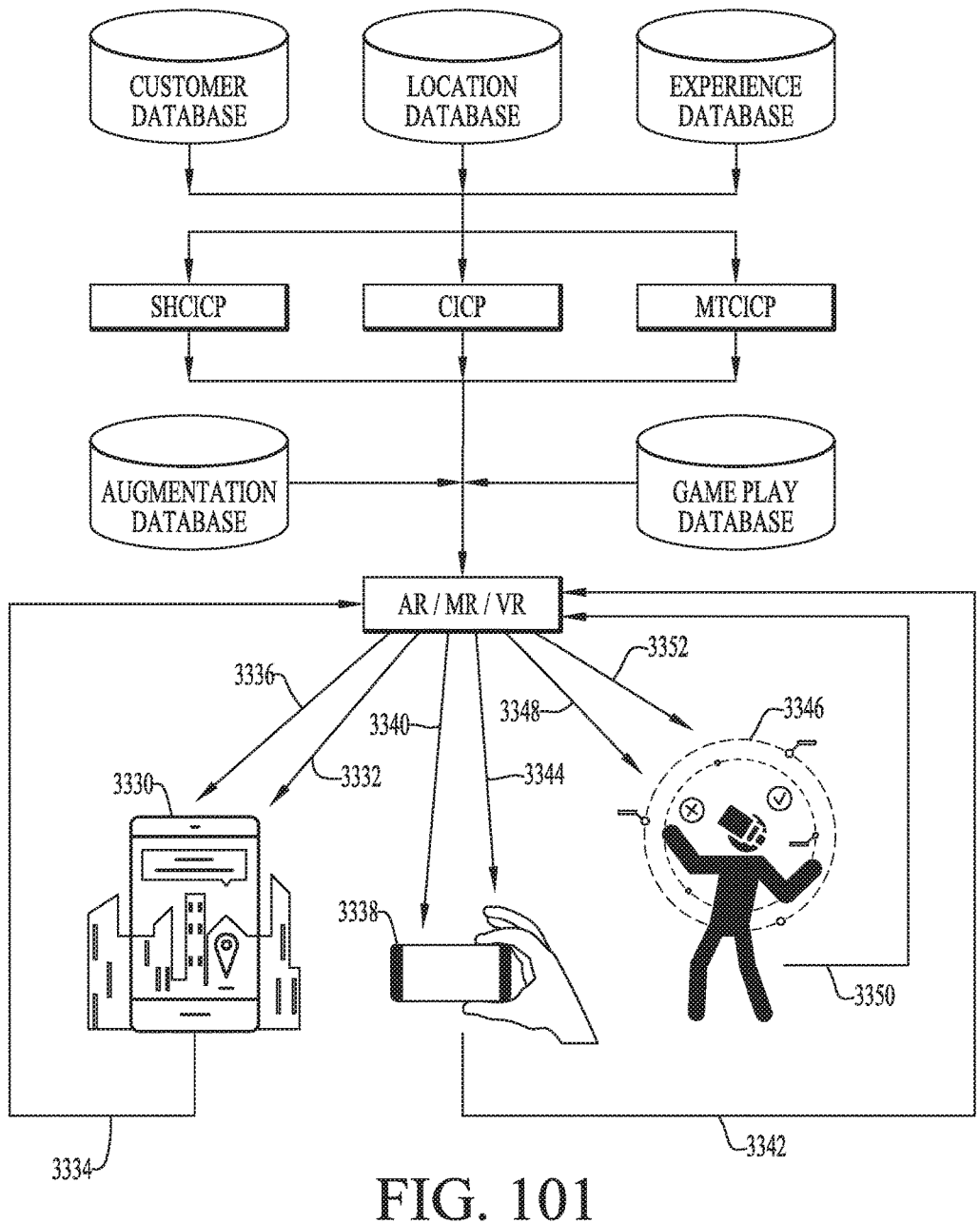

FIG. 101 is a schematic overview of a CICP system used to deliver game play on various devices and in various formats.

Figure 102:
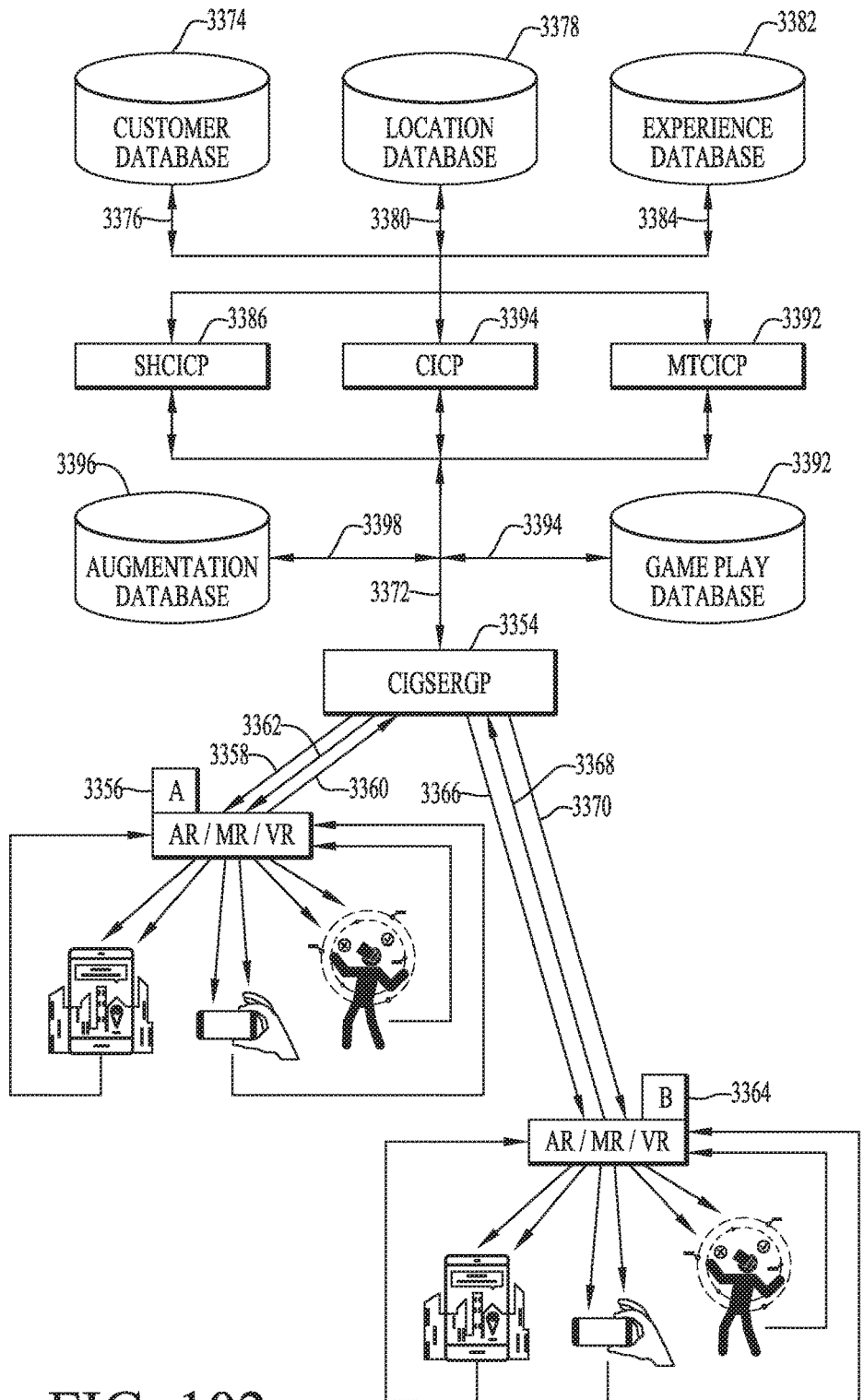

FIG. 102 depicts the system described in FIG. 101 with feedback loops.

FIG. 103 is a two part schematic that depicts the system described in FIG. 102 with multiple players connected via a central Contextually Intelligent Geolocation and Sensor Experience Replay Game Processor (CIGSERGP).

FIG. 103A is the first partial view of the FIG. 103 schematic.

Figure 103B:
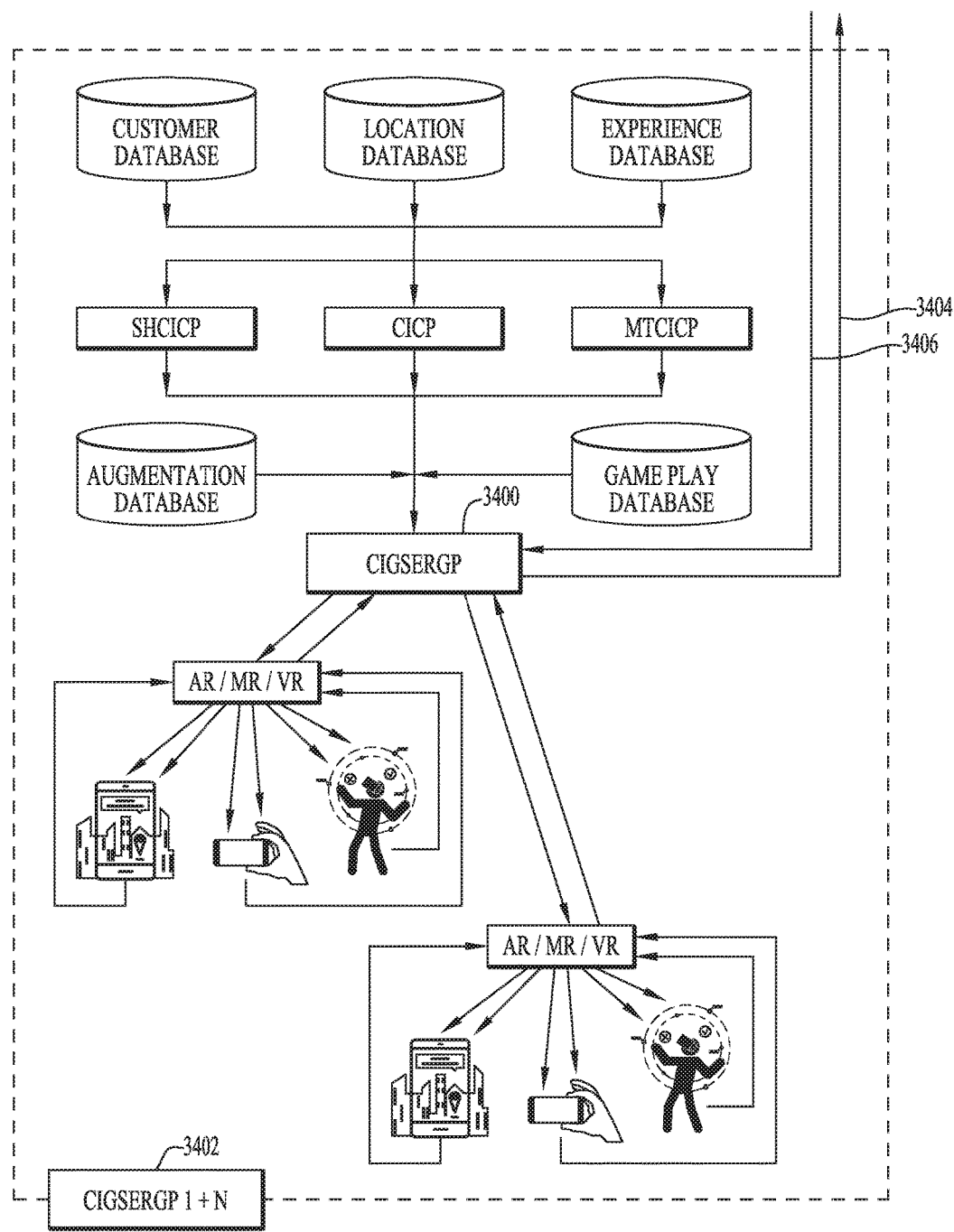

FIG. 103B is the second partial view of the FIG. 103 schematic.

Figure 104:
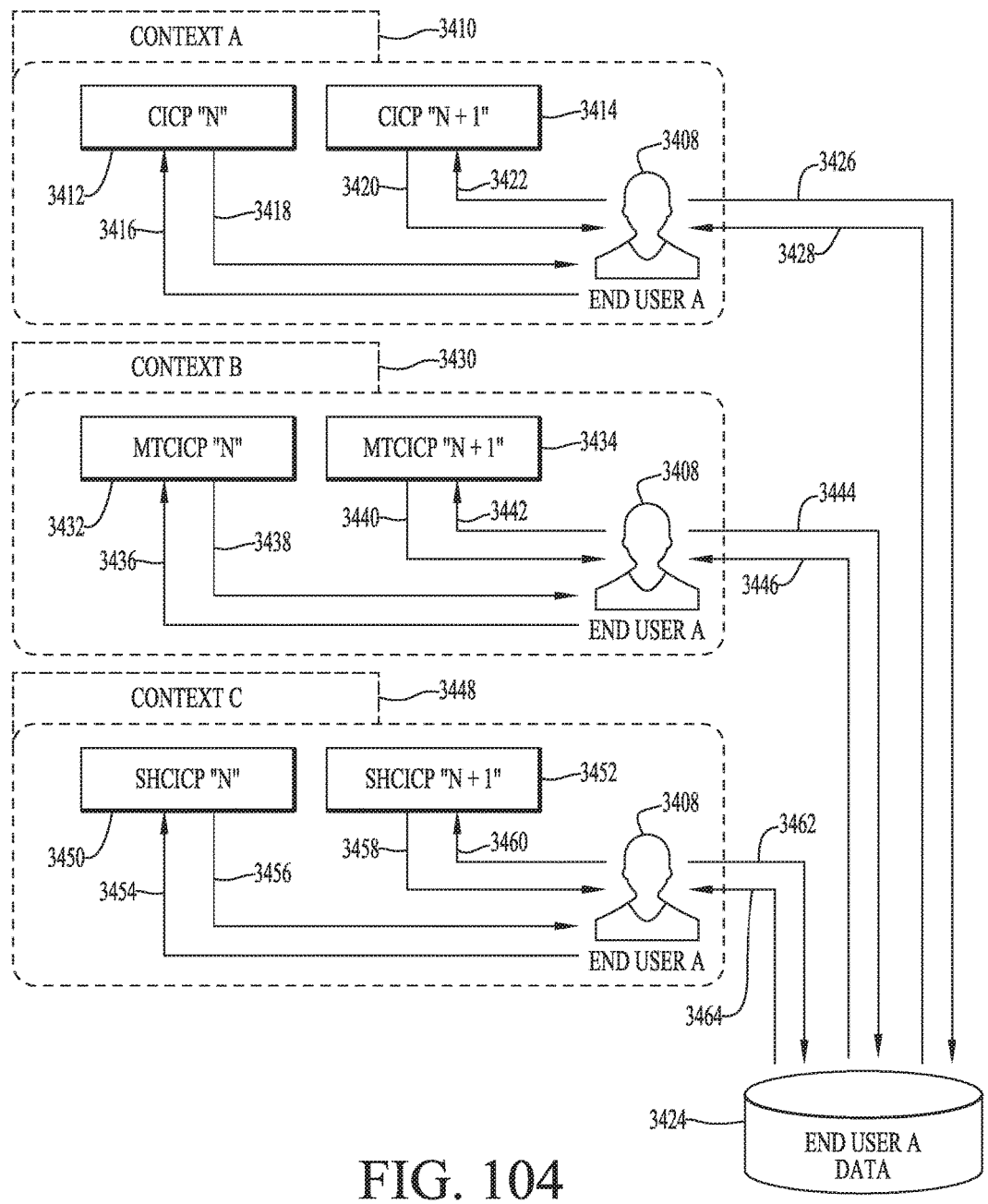

FIG. 104 depicts the multiple player system depicted in FIG. 103 with additional groups of players connected via their own group's CIGSERGP for multiple player groups.

Figure 105:
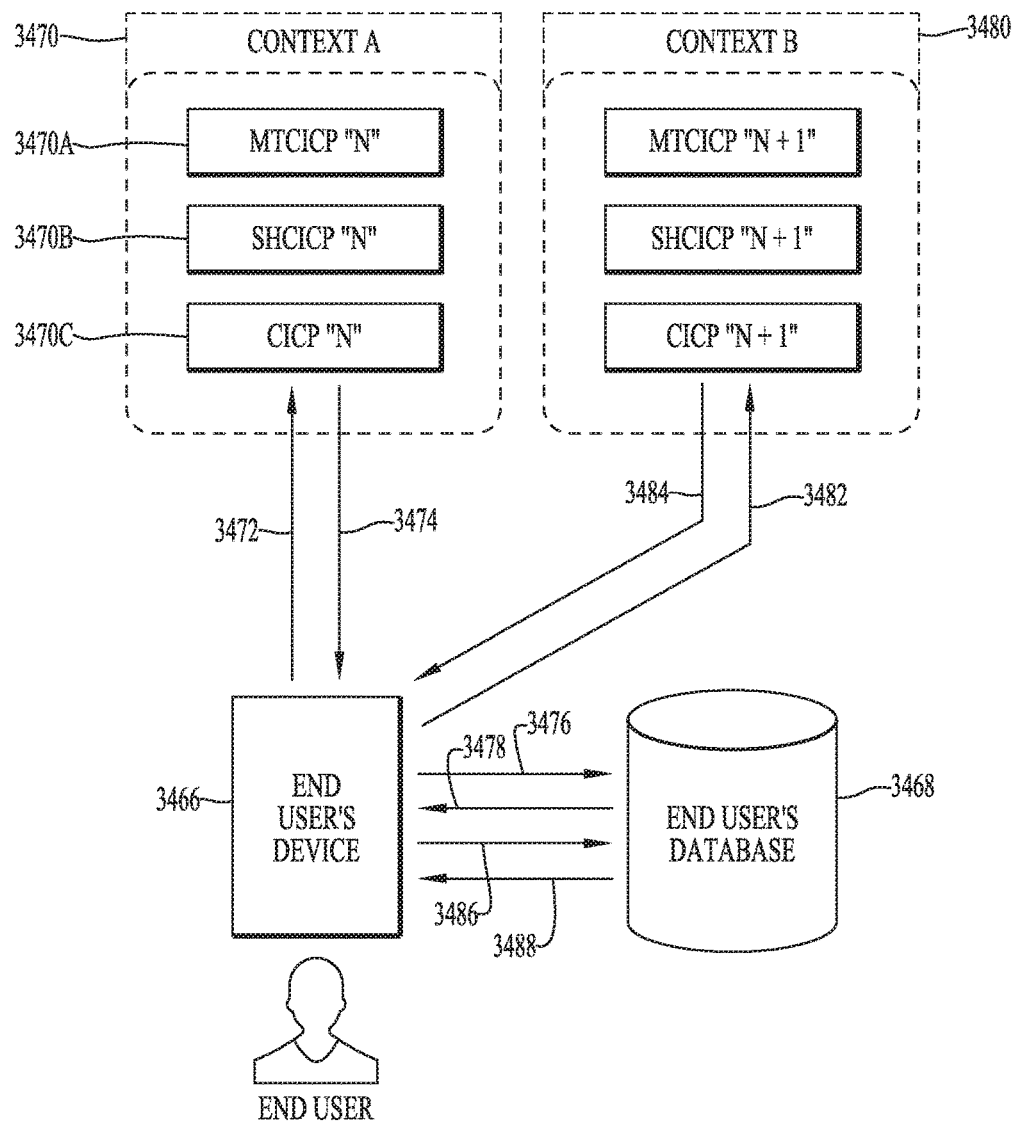

FIG. 105 is a schematic overview of numerous various CICP systems capturing user data in one common database.

Figure 106:
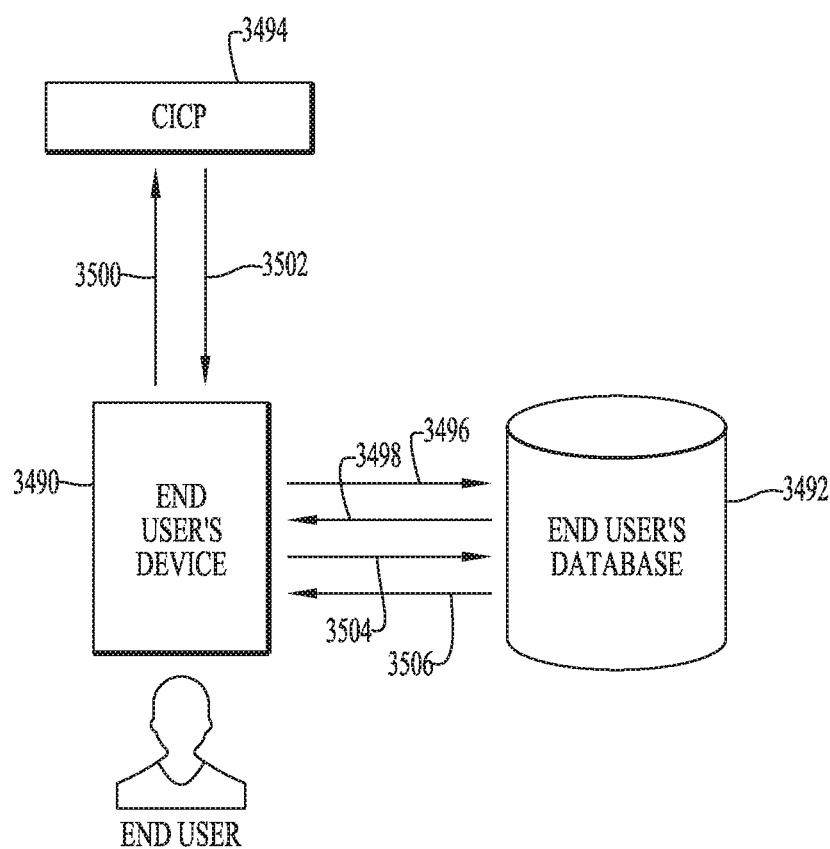

FIG. 106 is a schematic overview of an end user's communication device communicating with various CICP systems at multiple locations or environments with data gathered about the end user captured, stored and used in a specific end-user database.

Figure 107:
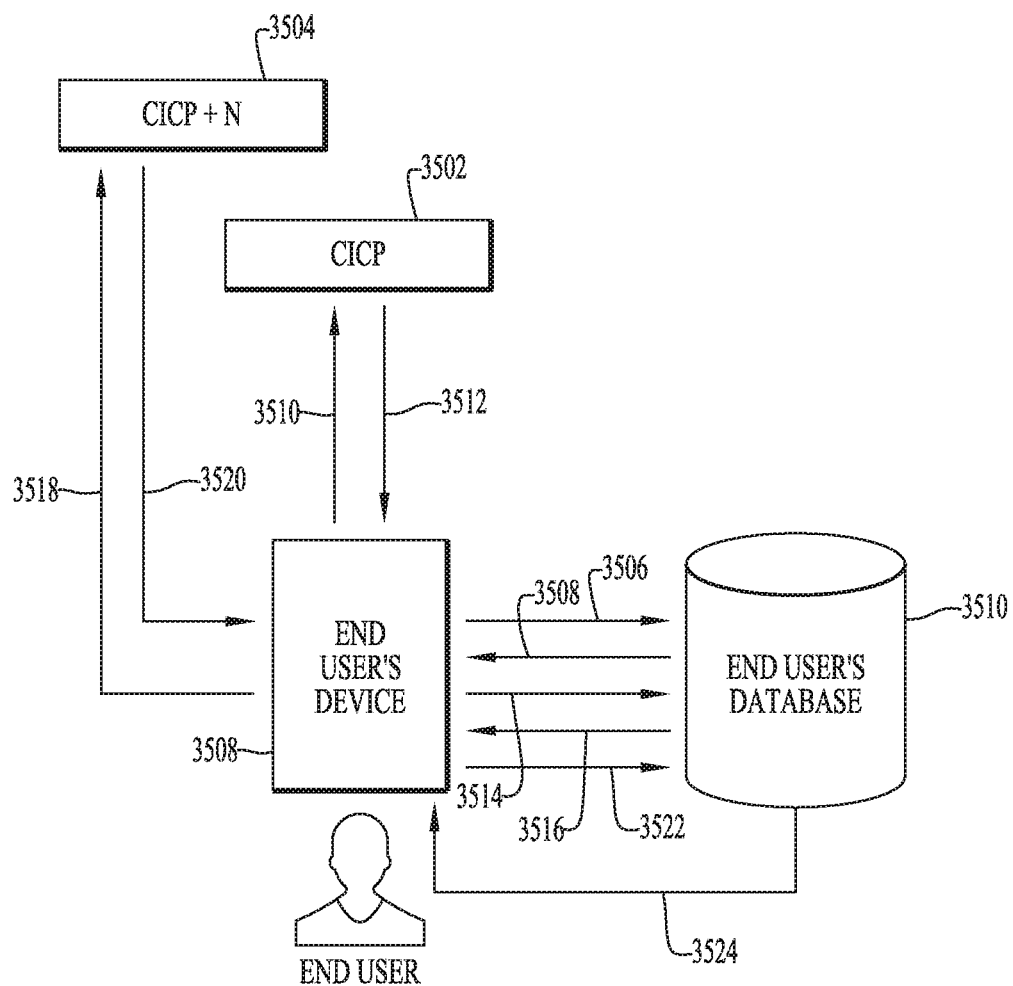

FIG. 107 is a schematic overview of the end user's data in the end-user database being used to interact with a CICP with results of the interactions captured and stored in the end user's database.

Figure 108:
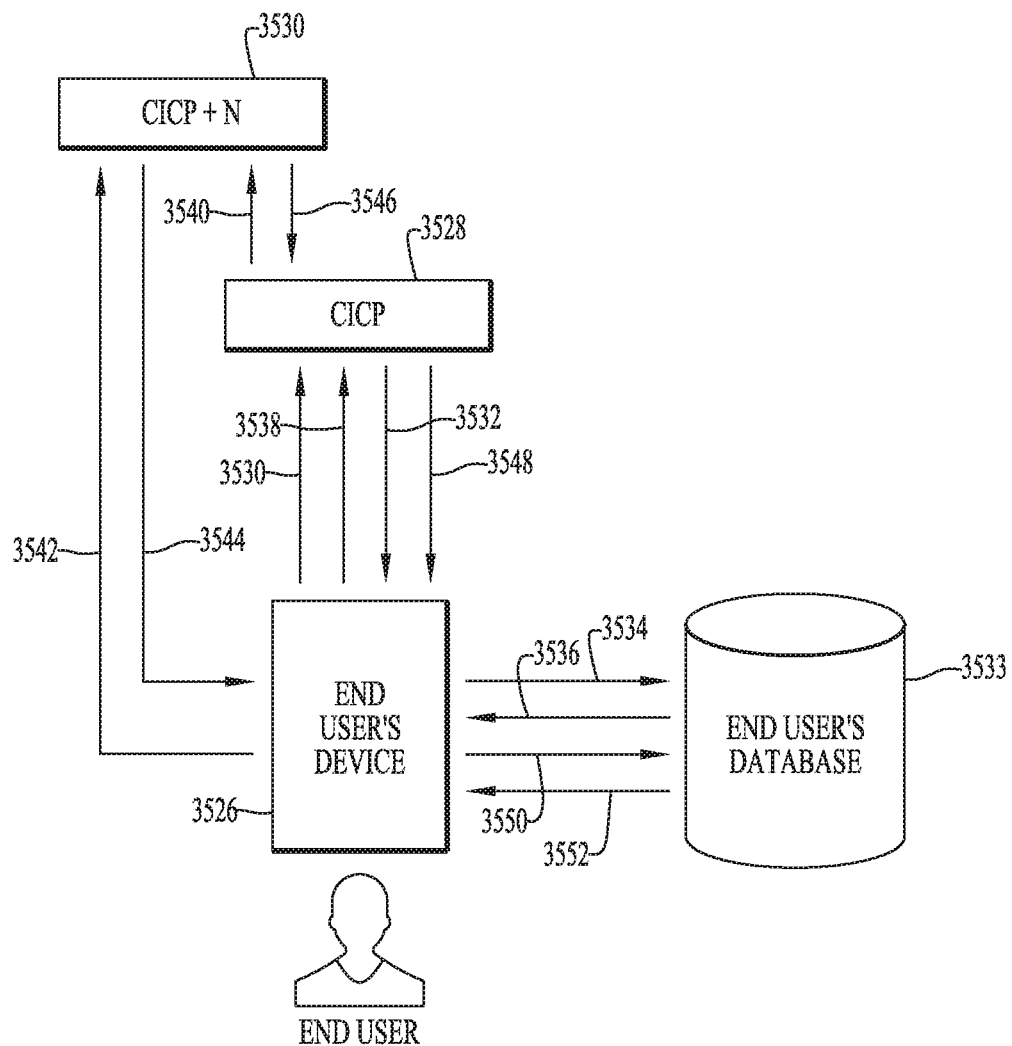

FIG. 108 depicts how the interactions and system depicted in FIG. 106 is expanded to interact with multiple CICP systems.

Figure 109:
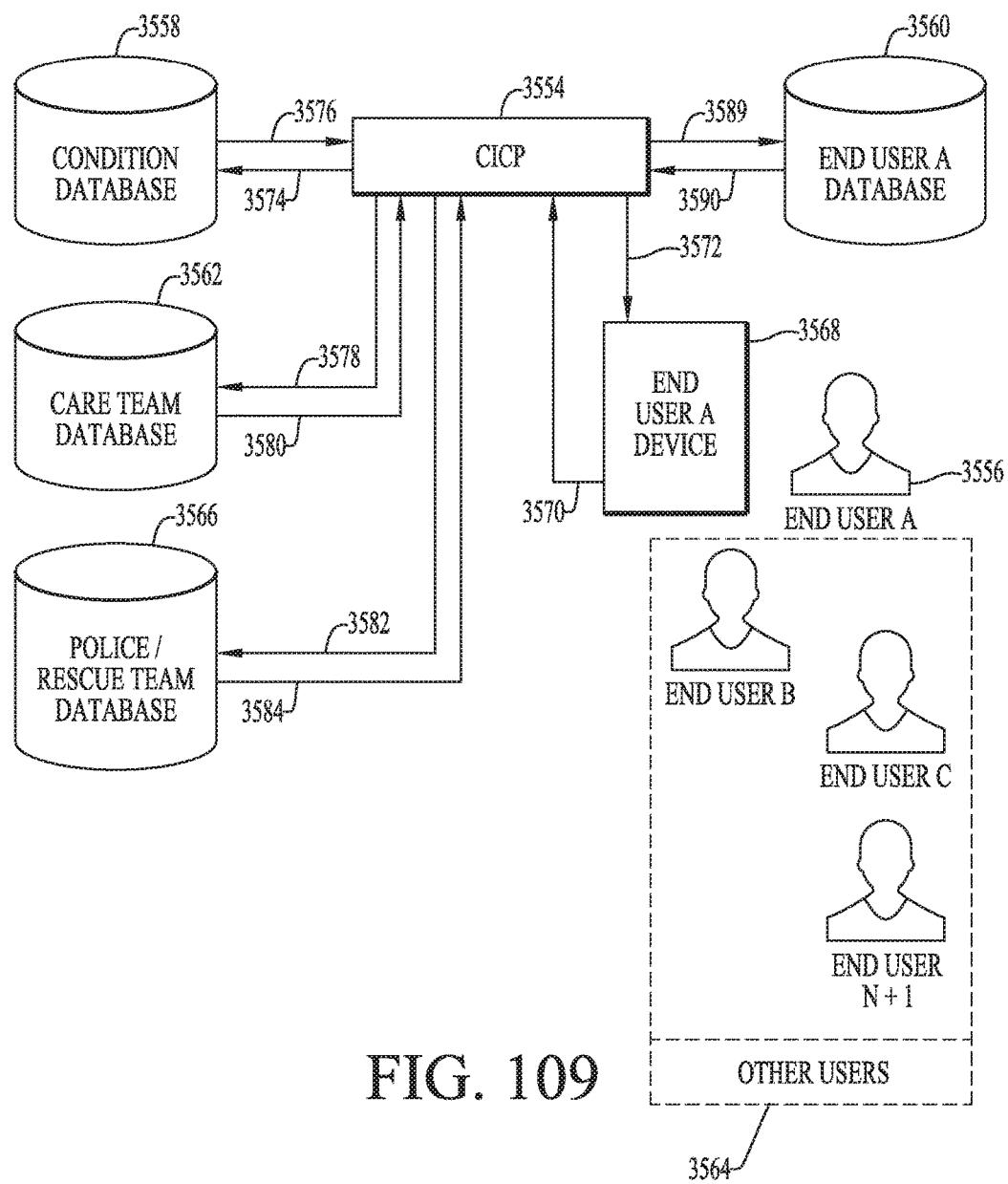

FIG. 109 depicts how the interactions and system depicted in FIG. 107 can be used to interact with new CICP systems the end user comes in communications with.

Figure 110:
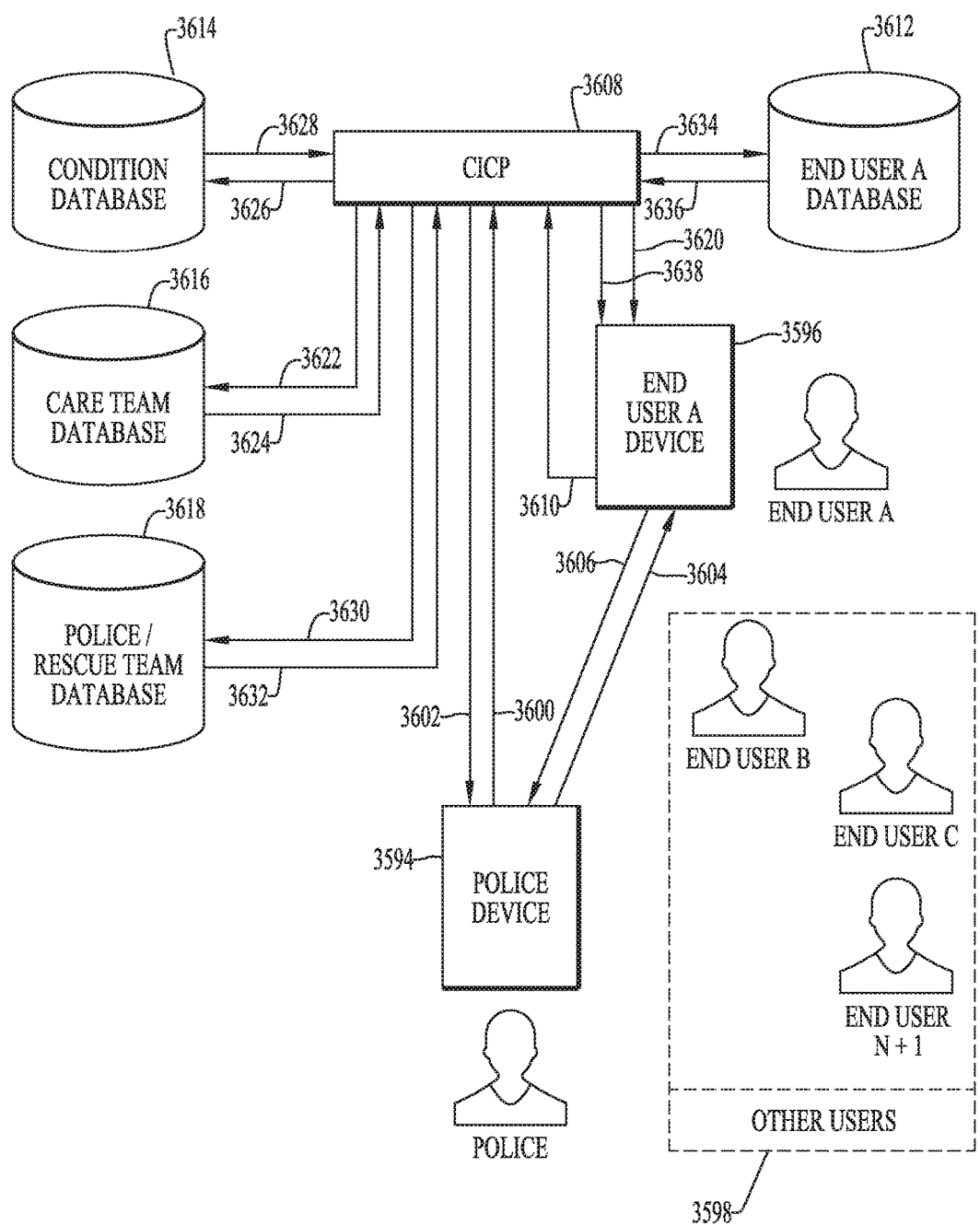

FIG. 110 is a schematic overview of a CICP system where a user has a condition that is known and this condition is communicated via the CICP to a series of care givers and law enforcement/rescue teams.

Figure 111:
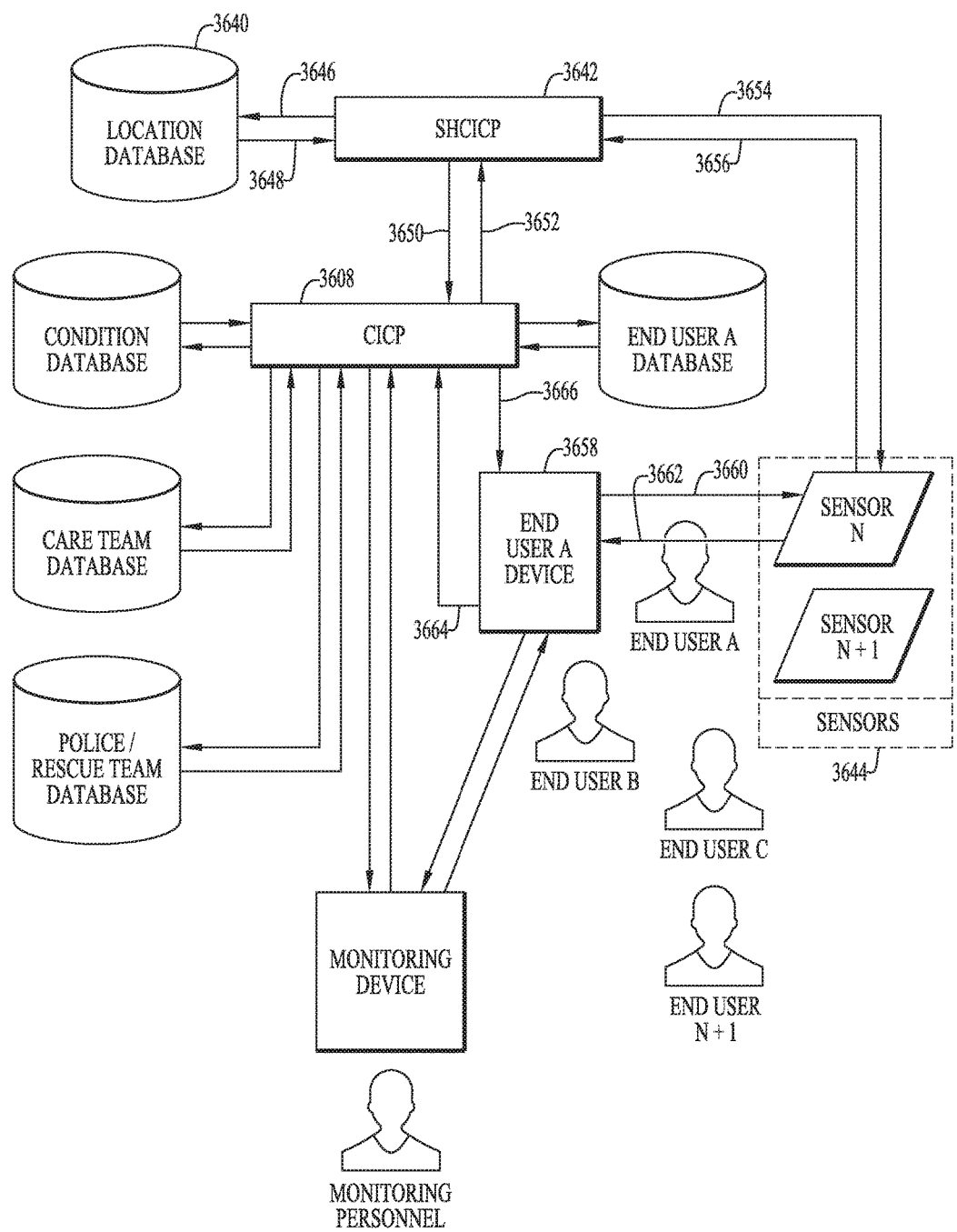

FIG. 111 depicts the system in FIG. 110 when a police officer with a device enters a crowd of people with one communicating with the system depicted in FIG. 110.

Figure 112:
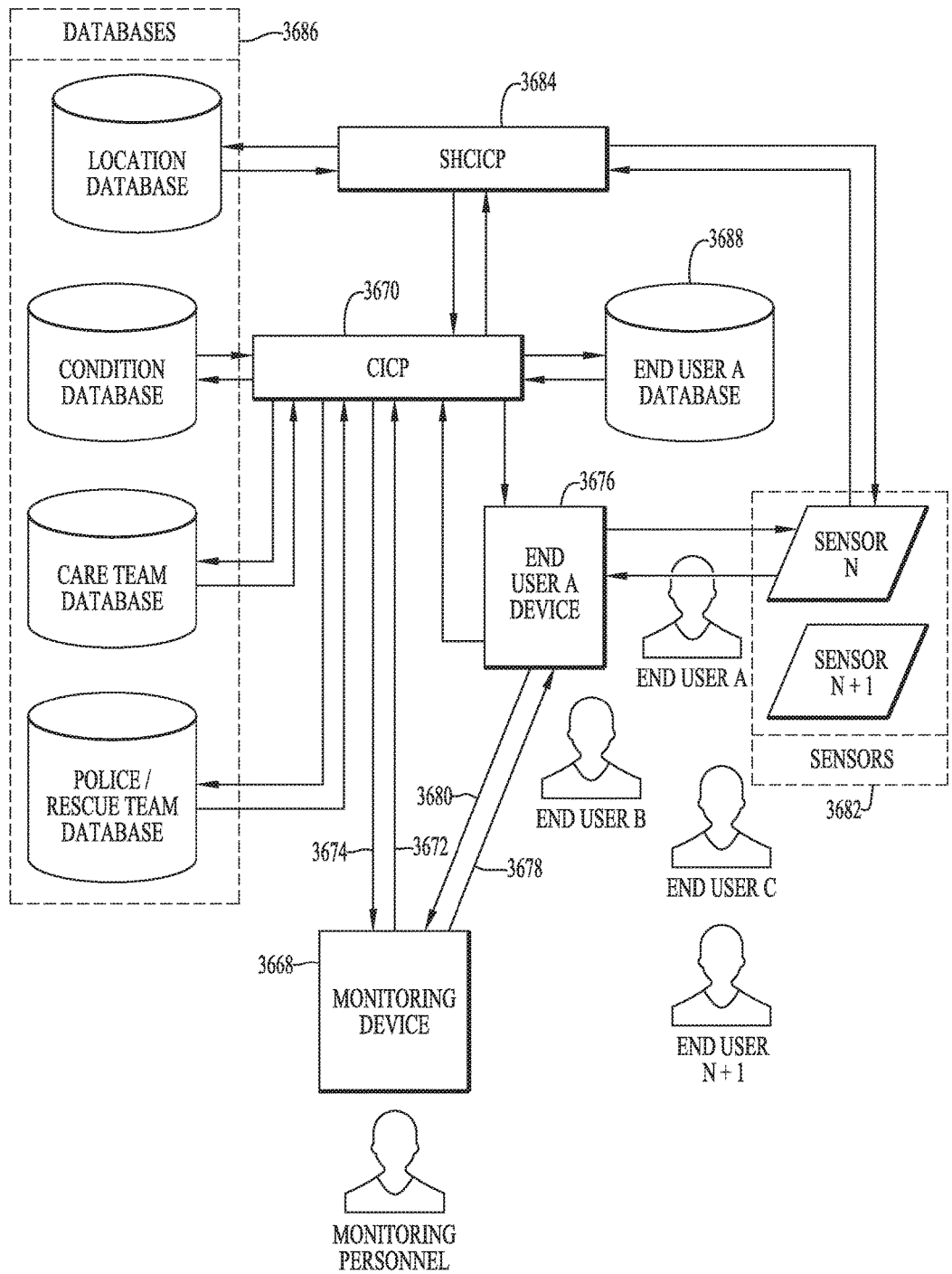

FIG. 112 depicts the system in FIG. 111 when connected to a SHCIP with a series of sensors in a location and data base with knowledge about the location.

Figure 113:
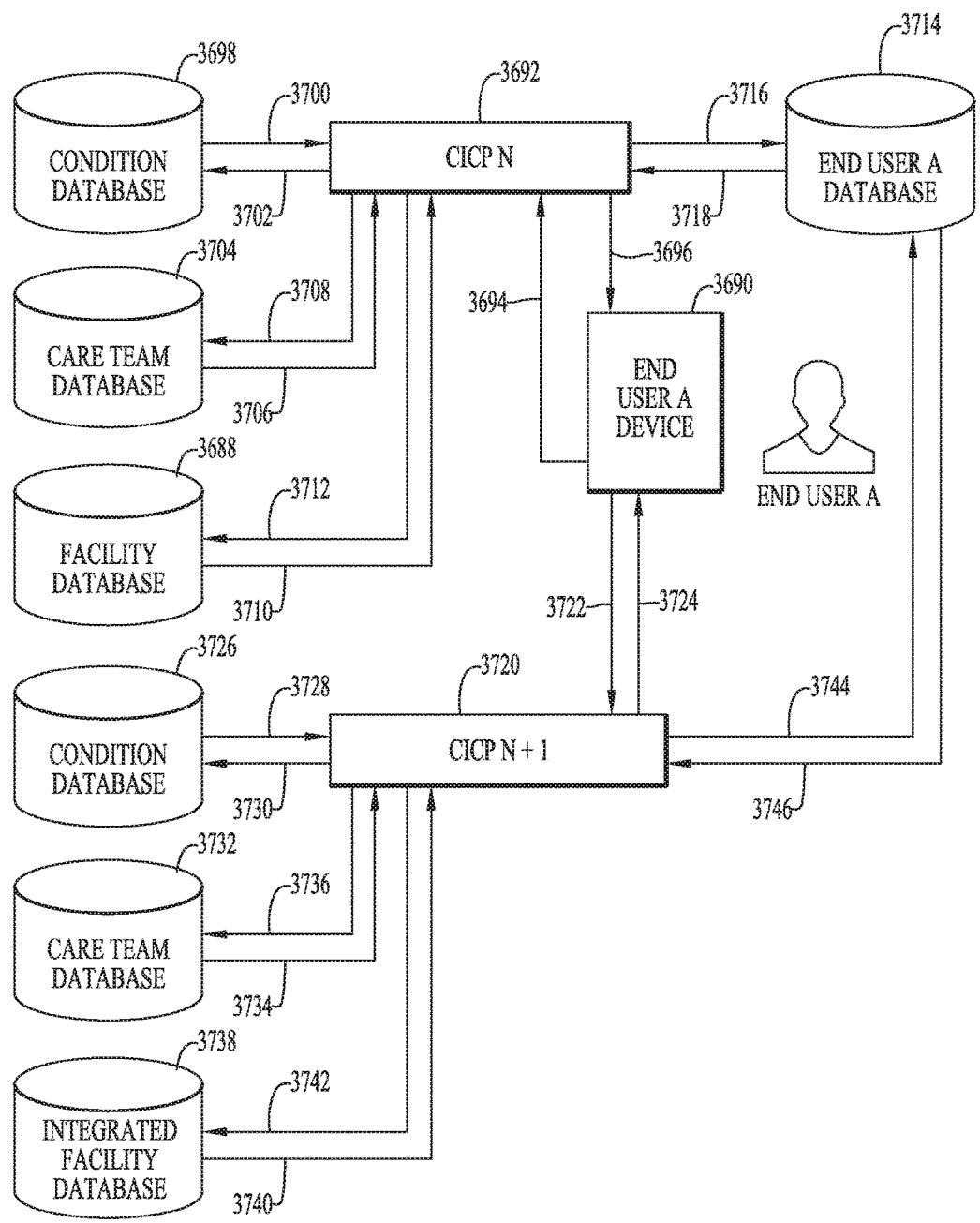

FIG. 113 is a schematic overview of a facility where there are multiple CICP systems, multiple operators and systems, known conditions of the End User and a care team all connected and communicating with a database with known information about the end user.

Figure 114:
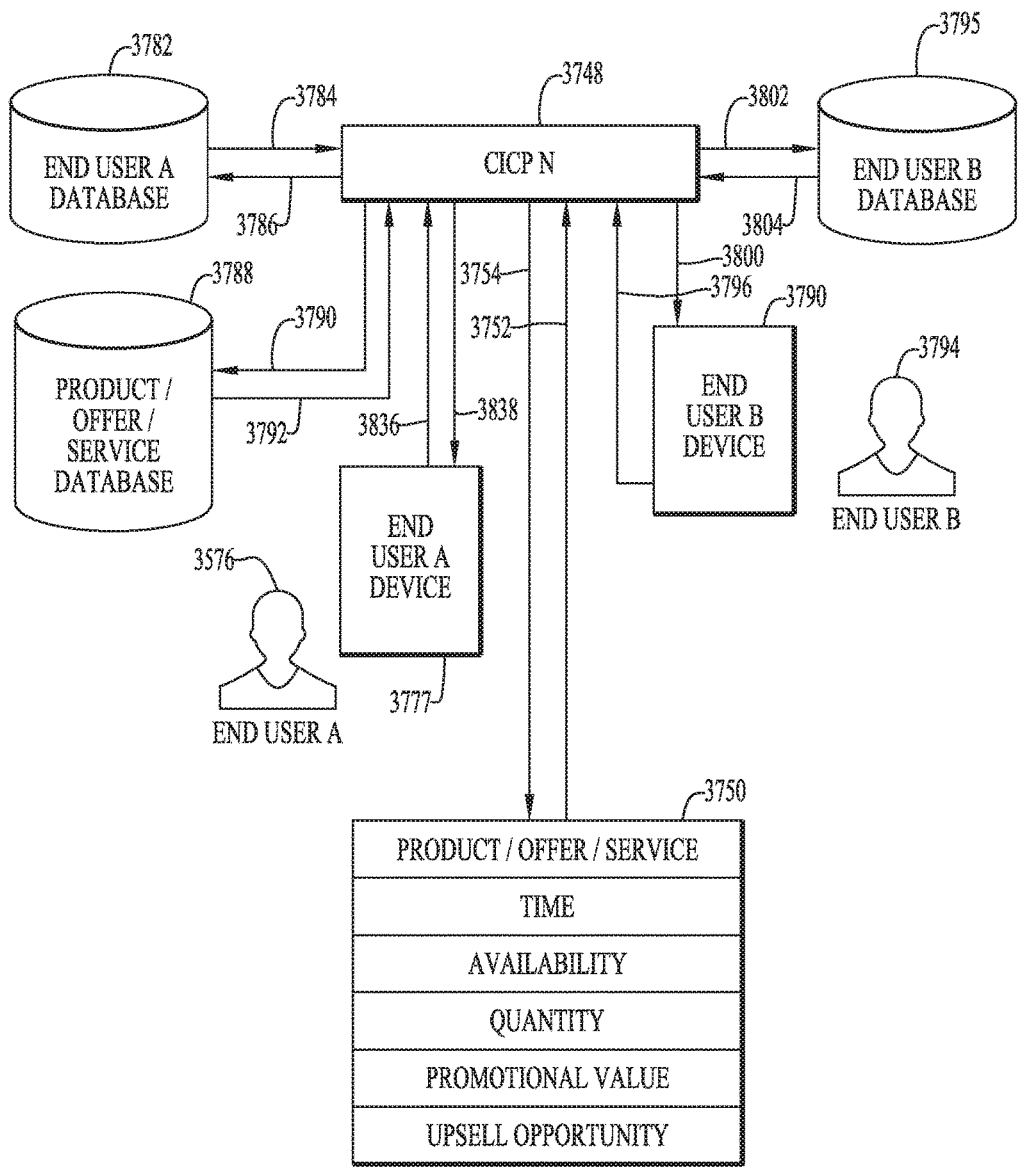

FIG. 114 is a schematic overview of a CICP system that connects a series of end users and their databases with a series of offers and services triggered and presented by the CICP.

Figure 115:
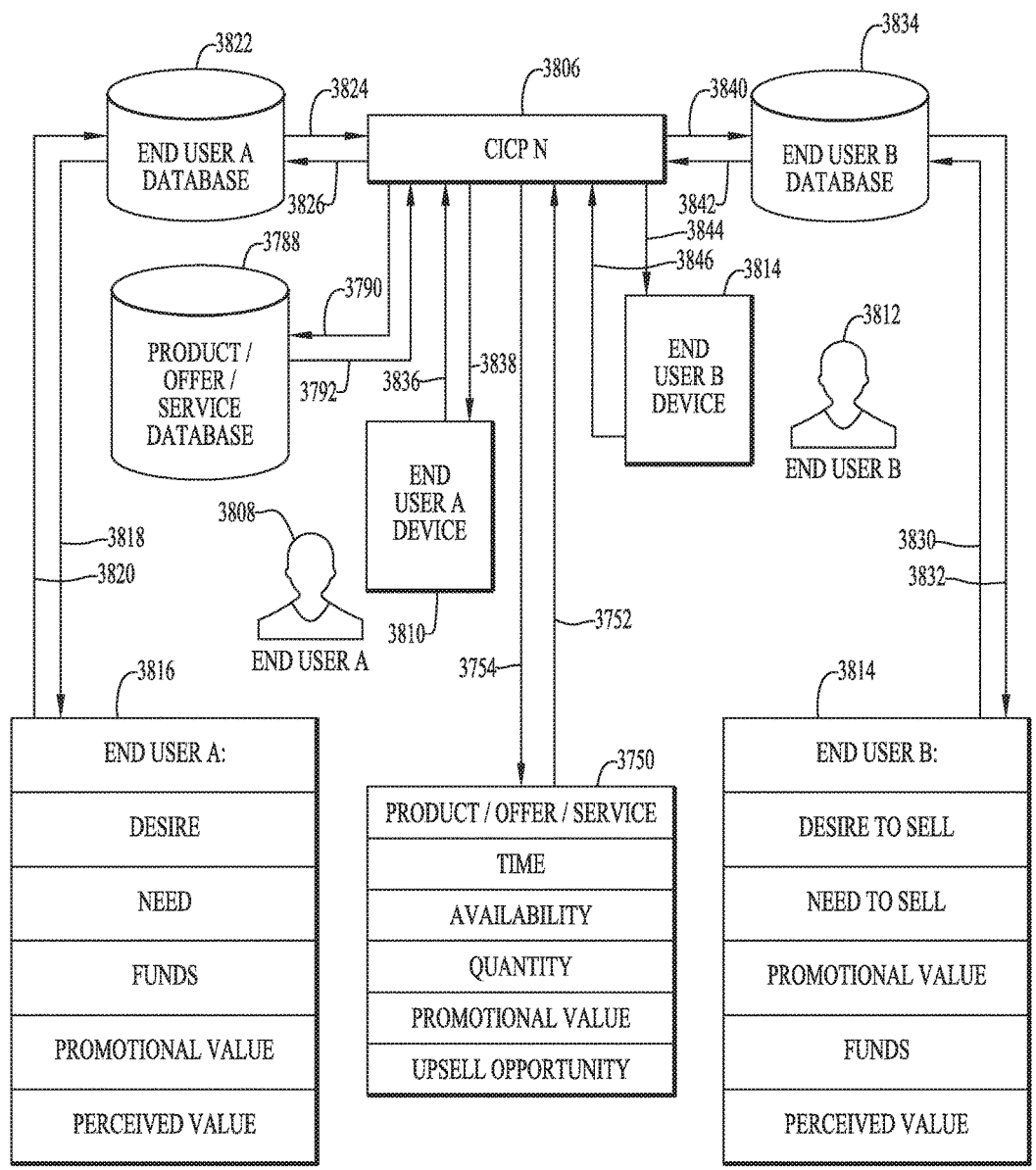

FIG. 115 is schematic view that expands the system depicted in FIG. 114 with end users who have a service or product or offering to sell, promote or present to another user or have a desire to engage in a transaction or trade or sale to another end user via the same CICP as depicted in FIG. 114.

Figure 116:
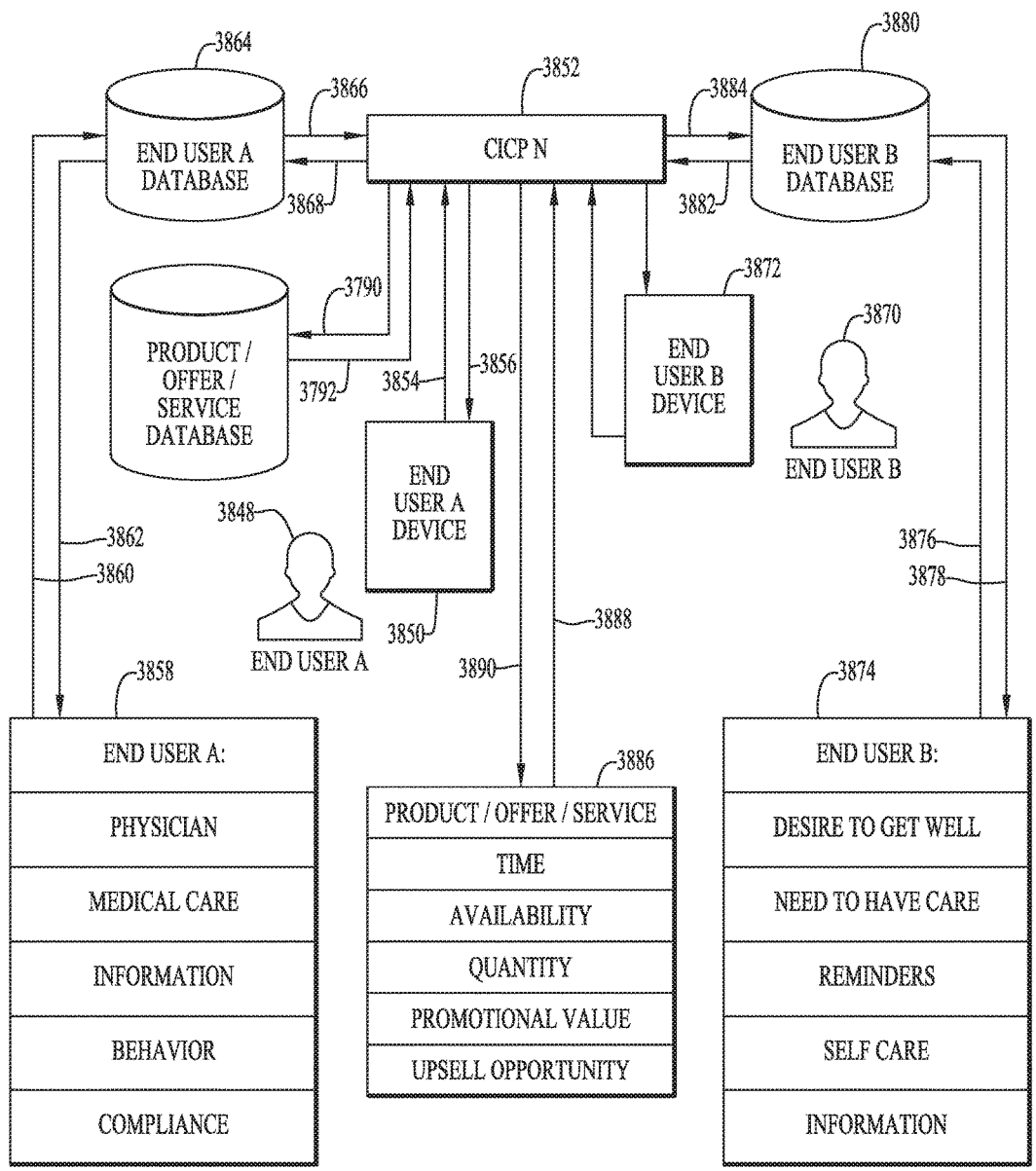

FIG. 116 depicts a system as described in FIG. 115 where the type of end users of FIG. 115 is replaced with end users who are any of a patient/recipient of care, care giver or health care provider, such as a physician communicating via a CICP system as described in FIGS. 114 and 115.

Figure 117:
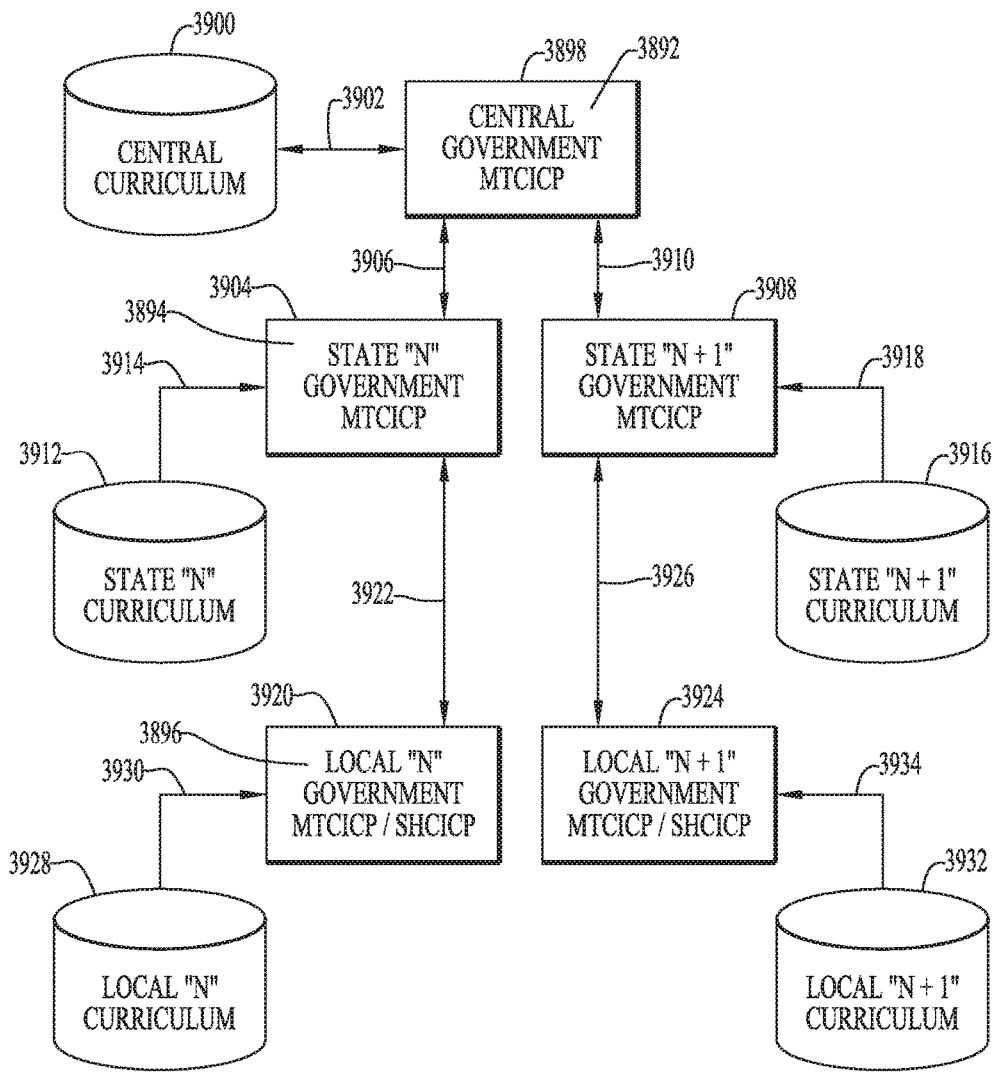

FIG. 117 depicts a system where a central government has an MTCICP that include several or a series of CICP sub-governmental entities or sub-systems communicating with each other.

Figure 118:
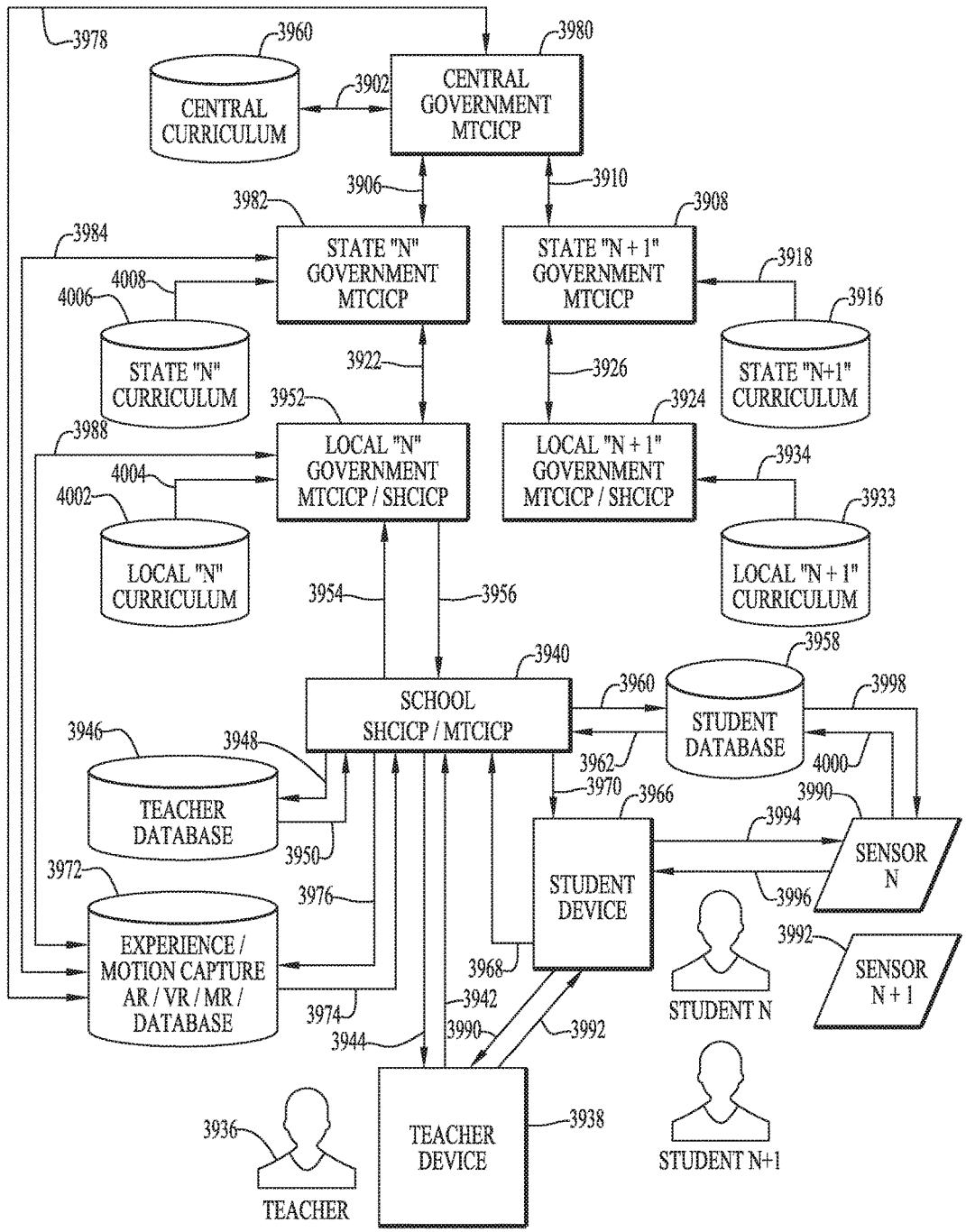

FIG. 118 depicts an example of the FIG. 117 system, for a specific, exemplary use where the sub-governmental entity is a local school and the system is used by the school for active teaching systems that include activity, sensors, student devices and databases with central teacher databases and CICP systems.

Reference symbols or names are used in the Figures to indicate certain components, aspects or features shown therein. Reference symbols common to more than one Figure indicate like components, aspects or features shown therein.

DETAILED DESCRIPTION OF INVENTION

In accordance with embodiments described herein interactive, electronic networks, in the form of computer-implemented, enterprise applications or platforms according to the present disclosure will be described in detail. The embodiments herein are presented in a systems level description. Specific examples of code have been written, and other specific code could be written by persons of ordinary skill in this field of technology and that would enable operation of the inventions described herein. Techniques and commercially available applications for generation of such specific computer-implemented code are well-known and the capability to write such code is well within the level of skill of ordinary coders who work in this field of technology.

In its most general sense, the present invention is a computer-implemented enterprise application or platform configured to provide functionality as further described. Embodiments of the application or platform are preferably intended to work in conjunction with the systems and processes described in International application PCT/US13/062504, U.S. application Ser. No. 14/040,677, filed 28 Sep. 2013, now U.S. Pat. No. 9,338,622 issued May 10, 2016, U.S. provisional application 61/882,593, filed 25 Sep. 2013, U.S. provisional application 61/709,710, filed 4 Oct. 2012, U.S. provisional application 62/324,283, filed 18 Apr. 2016, and U.S. provisional application 62/379,150, filed 24 Aug. 2016, (the subject matter of which is individually and collectively referred to as contextually intelligent communication platform(s) or CICP(s)), and each of which is incorporated herein by reference. The presently described embodiments do not depend or rely on the CICP(s), but preferably include one or more aspects, components and/or features of the CICP(s) incorporated by reference herein.

The presently described embodiments are directed to CICPs that have a master control component, which preferably is an enterprise holding a master license for that specific enterprise, and having the capability to assign sub-levels of control and various types of access to that enterprise-specific application.

Also, the master licensee is preferably granted permission to sub-lease access to selected and defined sub-licensees. The present computer software implemented application can thereby be distributed in a manner that will permit specific enterprise licensees and sub-licensees to generate commerce by controlling and being responsible for all operations of the specific MTCICP application licensed to that enterprise and its licensees and sub-licensees, respectively.

The multiple layers of control and multiple types of access and control within and spanning the multiple layers are advantageous aspects of the present application, and enable the capability of sending the correct or right messages to the correct or right user(s) at the correct or right time and place.

Figure 1:
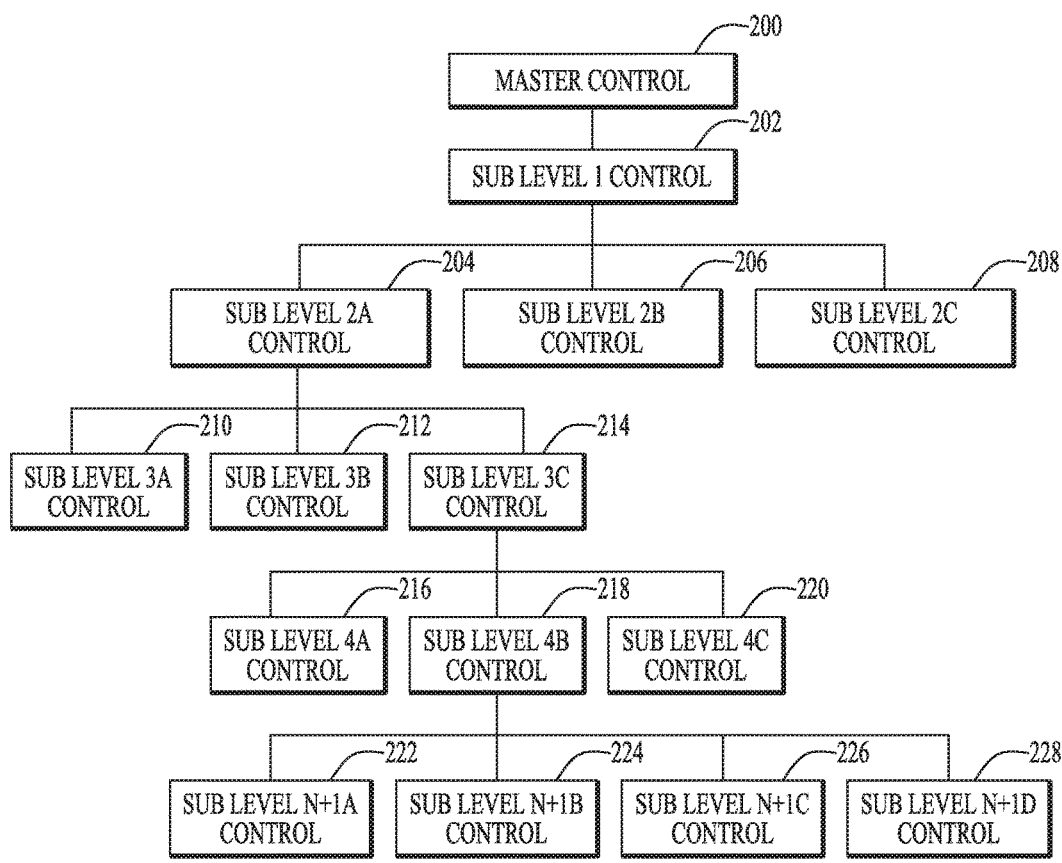
FIG. 1 is a schematic overview of an exemplary multi-tenant architecture for a preferred platform or system showing different and various layers and control over those layers.

Multi-Tenant, Real-Time Embodiments Adapted for Delivery of Contextually Intelligent Content, Offers and Experiences to Designated Recipients With reference to FIGS. 1-118 preferred embodiments of the interactive, computer software implemented electronic network application may be configured as a multi-tenant contextual intelligent communication platform (MTCICP) that functions to deliver real-time contextually relevant content, offers and experiences to designated recipients while simultaneously gathering and recording real-time performance data for multiple administrators or users associated with multiple organizations that are connected to the application and having access to various designated levels and designated types of access within, among and spanning the levels and types of access for each organization or group of multiple organizations.

With reference to FIGS. 1-5, the Master Control 200 may be configured to grant access to designated users for various designated levels, sub-levels, controls, sub-controls, parts and/or components of the application or system based on any of numerous predesignated criteria. As shown in FIG. 1 for example, at Master Control 200, the application is preferably implemented for a specific enterprise, such as for example a national chain retail store, a hospital, a convention center, etc. Master Control 200 preferably is computer-implemented software or code that has the capability of controlling all of the types, sub-types, levels and sub-levels of control and/or access for users within the enterprise and for users outside of the enterprise who have been granted some degree of access to a specific enterprise application. Preferably the Master Control 200 will be operated by a master licensee who licenses rights to use the enterprise application for its specific enterprise and who preferably has rights to sub-license rights under a master license. For convenience a person performing the functions of, or operating the Master Control will be referred to as the master control user. This user preferably has the ability to control access to and operations of lower or sub-levels of control as shown in the FIG. 1 architecture and to control users at the lower or sub-levels. As shown in FIG. 1, illustrative sub-levels of control are shown at sub-level 1 control 202, sub-level 2A control 204, sub-level 2B control 206 and sub-level 2C control 208. The users of the sub-levels are referred herein to as sub-level control users. The Master Control 200 is shown as having one sub-level 202. Sub-level 1 control 202 is shown as having three sub-levels 2A, 2B and 2C at 204, 206 and 208, respectively. Sub-level 2A control 204 is shown as having three sub-levels 3A, 3B and 3C at 210, 212 and 214, respectively. Sub-level 3C control 214 is shown as having three sub-levels 4A, 4B and 4C at 216, 218 and 220, respectively. At sub-level control 4B, FIG. 1 then continues, by showing in generalized form the capability of the application to create and function with N additional sub-level controls. The number N can be a large number, depending primarily on the complexity of the specific enterprise and the number of users. In FIG. 1, N=4 and thus the sub-level N+1A control 222, N+1B control 224, N+1C control 226 and N+1D control 228 would each be at the fifth sub-level, respectively, and so on with the system capable of having additional controls and users at each sub-level (control E, control F, control G, etc.) and additional sub-levels beyond five sub-levels (sub-level 6, sub-level 7, sub-level 8, etc.).

Preferably the system enables the master control user with authority and capability to control the specific enterprise MTCICP, including all sub-level controls. The system is preferably adapted to enable the master control user/licensee to sub-lease or grant access to predesignated and defined licensees and/or sub-control users.

The enterprise application is preferably distributed or provided to users by conventional means, such as to the master control user/licensee by an Internet connection. The master control user can then further distribute or provide specific levels of control within the specific MTCICP, also by conventional means, so that the licensed enterprise itself will operate the specific enterprise platform in a manner that will generate commerce or some other activity. Preferably, the master control user/licensee will be responsible for all operations of the specific MTCICP, such as, for example, sales and distribution for a manufacturing or retail business; patient care and communication for a health provider enterprise; access to and communication with governmental units for a governmental application; and providing education, instruction and training at virtually all levels and types of learning activities for an educational enterprise. The capability of the application or system to provide the master control user/licensee control with access to and use of each of, and groups of multiple layers, multiple controls at each sub-level and/or multiple types of control of the platform is an advantageous feature of the present system because it provides the capability of ensuring that the correct or right message(s) are sent to the correct or right person(s) or user(s) at the correct or right time and to/from the correct or right place(s).

Figure 2:
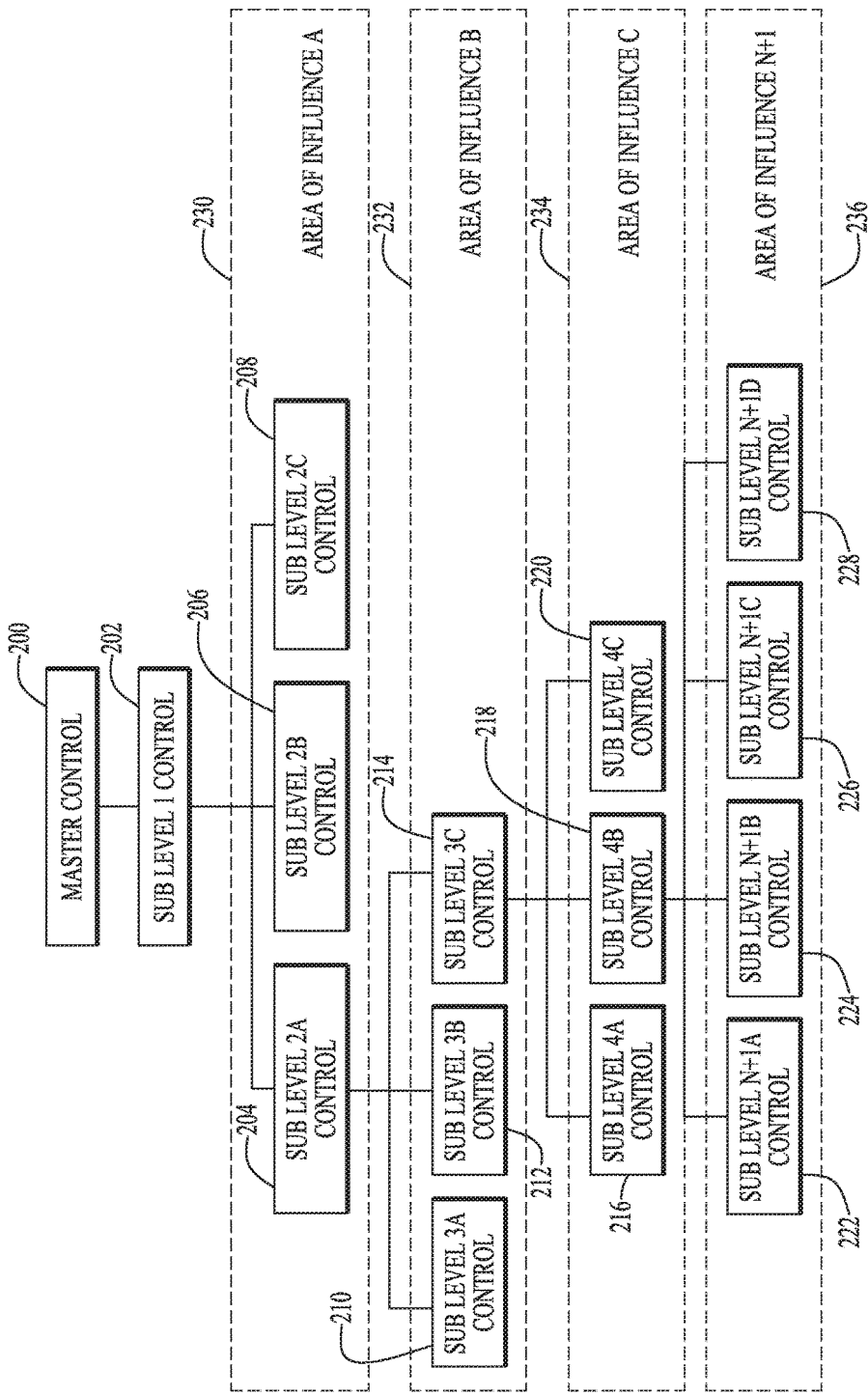
FIG. 2 is a schematic overview showing areas of influence controlled by different layers of the of the FIG. 1 platform.

FIG. 2 shows a general, exemplary architecture or scheme whereby the various levels of access are grouped into functional of areas of influence, such as sub-level 2 controls 204, 206 and 208 designated as within area of influence A, shown at 230. Sub-level 3 controls 210, 212 and 214 are designated as within area of influence B, shown at 232. Sub-level 4 controls 216, 218 and 220 are designated as within area of influence C, shown at 234. In the general case, sub-level N+1, controls 222, 224, 226 and 228 are designated as within area of influence N+1, shown at 236. The exemplary system illustrated in FIG. 2 is a system that is an extension of the FIG. 1 system, and is a system in which the areas of influence are preferably controlled by respective sub-users who are positioned at the various layers or levels of the overall architecture, although defining and designating areas of influence may be tasks assigned to some other system user, such as for example, the master control user. In another aspect of the nature of the areas of influence or definition or designation of areas of influence, an area of influence can be designated or defined, for example, as a geographical area, a subset of clients that designated sub-control users have access to, some grouping of users for which access is time-limited, or for which access is granted on some other predefined criterion or criteria. Thus, the system is adapted to provide for one or more areas of influence that can be defined by multiple criteria, such as a geographical area and specification of characteristics of a user or groups of users, interests of a user or group(s) of users, specific position of the user(s) in the larger geographical area, identity of any device(s) to which the end user has access, any device(s) associated with the end user and so forth. With respect to the system embodiments illustrated in FIG. 1 and FIG. 2, controls of and for the various levels and controls of and within each level and sub-level are shown. Preferably, specific assignment or designation of a specific degree or type of control and/or access is based on the nature of an area's influence at each of the various layers of system administration, respectively. Preferably, the master control and/or master control user has the capability to assign to one or more of the sub-levels of control, and the capability to set further controls at each level and sub-level. As one example, consider a convention center, such as the San Diego Convention Center, to be the master control and having a master control user. The Convention Center could lease designated Convention Center assets, and lease control of the system's sub-level 1 to a sub-level 1 control user, who could be a convention manager for a specific convention at the Convention Center or the convention sponsor of a specific convention at the Convention Center. The sub-level 1 user would then have access to the leased facilities and leased system during a specific time, such as when that specific convention is open in San Diego. The sub-level 1 control user would then have, for example, access to certain or predesignated sections of the Convention Center during certain or predesignated periods. More specifically, consider the well-known Comic-Con convention in which the convention manager or organization that hosts the convention then leases or sub-leases space in the convention center to exhibitors and content owners during that time. The number and types of levels and controls is variable, and can be changed over time. For example, in the case of Comic-Con, the entire Convention Center might be leased for control by the sponsor. For other conventions, perhaps taking place at the same or overlapping times, such as the American Cancer Society convention and the American Heart Association convention, only part of the Convention Center and part of the Convention Center assets would be leased to each organization, and each organization would have sub-level 1, "geo-control" over only the part of the Convention Center that it leased.

Continuing with the Comic-Con example, one exhibitor might be Marvel, who would lease space in the Convention Center from the convention organizer, i.e., the sub-level 1 user rather than from the master control user, which would be the Convention Center itself. Marvel might want the capability of having a proximity event trigger within its booth, and of having rights to influence only people within a certain distance from its booth. Also, exhibitor Marvel might want to have access to beacons or systems that are outside of the convention center, but included in the offerings by the Convention Center that are available to exhibitors. The system has the capability to provide for this level and type of access, and it could also be included in the lease. The ability or capability for the system to physically locate an end user inside or outside of the convention center is also included within the presently described system though use of various wireless devices. The system includes and uses a combination of proximity sensors, proximity beacons (or "i beacons"), near field communication tags ("NFC") and augmented reality triggers, for example, images that are located only within the booth. As used in the present system, proximity beacons, such as "iBeacons™" brand proximity beacons are conventional devices that are relatively small and transmit low power, BlueTooth signals for a specific range. Each preferably has an identifier that is assigned to it and is controlled by one more users of the present system for a specific use or specific application such as the San Diego Convention Center Comic-Con convention. The conventional proximity beacon signaling is received by a sensor, and the signals are then transmitted through the various levels of control in the present system, in accordance with access and control assigned to the device and the users as described herein. When an authorized end user is within the predetermined proximity of the device, the device's signal is transmitted to and received by the end user. Such proximity beacons are available from several sources, such as Kontak.io, Gimbal and Estimote. Gimbal brand proximity beacons are preferred, specifically its Series S10, Series S20 and U-Series 5, although any conventional proximity beacon device may be used, so long as it performs its signaling functions as required by the system described herein.

Considering another example, for use in a large retail enterprise, area of influence A could correspond to three countries in which the enterprise operates, area of influence B could correspond to three states in one of the three countries, area of influence C could correspond to three cities or counties or metropolitan regions within one of the states. Within area of influence C, a specific retail store could further designate areas of influence according to products, services or profit centers, such as "toys", "women's clothing", "sporting goods", "restaurant", etc.

Figure 3:
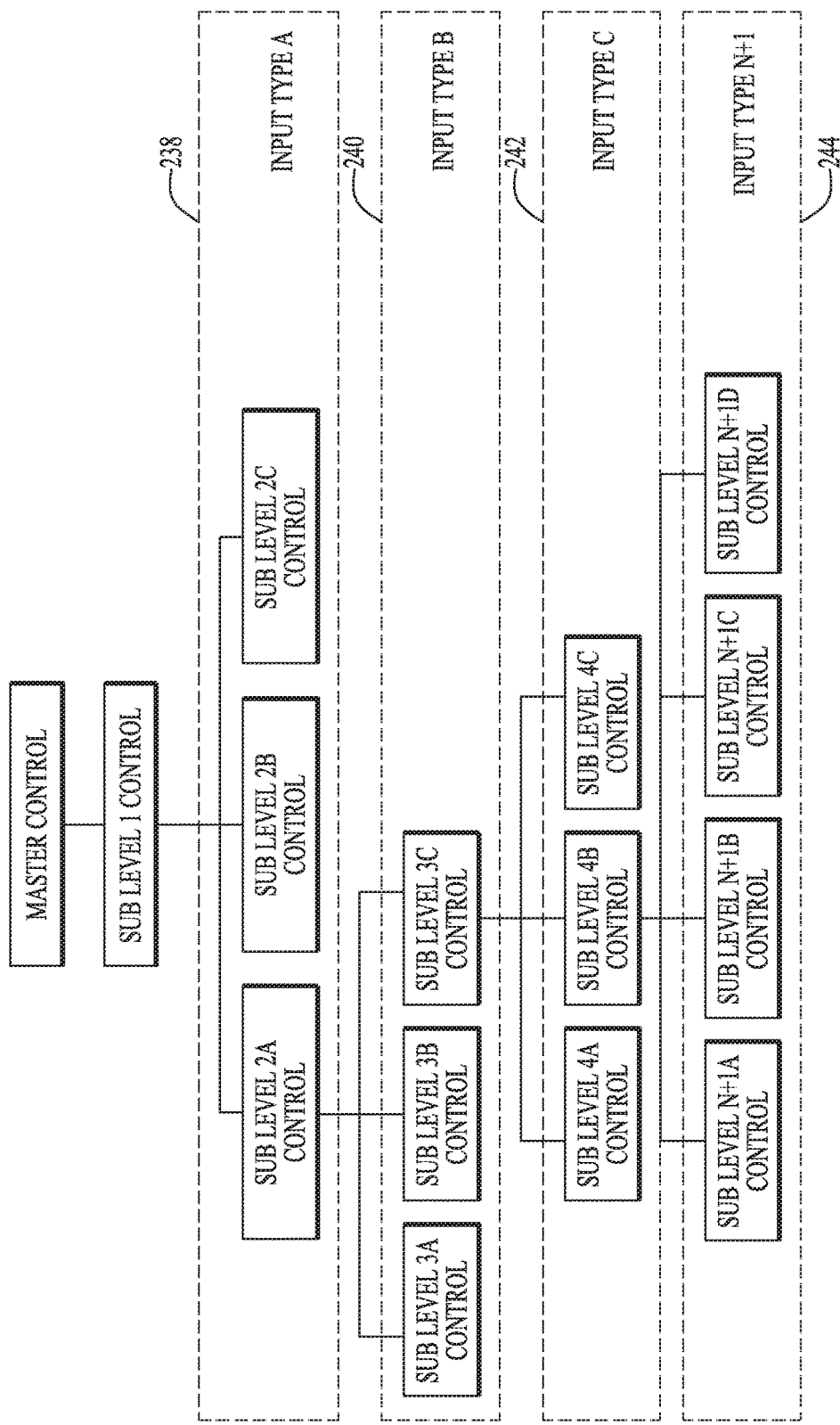
FIG. 3 is a schematic overview showing exemplary input types for the various layers of the FIG. 1 platform.
Figure 4:
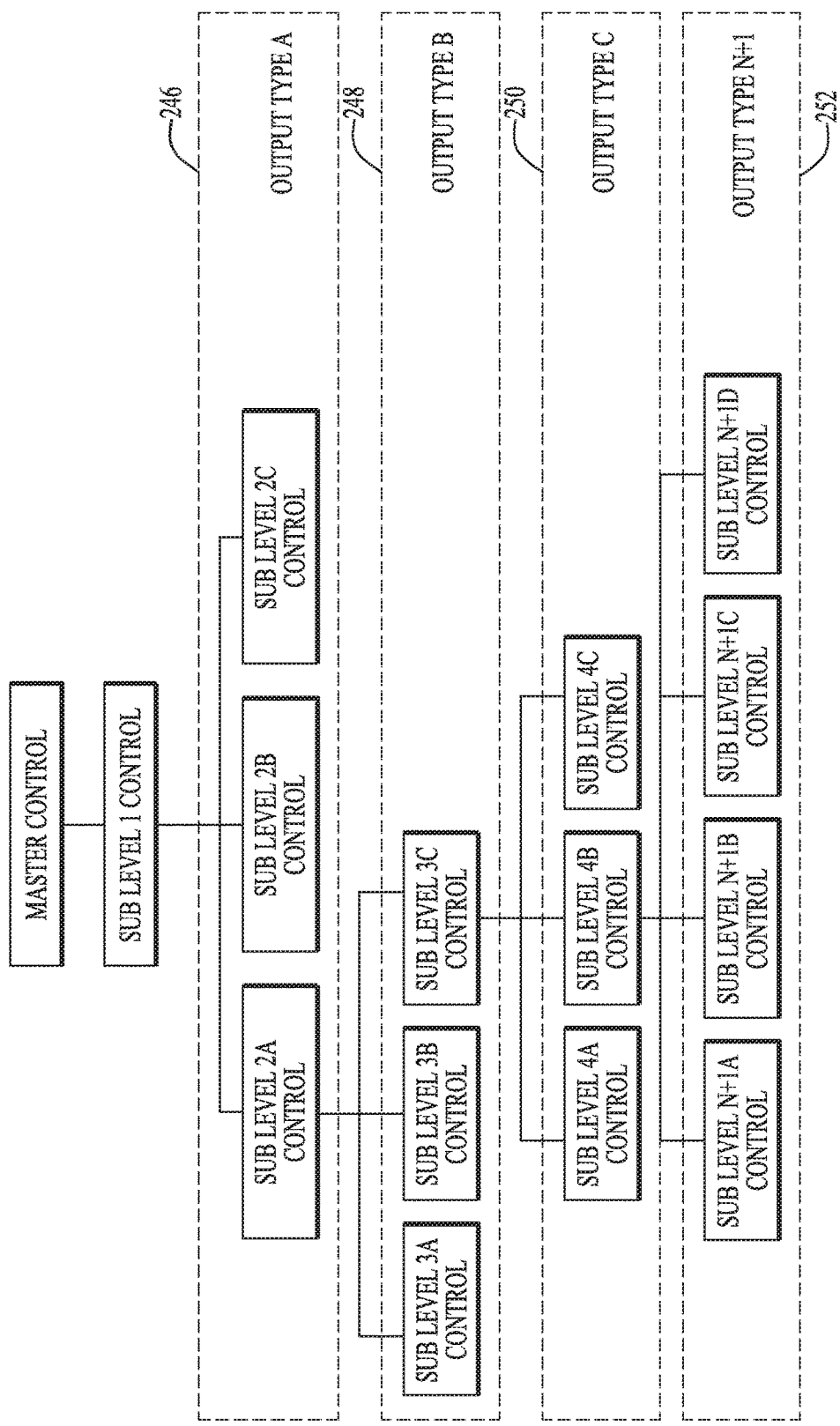
FIG. 4 is a schematic overview showing exemplary output types for the various layers of the FIG. 1 platform.
Figure 5:
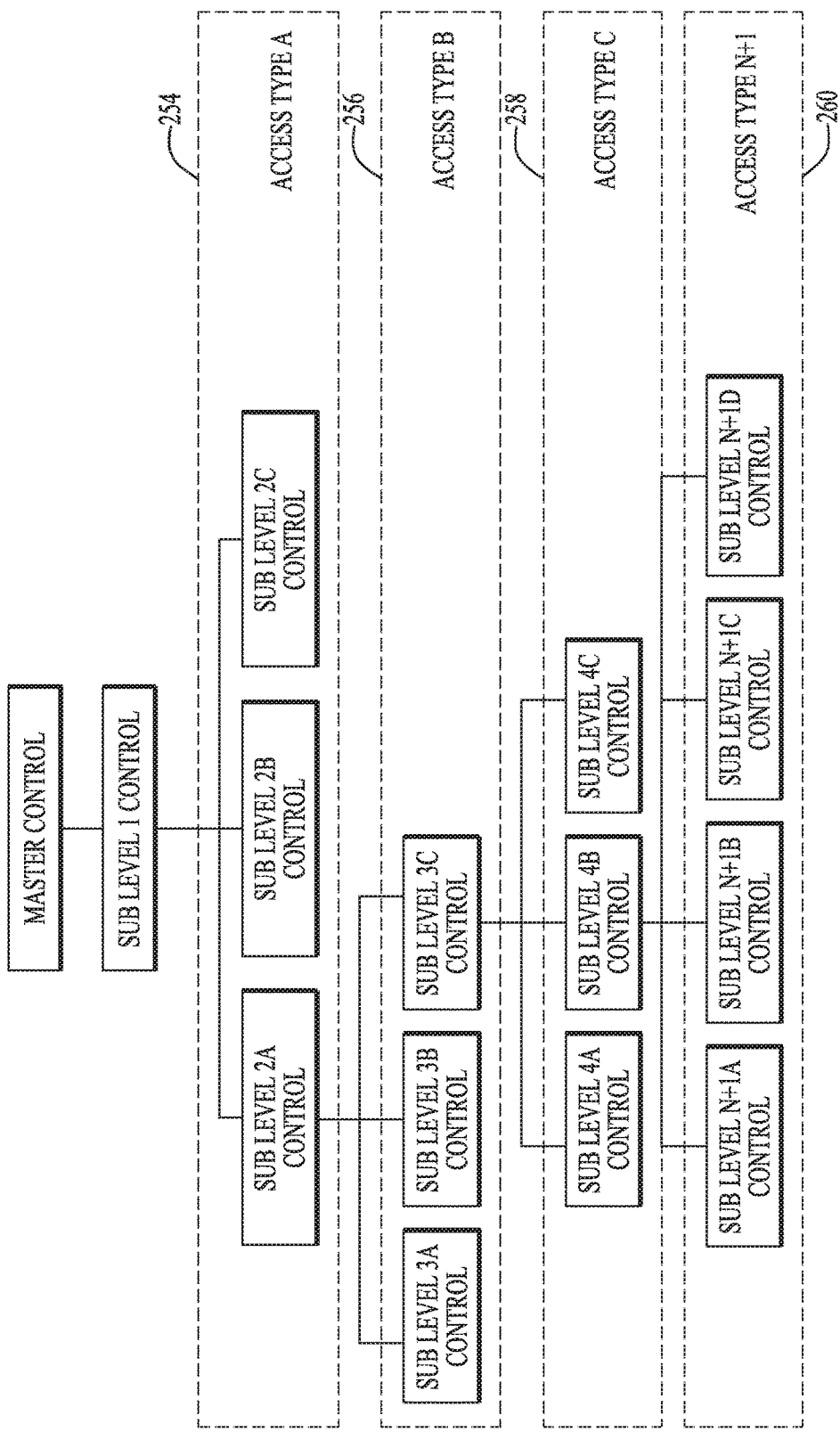
FIG. 5 is a schematic overview showing exemplary access types for the various layers of the FIG. 1 platform.

FIG. 3 illustrates granting different levels or degrees of control based on difference types of input, shown at 238, 240, 242 and 244, respectively. Referring to FIG. 4, another way in which the level and or degree of control could be assigned to users of the application is shown. Here the control is based on types of output, shown at 246, 248, 250 and 252. Referring to FIG. 5, another way in which the level and/or degree of control could be assigned to users of the application is based on the type of access, as shown at 254, 256, 258 and 260. Here the control is based on types of access to be granted to the various levels.

FIGS. 2-5 illustrate types of ways in which access and functionality for users can be assigned and controlled, but are intended not to limit the capabilities of the application. In general, virtually any defined feature and/or defined set of features, defined function and/or defined set of functions, defined location and/or set of defined locations, defined proximity and/or defined set of proximities may be used as criteria for the level of control and access that can be assigned or granted to specific users or groups of users of the application. Additional illustrative examples are described below.

Figure 6:
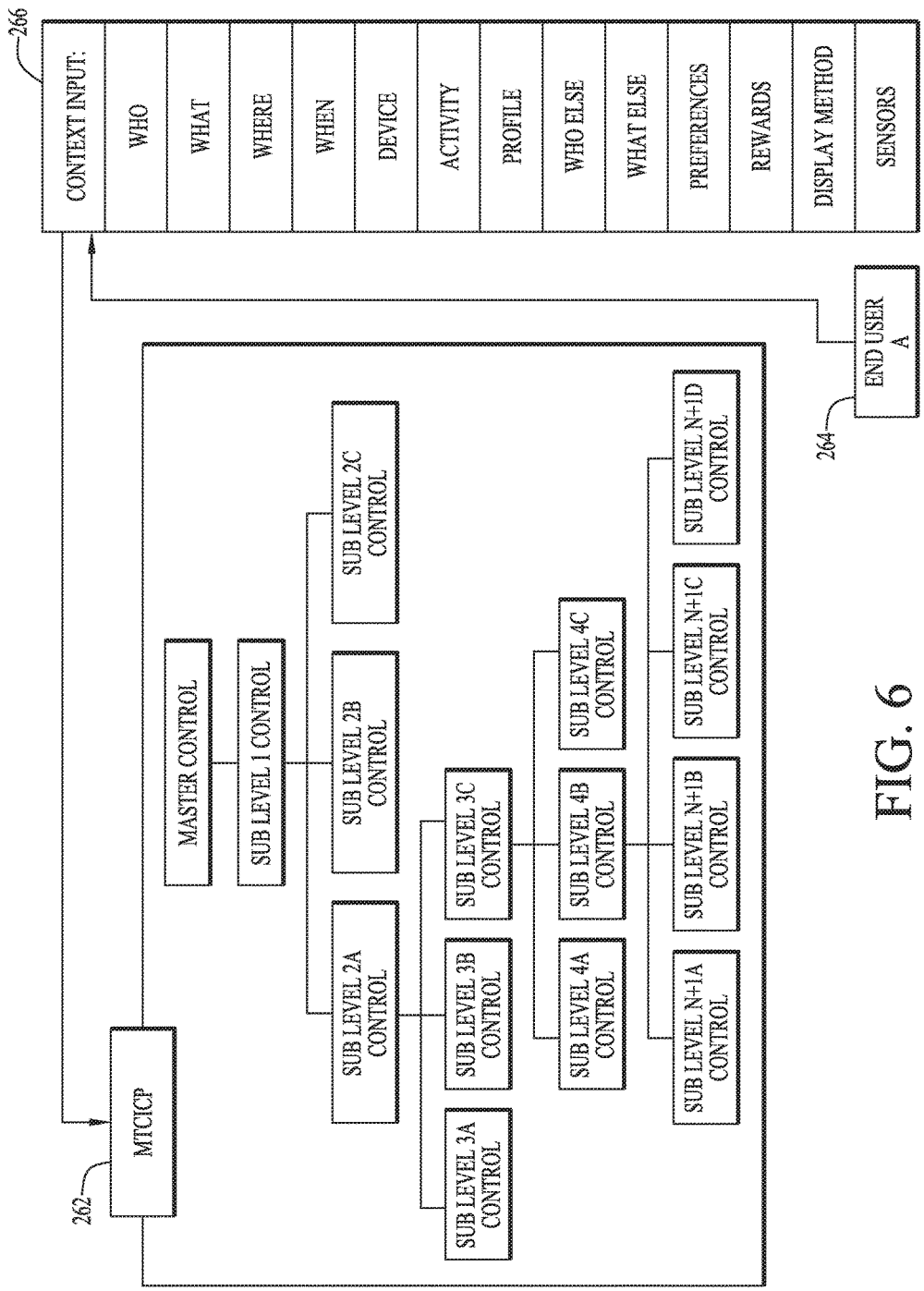
FIG. 6 illustrates exemplary inputs used to define a context for an end user of the FIG. 1 platform.

Referring to FIGS. 3 and 6, FIG. 6 shows an exemplary listing of types of information that the system is adapted to receive as input into MTCICP 262 for a designated end user A, shown at 264. The context input listing for end user A in FIG. 6 can correspond, in general to the context input described in the related applications identified above, and shown, for example in a list shown at 266 in FIG. 6, and in FIGS. 2-5 of International application PCT/US13/062504. The inputs 266 shown in FIG. 6 (not individually numbered) include but are not limited to application-specific designations of who, what, where, when, device(s), activity(ies), profile(s), who else, what else, preference(s), reward(s), display method and sensor(s).

Figure 7:
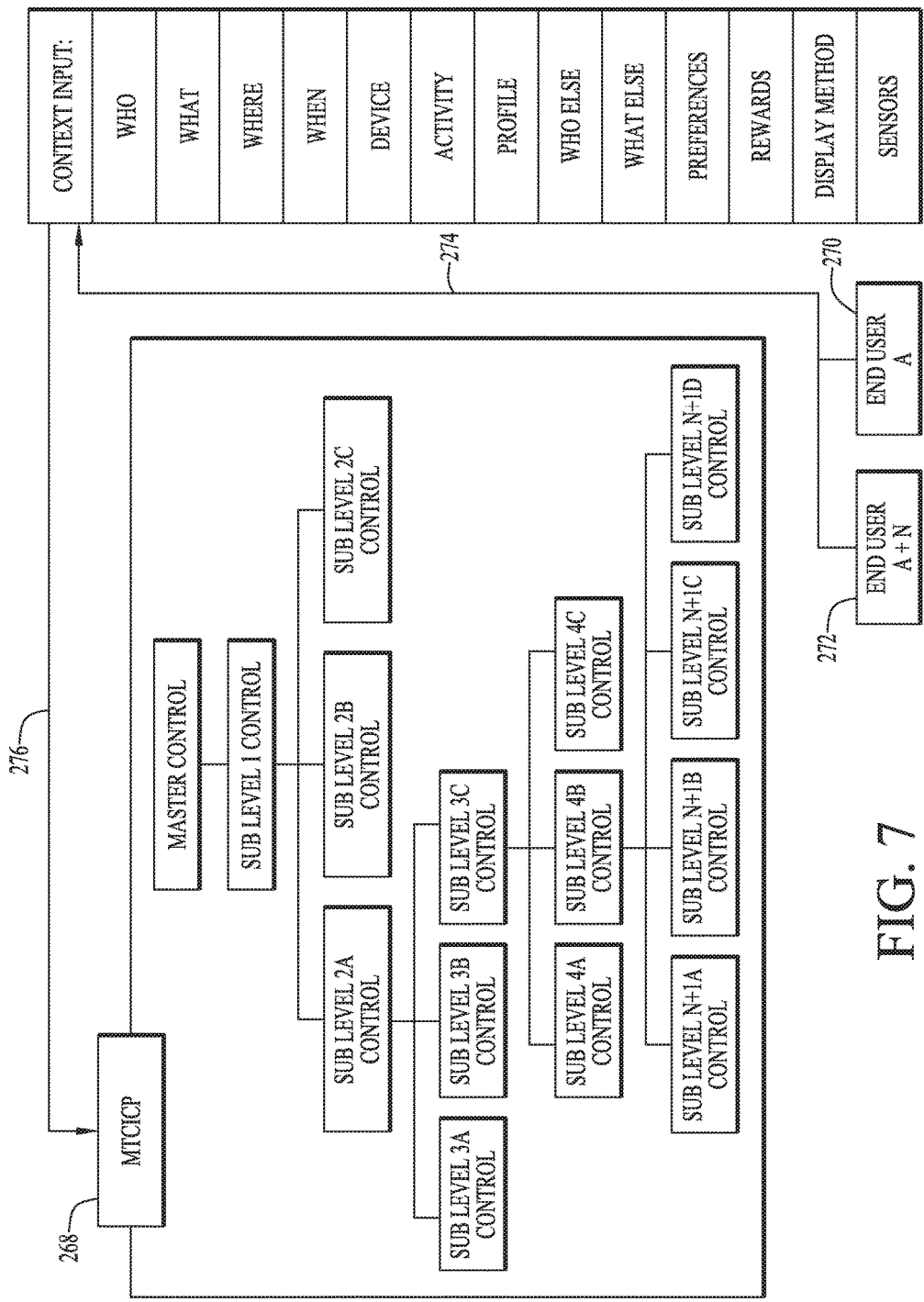
FIG. 7 illustrates the FIG. 6 inputs as expanded for more than one end user of the FIG. 1 platform.

In an alternate embodiment MTCICP 268, illustrated in FIG. 7, the application is adapted to accommodate multiple users 1+N, shown at 270 (end user A) and 272 (end user A+N) for content input as shown at arrow 274. The FIG. 7 embodiment MTCICP 268 also accommodates multiple users, and multiple context inputs, shown at arrows 270, 272, 274 and 276.

Figure 8:
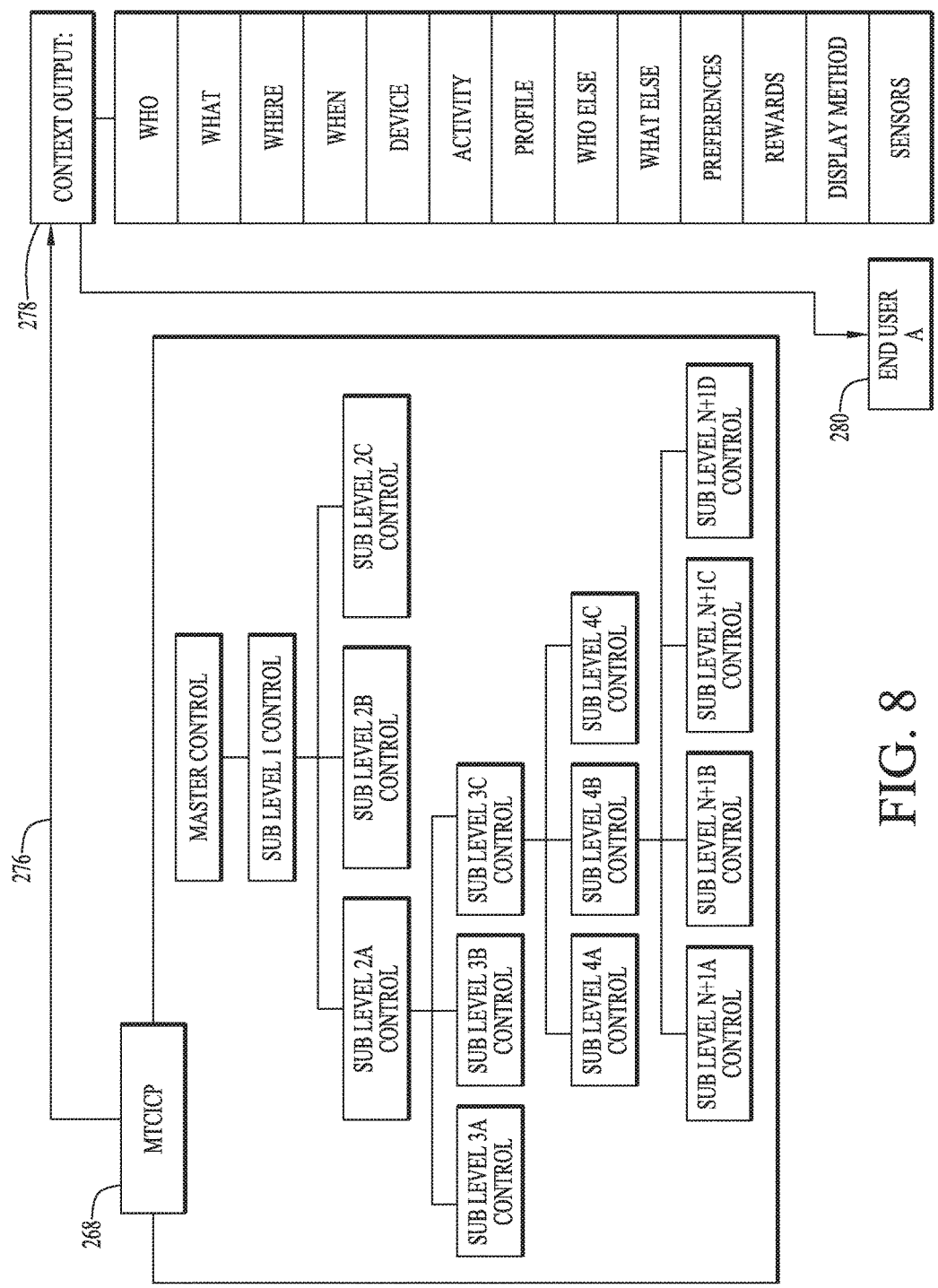
FIG. 8 illustrates exemplary context outputs for an end user of the FIG. 1 platform.
Figure 9:
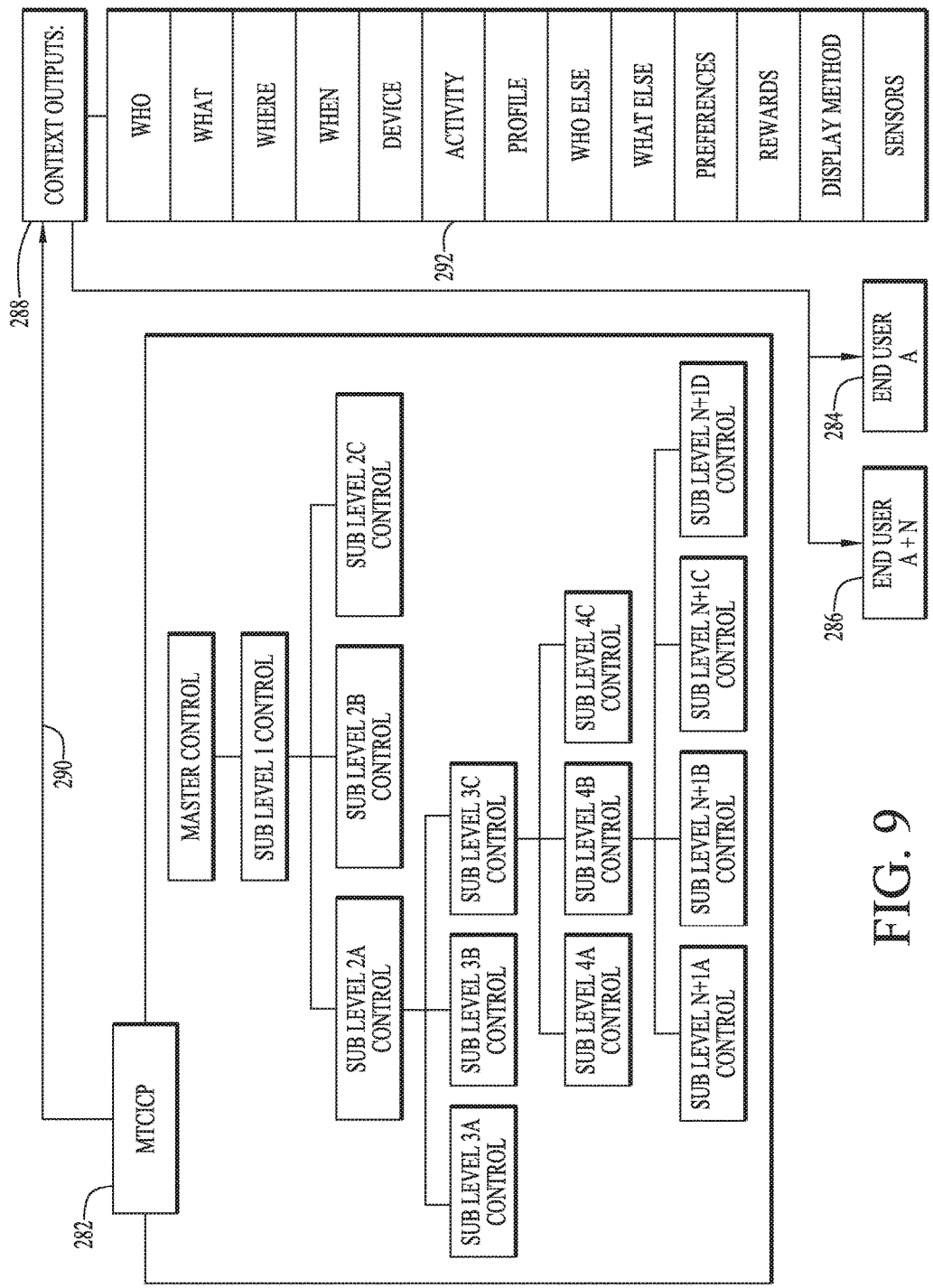
FIG. 9 illustrates the FIG. 8 context outputs as expanded for multiple users.

Referring to FIG. 8, alternate embodiment MTCICP 268 includes an exemplary listing 278 of types of information that the system is adapted to output from the MTCICP 268, shown with arrow 276 to an end user A, shown at 280 (FIG. 8). Referring to FIG. 9, alternate embodiment MTCICP 282 illustrates an adaptation in which the system is adapted to include any of numerous users, such as user A, shown at 284, and users A+N, shown at 286, where N is a positive integer, respectively. The FIG. 9 MTCICP 282 is also adapted to include multiple context outputs, 1+N. where N is a positive integer, shown at 288 and arrow 290. The context outputs illustrative list 292 may be adapted so that a different list is applied to each end user, or may be a single list applied to all of the users, or may be grouped such that specific groups of users may use the same list, with different lists for different groups of users.

Also, in other alternate embodiments, access to the application can be defined and granted for specific periods, such as at all times, or time(s) limited to one or more defined periods. Access may also be defined and granted on the basis of pre-determined conditions of performance, actions and/or activities, and/or during a defined period, a defined repeated period or for a defined variable period assigned by defined pre-determined performance or other criteria.

Alternatively, access to the application also can be defined and granted, for example, on the basis of a fee, a defined participation of revenues generated, a defined monthly fee, a defined fee per active or non-active user(s) who have been granted or permitted access and who have actively opted into the system, against other defined compensation criteria or, for example, at no fee and for no other compensation.

Alternatively, access to the application can be limited to certain aspects of the MTCICP application, such as limited to certain defined or predesignated sensors, defined set(s) of sensors, defined proximity beacon(s) or one or more set(s) of defined proximity beacons, defined video displays or one or more sets of video displays, or other defined or predetermined connected devices such as kiosks, in-store displays, virtual reality display units that are connected to the system, and any combination of criteria corresponding to devices that are connected to the system.

Alternatively, access to the application can also be granted on the basis of defined, specific end users, defined set(s) of user groups and or defined set(s) of network-connected devices, such as a customer's mobile phone(s), wearable(s), AR glasses, body sensors or other devices connected to the system. The system is adapted to enable access to be controlled through requiring end users to grant permission to have such access via active opt-in functionality as may be part of the master licensee's privacy policies.

The master licensee can also enable its authorized users to have access to, for example, related regulatory, and/or compliance organizations, expert organizations and/or commercial partners, subsidiaries, participants in a franchise structure, local, state and/or federal/national governments and governmental units, tourism organizations, health organizations, disease control organizations, law enforcement and/or other parties in accordance with privacy policies and applicable law corresponding to a particular enterprise, users, groups of users, etc.

Users who have been granted access to an enterprise-specific application can then use the authorized aspects of the MTCICP. For example, depending on the level and type of access granted, the user can control specific devices, can use specific features and functions of the specific MTCICP to deliver content, enable experiences, deliver messages, encourage behavior, reward behavior, monitor behavior, record behavior, encourage commerce, complete sales, reward for sales, make recommendations, encourage healthy behavior, stop and/or prevent unsafe or dangerous behavior, verify delivery of content and offers, verify actions taken, reward to encourage repeat behavior of desired behavior and discourage unwanted, unsafe or inappropriate behavior, and engage in educational activities, such as specific on-line educational courses or training.

As these above actions are taken, each specific MTCICP application preferably records all interactions corresponding to that application.

The various levels and types of access to the application can also be assigned, granted, and/or extended to entities and users that are remote from the initial geographical area of the installation. For example, they can be located in geographical areas beyond the location of the master licensee or the location of the master control of the MTCICP application. In regard to a convention center as an enterprise having a MTCICP installation, master license and master control over its specific enterprise installation, the convention master control could grant limited and specific access to extended entities or users such as restaurants, bars, hotels, shops, local retailers, tour operators, travel agents, taxi drivers and other entities and users interested in communicating with attendees of the convention center, but that are not physically located at that convention center.

Referring again to FIG. 6, an illustrative listing of types of content that can be input into the MTCICP 262 from or by a single end user A with one or more connected devices is shown. These types of inputs can include the types of input and from the types of input devices that are described and illustrated in FIGS. 2-13 of International application PCT/US13/062504. FIG. 7 is a schematic drawing that provides a listing of the same types of context input as shown in FIG. 6, but from multiple users, each of which is referred to as end user A+N, where N is an integer, shown at 272.

Referring again to FIG. 8, an illustrative listing 278 of types of content that can be output from the MTCICP 268 as shown with arrow 276 to a single end user A, 280 is shown. These types of output can include the types of output and from the types of input devices that are illustrated in FIGS. 2-5 of International application PCT/US13/062504. Again referring to FIG. 9, an exemplary listing of the same types of context output as shown in FIG. 8 is provided, but with the MTCICP 282 adapted for use with multiple users, each of which is referred to as end user A+N, shown at 286 and where N is a positive integer.

Figure 10:
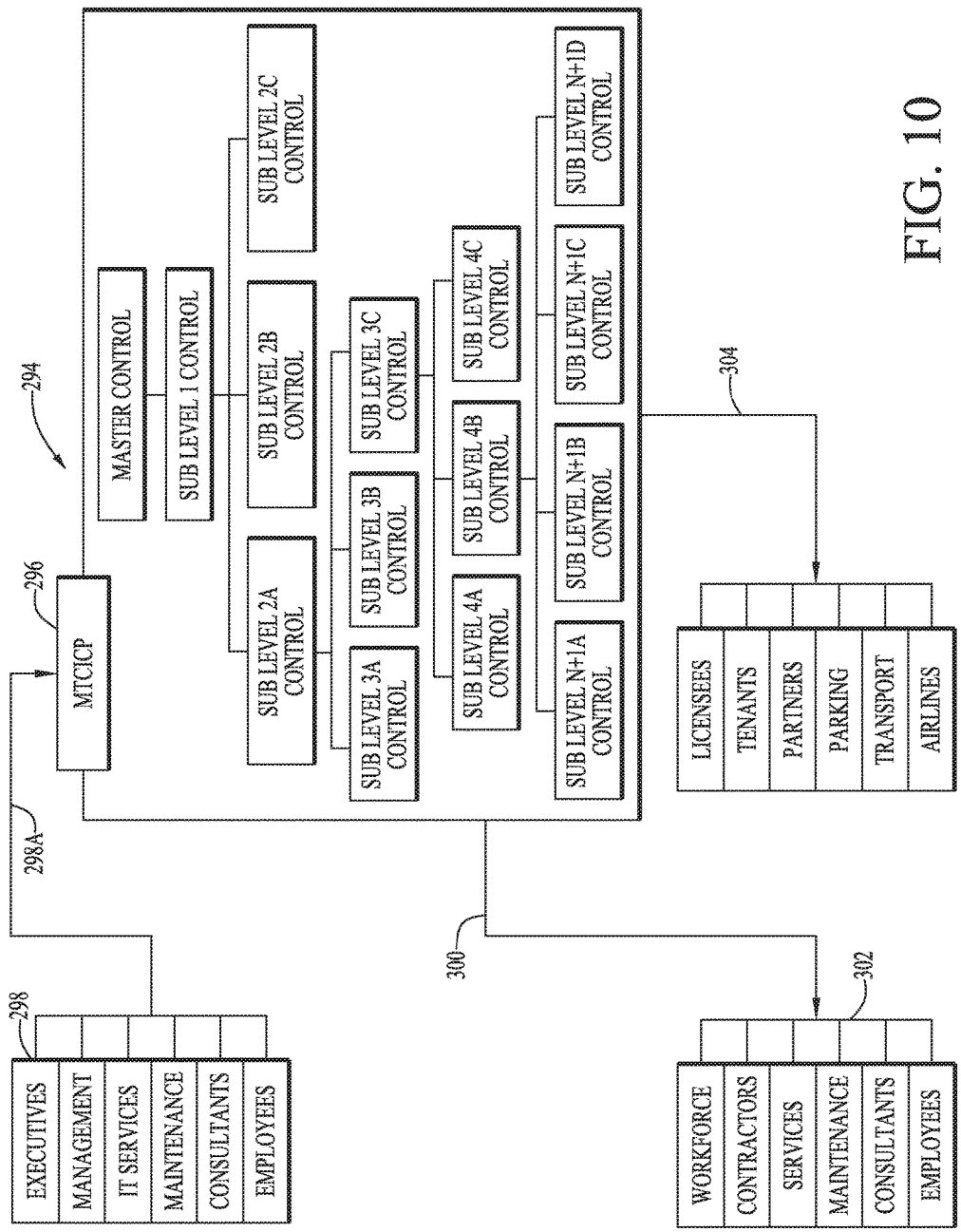
FIG. 10 illustrates different and exemplary types of users and input from different access/control levels in the FIG. 1 platform.

Referring to FIG. 10, an alternate embodiment system 294 infrastructure is shown. The infrastructure 294 includes MTCICP 296 and different types and levels of responsibilities, control and input. In this instance, a management team 298 is shown, listing, for example (not individually numbered) executives, other management users, IT services and users, maintenance functions and users, consultants and other employees. The management team 298 users preferably are the users who control the system and define the information that goes into the MTCICP system 296 as shown by arrow 298A. Management Team 298 illustrates what would be some examples of different types of users that could be defined as included in a management team for a specific application, generally in terms of the functions that each type of user or groups of users would perform in comparison to the functions of other types of users, such as workforce users and users whose products or services could be useful to the other users. In another application, for instance, in an airport use example, if an executive is walking the facilities and sees a problem with one of the flight information displays ("FID"s) that digitally display flight information at gates or other locations at the airport, that executive could send an alert that there is a problem in FID No. 5, for example, and the system will recognize where that location is, will recognize that the input is from an authorized member of the management team and is a request for service, will recognize who sent the alert and will determine the level or type of user who should receive this message. In this example the message preferably would not go to the janitorial staff; but rather, it would go to the IT staff, who would then investigate and address the problem identified by the executive.

Again referring to FIG. 10, each of the executive group users 298 would be identified and assigned specific levels of authority, control and communication capabilities. For example, a CEO preferably will have the maximum or ultimate control or ability to send messages to any of the users, but a janitorial staff supervisor could have a relatively limited ability regarding the types of messages that could be sent and where the messages could be sent. For example, a janitorial or maintenance supervisor in the management team 298 would be blocked from sending messages that would change information on any of the FIDs for airlines using the airport. With respect to a convention center example, the various types of users in the executive group would have control, access and functionality from the organizational and operational standpoint of the facility. A designated supervisor could have overall control across the janitorial services and security services as well as the IT aspects of those parts of the system. With a system having multiple layers of supervisors, each supervisor preferably would have an area of influence that corresponds to that supervisor's actual responsibility. For example, the janitorial supervisor in charge of a specific section, such as "Section B" of a convention center, could have and use the same input mechanism, as described in the above example to identify an issue or a problem that that need to be addressed or that some other action needs to take place in Section B of the convention center. At the same time, while an upper management user, for example, the CEO, who may be touring the facilities and sees that there is another issue or problem, or the same issue or problem, and can send the same message or command as sent by the janitorial supervisor. However, the message or command from the CEO could go global to all users in the system, in comparison to the message or command send by the Section B janitorial supervisor, which message or command preferably would be sent only to the Section B janitorial staff.

In general, each of the individual users in the management team 298 would have specific criteria that would identify to whom each would be able to send messages to. The system architecture enables the access level of each user to be preassigned and predefined, so that during operation of the system, the system automatically routes commands or other messages from specific users to specific users or groups of users. With this functionality each access level relates not only to access that the system would enable for an individual user, but also access that the individual user would have in order to send or initiate messages to other users or groups of users in the system or platform 294, such as the MTCICP 296 of FIG. 10. Additionally, specific enterprise applications of the system can be adapted so that access to a user from other users in the system can be different than access from any specific user, as indicated at arrow 300 and types of users 302 in FIG. 10.

Again referring to FIG. 10, arrow 300, the arrowhead points towards a group of service providers 302. The arrow indicates that specific messages initiated by a management team 298 user would be sent to the MTCICP 296 for processing and then directed to a workforce team 302 user. Exemplary workforce users (not separately numbered) are listed as workforce, contractors, services, maintenance, consultants and employees in FIG. 10. Other, non-management team and non-workforce users are shown with arrow 304, with the single arrowhead indicating the direction of transmission for certain types of messages. In the FIG. 10 example, the exemplary list of other users (not separately numbered) includes licensees, tenants, partners, parking, transport or transportation, such as taxis, and airlines.

Again with reference to FIG. 10, consider for example, a convention center as the enterprise, and a tenant user in a section, e.g. section 15, where the tenant sells, among other products, coffee. Suppose there is a coffee spill at that location and the spill is noticed by a convention center management team user, specifically a maintenance supervisor of that section in the convention center. That supervisor's alert of the coffee spill is transmitted into the system at arrow 298A, and the system 294 then as shown by arrow 300 alerts the maintenance staff and the service staff of the workforce 302 that is in control of that specific location. The system 294 also identifies the location of the spill, knows the location of each of the section's janitorial staff within the convention center and then automatically routes the message to the section staff user who is closest to the spill. Continuing with this example of a coffee spill, and the other users identified by arrow 304, for example, the system 294 would send a message to the tenant who sells coffee in that section. That tenant would not be responsible for cleaning up the spill, but would want to know about it and be assured that the spill was being cleaned up by the convention center staff, and the message to the tenant would provide that information and assurance. In this example, the system alerts the tenant of that section that a facility manager has identified the spill and the cleaning staff has been assigned to clean up the coffee spill.

Figure 11:
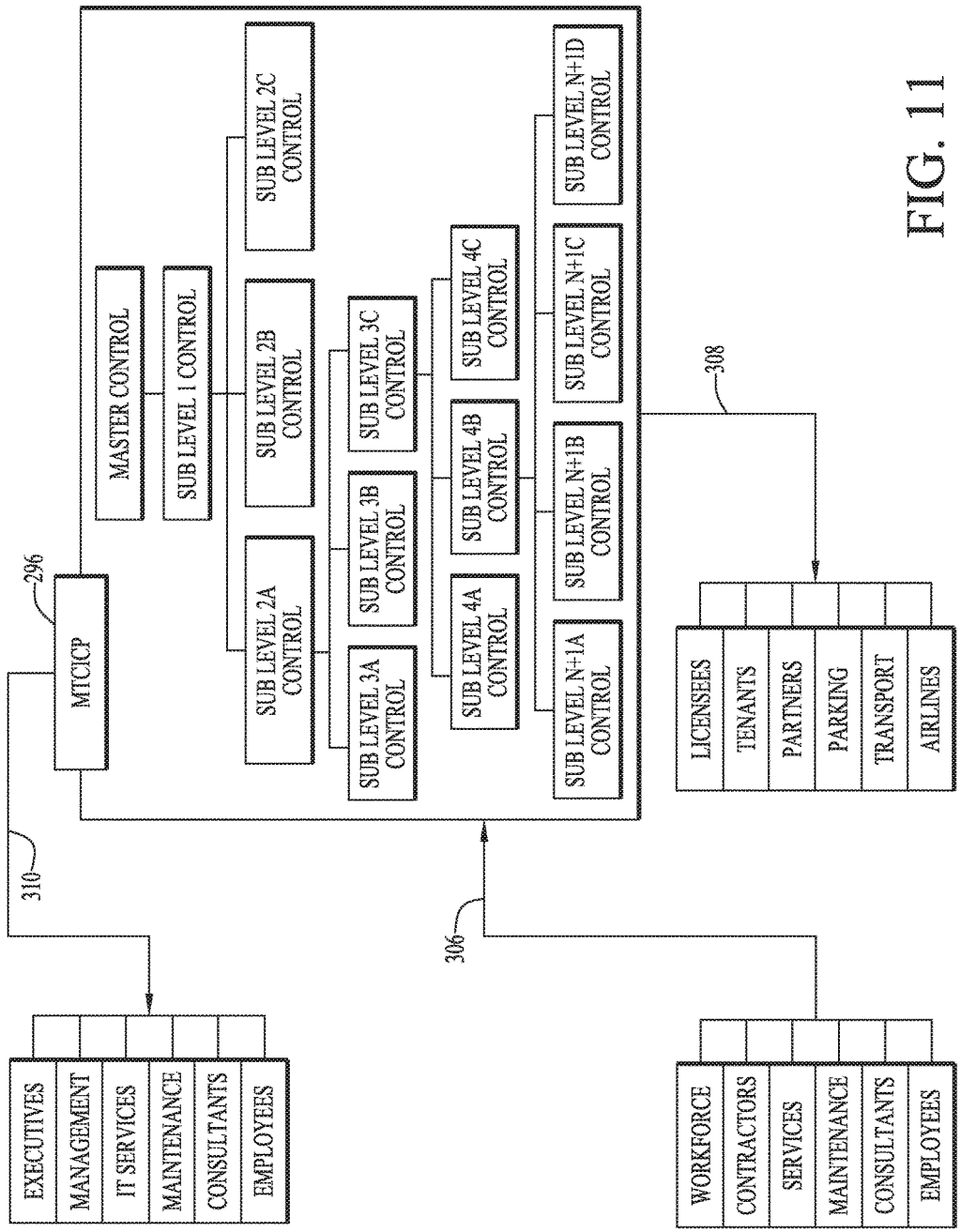
FIG. 11 illustrates different and exemplary types of feedback or output to different levels in the FIG. 1 platform in response to an event.
Figure 12:
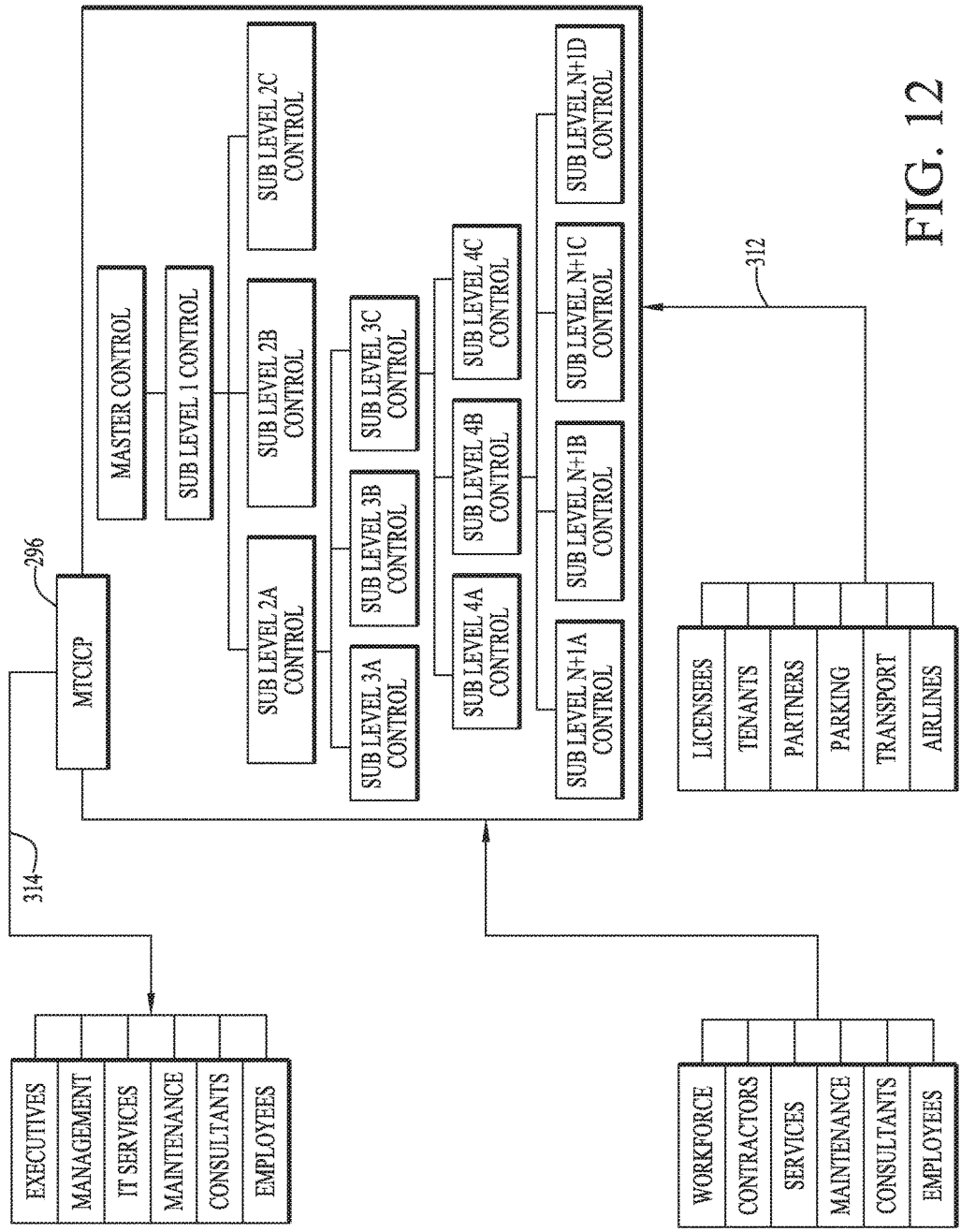
FIG. 12 illustrates a specific example of input and output for an event that takes place during use of the FIG. 1 platform.

Referring to FIGS. 11-12, the coffee spill example described above in regard to FIG. 10 is described, but from the perspective of the messages originating from and being received by affected users as the spill is being cleaned up (FIG. 11) and after it has been cleaned up (FIG. 12). As shown in FIG. 11, the spill is being cleaned up by a maintenance person as shown at arrow 306 by a message from the user who is cleaning the spill with the arrowhead pointing to the MTCICP 296, which message is transmitted to the tenant, shown with arrow 308 pointing to the tenant, and to the originating reporting executive, shown at arrow 310. Referring to FIG. 12, after the spill has been cleaned up the tenant has verified the clean-up as shown with arrow 312 pointing to the MTCICP 296. A feedback report from the system 296 to the original supervisor is transmitted as shown by arrow 314 pointing to the original supervisor. In summary, FIGS. 10-12 report the history of an incident, from discovery to reporting completion of corrective action.

Figure 13:
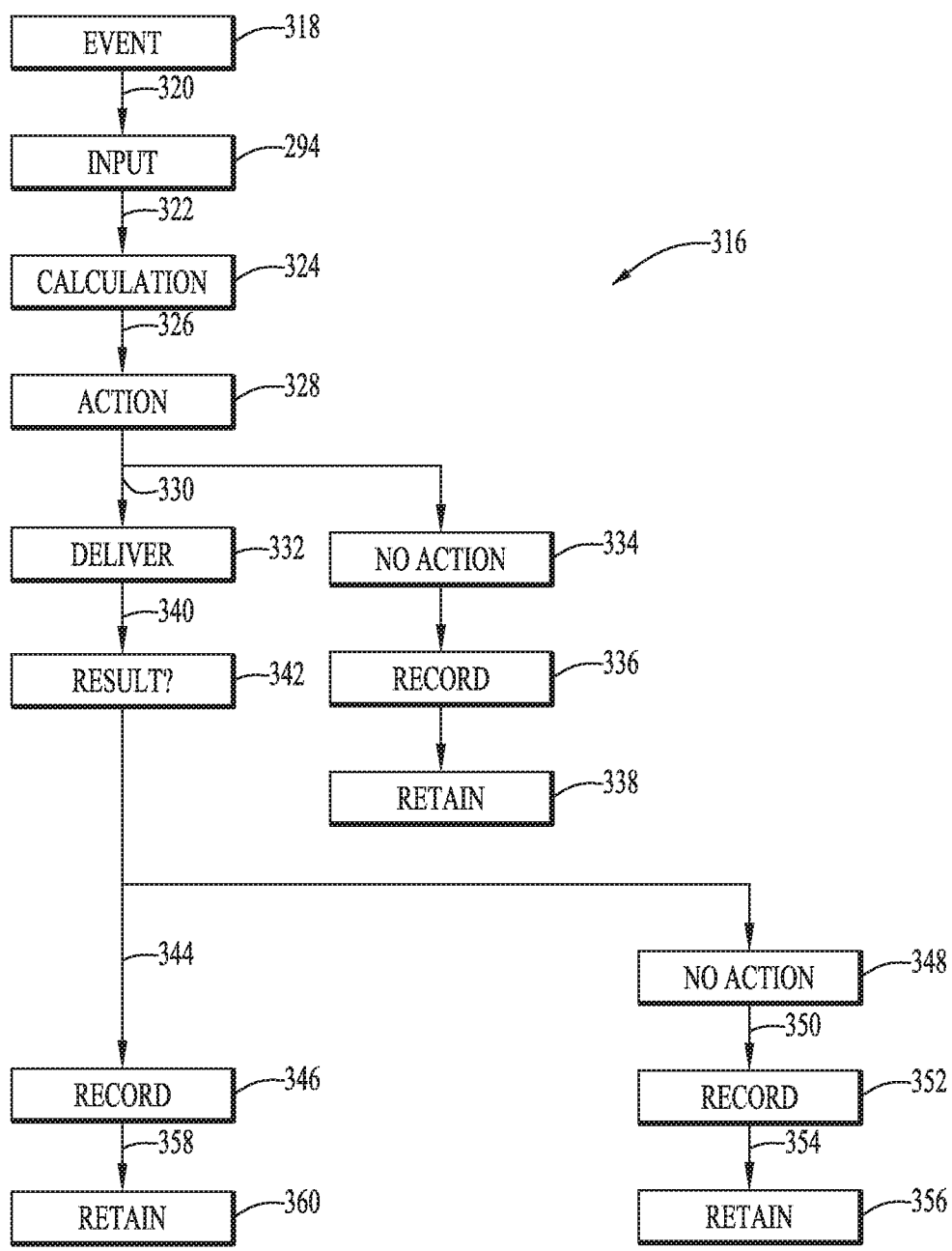
FIG. 13 is an exemplary event action record and retain flowchart for use in the FIG. 1 platform.

Referring to FIG. 13, an event history 316 is shown. The event history preferably includes information on the actions taken, generates a record of the actions taken, and retains that information. An illustrative architecture or schematic flowchart is shown in FIG. 13, where an event occurs at 318, and that event is input into the system 294 at arrow 320. The system 294 then provides the input, shown at arrow 322 for a calculation or determination 324 based on this event, for example, simply that the event is recorded and no action is taken, or that some action is to be taken as shown at arrow 326. The calculation can be based on a preprogrammed algorithm and that can be complex or can be simply a yes/no decision, as will be understood by those skilled in this field. The action, if any, shown at 328, is then transmitted or delivered at arrow 330 to the affected user(s) at 332, or in the case of no action taken, shown at 334 there would be no transmission, shown at 336. In the case of no action, the "no action" event 334 is recorded and retained by the system at 336 and 338. When an action has been taken at 328, the result is delivered and recorded as shown at 330, 332, 340, 342, 344, 346 and 358. If no further action results from the delivery, then a "no action" is recorded and retained as shown at 348, 350, 352 and 354. In either case of "no action" or when an "action" has been taken, the record is retained in the system, as shown at 356, and 360, respectively.

Specific algorithms used in specific applications will be different according to and depending on the specific use of the platform or application of the system, such as shown at 294 in FIG. 10, and creation of specific code for each such specific application is within the skill of those of ordinary skill in this field. For example algorithms in a system for use in a sporting venue such as a stadium would be different from algorithms in a system for use in a convention center, or in a system for use in a national, retail chain. Writing such specific use code or algorithms is within the skill of those skilled in this field and all are considered to be within the scope of the presently described inventions. For example, algorithms for use in a sports oriented system where the events would be based on sensors on the body of one or more players during sports action would be different than algorithms for a marketing platform where an advertisement is presented on behalf of a beverage manufacturer and/or a specific restaurant, for example.

Figure 14:
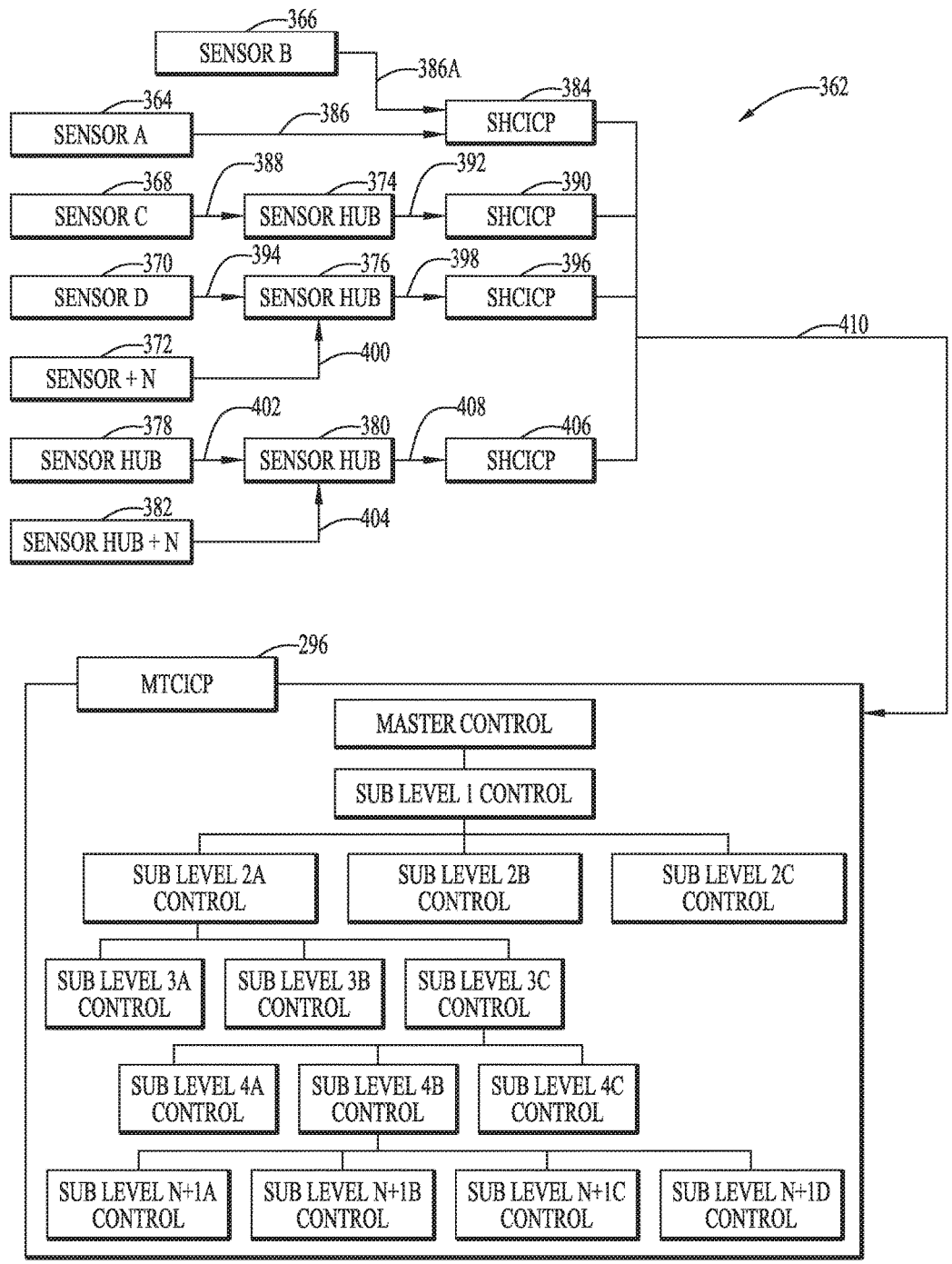
FIG. 14 illustrates an exemplary sensor network infrastructure for use in the FIG. 1 platform.

Referring to FIG. 14, an alternate embodiment including a sensor network infrastructure 362 includes a series of sensors 364, 366, 368, 370 and 372 identified as Sensor A, Sensor B, Sensor C, Sensor D and Sensor +N, respectively. The network 362 also includes Sensor Hubs 374, 376, 378, 380 and 382 that are connected together and in communication with or connected to the system as shown. Sensor A communicates with Sensor Hub Contextual Intelligent Communication Platform ("SHCICP") 384 as shown at arrow 386. As an example of a sensor, in this instance, a sensor can be a simple accelerometer that could be tied to the shoe and has blue tooth communication to another sensor that may detect the person's moisture, or sense how much that person is sweating. Those two sensors are adapted to communicate with a sensor hub, which in this instance a sensor hub can be the program that resides on, for example, a Samsung Gear S2 brand watch. The watch would be adapted to include a component of the CICP that combines the sensory input from each of these two sensors before it transmits the information to the MTCICP 296. Sensor B at 366 also communicates to SHCICP 384, as shown at arrow 386A. Similarly, Sensor C at 368 communicates with Sensor Hub 374 as shown at arrow 388, and Sensor Hub 374 communicates with SHCICP 390 as shown at arrow 392. Sensor D at 370 communicates with Sensor Hub 376 as shown at arrow 394, and Sensor Hub 376 communicates with SHCICP 396 as shown at arrow 398. Sensor +N, at 372 also communicate with Sensor Hub 376 as shown at arrow 400. Sensor Hub 378 and Sensor hub +N at 382 communicate with Sensor Hub 380 as shown at arrows 402, 404, and Sensor Hub 380 communicates with SHCICP 406 as shown at arrow 408. SHCICPs 384, 390, 396 and 406 communicate with MTCICP 296 as shown at arrow 410.

As also shown in FIG. 14, at 370, 372, 376, 394, 396, 398 and 400, information detected by one sensor could affect, in some way, the value that is output by another sensor. In other words, two or more sensors in communication with a single Sensor Hub and/or a single SHCICP need not be totally independent of each other, but rather the information output from one sensor could depend, in some way, on data that comes in from another sensor or other sensors. A Sensor Hub could be simply a hub that combines the data, and only collects and transmits data forward to a SHCICP. Sensor Hub CICPs, such as at 384, 396 and 406 preferably have algorithms that function to combine data and to define an output that goes into MTCICP 296. A specific system embodiment can be adapted to include sensor to sensor communication, sensor to sensor hub communication, and multiple sensors to a common sensor hub communication or multiple sensor hub communications to a common sensor hub in order to be transmitted through the system and into the platform. The sensor hub could be merely a pass-through, much like a switch, or, alternatively, it could also include some processing capability, but preferably the main processing capability will be in the SHCICP where the data is aggregated. The system can be adapted so that aggregation would be in a mobile device, in a series of mobile devices, in a field-based computer system, and/or in a call-by system, for example. As shown at arrow 410 in FIG. 14, output from the sensor hubs is transmitted to the MTCICP 296.

As an example of how a FIG. 14 sensor-based embodiment could be adapted to operate or to be used, consider that the enterprise is a football team. In this example each player, during a training session at a training facility, is fitted with sensors on his shoes, ankles, wrists and/or in his helmet. Each sensor has a relatively low power transmitter and has the capability to define or generate data representative of the mobility of each body part, the rate of speed and the acceleration of each body part during play. These data are then combined or aggregated via an algorithm to create a full picture of the activity, that is, data representative of the motions and actions of the player. The sensors are preferably of low enough power, low enough transmission range and sufficiently lightweight to not adversely interfere with the activities of the player, but have enough power and transmission range to generate data useful for the intended purpose of the invention. For example, a hub could be a Samsung Gear brand watch or a watch-like device that is worn on the wrist or elsewhere on a user's body. The hub functions to collect the data from the sensors and to transmit the data to the server as described, for example, with reference to FIG. 14. Continuing with the football player example, another sensor attached to the player could generate data that would correspond to or measure blood pressure or pulse rate of the player, in real time during play. Also, the sensor set could include a motion sensor, or a moisture monitor to determine the sweating level of the player. The hubs and SHCICPs could combine all these data to create a composite picture or data set for each player on the team and that would be representative of the player's condition. As another example, one or more accelerometers could be placed on a player's helmet and would be adapted to provide data representative of or directly proportional to the force of a hit during play, and that might provide other information, such as likelihood of a concussion resulting from the hit.

Figure 15:
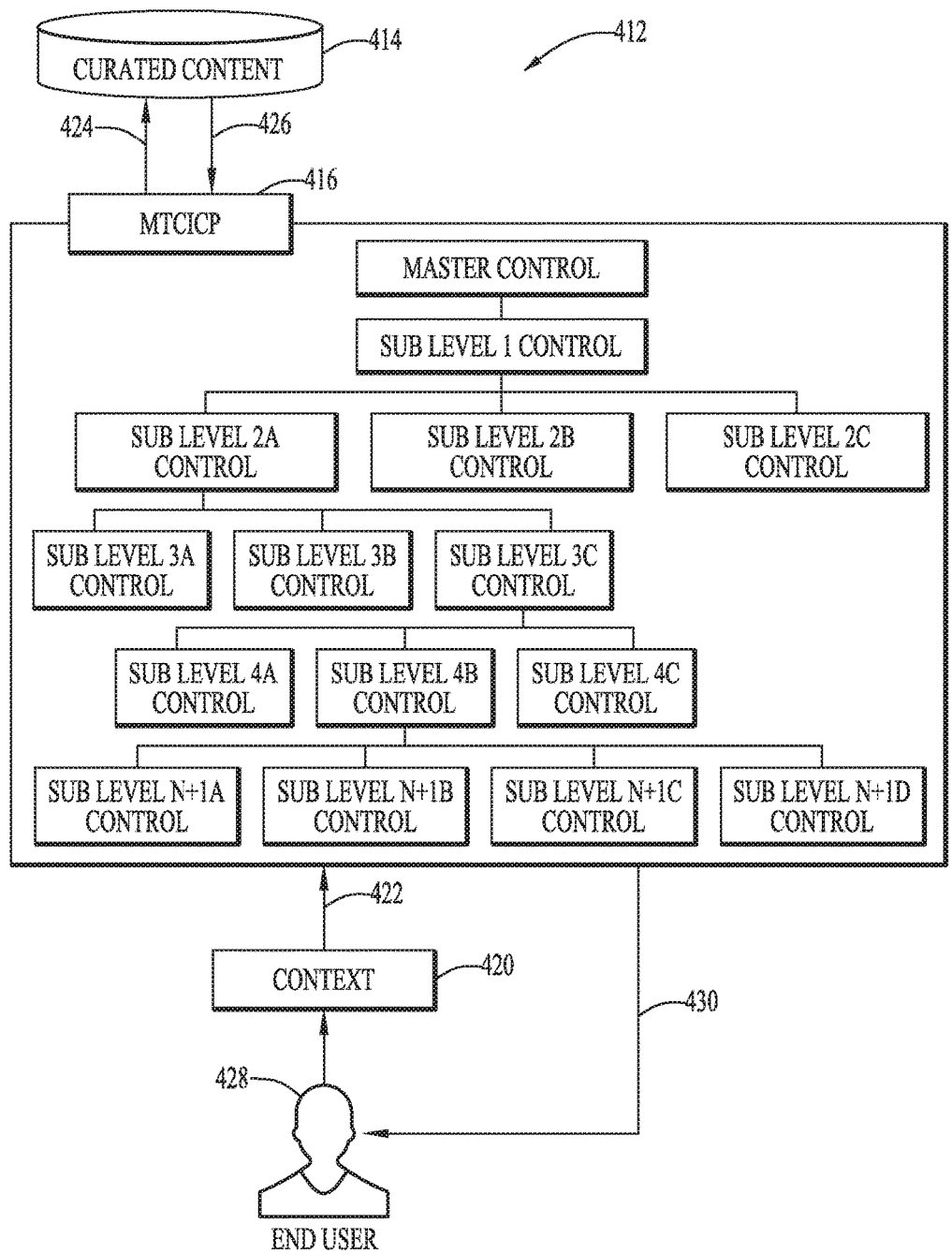
FIG. 15 illustrates an exemplary curated contextual relevant content delivery embodiment for use with the FIG. 1 platform.

FIG. 15 illustrates use of the platform or system 412 for delivery of curated content 414, for use in, for example a museum. The museum has an MTCICP system 416 in place, and has a content that is curated around specific exhibits. A person end user, who is a visitor to this museum, can experience that context as the user enters into the museum, and near the exhibit. The MTCICP system 412 can control delivery of the content by location of the user, by whom the content is delivered, what content is delivered to whom, how and when. The experiences that are being presented are curated in such a fashion that they have been prepared and approved by a control-user, such as a museum board of directors. The methodology of the delivery of the content can vary such as vary based on location. Delivery doesn't have to be only on the premises of the museum for instance. Now the content, the curated content 414, can be delivered on the mobile device of the user(s) when they are at a specific location or area, for example, the ruins of Pompeii or at some other site of historical significance. Here curated content means that somebody of authority has created or approved information that is related to a specific area or topic. It is unlike an advertising campaign, which is about marketing and defining a sale, and it is unlike a sports event where input is from athletic performance.

Referring to FIG. 15, the End User is shown at 428 coming into a context 420 that is defined by and recognized by the MTCICP 416 so that the curated content database 414 is accessed at 422, 424, and information relevant to that end user, based on the user's cross-referenced, personal information, is pulled from the curated content 414 at 426, and that information in the right format is delivered to the End User 428 as shown at 430.

Figure 16:
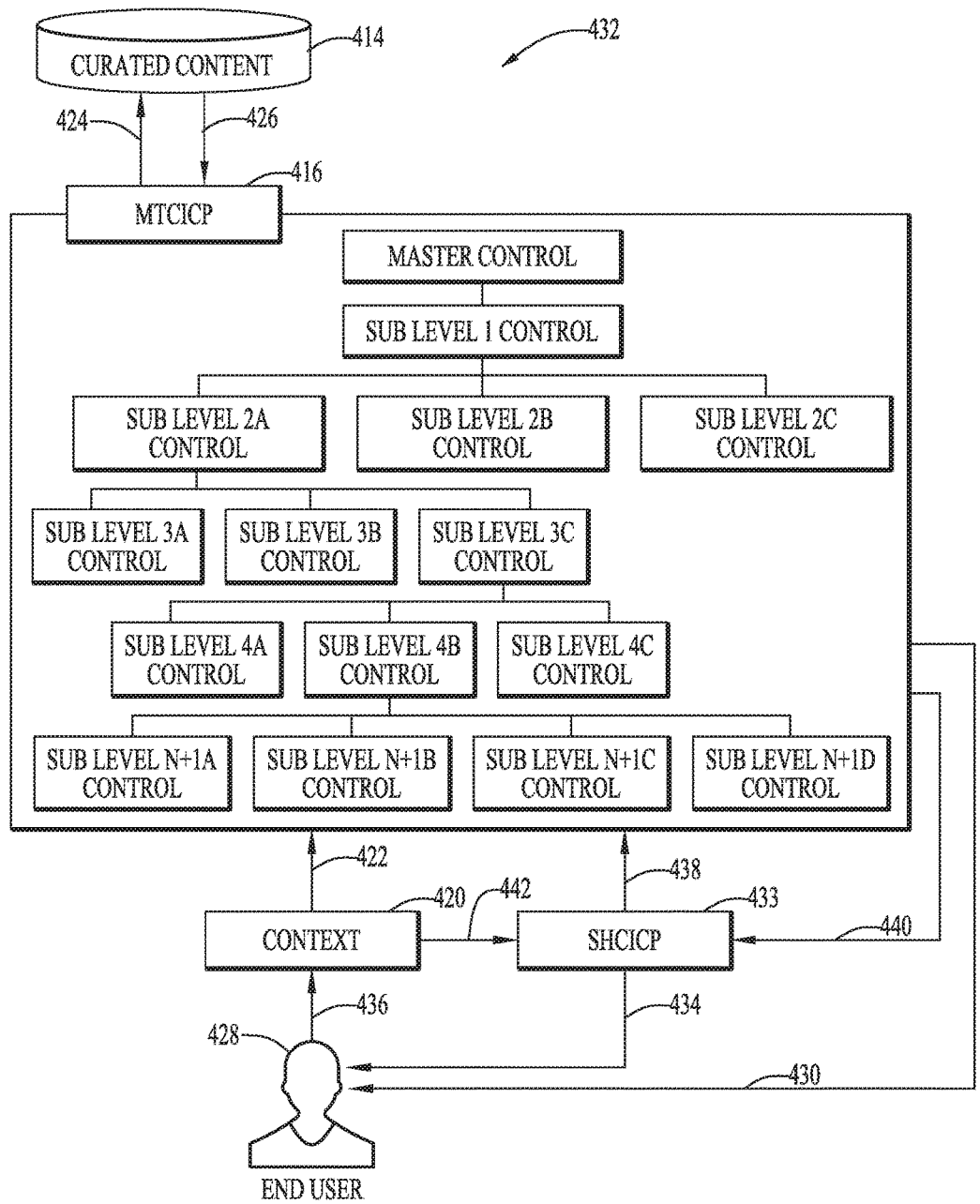
FIG. 16 illustrates an exemplary curated contextual relevant content delivery embodiment of FIG. 15 and in addition includes triggering the delivery of curated content by a sensor that detects the presence of an end user for use with the FIG. 1 platform.

FIG. 16 illustrates a system 432 adapted to enable context 420 relevant, curated experiences to occur using the present platform. In comparison to the FIG. 15 system, the FIG. 16 system 432 includes a SHCICP 432 within the museum and that receives context 420 from the user 428, shown by arrows 436 and 442. The SHCICP 432 can be, for example an interactive display and can now identify the presence of the end user 428 as shown by arrow 434, and provide information to and receive information from the MTCICP 416 as shown at arrows 438 and 440, respectively. The curated content 414 could be a virtual reality experience such that when the user enters the environment, such as near a particular exhibit in the museum, a trigger is activated and the content is sent as shown with arrow 430 to the end user 428. The content could be an immersion type experience, i.e., a 4D type environment where there is sound, video, wind and mist to create a virtual experience of what may have happened in the past. All triggered with curated content triggered by the SHCICP 432 that is embedded in that environment, controlled by an MTCICP 416 and via SHCICP 432 as shown at arrow 434.

Figure 17:
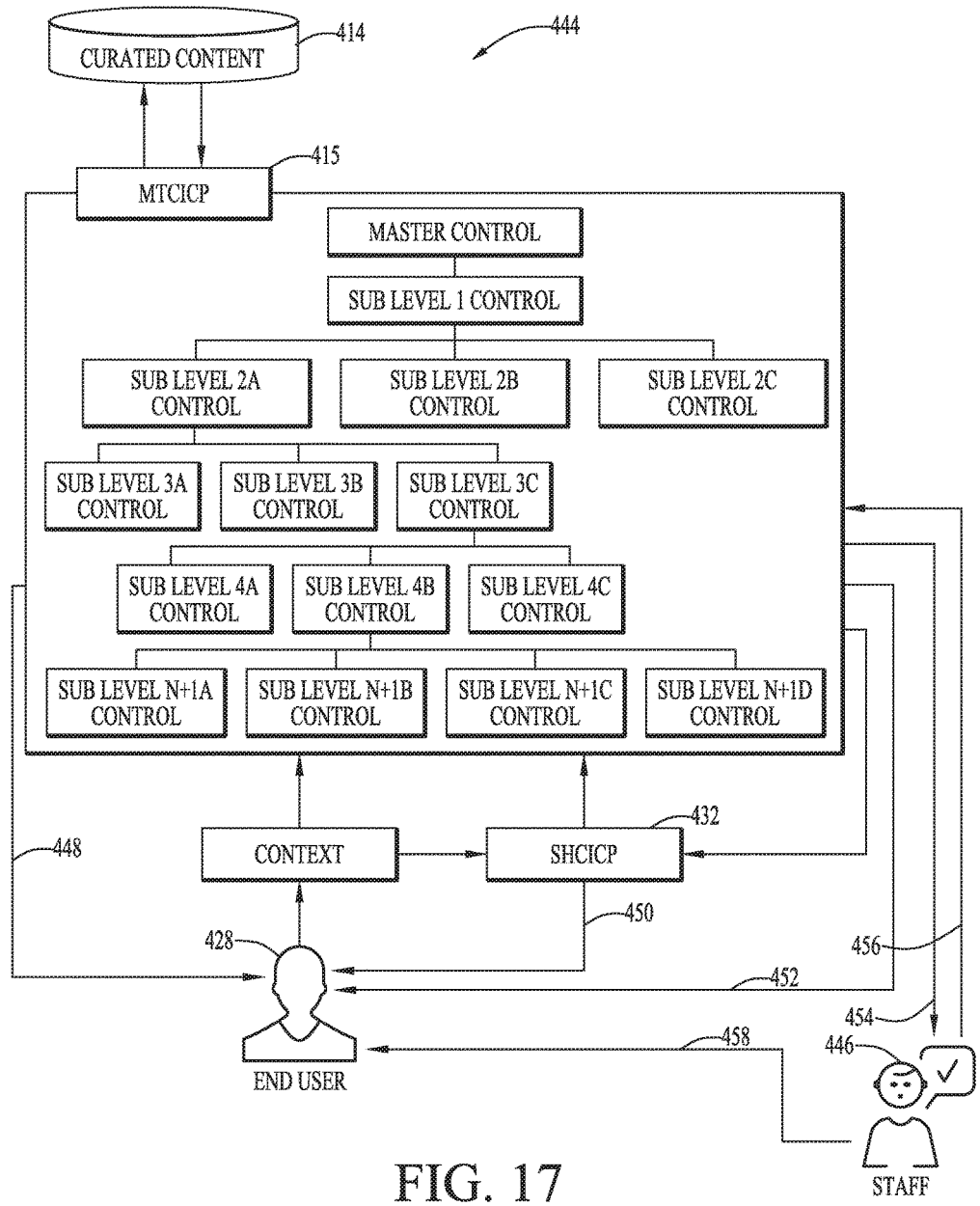
FIG. 17 illustrates an exemplary curated contextual relevant content delivery embodiment of FIG. 15 or 16 and in addition includes alerting a staff member about the presence of the end user so that that staff member can enhance the experience for the end user for use with the FIG. 1 platform.

FIG. 17 illustrates use of the platform as a curated content provider 444, and in relation to FIGS. 15 and 16 additionally provides the capability of alerting a sales person staff member 446 of the presence of the visitor-end user 428 in an environment that has delivery of curated content via a sensor hub driven infrastructure SHCICP 432. An alert of the visitor's presence is transmitted to the sales person staff so that that the sales person staff member 446 can enhance the experience for the visitor. Also, in a similar fashion but in a different end use—a retail business as the MTCICP 415 shown for example in FIG. 17—in which the end user is a shopper. In this case, the curated content would be information about an item for purchase, such as a laptop. The SHCICP 432 could be an interactive display of that computer where, when the customer comes in proximity to the computer augmented reality will be shown over the computer to identify the various features that are relevant to that specific computer. As these interactions are happening and the end user is consuming this curated contents about this laptop as shown by arrows 448, 450 and 452, sales person staff 446 is alerted about these interactions and is receiving from the MTCICP 415 information about the end user so that the salesperson can come to the end user with information to help close the sale, as shown with arrows 454, 456 and 458.

Figure 18:
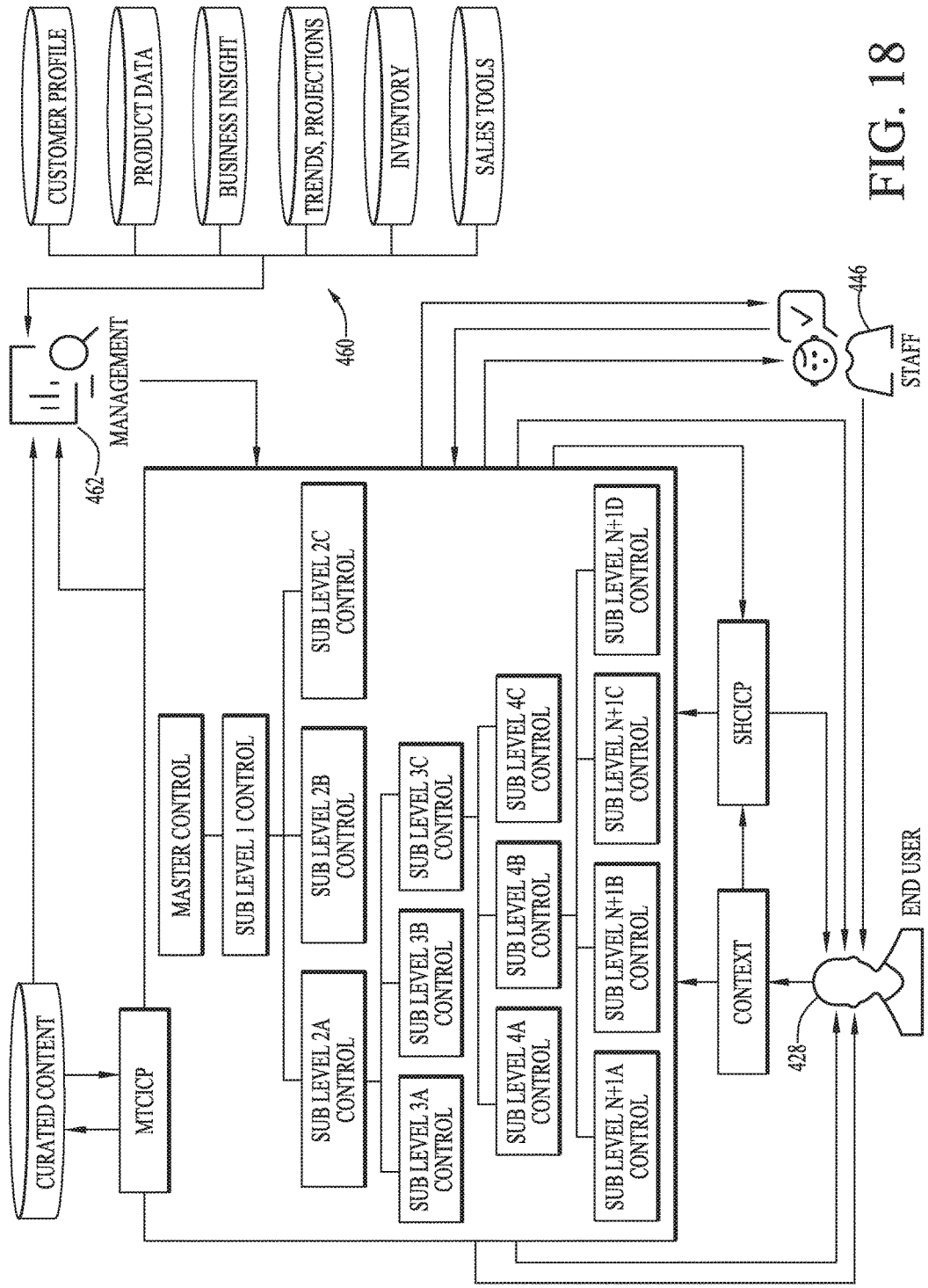
FIG. 18 illustrates an exemplary, curated shopping experience for use with the FIG. 1 platform.

FIG. 18 illustrates a curated shopping experience like that of FIG. 17, and including components of management oversights and capability to enhance the curated content based on a series of business intelligence data, such as shown at 460, including a company-wide customer profile of all its customers, product data, business insight, trends, projections, inventory, sales tools, etc., that are useful to management 462 of a retail store. With use of this platform configuration the system will have information about the end user 428 to maximize the chances that a sale can be made to the user based on the historical information the system knows about the user. Also in order to make sure that the right product is sold, management needs to have control of what's in stock, the inventory levels, what's likely to sell out now and what would be appropriate incentives to sell designated products. Examples of business insight could include trends, such as the weakening dollar versus yen, and should a certain type of product be pushed on a specific day, status of future delivery of orders of merchandise, staffing requirements or staffing issues, forecasts of an upcoming snowstorm or a hurricane. In the present example, trends and projections are intended to be forward looking as where the business wants to go, rather than known information and predictions on what is actually going to happen and what is happening within specific areas. Sales tools could refer to, for example, information such as the best words in order to sell a particular product or special features of a product in comparison to a competitor's product.

Figure 19:
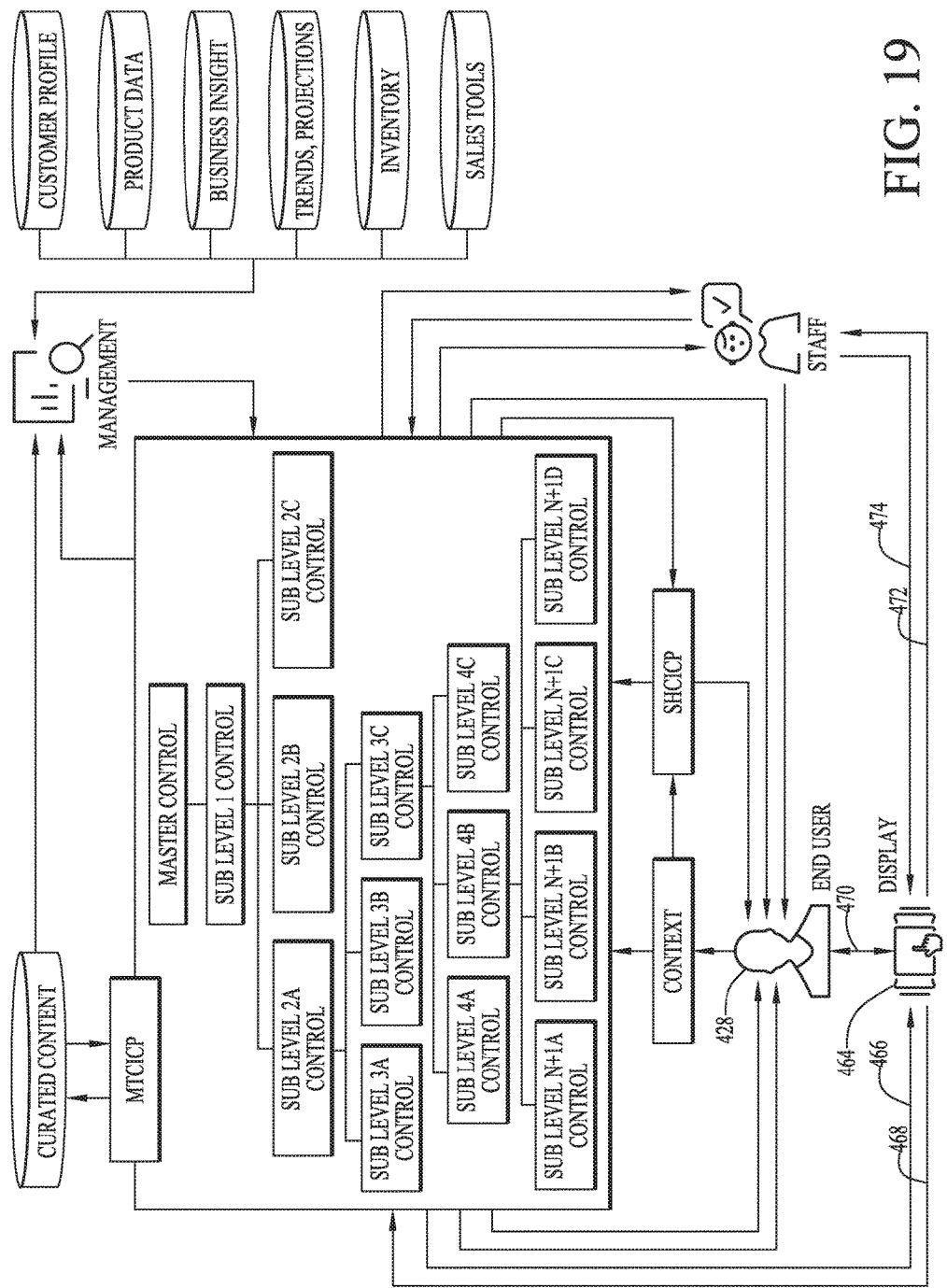
FIG. 19 illustrates an exemplary, curated experience with secondary display for use with the FIG. 1 platform.
Figure 20B:
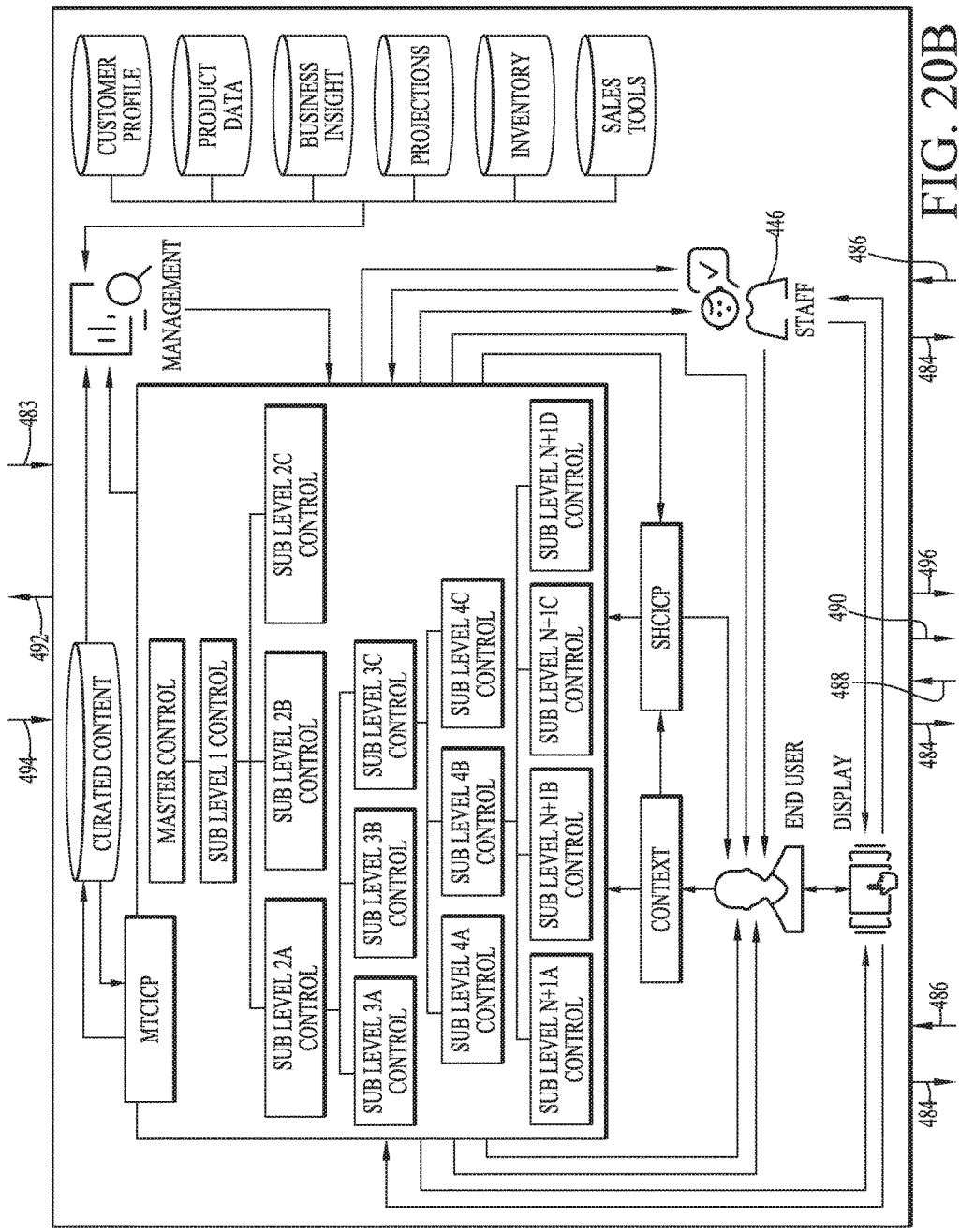
FIG. 20B is a partial schematic illustration of the input and output communications for the FIG. 1 platform in response to the FIG. 20 incident.
Figure 20C:
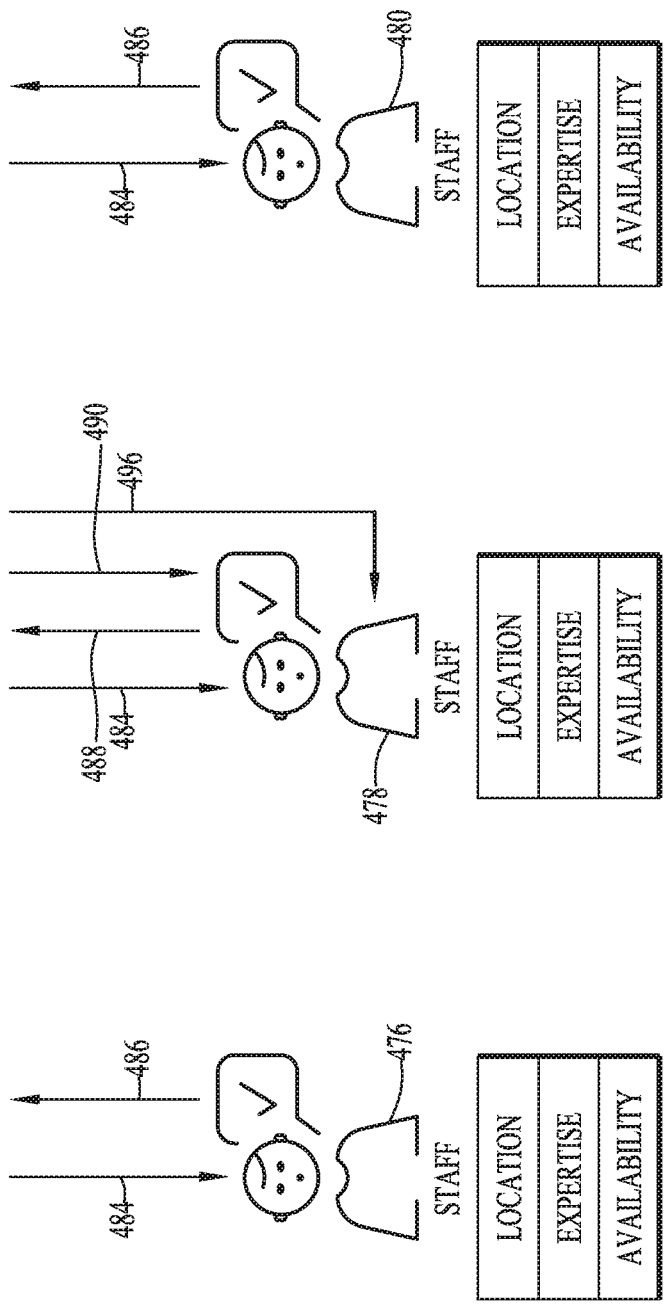
FIG. 20C is a partial schematic illustration of communications to/from and actions by on-site staff in response to actions of managerial staff as shown in FIG. 20A.
Figure 21B:
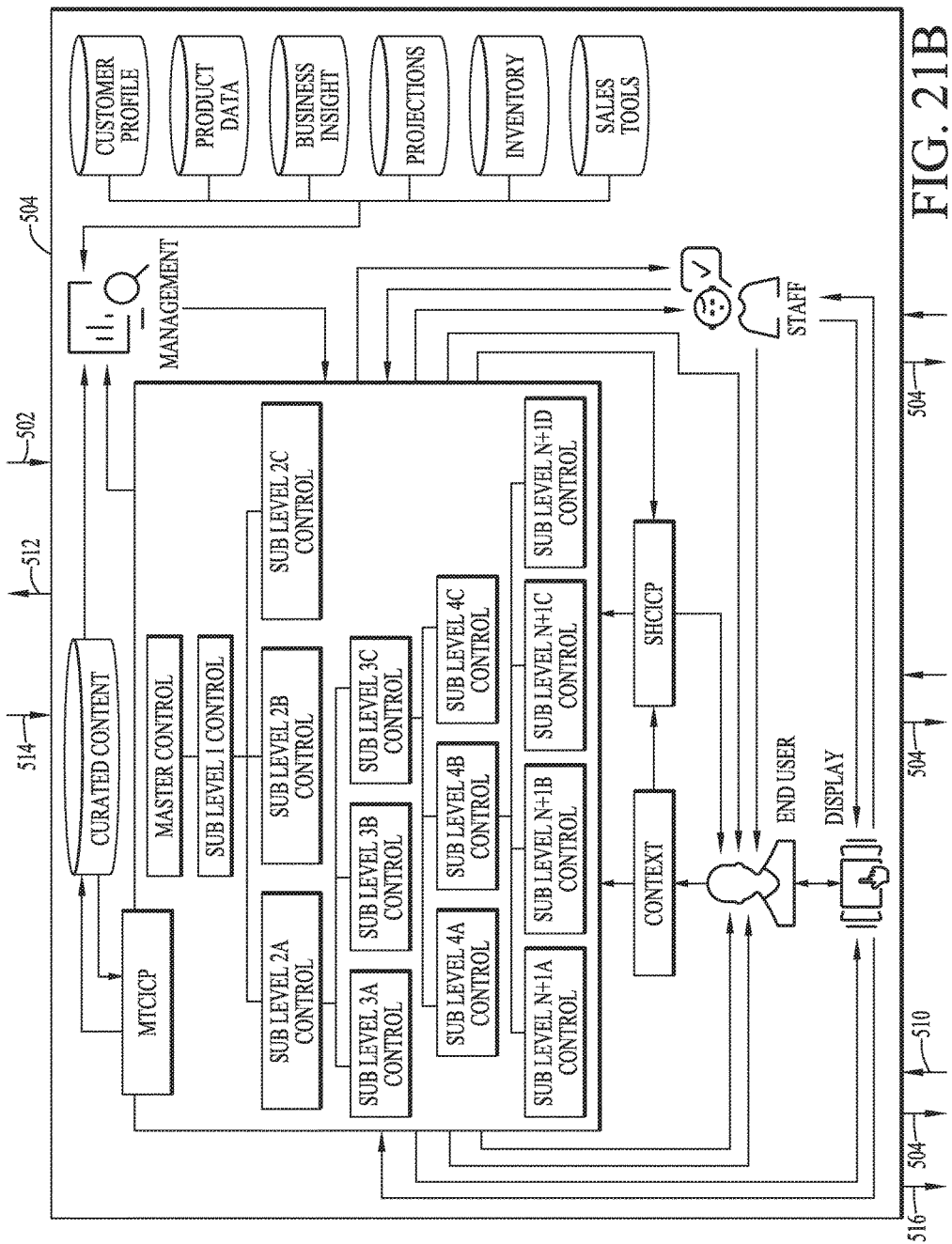
FIG. 21B is a partial schematic illustration of the FIG. 1 system showing the communications to and from staff and the patient in the FIG. 21 example.
Figure 21C:
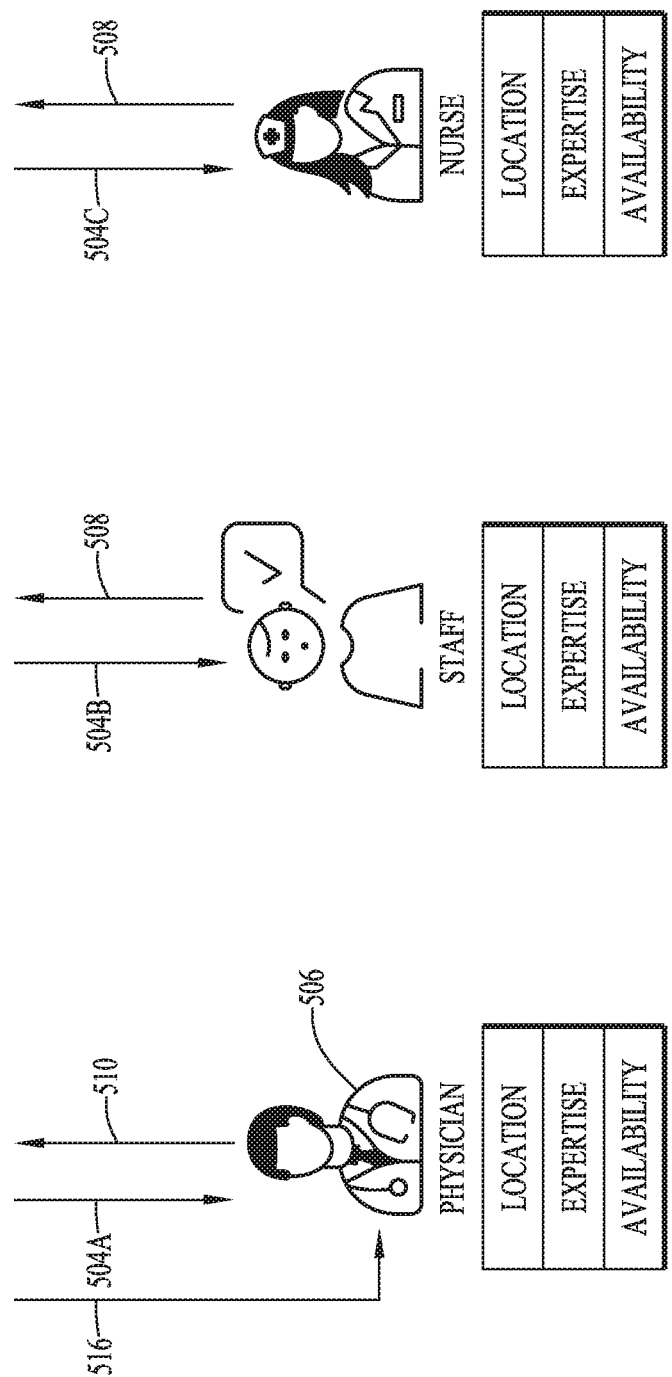
FIG. 21C is a partial schematic illustration of showing communications to and from staff in the FIG. 21 example.

FIG. 19 illustrates a curated, in-house curated experience platform with a secondary display 464 that is preferably in the physical location of the end user, or is otherwise identified. This display 464 displays curated content that is relevant to the end user when the end user is in front of this device, as shown at arrow 466 and will report back to the MTCICP, shown by arrow 468 when that user 428, is in front of that specific display 464, as shown by arrow 470. The system would also identify and display back to the sales staff that the end user is in front of this specific display. It will also inform the sales staff of the content that has been presented so that the staff member can go back in front of the display and engage the end user with the benefit of having information about the end user and the content provided, as shown with arrows 472, 474. It can also present information to the sales staff about the end user such as past behavior and any other data that may be associated to the end user so that the staff member is well prepared before engaging with the end user, as shown by arrows 472, 474.

FIGS. 20, 20A, 20B and 20C, taken together, are extensions of FIG. 19, and includes additional staff members 476, 478, 480 and an "incident" 482 at the physical location. The incident, shown at 482, could be, for example spilled coffee, an alert of arrival of a VIP member at a stadium, arrival of a VIP guest at a hotel, etc. As shown by arrow 483, this incident would alert several staff members, at 484, 484, 484. Any staff member who could not address the incident would notify the system with a rejection, shown at 486, 486. Another staff member who could address the incident would accept the responsibility at 488. Information about the incident is then provided at 490. The incident report is communicated to the executive at 492. The executive may provide additional communication or information that is relevant to this instance, as shown at 494, and all of that information is then sent to the staff member at 496.

Figure 22:
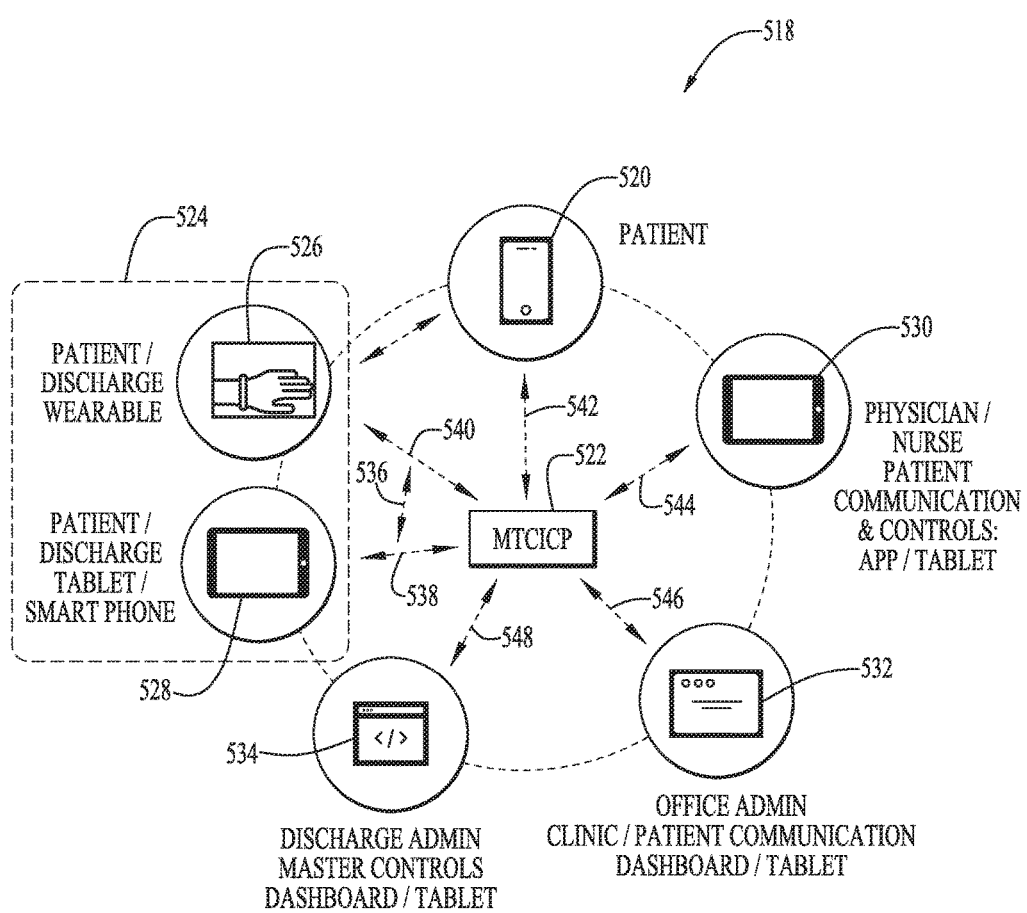
FIG. 22 illustrates an exemplary hospital patient discharge patient kit.

FIGS. 21, 21A, 21B and 21C illustrate a contextual patient's communication tool, or communication device, shown at 520, for example, in FIG. 22, for a patient 500 to raise an alert or request for help as shown with arrow 502. In this instance the patient has an issue which is detected by a device and transmits an alert 502 into a facility that has an MTCICP system 504 that tracks the device. In this instance, the issue is reported to all of the staff members that are on call at the health care facility, as shown at 504 A, B, C. The alert 504 comes to the physicians, other staff, and the nurses on call. In this example the issue raised by the patient is an issue for the physician 506 to handle. So the non-physician staff members reject the message at 508. The physician then responds with an acceptance at 510. Verification is sent to the management and the administrators of the facility at 512. Any information that is relevant to this interaction, such as insurance information, medical records, etc., is transmitted back into the system at 514 and the physician gets a "packet of information" at 516 so that he is fully informed about the incident and who was involved.

FIG. 22 illustrates a discharge patient kit 518, including the patient's communication device or tool, shown at 520, for use after the patient has been in the hospital and is discharged from the hospital. This hospital has an MTCICP system 522 that includes a patient kit 524, including a wearable device such as a wristband, shown at 526, and a tablet/smart phone that is shown at 528. The tablet 528 contains relevant and information useful to the patient about his/her condition and any procedures needed to be followed to recover. It can contain information such as contact information to the care team such as physicians and primary care physicians, pharmacy and other relevant information to the condition of the patient and the procedure that has been performed. The wearable 526 is a communication tool that sends reminders and alerts to the patients about taking medications, verification that the person has taken the medication etc. This kit goes with the patient when the patient leaves the hospital, and takes home, post procedure. The kit provides a way for the staff, the physicians and the administration to maintain contact with the patient, encourage compliance with medication, and remind the patient to make follow up appointments. The system's MTCICP 522 will record and retain all interactions within the system to ensure, verify and monitor compliance.

A tablet or dashboard application ("app") or another communication device, shown at 530 in FIG. 22, can be used by a physician and by a nurse as an input into the MTCICP and also, as an output from the MTCICP so that results can be displayed on this device 530. An office administrator would have access to the system via a tablet or dashboard, shown at 532. The administrator user(s) would be somebody who has more control of scheduling and has access to a dashboard that is potentially in a computer in the office. A discharge administrator, shown at 534, is also somebody who has control of the platform via dashboards. The patient's tablet, shown at 528, preferably also contains information about the discharge procedure, contact information to all of the care team members, including nurses and staff members, and information about how to address the recovery period. This tablet 528 preferably also communicates directly with the wrist device 526 worn by the patient, as shown at arrow 536, or can connect directly to the MTCICP 522 via other means such as 3G or WiFi, as shown with arrow 538. The wrist device communicates with MTCICP 522, as shown at arrow 540. The MTCICP alerts the patient when it is time to take medication. The patient acknowledges receipt of the message and will say "yes, I'll take the medication", thereby providing a medication compliance trigger back into the MTCICP, as shown at arrow 542. Compliance can be displayed to the physician, the nurse, the administrator and the office administrator so that all are aware that the patient is complying with the regimens that they prescribed, as shown by arrows 544, 546, 548, respectively. If the patient fails to acknowledge, an alarm can be sent to the discharge administrator 534, who can then contact the patient directly. If the wearable 526 has detected an indication or fall, similarly an alarm can be sent to the discharge administrator 534 for action, such as calling an ambulance or contacting the patient.

Figure 23:
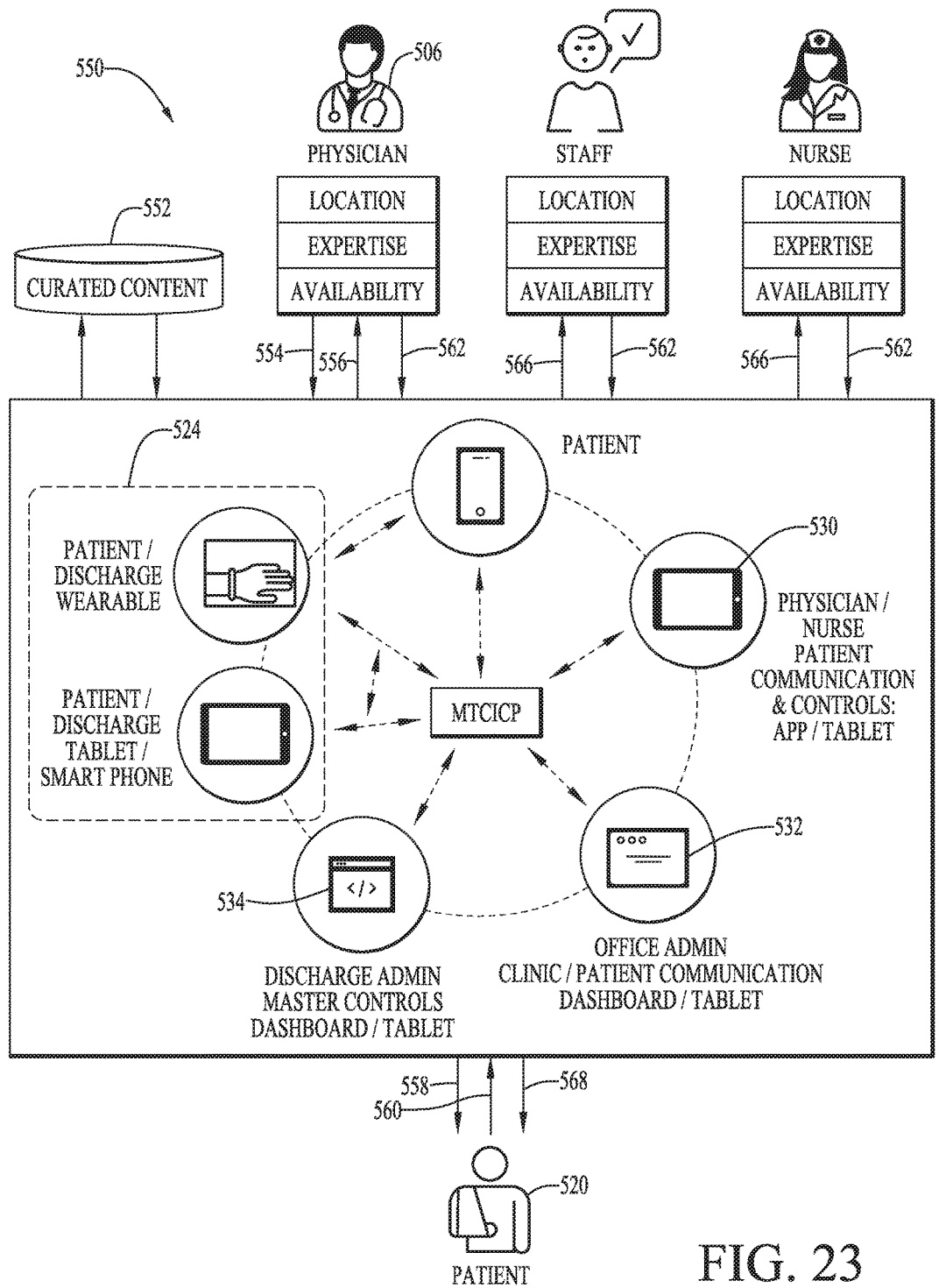
FIG. 23 illustrates the FIG. 22 discharge kit with the addition of capability to provide curated information, including capability for a physician to provide information to the patient.

FIG. 23 illustrates a discharge system 550, including discharge kit 518 as shown in FIG. 22, and with the capability of providing curated content 552 to the patient. Here there is a need for the physician 506 to provide information 554 to the patient and with a need for a response 556. In this example, medical information about a procedure is provided from the physician at 554 through the MTCICP. The information is delivered to the patient either via the wearable device or the patient discharge tablet at 558. The response is at 560, which is then put into the curated content 552 in case a complication has occurred. The system then can automatically identify whether there is a problem and if so communicates a message to all of the caregivers that are associated with the patient, namely the staff, the physician and the nurse, as shown at 556, 566, 566, respectively. Any of them that has an input to provide based on the information from the curated content and the answer from the patient, at 560, then delivers a response back into the system at 562, 562, 562. A response from the responding caregiver is then sent via the MTCICP to the patient at 568.

Figure 24:
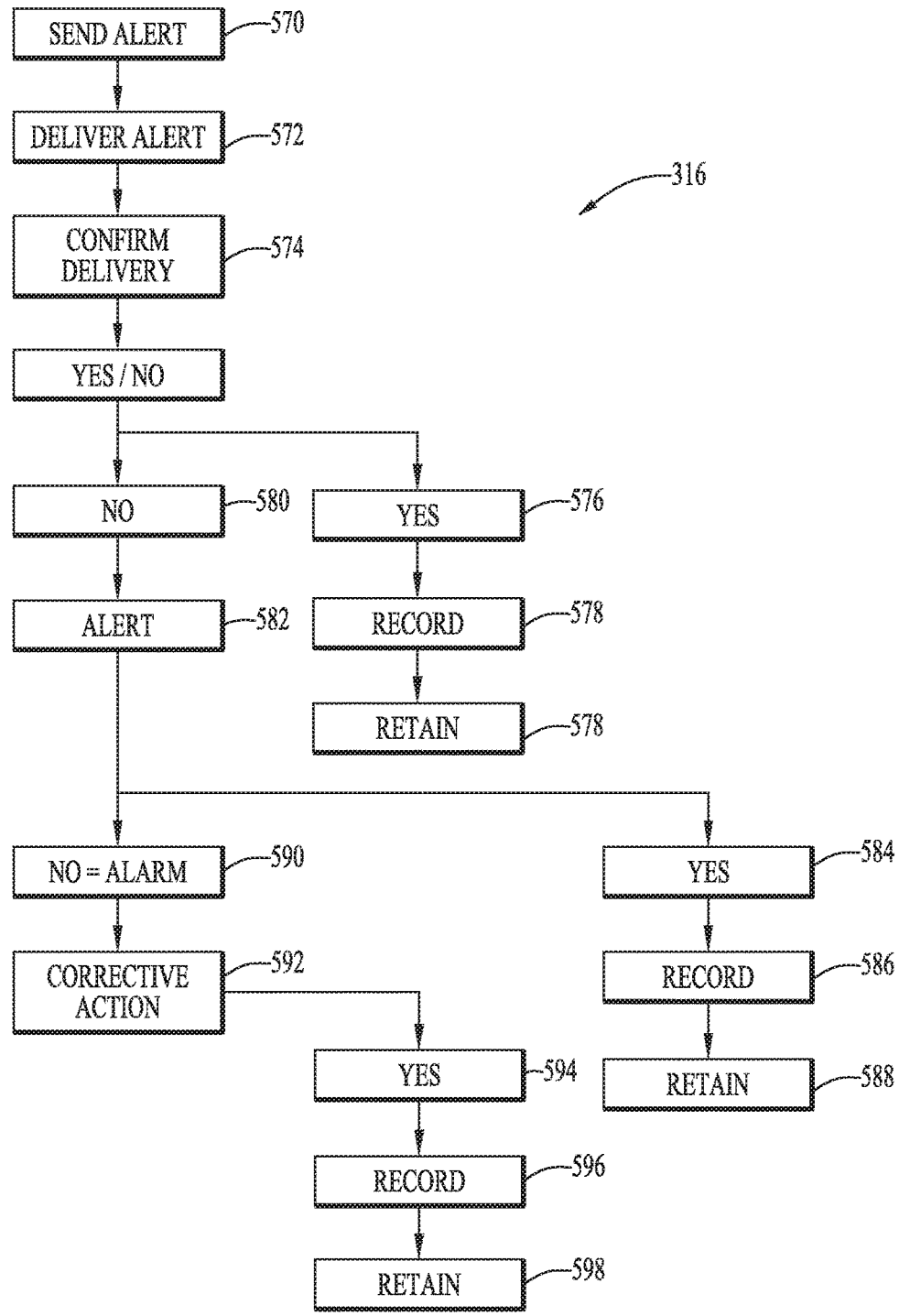
FIG. 24 illustrates the FIG. 22 discharge kit with the capability of communication, and follow-up communication with a patient.

FIG. 24 is an exemplary flowchart of the FIG. 22 embodiment for it's capability to alert, and send the right message to the right person at the right time and place with an alarm/alert, or with no alarm/alert. In this example an alert 570 is delivered as shown at 572 to a patient who has been notified to take medication and the alert is confirmed at 574. If the patient responded with a yes, at 576, then the response is recorded and retained at 578, 578. If there is no response, at 580, an alert can be sent at 582, and if that alert is acknowledged at 584, it can be recorded and retained at 586, 588. If there is no alert or no response to the alert, an alarm 590 can be sent and corrective action can be taken, recorded and retained at 592, 594, 596 and 598.

Figure 25:
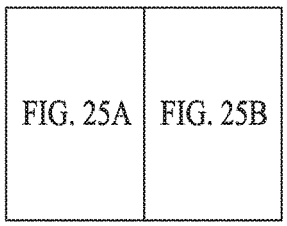
FIG. 25 is a two part schematic that illustrates an exemplary embodiment for providing contextual intelligence to caregivers, as an extension of the FIG. 24 example.
Figure 25A:
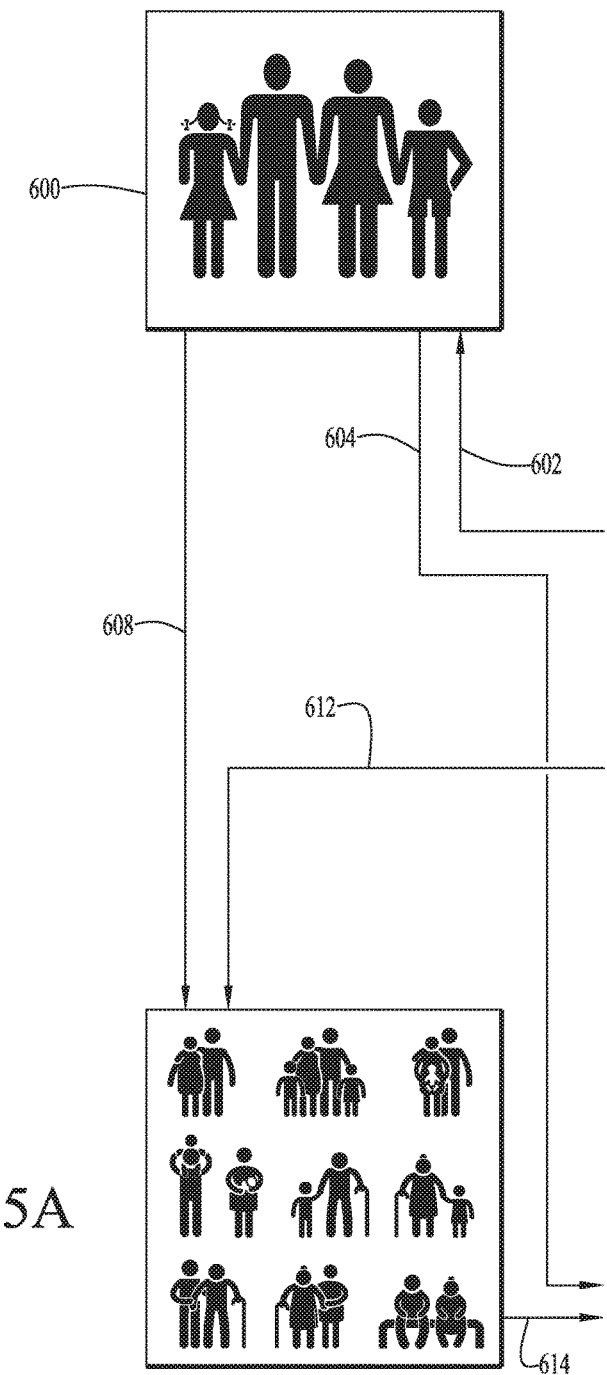
FIG. 25A is a partial view that illustrates first and second extended levels of influence for the patient of the FIG. 25 example.
Figure 25B:
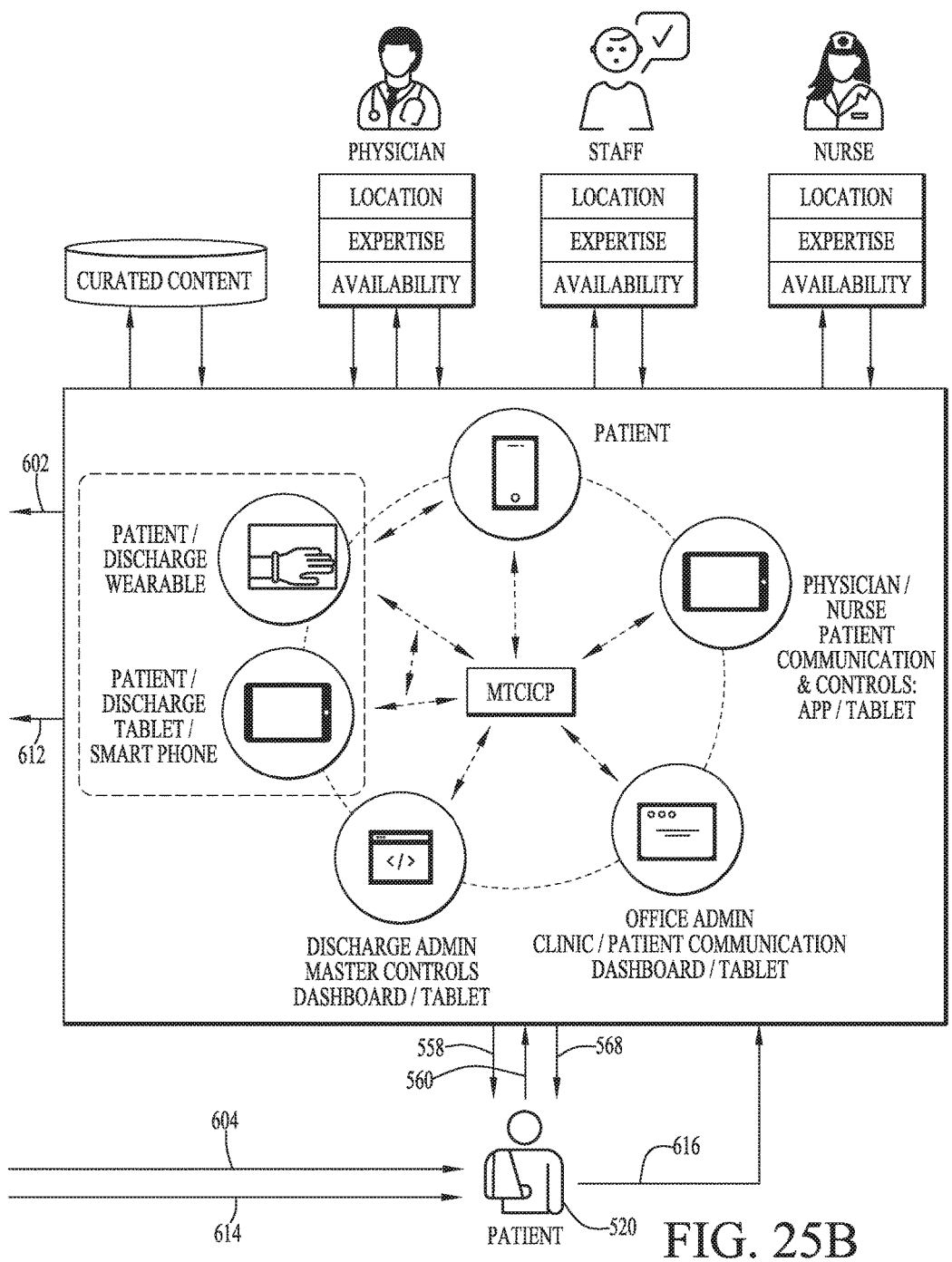
FIG. 25B is a partial view that illustrates the communication flow in the system of the FIG. 25 example.

FIGS. 25, 25A and 25B illustrate a contextual intelligence system for extended caregivers. This is the same basic system as in FIG. 24 that provides for delivery of curated content to the patient, but includes two additional levels of influence for the patient. One level could be friend(s) or close family member(s) 600, and the alert system can alert that person/those persons that there might be a problem as shown at 602. As shown at 604, that person is now alerted about the patient and asked to verify that everything is well. If that action has not happened or the family member cannot go to the patient, then the system could alert a user in a second group, such as a neighbor, volunteer, etc., as shown at 612. Whoever acknowledges that they can respond, will get more detailed information, and then contact the patient at 614. Regardless of who is contacted, the communications are recorded and reported into the system at 616.

Another capability of the application, particularly advantageous when the enterprise is a convention center, or the like, is inclusion of facility sensors as input devices. In such instances, sensors in the facility can also communicate with the MTCICP and provide useful input data or information. The information can, for example range from audio, temperature, movement, noise, moisture, smoke or other conditions that the sensor(s) detect, record and/or transmit. The process of alert and alarm communication through the MTCICP will be routed to the correct MTCICP connected device. For example, a connected smoke alarm, when activated would cause the application to route the alarm to the Master Control and to the nearest fire station.

As another example, connected sensors and the MTCICP could also be used to verify that a staff member has performed a given task. Such a task could be to open a refrigerated cooler or vending machine that is used to display and present cold drinks for sale or that dispenses cold drinks, respectively. The cooler or vending machine would have a proximity beacon. The enterprise specific application would provide information about the location of the cooler, by, for example a map showing the location of the device. As the staff member approaches the cooler, the proximity beacon will trigger an event on the staff member's device. This event is transmitted to the MTCICP server, recorded and retained as when the staff approached the cooler. The beacon inside will also transmit the temperature around it and its battery life. Both are transmitted to the connected device which then transmits this to the MTCICP. This is also recorded and retained by the MTCICP. Once the cooler door is opened, the temperature will drop. This is observed by the beacon sensor and transmitted to the staff member's connected device that then sends this to the MTCICP. This event is recorded and retained. The process is repeated when the staff member closes the door, and moves away from the cooler. Each event is recorded and retained by the MTCICP. Access can be granted to the MTCICP to the staff member's boss, his supervisor and the owner of the organization that services the coolers. The owner of the facility where the cooler or vending machine is placed can also be granted access to the MTCICP to review the collected and recorded data. The producer of the drinks that are sold or dispensed can also be granted access to the MTCICP to review the collected and recorded data. The same MTCICP has thereby been used to direct staff member to perform an action, verified that it has been performed, verified that the staff members was at the location, recorded when the staff member arrived, recorded how long he was there, and recorded when he left. The same system then can grant the ability to verify these events by the staff member's boss, the owner of the cooler and the owner of the location—all different entities and organizations.

The MTCICP can also be used to control the actual functions and functionality of the building. It can be connected to Smart Building infrastructures and sensors, equipment, control systems and infrastructure. This can include switches, controls and sensors, door locks, access cards, elevators, escalators, fire suppression, HVAC, AC, heating, lights, power supplies, window shades and other aspects of the building controls. These sensors can be connected directly to the MTCICP or via sensor hubs that can communicate the aggregated results from a series of such sensors. Those sensors that can control functions will have 2-way communications so that they can receive commands and actions from the MTCICP based on the actions it determines, and that are based on the events for which it collects data. These events can be collected from a sensor or from a series of sensors in the facility, or from people or equipment that is in the building temporarily. The people will have mobile devices that have installed software or operating systems that are also connected to the MTCICP. They can have full access to the MTCICP system or have been granted access, for example, to only a select series of interactions, sensors or events, for a predetermined time or for always as long as their log in credentials are accredited. In this way the MTCICP system's multi-tenant architecture is used as a partition system that functions to grant access and deliver content to the right person at the right time, even within a building, venue or structure for those who work there, operate it, maintain it, provide safety and or services to the building and to those who work there, visit, stay or live there.

The system will detect interactions with and between sensors and the people there as well as equipment that is mobile, record and retain these interactions. Those events that warrant an action will trigger actions to be transmitted to the right sensor or control unit or display or device or equipment.

This will enable the MTCICP to detect, e.g., how many people are in specific areas, determine the temperature in the area through devices such as NEST or Samsung Smart Works sensors, account for how many people are on the escalator coming to that room, start cooling the area via the control units on the NEST thermostat's control unit before the people enter because it is more efficient to cool the room than after they have arrived. Likewise, light controls can be connected to turn on while there are people there, and off when they leave, creating "following lights" down corridors for instance. Elevators, moving sidewalks and escalators may also be connected in this manner providing low power speeds or remain stationary while there are no people close by or on the devices. The levels of controls can be set and controlled by the MTCICP. For instance, digital displays along the moving walkways can be programmed to present content and offers to the people on the moving walkway as they pass by.

This methodology can work in spaces of any size, from across an apartment to across a 1-story building, to a large multi-story convention center or airport even across entire cities, islands or any geographical area.

The MTCICP will retain real-time contextual data about how people interacts with facilities, areas indoors and outdoors, across all the physical geographical areas that have been defined by the MTCICP operators and administrators. These data will provide a deep level of records for the way a person interacts with his or her surroundings—real life physical interactions. These data are contextually anchored, by time, person, ID, the type of interactions, the location, the type of location, what content was presented, what content was consumed, what content was interacted upon, what products, equipment, sensors, displays, cars, sports equipment, buildings were interacted with, used, consumed, viewed. All data can be made anonymous should this be required by rules and regulation. All data can be retained and/or removed. All data can be used again. This way the system is looking at past behavior to determine what is likely to be of interest for a person "next" based on their past behavior and current context. This context match does not need to be based on the users past behavior. It can be leveraging what others in the same context, with the same or similar background profiles have found of interest. By blending all these components, the MTCICP will create its intelligence. The content that is being presented does not need to be sent back to the originating device. Such an example can be a sports fan that is a fan of the Ole Miss Football team. He has downloaded the Rebel rewards app which is connected to a MTCICP operated by the Ole Miss Athletics Department. He is at the game when a record is set and one of the team members is a guaranteed shoe-in for the Heisman trophy. The system recognizes that he was in the stands the moment this happened. Two weeks later, he is on-line at home on his tablet. A sports fan site has signed a deal with Ole Miss to produce baseball caps commemorating the event, and also signed a deal to access the MTCICP. The off-line experience of being at the stadium that moment triggered an event in the MTCICP that is recorded and retained. When he is back on-line the access is recognized and an action is sent. This action is to present a personalized offer to get the baseball cap personalized and shipped to his home address—all information is pre-programmed and included in the offer—so it's an on-click order to have a personalized baseball cap shipped and paid for—memorizing his time in the stand. Once he is back in the stadium, the system will recognize he is back, and offer him, e.g., a special Coke, Hot-dog and Fries for $5 since he was there at the magic moment and had purchased the hat. Coke had also access to the MTCICP and the past actions with the current context caused the offer that was made on-line to be extended off-line into the real world. The MTCICP can also be used in situations when the access to the platform is widely granted due to a specific event. Such can be a natural disaster such as an avalanche at a ski resort. The resort operator would have a MTCICP enabled system where beacons or devices are used by the skiers as a guidance and access tool. Proximity solutions can grant access to lifts; provide VIP access to restaurants and record number of runs the skier has skied down. In platform tracking can be used to record number of runs, vertical drop skied, speed and g-forces. In the event an avalanche occurs the system can be reversed and access to detect proximity between users—the skiers—can be granted to all. Should someone be buried in snow, that skier's device will continue to transmit "I am here" signals. In this instance, instead of fixed sensors in the facilities, every other skier with the system can receive an alert about the proximity of another skier. Should a skier be buried in snow, the skiers above will be alerted to those other skiers above and visible by eye-sight, will also be alerted to the proximity of those skiers who are out of sight—i.e., buried in the snow. Signal strength can be used to guide rescuers to the person buried as weakening signal indicates moving away, stronger means getting closer. While this is not 100% accurate, it will minimize the time needed to start digging and getting oxygen to those under snow. In this instance, the multi-tenant architecture has been used to turn a crowd into the authorized user of the system, enabling rescue efforts to be crowd-sourced before official and professional help arrives.

Other uses of the multi-tenant feature of the MTCICP can be used in targeted advertising and programmatic delivery of advertisements, offers, coupons, content and experiences. Real time interactions with products, locations, sensors, printed materials and other contextual experiences will be gathered by the MTCICP as often as the system is programmed to gather the information. As this data is collected, it is combined with the information about the user that the user has given permission to collect. This data is gathered into a profile for the user. This profile can remain assigned to that specific person, or can be made anonymous and related to a specific user device and/or other way to anonymously identify that profile with past and future behavior as described herein. The MTCICP can be used by a third party who has been granted access to this system to present offers, content and experiences when that person at a later time interacts with this party's MTCICP or other communication systems. This system can be a re-targeting ad server, and artificial intelligent recommendation engine or other communication platform. The content delivered, and the action the user has taken upon the delivery of said content can then be used to further improve and expand the profile retained within the first MTCICP system.

The content delivered via a MTCICP can also be generated, provided and/or curated by the operator owner of the MTCICP or authorized third party providers. One such embodiment is in a museum setting. The operator of the museum can install a MTCICP system. They can then assign personnel internally to curate content relevant to the artifacts they show. They can enable content and content descriptions relevant to their artifacts to be provided by 3rd parties and or common databases. The MTCICP will enable the right curated content to be delivered to the right person on the right device. Such devices can be the museum visitor's own devices that have MTCICP enabled applications installed, with the devices including those such as mobile phones and wearables, or devices that are lent or leased by the museum and remain their property, those that are leased by the MTCICP provider to the museum or devices that are fixed at the museum. These devices can also be tablets, phones, wearables, digital displays, AR devices, VR devices, connected rooms, and other future display systems such as HoloLens, Samsung GearVR or other VR display technologies. The curated content can be delivered by the museum operator via the MTCICP on-site inside the museum, outside on the museum property or off-site such as remote sites or historic sites, or cities or ruins beyond the physical boundaries of the museum. Should there be an entity that owns this location or has other interests in such a location, they can be granted access to control the curated experiences that are triggered on such a site via the administrated access to the designated feature set of the MTCICP.

In a similar fashion, the owner of a sporting and/or education facility can grant access to the same MTCICP to multiple entities. The objective of this can be to enhance the experiences to those that are there, it can be to provide information, it can be to provide services, and it can be to provide safety and security. The same infrastructure of the MTCICP will enable all to access the same infrastructure, but to provide content and experiences that are within their domain or expertise or mandate. In such instances it can be used to promote a brand to a sports fan, while providing crowd control and security oversight to campus police, while granting access to concessionaires that want to sell products to the fans while in stadium. The same system can be used to provide educational content to students while in class rooms, enable automatic rollcall for attendance to university administrators while enabling educators in the room to push educational content at one time that is delivered personalized to the individual student in the designated room—or any other designated location. This system can also be used by students and teachers as a tool to learn how to deliver content, test what works and what does not, what inspired and drives activity and changes behavior, and what does not. In such an embodiment, the end users that experience these interactions can be limited to those who have granted the MTCICP permission to present such test cases, not the general public who have been granted permission only to final and commercial content.

The MTCICP can be used to detect crowds and alert those users who are connected to the system about such crowds, and direct them to less crowded areas before entering or while in the crowded area. One such embodiment is the ability to display an indication of number of users at each entry gate at a sports facility that has an MTCICP system installed with end user devices that are connected. Based on the interactions the system has at each enabled location, and the dwell time each such interaction has, the MTCICP can detect the density of users and the time that they are expected to remain in this area. An approximation of wait time and density of people can thereby be deduced. The MTCICP can present this information on the end user's devices so that the end user can make a choice of which entry to use. In addition, the MTCICP can send messages to those people who are in a line at a crowded entry point and informed that there is a smaller crowds and/or a shorter anticipated wait time at another entry point. Likewise, the anticipated wait time can be displayed on interactive displays/signs that can provide those users that are there with an anticipated wait time. This can be extended and further enhanced in areas of long lines such as amusement parks or taxi lines at busy airports. Here numerous displays/signs with sensors can be placed with known and fixed distances between each. As a member with a MTCICP connected device comes into proximity to sign number 1, the MTCICP records the time. When he moves along and comes into proximity to sign/display number 2 that is a known distance apart from sign number 1, simple calculation can be made to determine the rate of speed. This process can be repeated along the line and once a slowdown is determined, the time for a person who enters the line at sign 1 to arrive at the final destination which is a distance known distance can be calculated by the MTCICP and displayed at the sign 1 and on the user's MTCICP connected device.

Such understanding of location in a facility by the MTCICP and its permitted operators and users can also be used to facilitate roll-call, presence verification, and selected granted access, denial of access and/or check-in of a user with a device connected to the aforementioned MTCICP. Once such presence has been detected, the MTCICP can send alerts to others about the presence of the user in such an environment. This can be of great use to a hotel operator. As their guest arrives on the premises with a device that is connected to the hotel's MTCICP system, the MTCICP can send multiple messages alerting hotel staff about the guest's presence. This can be the car valet service and the bellboy services. They can be alerted by the MTCICP with details about the user such as name of the user, his status with the hotel rewards system to determine VIP level, his preferences and past visits thereby enabling the staff to present a personalized welcome. Should the hotel's MTCICP also be connected to the hotel's booking system, an automatic check-in can happen when sensors inside the lobby detect the presence of the user via his MTCICP connected devices. Should a payment be needed this payment can be tendered within the MTCICP if it has been so programmed. The payment tender can be closed via any of the current and future payment methodologies that have been incorporated into the MTCICP such as Samsung's PAY, Apple PAY, Google PAY, and Passport. Should the hotel MTCICP have been programmed to interact and be integrated with the hotel's room management and room key and room lock system, a token, message, programming code, other encrypted key granting access to the hotel room that the user has paid for can be delivered to the user's MTCICP connected device such as a mobile phone, wearable device such as a smart watch or other programmable device connected to the MTCICP. As the user arrives by his room, his connected device will grant him access via the MTCICP connected device to the room for the period that he has paid for via the MTCICP integrated room lock. As he enters the room with his MTCICP enabled device (s) his presence in the room is detected by sensors in the room. These can be passive sensors communicating with a room hub that communicates to the hotel MTCICP, control sensors that takes input and sends a control output command, and those that interact with both the user's MTCICP enabled devices and the hotel master MTCICP control systems. Interactions within the room can thereby controlled by input from the various sensors in the room with actions delivered to those devices they control[[led]], based on the presence of the user in the context as well as the use's past preferences as collected by the user's MTCICP connected device and/or a combination of this profile and the known past behavior and preferences of the user that the hotel MTCICP has retained and accessed and/or a third party's provided profile of the user that the hotel's MTCICP has been granted access to or any combination of any of the above. The room can therefore change its environment such as temperature, light, shades drawn or closed, radio station, tv channel based on the understanding of the user via the presence of his MTCICP enabled device in the environment that has sensors and controlled via the same connected MTCICP.

The use of such a MTCICP multi-tenant platform enables numerous entities to use the MTCICP as a revenue generator for the operator owner licensee of the MTCICP. This can enable a faster return on investment as it can be capitalized as a revenue investment, marketing expense, subscription or lease investment rather than a capital expense investment.

In larger geographical environments, such as regions, cities, islands and/or countries, multiple MTCICP platforms can be integrated across numerous vertical markets and numerous geographical areas with numerous end-users experiences under one master MTCICP. Such master MTCICP can be used by a city management to have real-time access to anonymous data and travel behavior across entire regions and cities. Such a system can provide the contextual intelligence for a smart city—numerous systems with various technologies providing real-time contextual data from private enterprises with governance data to provide better information and services to those who live there, enable those who work there to do so more effectively, entertain and service those who visit to encourage repeat visits while providing transportation, security, safety and services to all.

Figure 26:
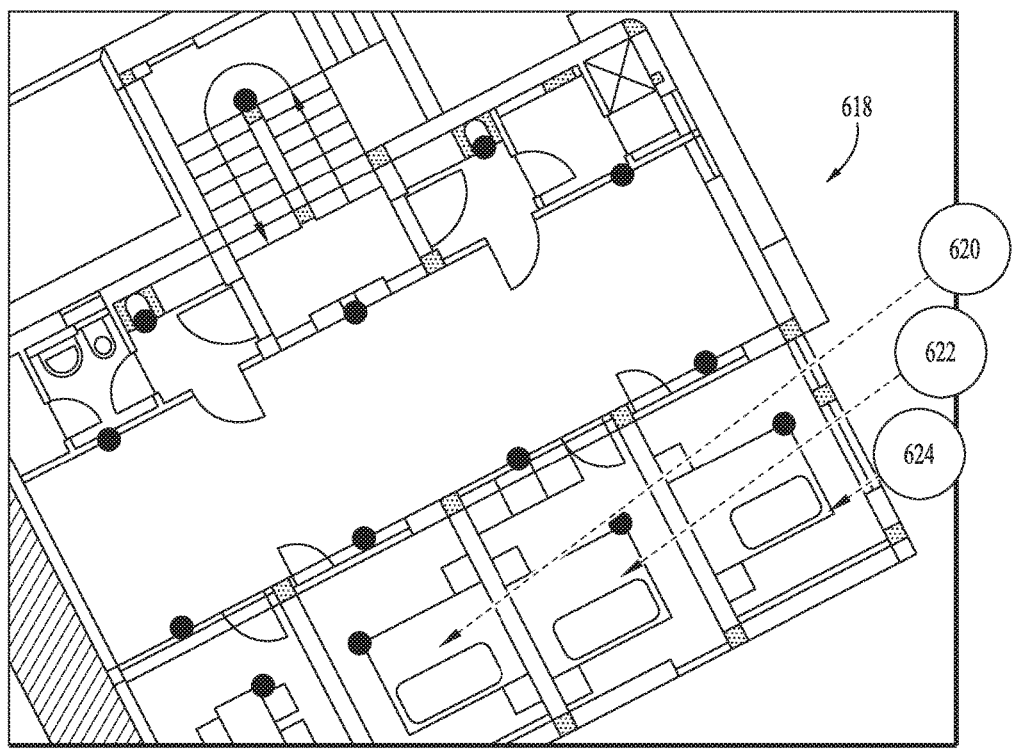
FIG. 26 depicts a floor plan of a venue with hallways, individual rooms with separate entrances from the hallway, stairways and entry point such as a section of a hospital with three movable assets.

FIG. 26 depicts a floor plan 618 of a venue with hallways, individual rooms with separate entrances from the hallway, stairways and entry points such as a section of a hospital. In some of these rooms there are movable items such as patient beds 620, 622, 624 that are used to move patients across hospitals. These could be any moveable item.

Figure 27:
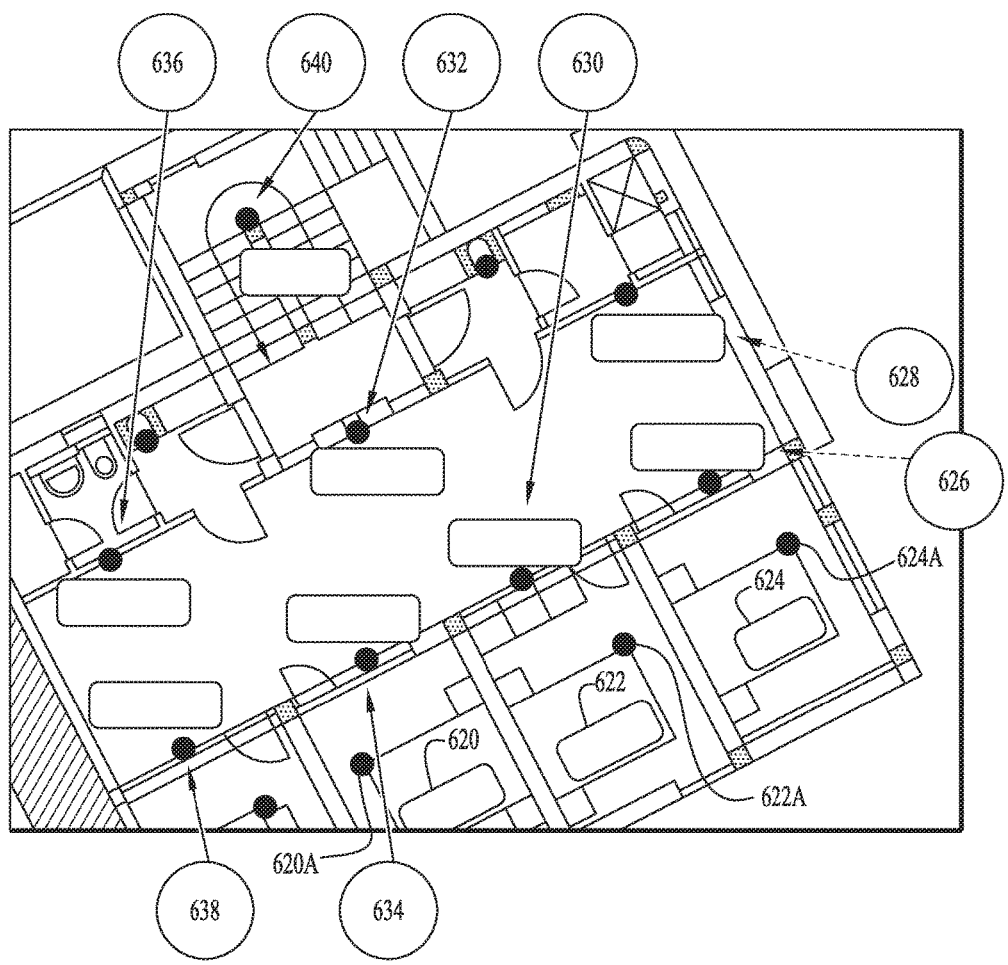
FIG. 27 depicts the FIG. 26 floor plan, with a series of sensors/proximity beacon sensors placed in the hallways and stairwell and three beds are in different rooms.

FIG. 27 depicts the same floor plan as in FIG. 26, where bed 620 is in one room, bed 622 is in another room and bed 624 is shown in a $3^{rd}$ room. Here a series of fixed proximity beacons and/or sensors are placed in the hallways and stairwell, and shown as sensors/proximity beacons 626, 628, 630, 632, 634, 636; beacon 638; and stairwell sensor/ proximity beacon 640. Fixed beacons are used to identify a known location when somebody comes in proximity to that beacon. They are also useful in that having several beacons with overlapping signals permit triangulation based on those signals, so that the exact location of a person that is in connection with more than two, but ideally three, beacons at any given time can be determined. In this example beacons 620A, 622A and 624A are attached to mobile pieces of equipment that can be moved, such as beds, EKG systems and so forth, as shown in FIG. 27, (attached to beds 620, 622, 624, respectively).

FIGS. 27, 28, 28A and 28B depict the same floor plan as in FIG. 26 and FIG. 27 with beacon sensors in the hallways, for example at 626 and 630, beacon sensors in the stairwell, for example at 640, and beacons/sensors, for example at 620A, 622A and 624A, attached to the beds 620, 622 and 624, respectively. The beacons placed on the beds such as beacons 620A, 622A and 624A, for example and shown in FIGS. 27, 28A and 28B communicate with and are recognized by SHCICP-MTCICP 650, as shown by arrows 622B and 624B. The beacon sensors in the hallways and stairwells can also communicate with and/or be recognized by the same SHCICP-MTCICP, shown at 650 in FIGS. 27, 28A and 28B by arrows 630B, 622B, 624B and 626B.

Figure 29:
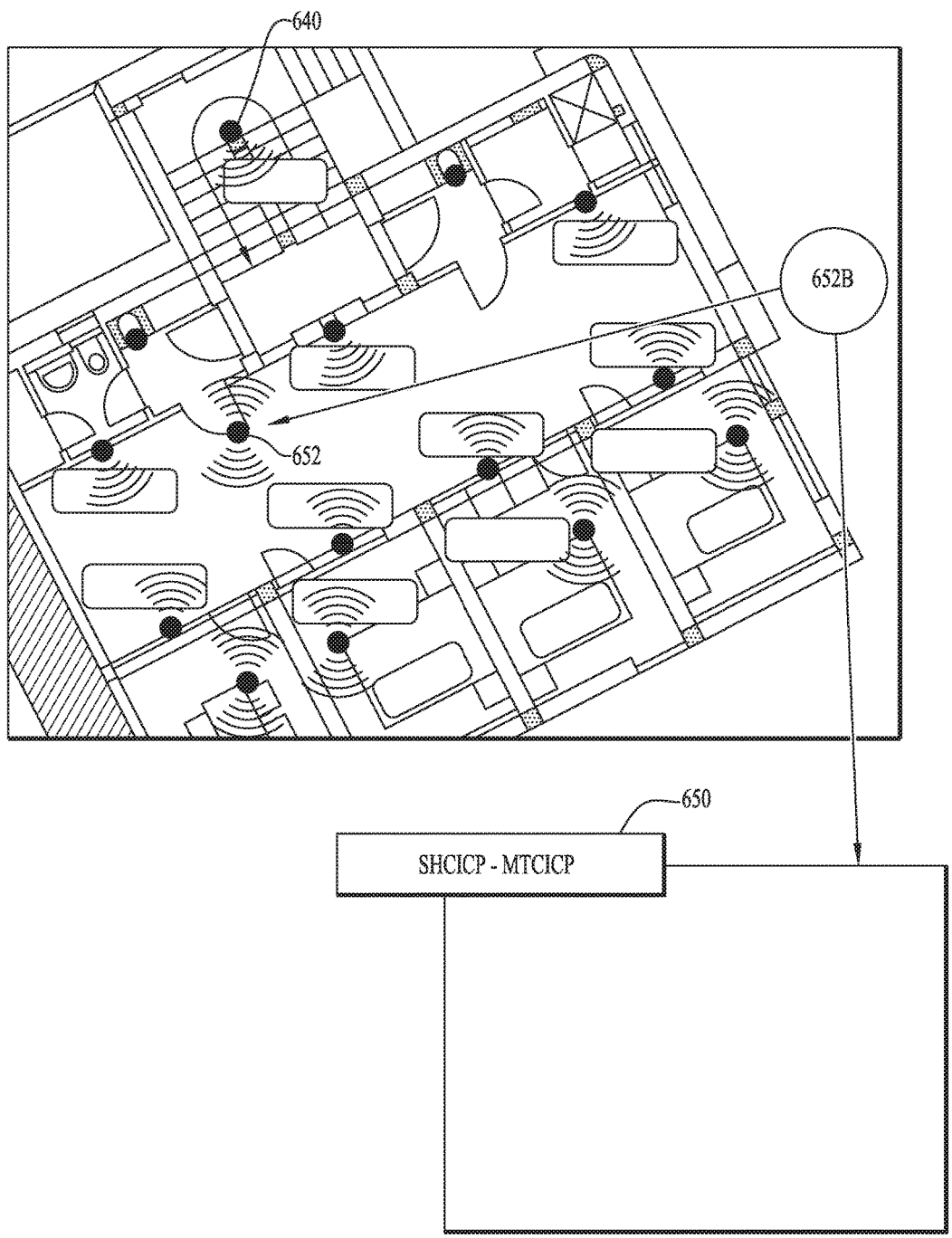
FIG. 29 depicts the FIG. 27 floor plan with additional beacons or transmitters placed in a hallway.

FIG. 29 depicts the same floor plan and SHCICP-MTCICP 650 as depicted in FIG. 27. In this instance, and additional beacon or transmitter device 652 has entered the hallway. This device can transmit and emit signals and can communicate with and or be recognized by the same SHCICP-MTCICP 650 that controls the sensors as shown in FIG. 28 such as shown by arrow 652B. This device 652 can be a mobile phone, tablet or computer, wearable or other communication device worn by a staff member, management or support staff, a physician, nurse or admin operator in a hospital, or a member of the public who has a device that communicates with the SHCICP-MTCICP 650.

Figure 30:
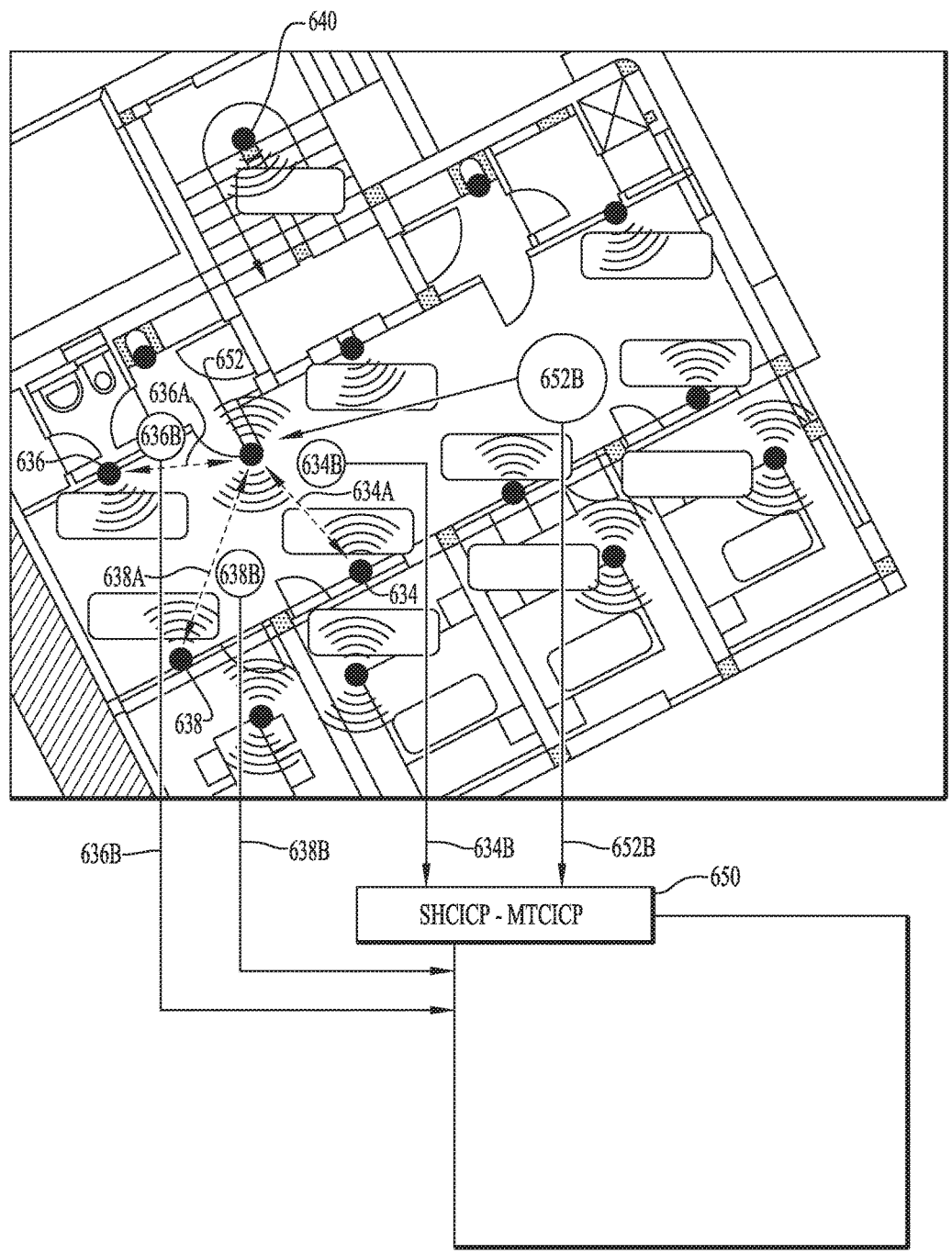
FIG. 30 depicts the FIG. 29 floor plan, with a communication device having made a connection and recognized or started a communication with the FIG. 27 hallway sensors/beacons.

FIG. 30 depicts the same floor plan and SHCICP-MTCICP 650 and added device 652 as depicted in FIG. 29. Here the device 652 has made a connection, recognized or started a communication with the hallway sensors/beacons shown in FIG. 27 and as shown by the double-headed arrows 634A, 636A and 638A in FIG. 30. The hallway beacons/ sensors that device 652 communicates with are the ones in range, namely sensors 634, 636 and 638. These connections are indicated as double-headed arrow 636A for connection between device 652 and sensor 636, double-headed arrow 638A for connection between device 652 and sensor 638 and double-headed arrow 634A for connection between device 652 and sensor 634. These sensors communicate to the SHCICP-MTCICP 650 as shown by arrows 636B, 638B, 634B and double-headed arrow 652B together with device 652. The signals at 636A, 638A and 634A can be used to triangulate the location of the device 652 in any of numerous ways using standard location algorithms applied by the SHCICP-MTCICP 650. The location of device 652 can thereby be calculated, recorded and retained by the SHCICP-MTCICP 650.

Figure 31:
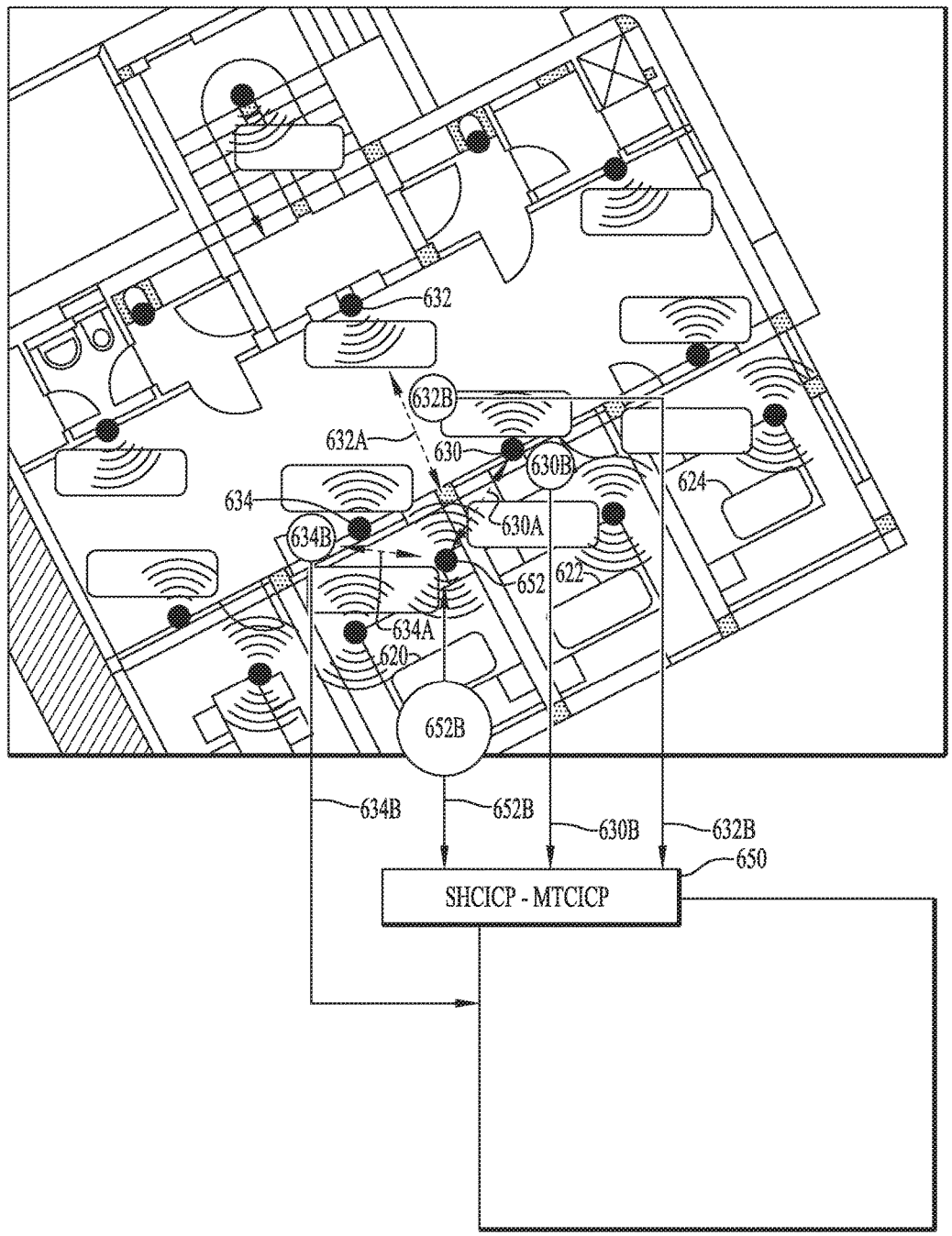
FIG. 31 depicts the FIG. 30 hallway and set up, and with the FIG. 30 sensor and communication devices moved from the hallway into the room where a bed is located.

FIG. 31 depicts the same hallway and set up as in FIG. 30. Here the sensor, communication device 652 has moved from the hallway into the room where the bed 620 is located. The communication between the device 652 in its new position and the SHCIP-MTCICP 650 is shown at double-headed arrow 652B. Now the connections between the fixed sensors in the hallway shown in FIG. 28A and the movable sensor/ communication device 652 have changed to have connections with the hallway sensors 630, 632 and 634. These new connections are indicated as a double headed arrow 634A between devices 634 and 652, and device 634 is shown connected to SHCICP 650 by arrow 634B; as a double-headed arrow 632A between devices 632 and 652, and device 632 is shown connected to SHCICP 650 by arrow 632B; and as a double-headed arrow 630A between devices 630 and 652, and device 630 is shown connected to SHCICP 650 by arrow 630B. These connections 634A, 630A and 632A are communicated to the SHCICP-MTCICP 650 together with the identification of device 652 as indicated by arrows 634B, 630B, 632B and double-headed arrow 652B, respectively. The signals at connections 634B, 630B, and 632B can be used to triangulate the new location of the device 652 in any of numerous ways using standard location algorithms applied by the SHCICP-MTCICP 650. The new location of device 652 can thereby be calculated, recorded and retained by the SHCICP-MTCICP 650.

Figure 32:
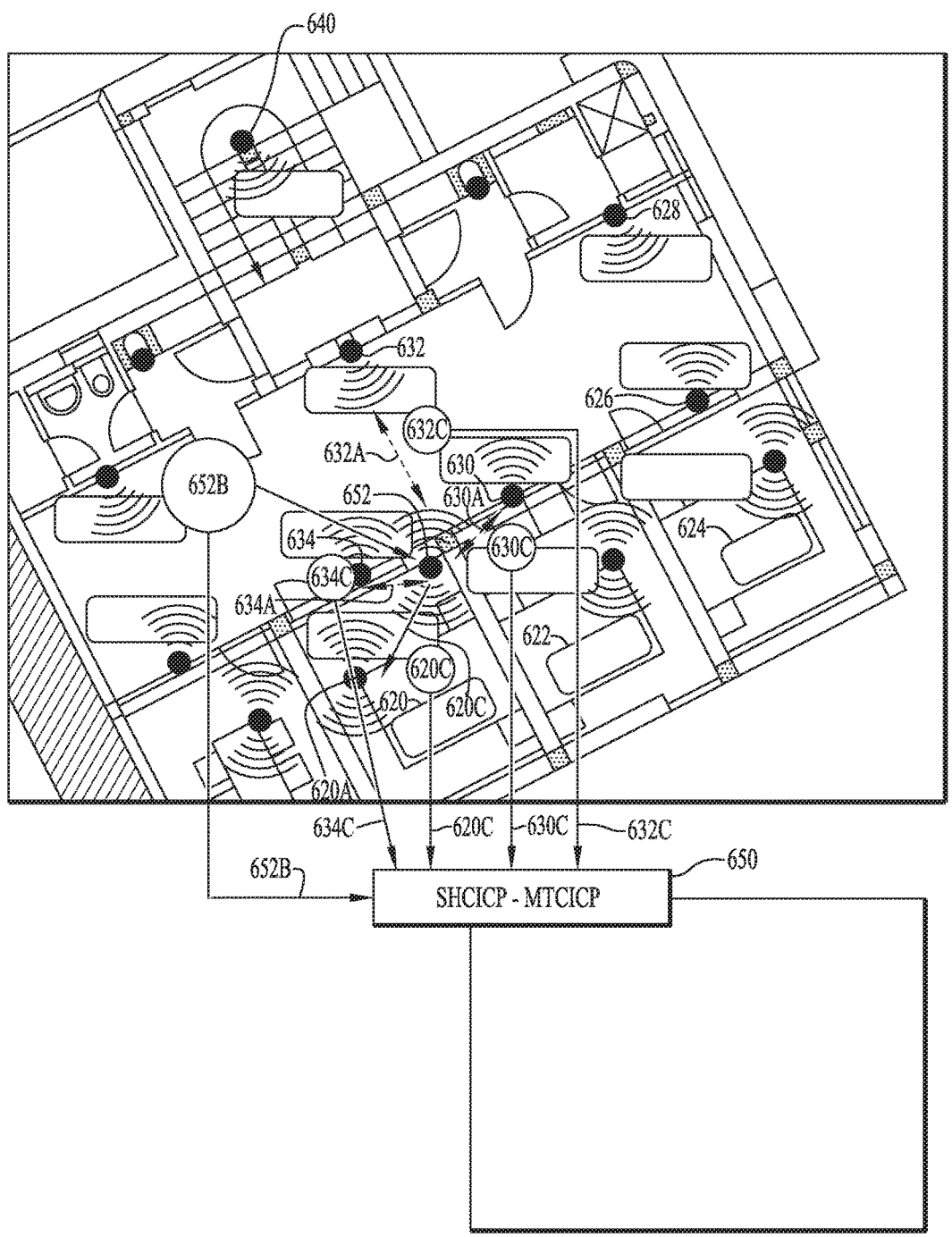
FIG. 32 depicts the FIG. 31 hallway and set up, and with the FIG. 30 sensor and communication devices moved from the hallway into a room where a bed is located.

FIG. 32 depicts the same hallway and set up as in FIG. 31. Here the sensor, communication device 652 as shown in FIG. 31 has moved from the hallway into the room where the bed 620 shown in FIG. 26 is located, but to a location in room 620 that is different from the location as shown in FIG. 31. Now, in FIG. 32, the connections between the fixed sensors in the hallway shown in FIG. 28 and the movable sensor/communication device 652 changes to have different connections with the hallway sensors 632, 634 and 630 because their positions relative to each other have changed. These connections are indicated as double-headed arrow 634A, as double-headed arrow 630A and as double-headed arrow 632A. These connections provide for communication to the SHCICP-MTCICP 650 together with communication with and from device 652 in its new location. The signals at connections 630C, 632C and 634C can be used to triangulate the new location of the device 652 in numerous ways using standard location algorithms applied by the SHCICP-MTCICP 650. The new location of device 652 can thereby be calculated, recorded and retained by the SHCICP-MTCICP 650. An additional connection 620C has been made, shown by arrow 620C. This connection is between beacon 620A on bed 620 and the SHCICP-MTCICP 650. The signal strength and the action of coming within proximity range between sensor—communication device 652 and the beacon 620A on bed 620 is captured, recorded and retained by the SHCICP-MTCICP 650 with the time the proximity was detected and the location of device 652 at that time. The location of the proximity detection between the device 652, e.g., worn by a staff member and the bed 620 is thereby recorded, retained and known.

Figure 33:
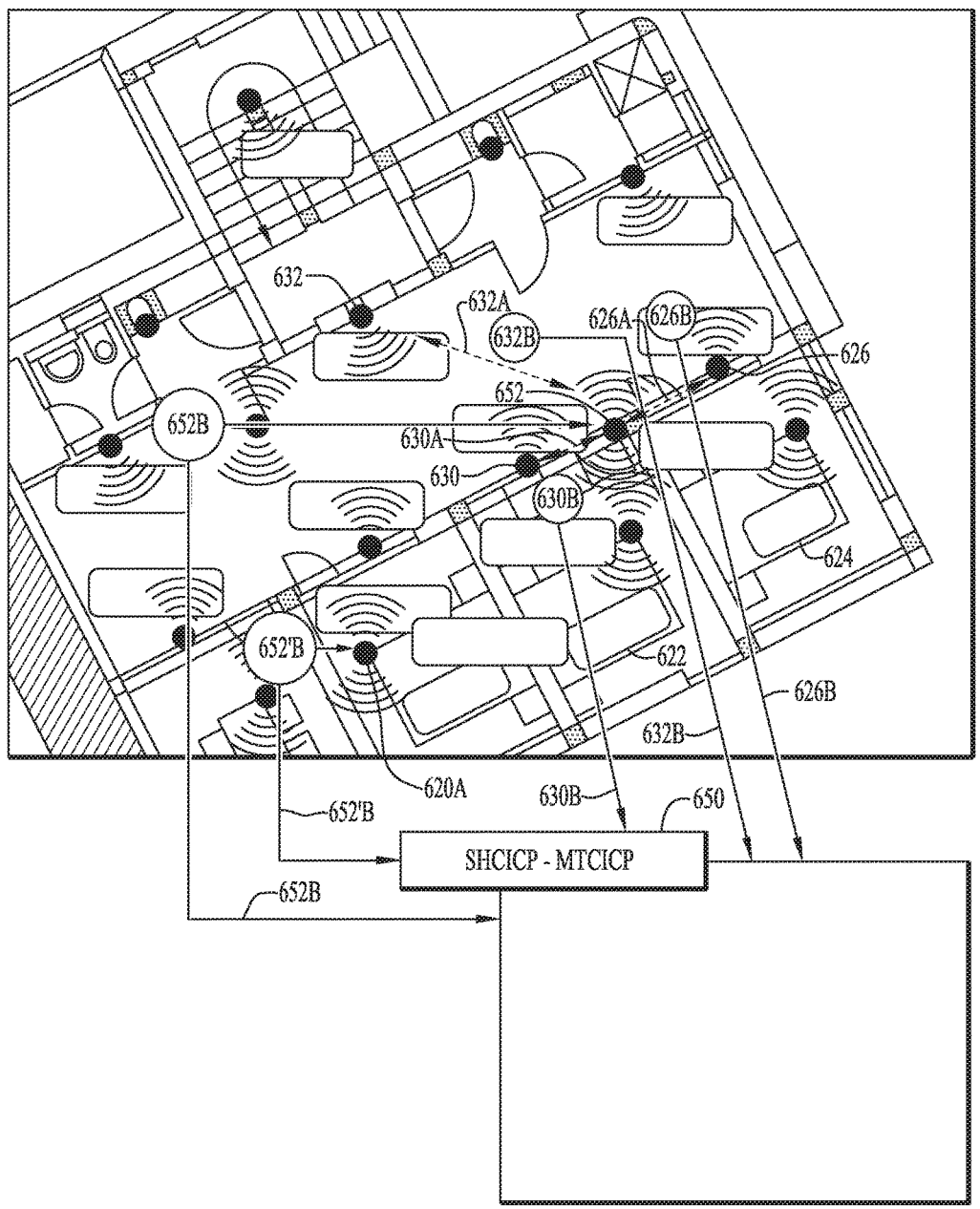
FIG. 33 depicts the FIG. 32 hallway and set up, with the FIG. 32 sensor and communication devices moved from the room where the bed was located into the hallway.

FIG. 33 depicts the same hallway and set up as in FIG. 32. Here the sensor, communication device 652 shown in FIG. 32 has moved from the room where the bed 620, shown in FIG. 26, was located, into the hallway as shown by FIG. 33. Now the connections between the fixed sensors in the hallway, near the rooms where beds 622 and 624 are located, as shown in FIG. 33, and the movable sensor/communication device moves to the new location and causes it to have connections with the hallway sensors 626, 630 and 632. These connections are indicated as 626A for connection between 626 and 652, as 630A for connection between 630 and 652 and as 632A for connection between 632 and 652. These connections 636A, 630A and 632A are communicated to the SHCICP-MTCICP 650 together with the identification of beacon/sensor/communication device 652, as shown by arrows 626B, 630B, 632B and 652B in FIG. 33. The signals 626B, 630B, 632B and 652B can be used to triangulate the new location of the device 652 in any of numerous ways using standard location algorithms applied by the SHCICP-MTCICP 650. The new location of device 652 can thereby be calculated, recorded and retained by the SHCICP-MTCICP 650. The connected device 652 that was with bed 620, adjacent sensing device 620A is now no longer in that place because it has been moved to the new location as shown in FIG. 33. The action of moving device 652, as shown in FIG. 33, out of range of sensor 620A is captured, recorded and retained by the SHCICP-MTCICP 650 with recording the time the proximity was lost as depicted by arrow 652'B, that is, the location of device 652 at that time was last captured by the system. The location of the loss of proximity detection between the device 652 worn by a staff member and bed 620 is thereby recorded, retained and known. This is captured and retained as "last known location" of device 652 near bed 620 by the SHCICP-MTCICP.

Figure 34:
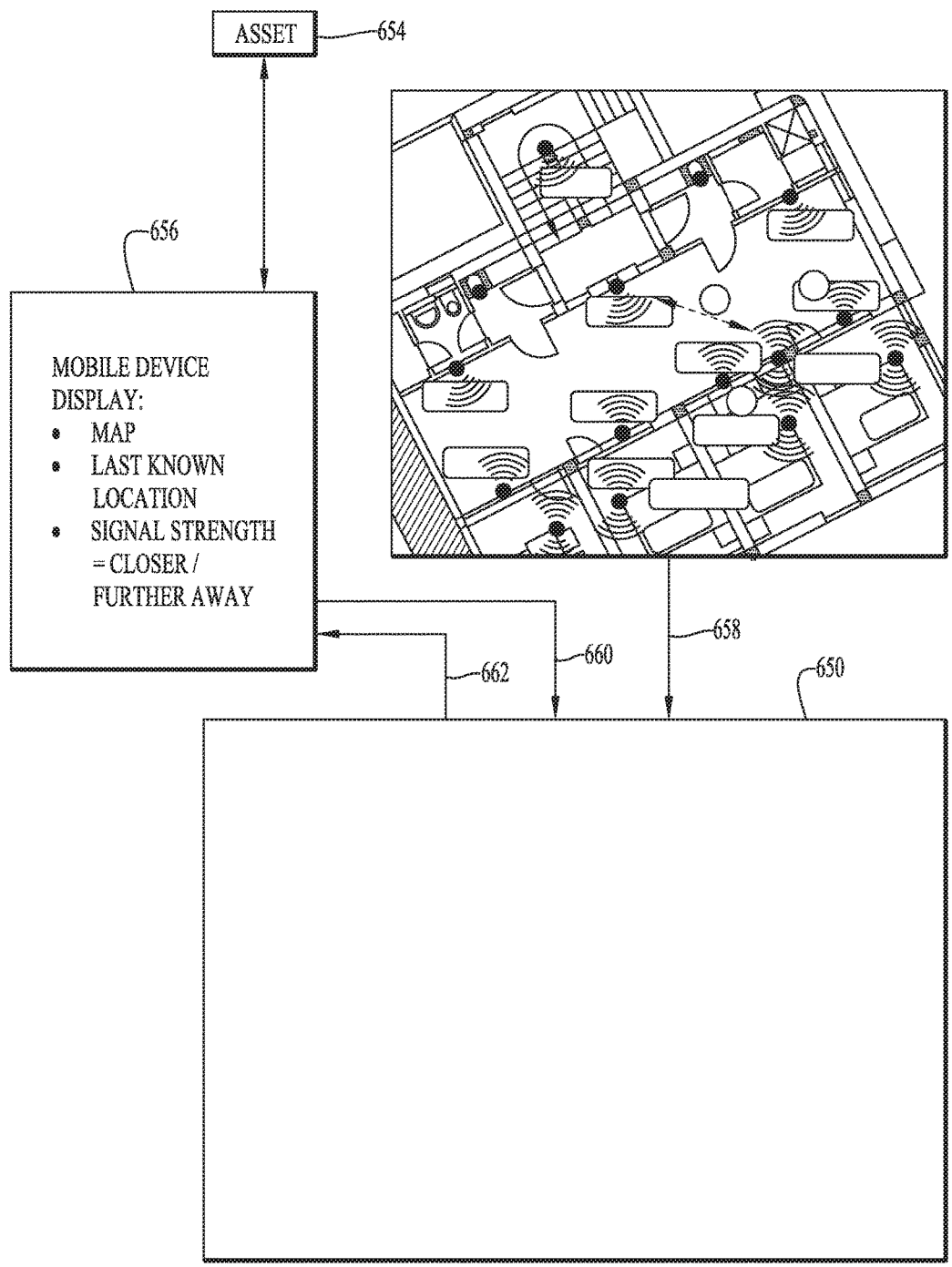
FIG. 34 depicts the FIG. 33 floorplan with the "last known location" of the bed detected and its location calculated by the SHCICP-MTCICP.

FIG. 34 depicts the floorplan shown in FIG. 33 with the "last known location" of the bed 620 as detected and calculated by the SHCICP-MTCICP 650. The asset 654 in this figure can be, for example, the bed 620, or a database of assets controlled by the system and its operators. The information from the SHCICP-MTCICP 650 can be displayed on devices such as one shown at 656, with information from the SHCICP-MTCICP 650. This information can be, for example, "last known location", and "signal strength" between sensors and communication devices so that alerts can be presented if a person is moving closer as indicated by increase of signal strength, or away by lower signal strength. A floor map or other lay-out of the areas where sensors and beacons also can be presented by the SHCICP-MTCICP 650 on these displays. These displays can be mobile and on phones, tablets or wearables used and worn by personnel that have authorization to access the SHCICP-MTCICP 650, can be on fixed digital displays and kiosks in the facility or can be on computer screens at the facility or elsewhere. Feedback from these devices will be communicated back to and from the SHCICP-MTCICP 650 as shown by arrows 658, 660 and 662.

Asset Tracking Example

Figure 35:
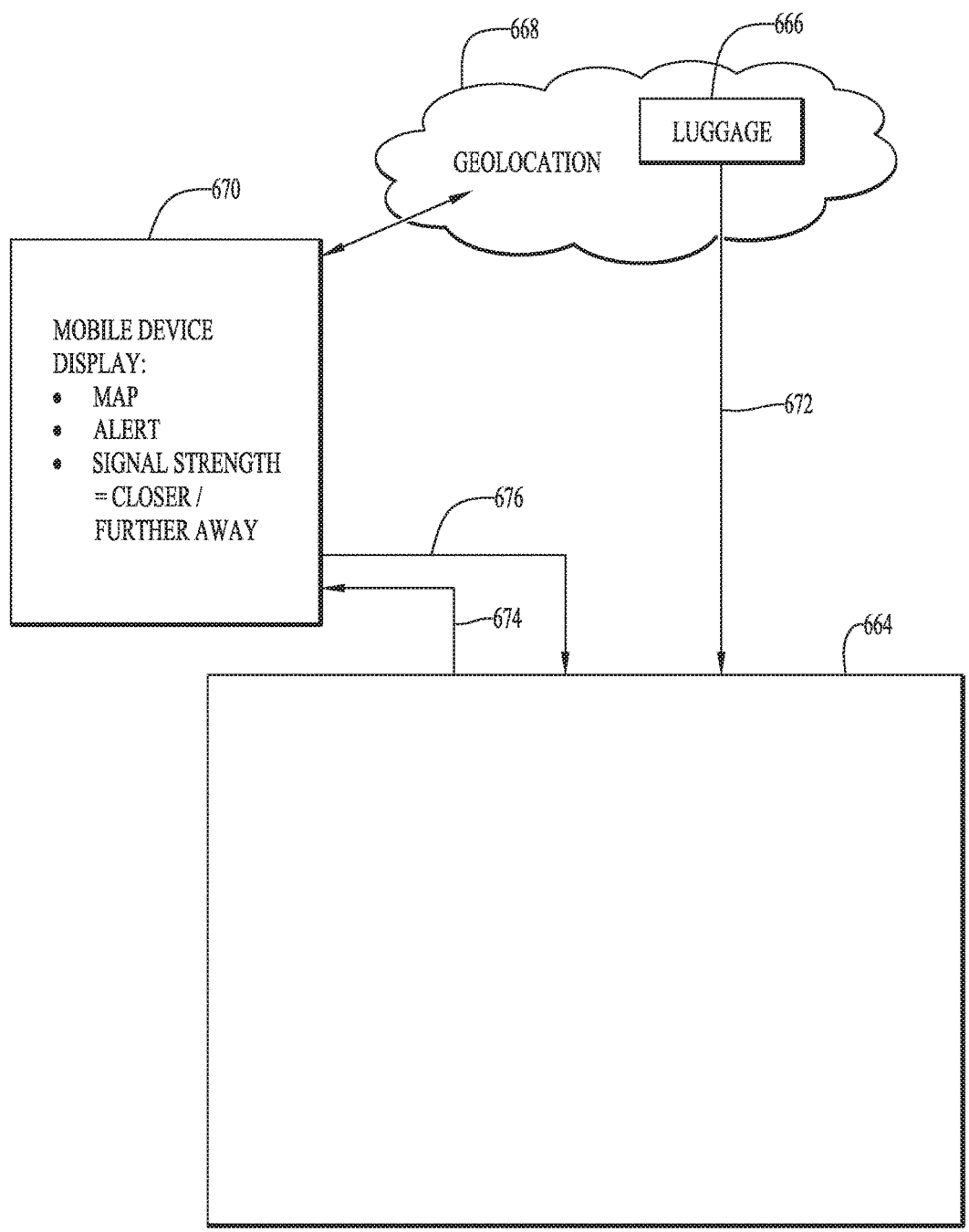
FIG. 35 depicts a SHCICP-MTCICP operating platform that incorporates a sensor or proximity beacon on a piece of luggage or other product that is shipped and in which a location or series of locations are pre-determined as "geo-locations".

FIG. 35 depicts an alternate embodiment SHCICP-MTCICP operating platform 664 that incorporates a sensor or proximity beacon on a piece of luggage or other product that is shipped. A location, or series of locations, are pre-determined as "geo-locations". These geo-locations are known and matched with a series of mobile devices 670 and the ability of each to display information about locations of assets and provide directions to move towards the asset are as described, for example, with reference to FIG. 34 and as shown in FIG. 25. The identity of the luggage and other asset 666 is also communicated to these devices 670 and to their displays. The mobile display can be on a mobile device that is mobile and moves with a user or a mobile, connected display that is fixed permanently or temporarily in a known physical location. The identity of the luggage/asset 666 is also communicated to the SHCICP-MTCICP 664 as shown in FIG. 35 by arrow 672. When this asset 666 has been identified and location determined by the SHCICP-MTCICP 664, this information is presented to the mobile device 670 display as shown by arrow 674. When this has interacted with the mobile device, the feedback from this interaction is communicated back into the SHCICP-MTCICP 664, as shown by arrow 676.

Food and Drink Vendor Example

Figure 36:
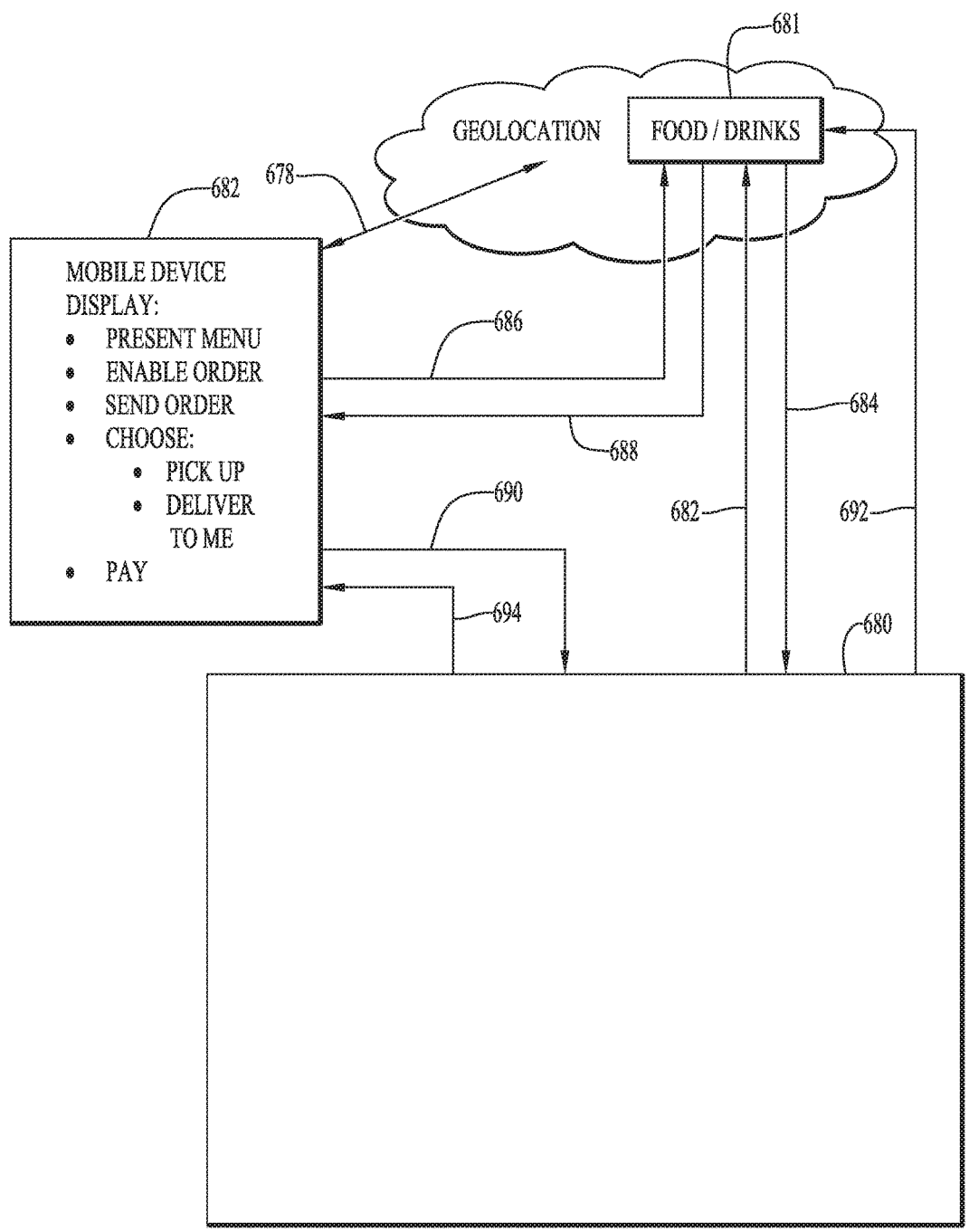
FIG. 36 depicts a SHCICP-MTCICP operating platform that incorporates a mobile communication device and a sensor or proximity beacon at physical locations that serve food or drinks or both.

FIG. 36 depicts a SHCICP-MTCICP operating platform embodiment 680 that incorporates a mobile communication device 682 and a sensor or proximity beacon 681 at physical locations that serve food or drinks or both. This location is known, as shown at arrow 678. This can be a location, or series of locations that are pre-determined as "geo-locations". The information about the Food and Drink and this or these locations are shared with SHCICP-MTCICP 680. The SHCICP-MTCICP 686 can display this information on a mobile device, such as shown at 682. This information can be, for example, to "Present Menu" on the device, "Enable Order" that enables a user to prepare and present an order based on the "Menu" presented on the device, "Send Order"

that will enable the user to send the order presented, and the end user can chose to "Pick Up" the order or have it "Delivered to me" and finally enables the user to "Pay" for the order to complete the order. The mobile communication device 682 can be a mobile phone, mobile tablet or wearable the user is wearing, or it can be a fixed kiosk at the location or it can be a digital display in vicinity of one of the geo-locations. Once this information has been compiled on the Mobile Device 682, the Mobile Device communicates this information to the SHCICP-MTCICP system 680. This information is aggregated by the SHCICP-MTCICP system 680 to include location of the Mobile Device and any information about the end user that the user has approved for the SHCICP-MTCICP system to gather and retain, and sent to the appropriate Geolocation that produces and serves Food/Drinks shown at 681. This complete order is recorded and retained by the Food/Drinks geo-location system 680 using any of the numerous commercially available Point of Sales and Order Entry systems used by such facilities, and confirms and acknowledges that the order is received and accepted, and worked on as shown at arrow 684. Should the end user have selected "Deliver to me" order delivery, the mobile device will communicate its location to the geolocation as shown at arrow 686. Should the user have selected "Pick Up", the Mobile Device will present the user's identification, location and enable the delivery of the order when in proximity to the geolocation as shown at arrow 688. Should the user have selected "Pay", the mobile device will enable payment of the order via any of the readily available mobile payment systems that the SHCICP-MTCICP—payment activated as shown at arrow 690—enables and integrates and that the geolocation operator accepts such as Apple Pay, Android PAY, Samsung PAY, MasterCard Mobile PASS or any other such system as shown at arrow 692 with the SHCICP-MTCICP system 680 verifying payment has been rendered to the user's mobile device as shown with arrow 694.

Figure 37:
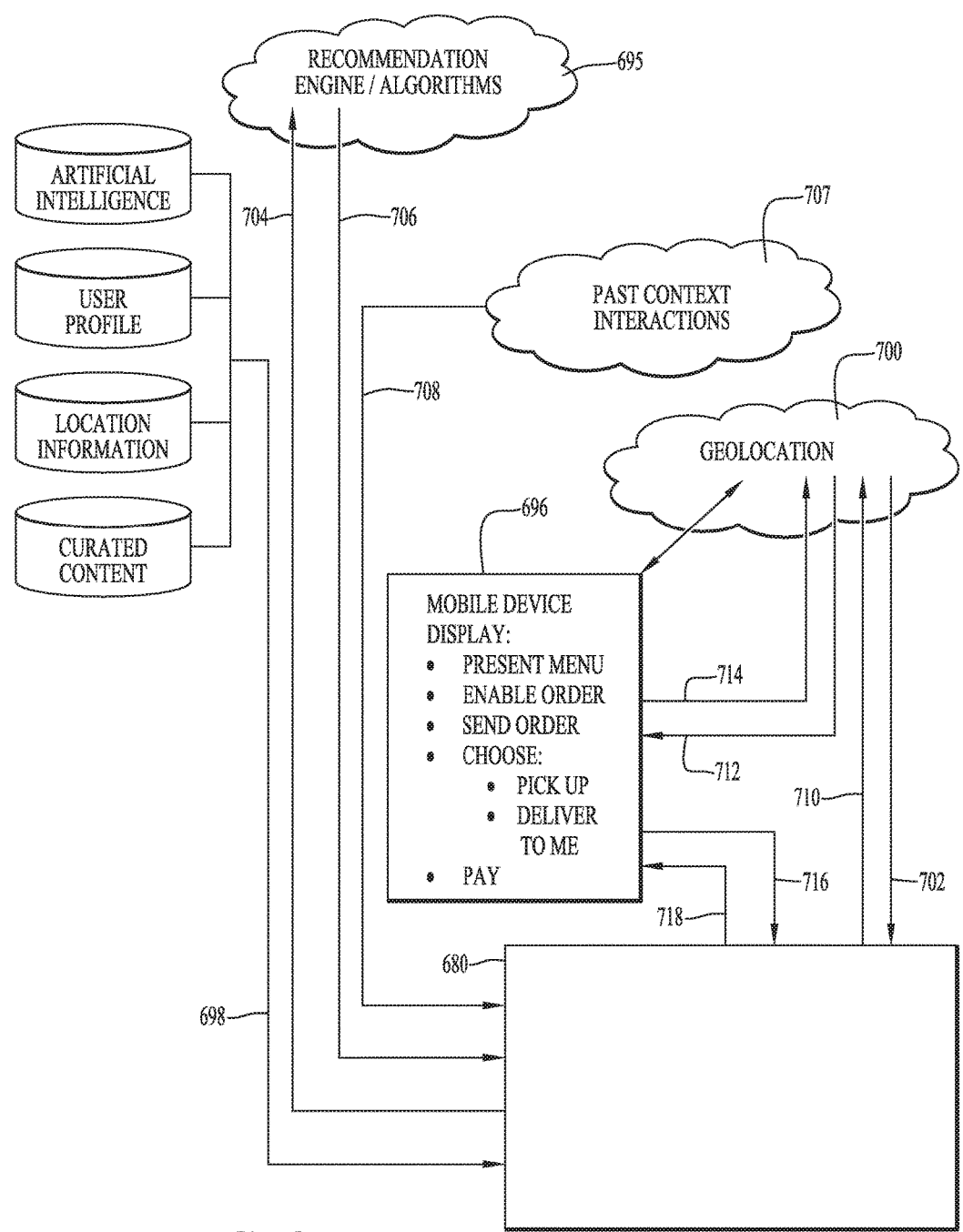
FIG. 37 depicts the FIG. 36 system and with a series of additional parameters to present the information to the end user's mobile device.

FIG. 37 depicts the system as described in FIG. 36 with a series of additional parameters such as algorithms from a recommendation engine 695 to present the information to the end user's Mobile Device as shown at 696. This information is presented to the SHCICP-MTCICP as shown at arrow 698 from a combination of information databases depicted as "Artificial Intelligence", "User Profile", "Location Information" and "Curated Content" such as calorie intake for a menu item, photographs of a menu dish or advertisement information about a blended drink. These are listed as illustrative and not intended to be all-encompassing. In addition, algorithms can be used to combine the information as depicted by "Artificial Intelligence". These combined data are sent to the SHCICP-MTCICP, as shown at arrow 698. The combination of this and the information presented to the SHCICP-MTCICP from the geolocation 700 and the Mobile Device 696 is calculated and combined by the SHCICP-MTCICP 680 and presented to the SHCICP-MTCICP as shown at 702. An integrated or separate cloud device will perform calculations based on recommendation engine algorithms with input from the SHCICP-MTCICP internally or externally as shown at arrow 704 and presents the results back to the SHCICP-MTCICP 680 as depicted at arrow 706. Another cloud based database and computation device 707 then presents "Past context interactions" to the SHCICP-MTCICP, as shown at arrow 708. These can be past interactions of the end user, they can be interactions of the user and the geo-location, they can be others' interactions with the geo-locations, they can be the user's behavior at other geo-locations or they can be others' interactions at other geo-locations. This context understanding and knowledge is presented to the SHCICP-MTCICP 680 as shown at arrow 708. This combined knowledge and computation results are presented to the geo-location as shown at arrow 710 and presented to the Mobile Device from the geo-location 700 after they have been evaluated, reviewed and accepted as shown at arrow 712. The end user's response to the information, including order details, order delivery method or pick-up by user and payment is then presented to the geolocation, as shown at arrow 714. The user's final payment and acceptance of the order is reported to the SHCICP-MTCICP 680 as shown by arrow 716 and receipt of this is confirmed by the SHCICP-MTCICP 680 and reported back to the user as shown at arrow 718.

Figure 38B:
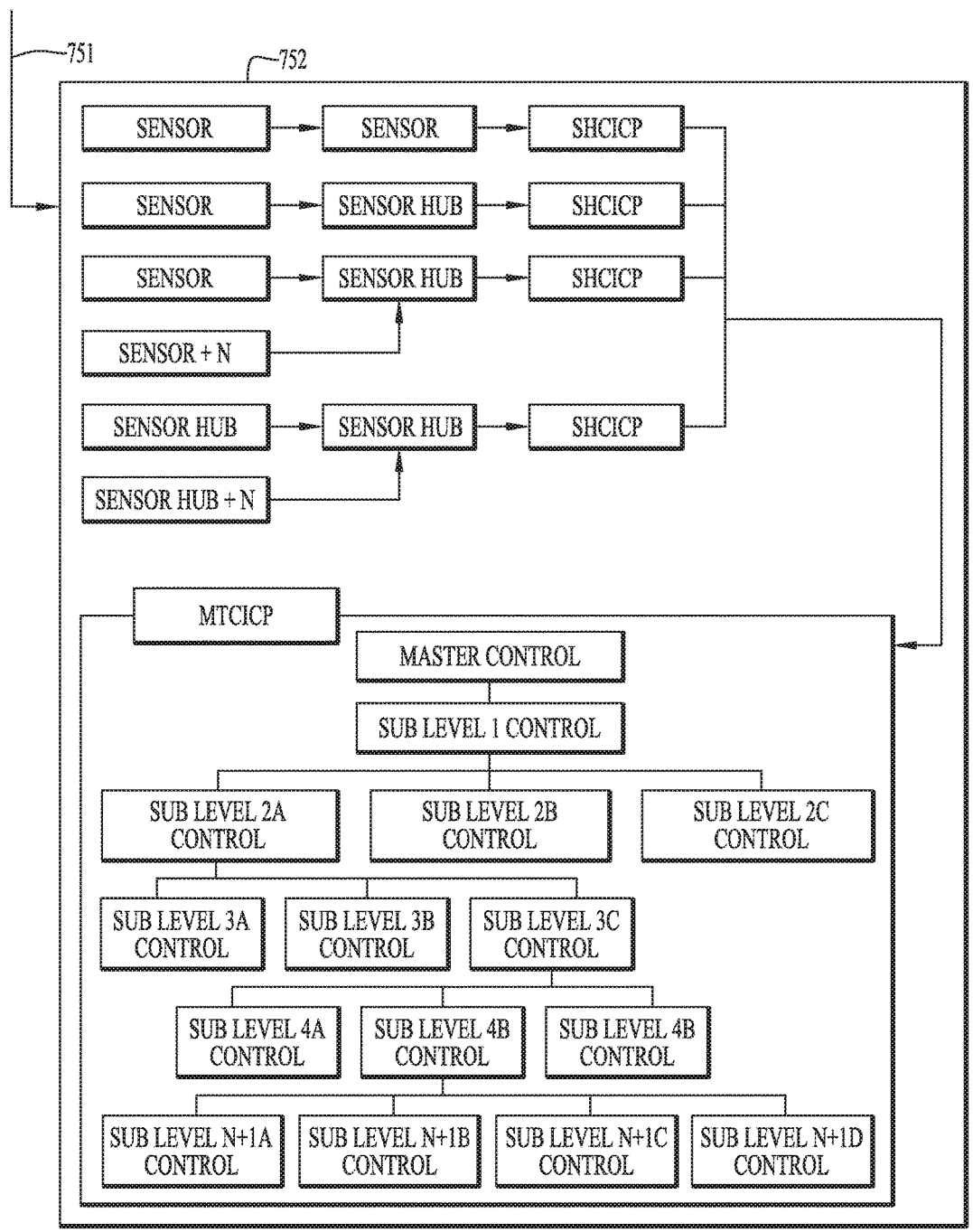
FIG. 38B depicts the second partial view of the FIG. 38 decision tree.

FIGS. 38, 38A and 38B depict a decision tree for the delivery of messages, content, instructions and actions, such as actual delivery of food items as depicted in FIG. 37 combined with a SHCICP-MTCICP 680 and with a series of sensor inputs.

In FIG. 38A, a decision tree 717 illustrates the processing of an exemplary message 719 sent as an alert 720 and a delivery alert 721 delivered at 722 with a confirmation request alert 723 sent as shown by arrow 724. The message can be any of instructions, alerts, actions, instructions, confirmation of actions, or a request for action. The response to the confirmation request can be YES/NO, shown at 725 and responses sent "NO" at 726, or "YES" at 728. If "NO" 727, then an alert, at 729 is initiated and sent as shown with arrow 730. This alert can initiate two responses at 732, and an ALARM at 731 if NO response is selected or received. If the Alarm is initiated at 734 a "Corrective Action" at 733 may be triggered. If this is triggered, the response is activated as shown with arrow 736 as a confirmation "YES" 735. This is recorded at 737 as shown at action arrow 738 and action arrow 740 to retain the response as shown at 739. If the action 728 to the confirmation request 724 is Yes, as shown at 741, then a record action is recorded at 743, as shown with arrow 742 and action record 743 is sent to be retained at 745—as shown with arrow 744. If the Alert is accepted and does not trigger an alarm, as shown at arrow 746, the response YES at 741 is recorded at 743 with instructions as shown with arrow 748 and with instructions to be retained at 747 as shown with arrow 750.

In FIG. 38B the decision tree 717 shown in FIG. 38A is extended as shown with arrow 751 into a sensor network SHCICP and multi-tenant MTCICP system 752 as described with reference to FIG. 14.

Figure 39B:
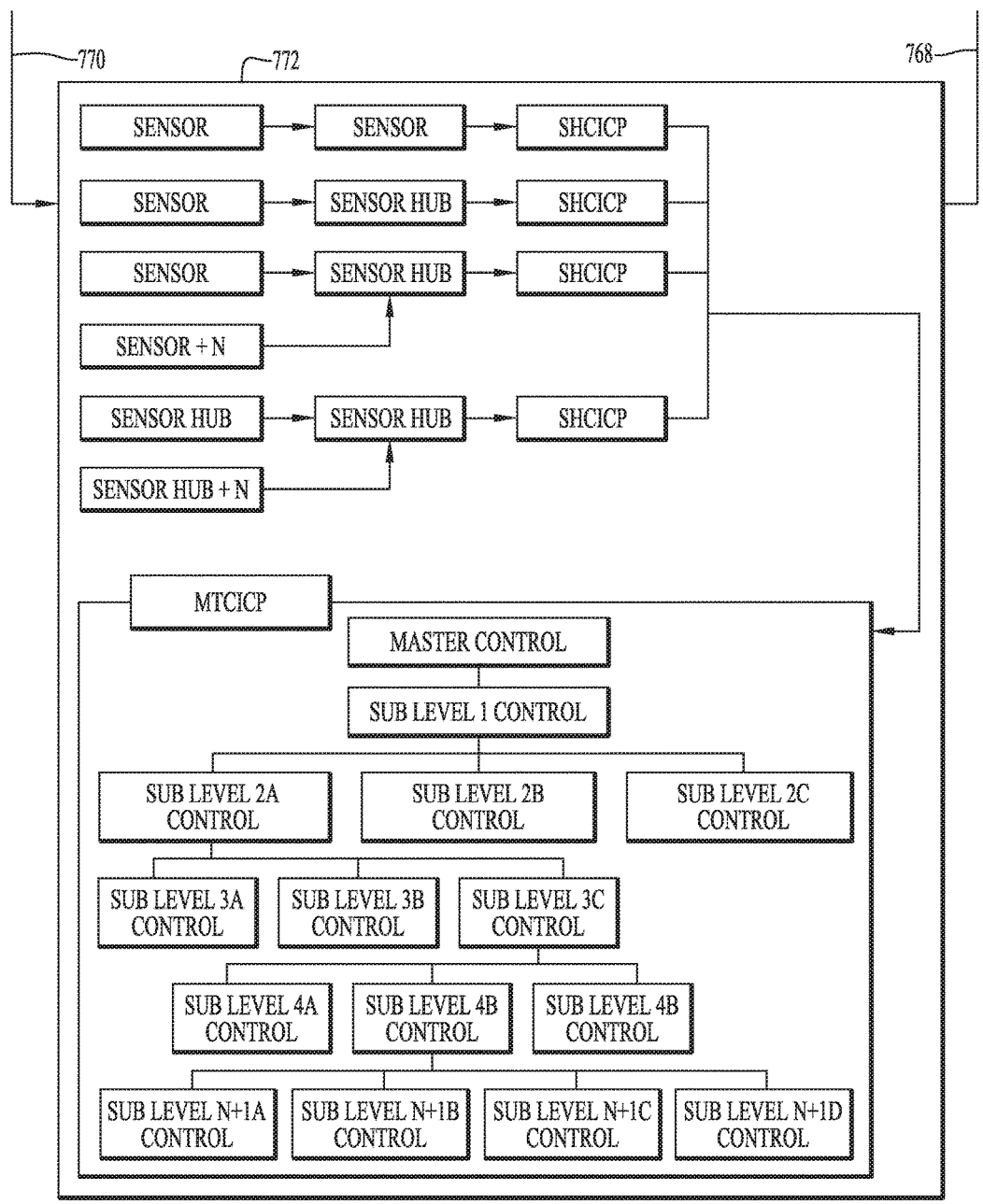
FIG. 39B depicts the second partial view of the FIG. 39 exemplary decision tree.

FIGS. 39, 39A and 39B depict the decision tree shown in FIG. 38 with decision input 754 coming from suggestions from devices and venues listed as "Equipment" 756, "Venue" 758, "Home" 760, "Hotel" 762, "Car" 764 and "Person" 766 as shown in FIG. 39A. This list is for illustrative purpose only, and is not intended to be complete. It is any facility, human, device, system, infrastructure, city, building or any other entity or device that has a series of interactions within its sphere of influence/context and this output from these is entered into a decision tree 753 as shown with arrow 754. The output from these calculations is then put into a SHCICP-MTCICP as shown by 770. The results based on these calculations are fed back into the Equipment 756, Venue 758, Home 760, Hotel 762, Car 764 and Person 766 devices and venues as shown by arrow 768.

FIG. 39B shows output 770 received from FIG. 39A that is fed into the SHCICP-MTCICP 772 as described in regard to FIG. 14 as shown by arrow 770, also shown in FIG. 39A. The output from the SHCICP-MTCICP as described, for example in regard to FIG. 14, is then sent back into the originating location that detected the original context illustrated in FIG. 39A as shown by arrow 768.

Multiple Devices CICP Example

Figure 40:
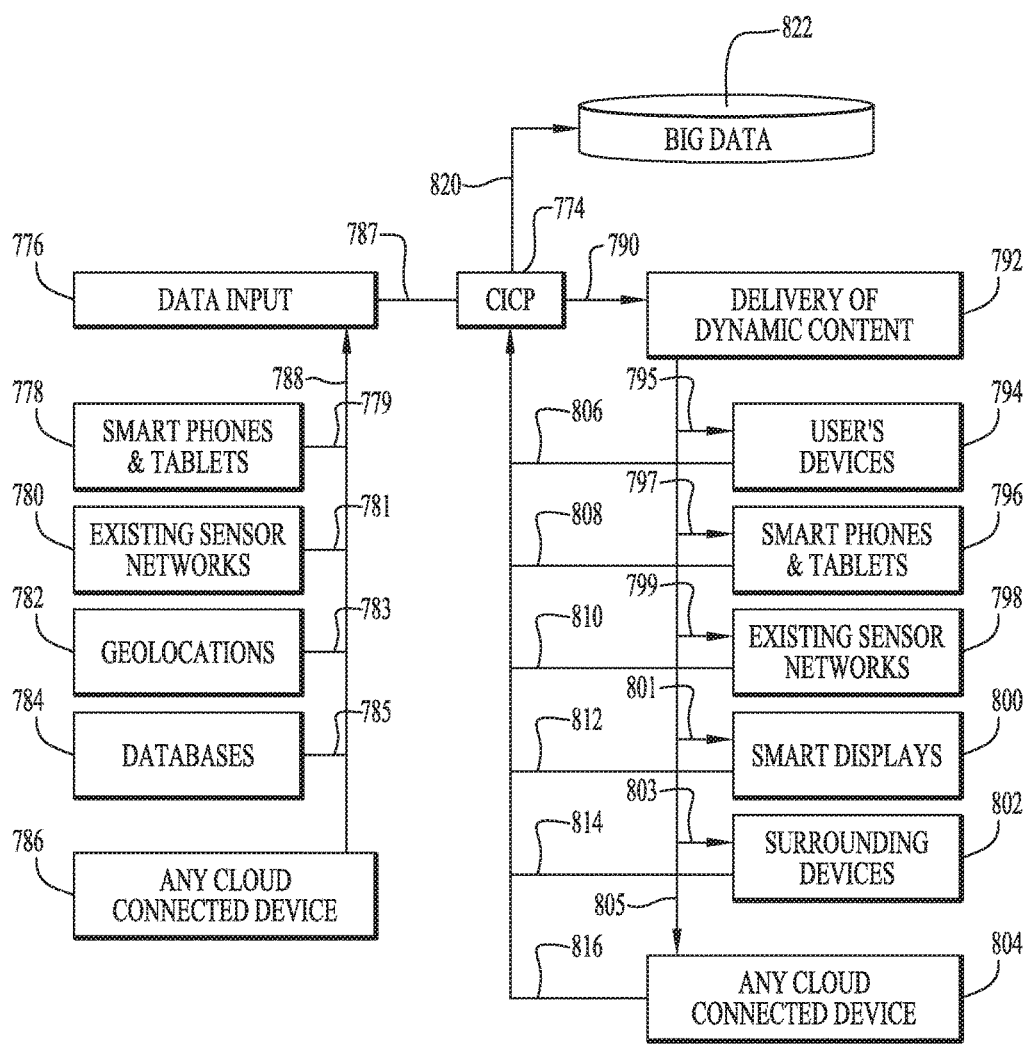
FIG. 40 is a schematic dataflow and input/output with feedback extending across a series of sensors and devices that are communicating via a CICP.

FIG. 40 depicts an alternate embodiment showing an schematic dataflow and input/output with feedback across a series of sensors and devices that are communicating via a CICP 774. Data input 776 can come from "smart phones and tablets" 778 as shown by lead line 779, "Existing sensor networks" 780 as shown by lead line 781, "Geolocations" 782 as shown by lead line 783, "Databases" 784 as shown by lead line 785 and "Any cloud connected device" 786 which can be aggregated data from all devices and/or any combination of any single or plural devices as shown at arrow 788 and providing the data input 776 to the CICP 774 as shown by line 787. This data input is sent to the CICP 774 via 787, processed and sent, as shown by arrow 790 as Delivery of Dynamic Content 792 to any one or more of "Users devices" 794 via arrow 795, "Smart phones and tablets" 796 via arrow 797, "existing sensor networks" 798 via arrow 799, "Smart displays" 800 via arrow 801, "Surrounding devices" 802 via arrow 803 and/or "Any Cloud connected device" 804 via arrow 805. Feedback from the originating devices as indicated, for example, by "end user's devices" 794 is transmitted back to the CICP 774 from User's device via line 806, from "smart phones and tablets" via line 808, from "Existing sensor networks" via line 810, from "Smart Displays" via line 812, from "Surrounding Devices" via line 814 and from "Any cloud connected device" via line 816 and "Databases" (not shown) can also be used to provide "Delivery of dynamic content" 792 to the "Users devices 794", "Surrounding devices 802" and/or "other people's phones" (not shown), "Any Cloud connected device 804" and/or "Smart displays 800". Then the results generated by the "Users devices", "Surrounding devices" and/or "other people's phones", "Any Cloud connected device" and/or "Smart displays" can be sent back to the originating "smart phones and tablets", "Existing sensor networks", "Geolocations", "Any cloud connected device" and "Any connected device". Data is collected across all these interactions as indicated by arrow 820 and BIG DATA 822 is collected across the platform by this process. The devices and databases listed are intended to be illustrative and not all encompassing.

Airport Example

Figure 41:
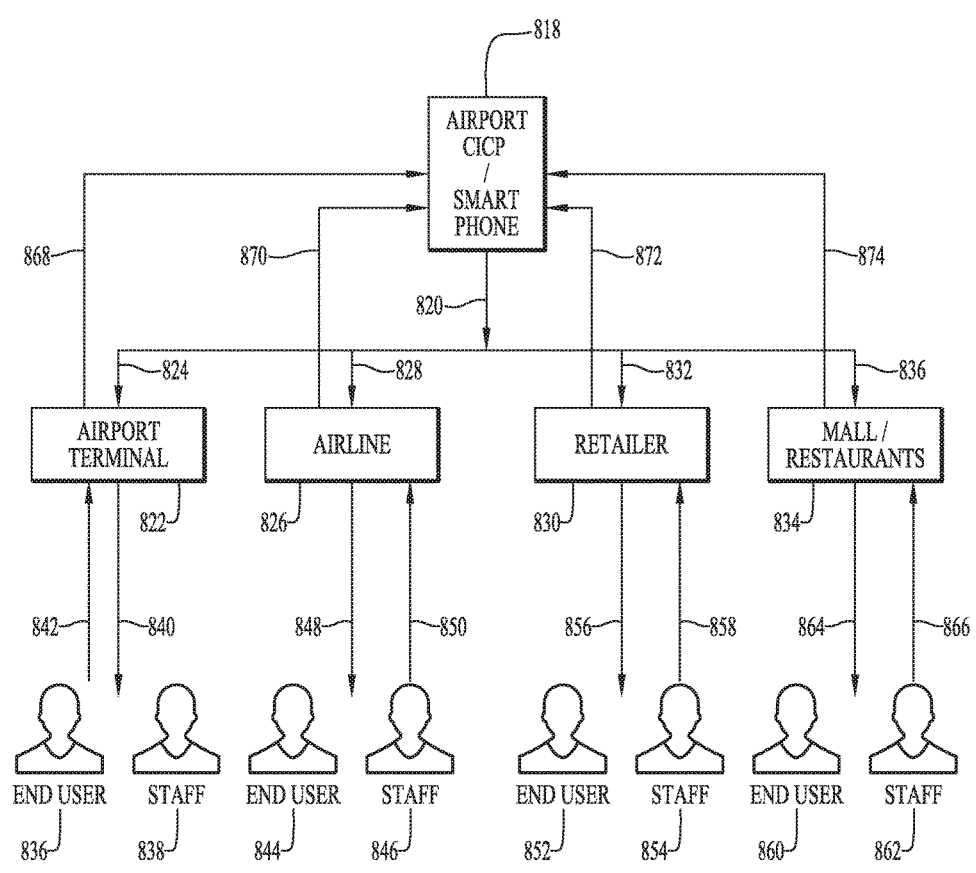
FIG. 41 depicts a multi-tenant architecture of a MTCICP as used by an airport.

FIG. 41 depicts an alternate embodiment Multi-tenant architecture of a MTCICP as used by an airport. This figure is intended to be illustrative and not all-encompassing. In this instance, the master administration application is represented by "airport app/CICP/smart phone" 818. Subordinated to this application is a series of apps that are controlled and overseen by the "airport app/CICP 818", as shown with arrow 820, indicating several, exemplary connections to exemplary subordinate applications. These are represented as examples such as apps for each of "Airport terminal" app 822 as shown with arrow 824, "Airline" app 826 as shown by arrow 828, "Retailer" app 830 as shown by arrow 832 and "Mall/Restaurants" app 834 as shown by arrow 836. Each of these apps has access to a series of end users 836, 844, 852, 860 and staff 838, 846, 654 and 862, respectively. These subordinate apps control, interact, deliver, communicate with, send messages to and from, and oversee end users such as the general public employees, contractors and others that perform work and/or tasks on their behalf. In this instance the "Airport Terminal" app 822 communicates with each end user/customer, one of whom is shown at 836 and Airport Terminal staff members, one of whom is shown at 838 as shown by arrow 840. Response and feedback from these end user communications are shown with arrow 842. The "Airline" app 826 communicates with its end users, one of whom is shown as customer 844 and staff, one of whom is shown at 846 as shown with arrow 848 and receives feedback from each as shown with arrow 850. "Retailer" app 830 communicates with its end users, one of whom is shown as customer 852 and its staff, one of whom is shown at 854 as shown with arrow 856 and receives feedback from each as shown with arrow 858. The "Mall/Restaurants" app 834 communicates with its end users, one of whom is shown as customer 860 and staff, one of whom is shown at 862 as shown by arrow 864 and receives feedback from each 866 as shown by arrow. The "Airport Terminal" app 822 aggregates all the feedback from its staff and end users and communicates this back to the Airport CICP 818 as shown with arrow 868. The "Airline" app 826 aggregates all the feedback from its staff and end users and communicates this back to the Airport CICP 818 as shown with arrow 870. The "Retailer" app 830 aggregates all the feedback from its staff and end users and communicates this back to the Airport CICP 818 as shown with arrow 872. The "Mall/Restaurants" app 834 aggregates all the feedback from its staff and end users and communicates this back to the Airport CICP 818 as shown with arrow 874. This exemplary set of apps, connections and communications is intended to be illustrative and not all-encompassing.

Figure 42:
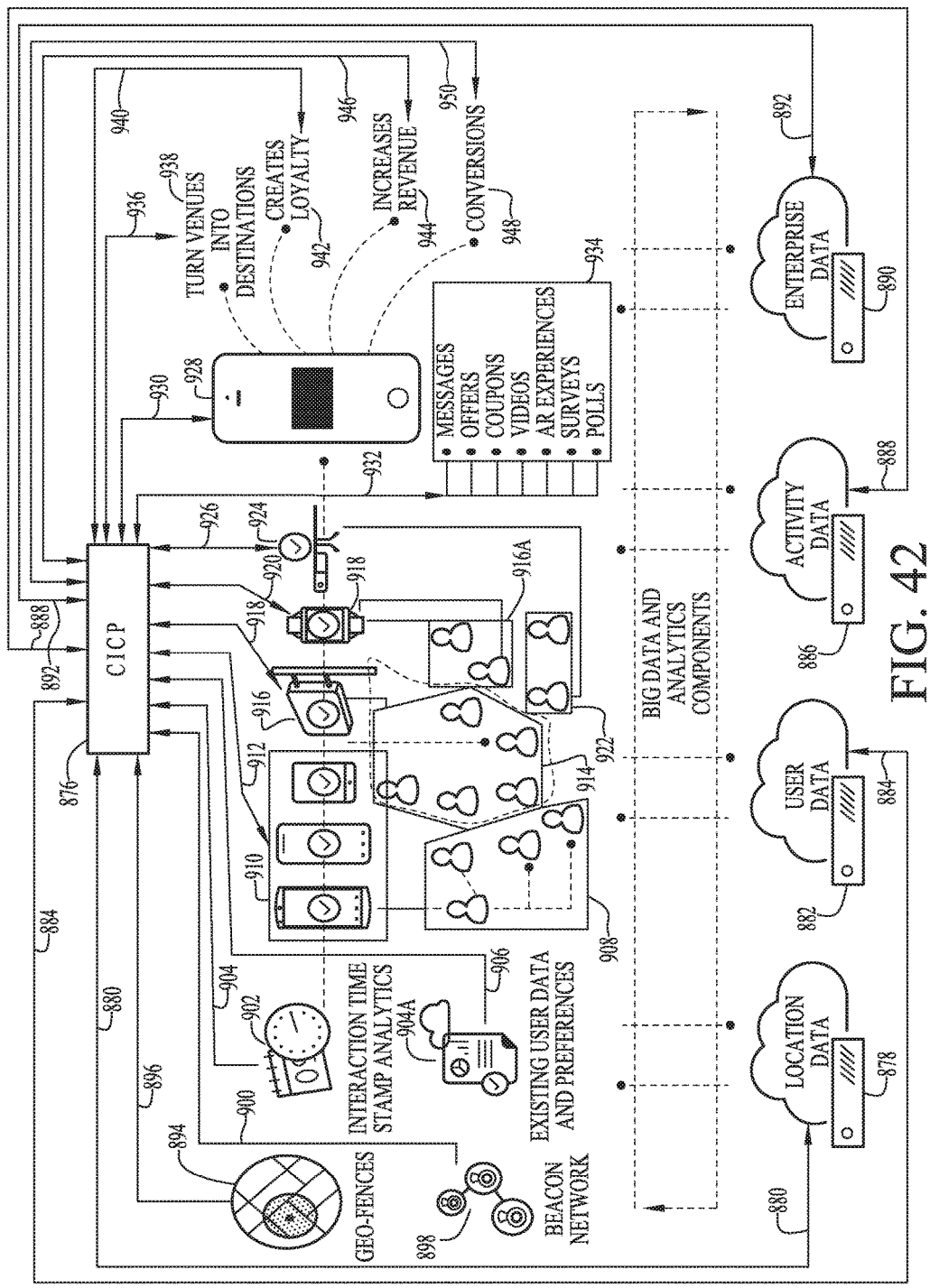
FIG. 42 depicts an overview of devices and experiences as well as the data collected in a CICP platform.

FIG. 42 depicts an alternate embodiment with an overview of devices and experiences as well as the data collected in an exemplary CICP platform 876 into which various devices, features, databases and infrastructures are shown to provide input. Location data is stored and retained in a "Location Database" 878. Location information, data and content is communicated to the CICP 876 and location data captured and calculated by the CICP is communicated back to the Location Database 878 as shown in bi-directional communication arrow 880. User data is stored and retained in a "User Database" 882. User information, data and content is communicated to the CICP 876 and user data captured and calculated by the CICP is communicated back to the User Database 822 as shown in bi-directional communication arrow 884. Activity data is stored and retained in an "Activity Database" 886. Activity information, data and content is communicated to the CICP 876 and location data captured and calculated by the CICP is communicated back to the Activity Database 886 as shown with bi-directional communication arrow 888. Enterprise data is stored and retained in an "Enterprise Database" 890. Enterprise information, data and content is communicated to the CICP 876 and enterprise information, data and content captured and calculated by the CICP are communicated back to the Enterprise Database 890 as shown in bi-directional communication arrow 892. Geo-locations and geo-fences and other geo-location based event triggers 894 are entered into the CICP 876 as shown with arrow 896. Beacon networks 898, including beacons, beacon networks, clusters of beacons, beacon mesh, proximity beacons and sensors, NFC taps and other hyper location activation networks, individual sensors and networks of such, are entered into the CICP, as shown with arrow 900. Time and date triggers 902 are entered as "interaction time stamp analytics" and communicate with the CICP 876 as shown by arrow 904. Existing user data and preferences are identified as 904A and are communicated to the CICP 876 as shown with arrow 906. An exemplary group of four end users are in a location, shown at 908. All have their individual mobile communication devices, such as smart phones and tablets, an exemplary three of which are shown at 910, that are in bi-directional communication with the CICP 876 as shown with arrow 912. Another, second, exemplary group of four users 914 are in same location and context as the first group 908, but their devices may or may not be connected with the CICP, in this instance they are not connected. Instead, these end users 914 are in front of a connected smart sign 916 that is in bi-directional communication, shown with arrow 918, with these second group users showcasing data, content and information from the CICP 876 via its display 916. The communication between the display sign and the CICP 876 is bidirectional as the sign may have sensors such as motion capture, crowd counter, temperature, facial recognition, facial expression, audio sensors and other sensors to detect the context around it and to communicate it back to the CICP 876. A third group of end users 916A is in the same context as are groups 908 and 914. This third group has connected wearables 918 that are in bi-directional communication as shown by arrow 920 with the CICP 876. A fourth group of end users 922 are in the same context as the first three groups 908, 914 and 916. This fourth group has connected devices that display augmented reality, mixed reality and/or virtual reality 924 that are in bi-directional communication as shown by arrow 926 with the CICP 876. Data is collected and retained, by all means of communication by the CICP 876 and used for computation and analytics, retained and recorded. The input data from the complete infrastructure is shown on a variety of devices such as phones 910, wearables 918, tablets 910, digital signs 916, and augmented reality glasses 924, for one or many end users. Data is collected and retained, by the CICP and used for computation and analytics, retained and recorded. The data presented on any of the connected devices that have bi-directional communication, illustrated with arrow 930, such as the devices depicted as 910, 916, 918 and 924 are presented as a single device 928 for simplicity. Device representation 928 represents any, all, some and selections of these devices 910, 916, 918 and 924. The messages, content, information, instructions, code, experiences transmitted to these devices represented by device 928 is shown in bi-directional communication between the device 928 and the CICP 876 with arrow 932. The communication between these devices depicted with arrow 932 can be "Messages", "Offers", "Coupons", "Videos", "AR experiences", "Surveys" and "Polls" as shown, for example at 934. Data such as delivery, action taken based on the offers, instructions and content is collected and retained, transmitted back to the CICP 876 as shown by arrow 930 and used for computation and analytics, retained and recorded by the CICP. The content and experiences delivered as shown with arrow 936 is intended to "Turn venues into destinations"938, with recording, retention and storage of responses to the communication as shown with arrow 936 communicated back to the CICP 876. Data content and instructions intended to create loyalty 942 is transmitted as shown by arrow 940, with recording, retention and storage of responses to the communication communicated back to the CICP 876. Data content and instructions intended to increase revenue 944 is transmitted as shown with arrow 946, with recording, retention and storage of responses to the "increase revenue" communications 944 communicated back to the CICP 876. Ultimately, the objective of the use of the CICP may be to provide "conversions" 948. Data content and instructions intended to create conversions 948 are transmitted as shown with arrow 950 with recording, retention and storage of responses to the communications 948 communicated back to the CICP 876. All data is collected and retained in the CICP 876 and used for computation and analytics, retained and recorded. Data relevant to Locations is transmitted by the CICP to the Location Data 878 as shown with arrow 880. Data relevant to user data is transmitted by the CICP to the User Data 882 as shown with arrow 884. Data relevant to Activity 886 is transmitted by the CICP to the Activity Database 886 as shown with arrow 888. Data relevant to Enterprise 890 is transmitted by the CICP to the Enterprise Database 890 as shown by arrow 892. These processes are then repeated as needed providing a real-time context aware, context intelligent CICP solutions that capture real-time data, do on cloud computations and edge computing to deliver content and experiences that "turns venues into destinations" 938, "creates loyalty" 942, "increases revenues" 944 and provides "conversions" 948 while recording, retaining and storing all relevant data, outcomes and actions in relevant databases. This approach ensures an intelligent and self-learning solution. This description in regard to the FIG. 42 embodiment is intended to be illustrative and not all encompassing.

Figure 43:
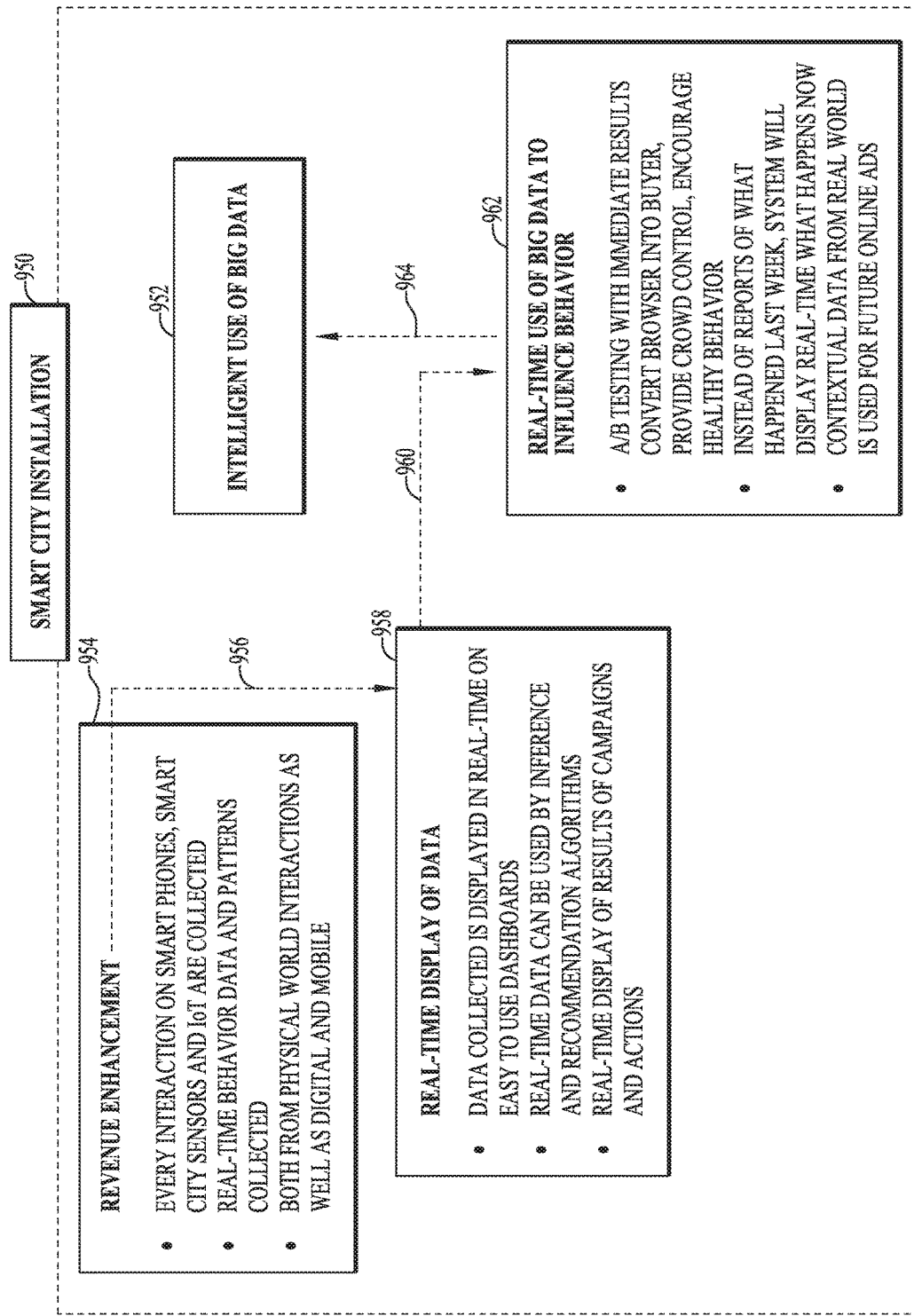
FIG. 43 depicts the flow of "Big Data" and its use in a "smart city" installation of a SHCICP-MTCICP system.

FIG. 43 depicts the flow of "Big Data" and the use of this embodiment as an extension of the embodiment shown in FIG. 42 and other uses of the invention to create "Intelligent Use of Big Data" 952. Big data in this instance is depicted as data across a "smart city" installation of a SHCICP-MTCICP system 950. The data collected from every smart phone, smart city sensor and Internet of Things (IoT) devices are collected and combined to deliver real-time behavior and patterns of behavior from both the physical world and the digital/mobile world shown at 954. This is all combined to enable revenue enhancements. These data that have been collected are transmitted as shown with dashed arrow 956 to be displayed real-time on dashboards 958 so that the data can be reviewed and used for further calculations such as inference and recommendation algorithms, with the ability to see real-time results of campaigns, messages and commands sent. This real-time display of the data is shown as 958. This ability to see immediate results on a dashboard or combinations of dashboards, is then used by others as shown with arrow 960. The data can be used for evaluation shown at 962. Such evaluations can be for evaluating campaigns and A-B testing that can for instance be used to convert browsers in a shopping mall to actual buyers, can provide information to people real time to manage crowds and can enable messages, content and experiences to be delivered to drive healthy behavior such as taking the stairs in a government office rather than the elevators. Instead of the typical reporting capability of traditional big data systems that provide reports in the future of what is happening now, or provide reports now of what happened in the past, this system enables real-time viewing of real-time events as they actually unfold, the results of messages sent and the results of campaigns and A-B testing. This real-time use of data can be a tool to provide content to influence behavior. This complete process leads to "intelligent use of Big Data" 952 as shown by arrow 964. This is one of the core principles of the complete CICP, MTCICP, SHCICP and SHCICP-MTCICP group of systems. This FIG. 43 embodiment is intended to be illustrative and not all encompassing.

Smart City Example

Figure 44:
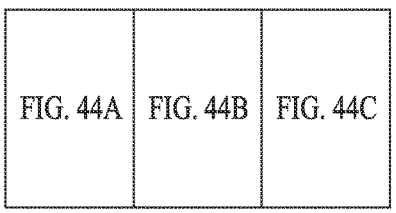
FIG. 44 depicts in three parts an SHCICP-MTCICP infrastructure for a smart city that incorporates a convention center "FIRA" example with a solution for travelers and exhibitors that attend and exhibit at the convention center.
Figure 44A:
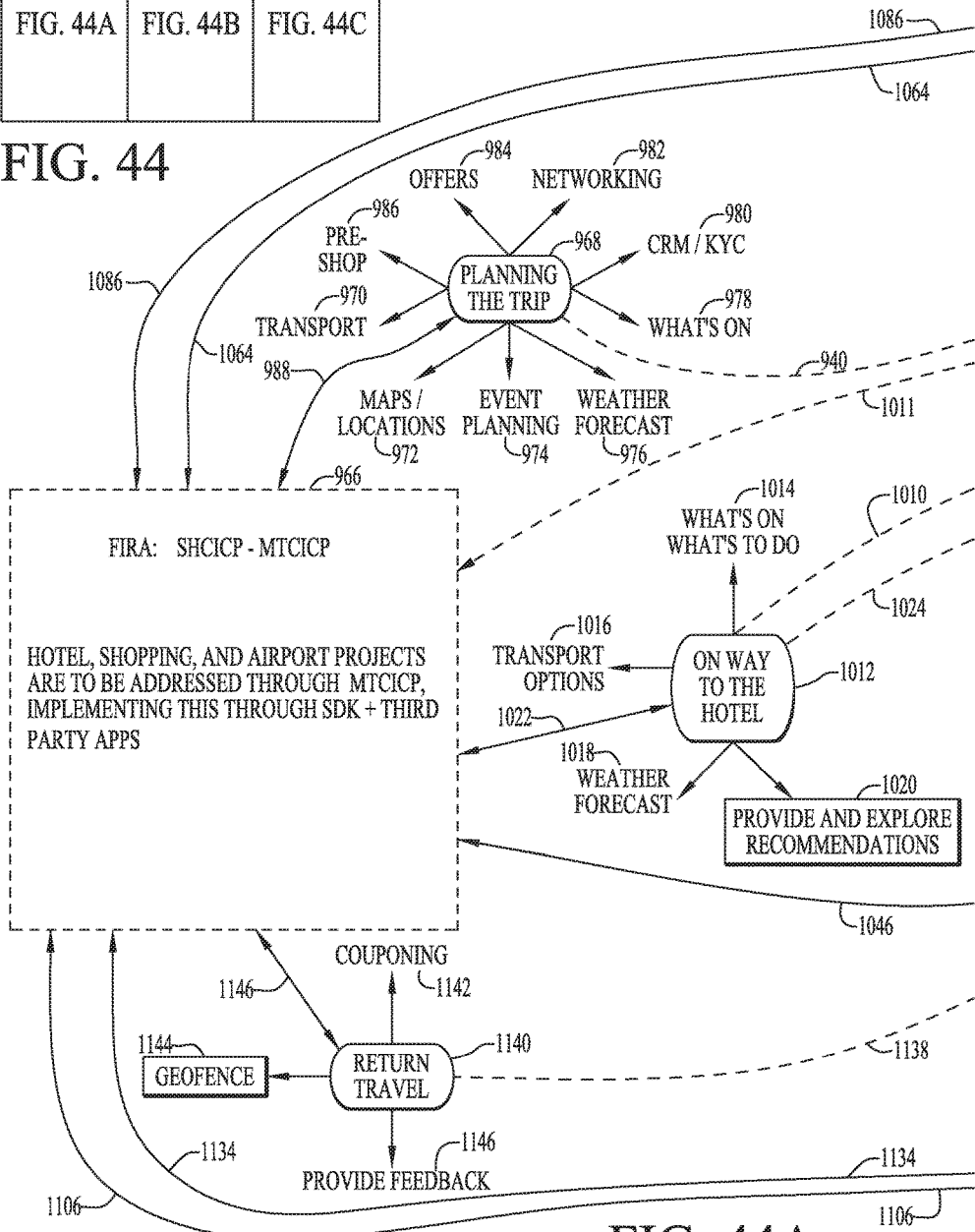
FIG. 44A depicts the first partial view of the FIG. 44 convention center example.
Figure 44B:
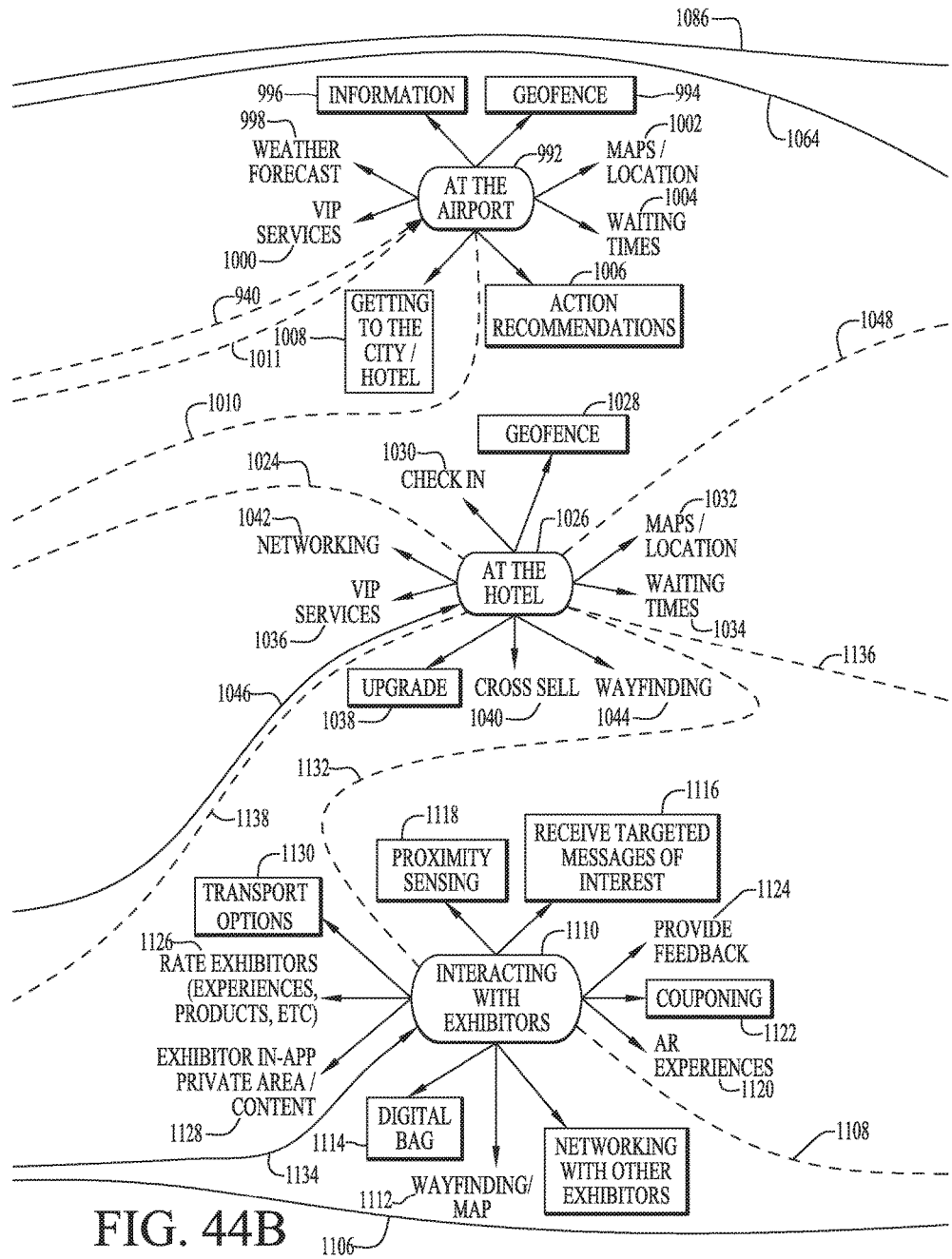
FIG. 44B depicts the second partial view of the FIG. 44 convention center example.
Figure 44C:
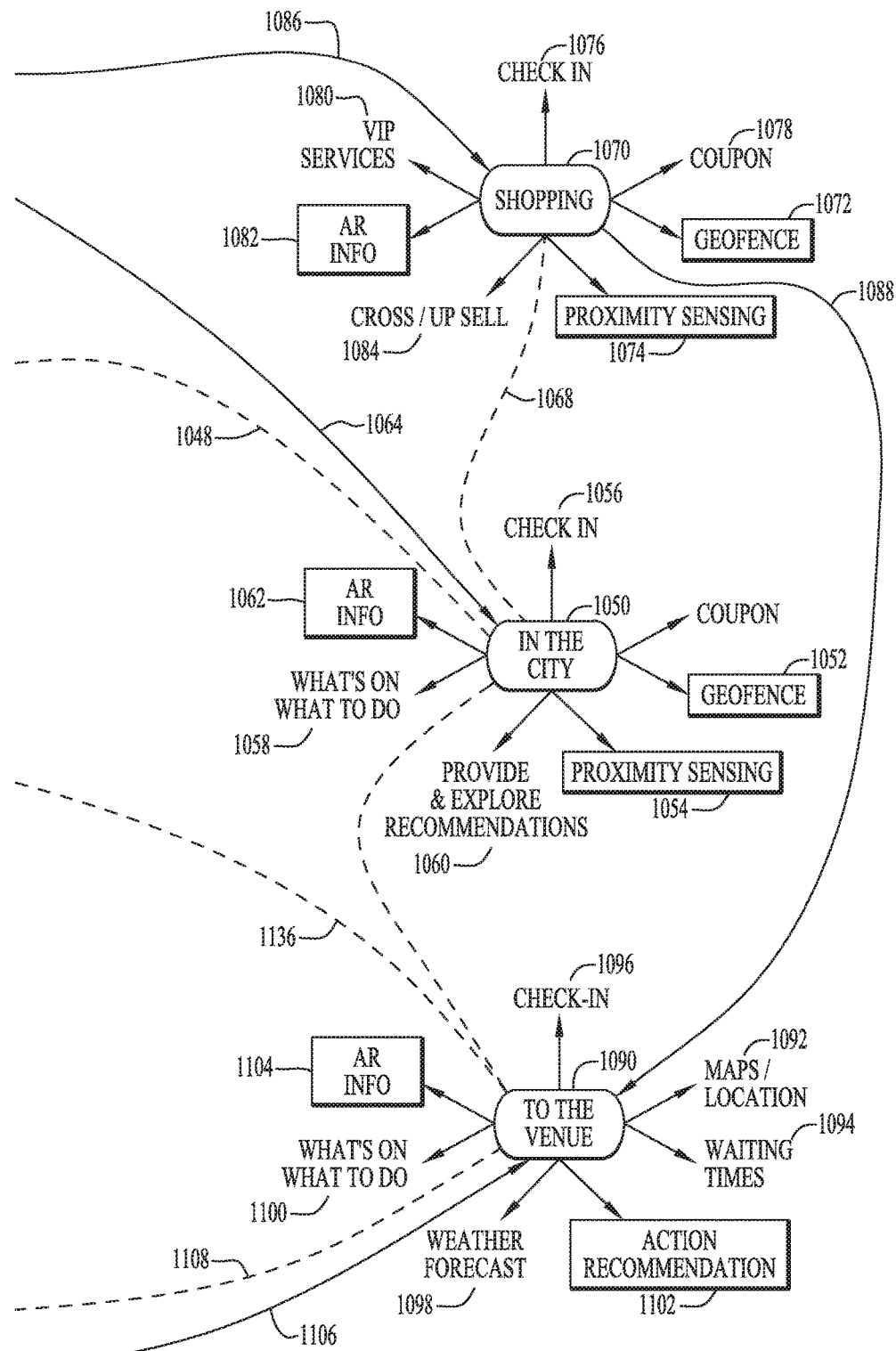
FIG. 44C depicts the third partial view of the FIG. 44 convention center example.

FIGS. 44, 44A, 44B and 44C depict a complete SHCICP-MTCICP infrastructure for a Smart City that incorporates a convention center herein named "FIRA" 966 with complete solutions for the travelers and exhibitors that attend and exhibit at the convention. It starts providing information before the attendees arrive as indicated by "Planning the trip" 908. The trip planning includes "transport" 970 to the exhibit city and venue, educate and understand the location city by obtaining maps and identify locations, planning any events there or close by or relevant to the event 974, investigating weather forecasts 976, seeing and investigating what events are on "Whats On" 978, set up, integrate with calendars, populate Customer Relationship Management solutions, "CRM/KYC" 980, network with others that are going to the event/convention 982, gather, seek, execute on, and/or decline offers that are relevant to the convention 984 and finally shop before the event for needed products relevant to the event and the travel, 986. These efforts are presented, enabled, enhanced, activated with content, connections, information, instructions, payments, booking, ordering, confirmations and other tools presented to the user planning the trip by the FIRA SHCICP-MTCICP 966 via bi-directional communication shown with arrow 988. As the user travels to the event as shown with dashed line arrow 940, the user arrives at an airport near the FIRA convention center location, shown as airport 992 on FIG. 44B. For simplicity, the description will follow the flow of the end user and will therefore include a combination of structures, events and actions as illustrated in FIGS. 44A, 44B and 44C. Still referring to FIG. 44B, the user crosses a geofence 994 while arriving at the airport. The user will be presented with information 996 based on his exact location at the specific airport. This information can include a weather forecast 998 at the city he has arrived in, information about and trigger of VIP services 1000, maps of the airport and surrounding areas including other nearby locations 1002, as well as more immediate and relevant information based on the airport such as waiting times 1004 for taxis, public transportation, connections, security, customs etc. The user can also be served up recommendations for activities or other instructions, commonly referred to here as "action recommendations" 1006. All the activity has the objective of providing information, content and data relevant to the experience and enable a transfer to the hotel "Getting to the City/Hotel" 1008. All interactions, content, commands, instructions and offers are presented from the SHCICP-MTCICP 966 via the bi-directional communication shown as 1010. All communication, content, instructions, offers and the results of the presentation of these are in communication via the SHCICP-MTCICP 966 via bi-directional communication, shown with arrow 1011. Now we follow the user to the FIG. 44A, "On Way to the hotel" activity designation 1012. On the way there the user is learning "what's on/what's to do" 1014, transportation options to events and elsewhere 1016, local and future weather forecasts 1018 and gets the options to "provide and explore recommendations" 1020 similar to the rating/customer review solutions provided by many travel solutions such as Expedia, BookIt and others. All communication, content, instructions, offers and the results of the presentation of these are in communication with the SHCICP-MTCICP 966 via bi-directional communication, shown at arrow 1022. We follow the user as he is now checking in at the hotel 1026 as depicted in FIG. 44B. The hotel location is geofenced, shown at 1028 to identify the location and verify the arrival of the user there. Check-in procedures, features and functions 1030 are presented. Local maps 1032 are presented, wait times 1034 are displayed when available, with VIP services 1036 activated for appropriate users. Offers to upgrade 1038 are also presented to accredited users, with other offers such as cross sell bundle deals are presented and shown at 1040. Offers to network with other event goers may be presented, as shown at 1042, with wayfinding across the hotel enabled when available, shown at 1044. All communication, content, instructions, offers and the results of the presentation of these are in communication via the SHCICP-MTCICP 966 via bi directional communication shown at 1046. We are now following the user as he decides to go to the city to do some shopping before going to the venue, as shown with dashed line 1048. We transfer to FIG. 44C to follow the user into the city, shown at 1050. Here, geofences, one of which is shown at 1052, and proximity beacons and beacon networks, and other location sensors referred to as "proximity sensing", and shown at 1054 identifies and maps his locations as he moves across the city. He can check in at participating locations that may offer rewards or other benefits for being there, as shown at 1056 and may receive offers, content and coupons based on this location as he enters the city and he moves around. Information on "what to do and what's on" can be presented, as shown at 1058, with the ability to provide and explore recommendations, shown at 1060. Information can also be presented in Augmented Reality, referred to as "AR Info", and shown at 1062. All communication, content, instructions, offers and the results of the presentation of these are in communication via the SHCICP-MTCICP 966 via bi-directional communication, shown with arrow 1064. As the user moves across the city, goes into "shopping mode/shopping context", referred to as "shopping" and which movement and mode change is shown by dashed line 1068, and then is actively shopping, shown at 1070, a similar process is repeated. As he moves around, then geofences 1072, proximity beacons and beacon networks, and other location sensors, collectively referred to as "proximity sensing" 1074 identifies and maps his locations as he moves across the city shopping. He can check in at participating locations that may offer rewards or other benefits for being there, shown at 1076 and may receive offers, content and coupons based on this location as the user enters the city and he moves around, with one such item, a coupon shown at 1078. Information on "VIP services" 1080 can be presented while shopping. Information can also be presented in Augmented Reality, "AR Info", shown at 1082. He can be offered more offers based on what he buys, shown as "Cross/Upsell" 1084. All communication, content, instructions, offers and the results of the presentation of these are in bi-communication with the SHCICP-MTCICP 966, as shown by arrow 1086. After shopping, the user now goes to the venue 1090, shown by arrow 1088 and arrives at the venue 1090. There he is presented with a map, shown as Maps/Location 1092 that shows him the venue, with information where the shortest lines are, referred to as "waiting times" 1094, so that he can check in quickly and efficiently, shown at 1096. He is offered information such as a weather forecast 1098, what's on/what to do shown at 1100 and presented with Action recommendations such as what events, exhibits, talks and demos to attend, 1102. Information may be presented in AR, shown at 1104. All communication, content, instructions, offers and the results of the presentation of these are in communication via the SHCICP-MTCICP 966 via bi-directional communication, shown with arrow 1106. The user now starts walking across the "FIRA" convention center, as illustrated with dashed line 1108, in FIGS. 44B and 44C, and the user's context is now "interacting with exhibitors" 1110 as shown in FIG. 44B. At the FIRA center he is presented with wayfinding and a map of the center, 1112. He is offered a file folder depository on his mobile device that gathers information as the user walks around, a "digital bag" 1114 to gather all the information from the exhibitors as he walks around, where he "receives targeted messages of interest" 1116 based on proximity sensing 1118 that verifies which booth he is in. Some of the offers and information are presented as AR experiences 1120, some may include coupons and offers, shown as "couponing" 1122, and some may provide options to provide feedback, 1124. The user is presented with the option to rate the exhibitors and the products and solutions that are presented 1126 with some offering private areas, exclusive content and private demos and showings 1128. As the user is about to end the day, the system presents Transport Options 1130 back to the hotel he is staying at, including the route which he travels on 1132. All communication, content, instructions, offers and the results of the presentation of these are in communication via the SHCICP-MTCICP 966 via bi-directional communication shown with arrow 1134. The user is back at the hotel 1026 and the process repeats while arriving there. Next day he returns to the exhibit venue 1090 as shown with dashed line 1136. The process repeats there and then on to interacting with the exhibitors 1110. At the final day he leaves hotel 1026 as shown in dashed line 1138. During return travel as shown on FIG. 44A as 1140, the platform can provide offers and coupons for the traveler, referred to as "couponing 1142 and based on the user crossing geo-fences, 1144, together with the request to provide feedback, 1146. The return travel can include departure from the arriving airport 992. All communication, content, instructions, offers and the results of the presentation of these are in communication via the SHCICP-MTCICP 966 via bi-directional communication, illustrated with arrow 1146. This system thereby incorporates transportation to the venue, namely "Airport" and from airport to the hotel "To the hotel" 1008, enables hospitality to interact as indicated by "At the Hotel"1026. As the attendee travels to the exhibition, the system can interact as indicated by "To the Venue" 1090. It also shows how the attendee and exhibitors can interact and create connections at the exhibit as indicated by "Interacting with exhibitors" 1110. As the attendee is in the city before and after the event, the system can interact as indicated by "in the city" 1050, and can be used to encourage retail shopping shown as "Shopping" 1070. Each of the locations have a series of experiences that can be triggered and enabled, features that can be used, technologies that are integrated and content delivery. This is all part of the context intelligence gathering capability of a complete SHCICP-MTCICP infrastructure, as well as the contextually intelligent distribution of content and experiences by the same complete SHCICP-MTCICP infrastructure. This example is intended to be illustrative and not all encompassing.

Figure 45A:
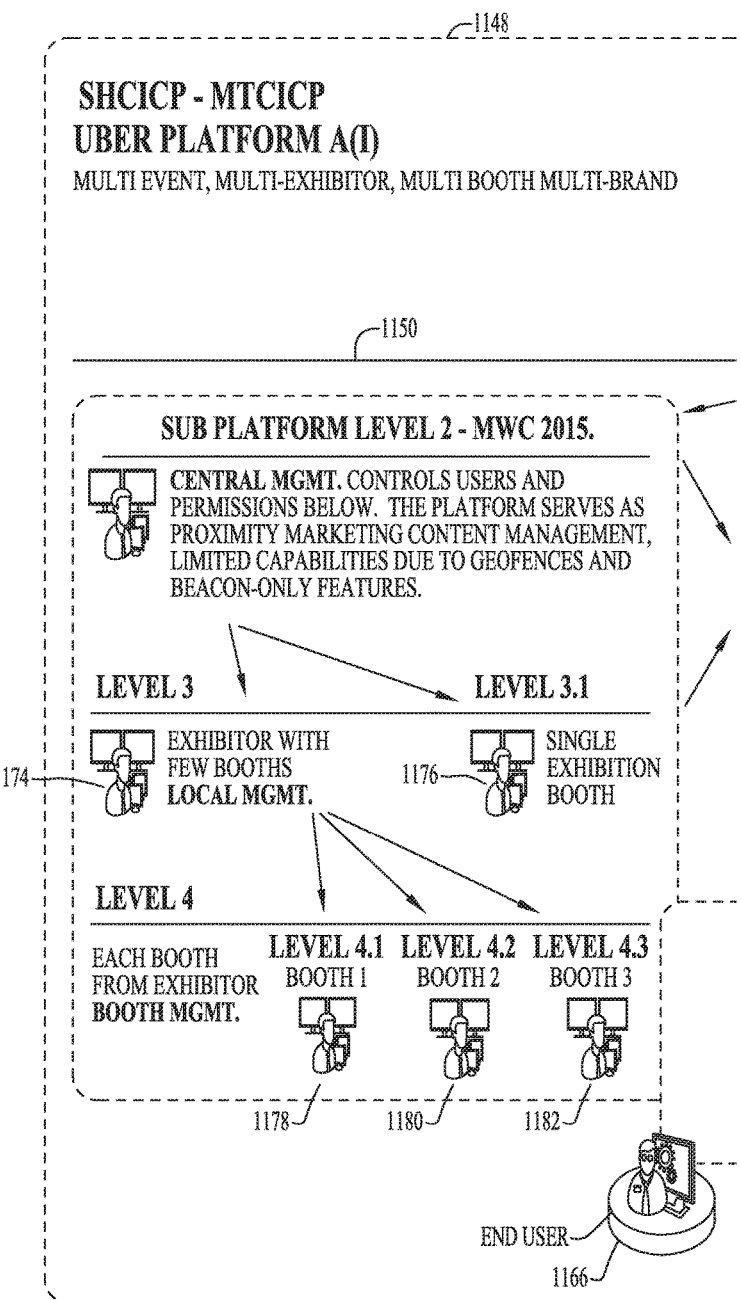
FIG. 45A depicts the first partial view of the FIG. 45 subset.
Figure 45B:
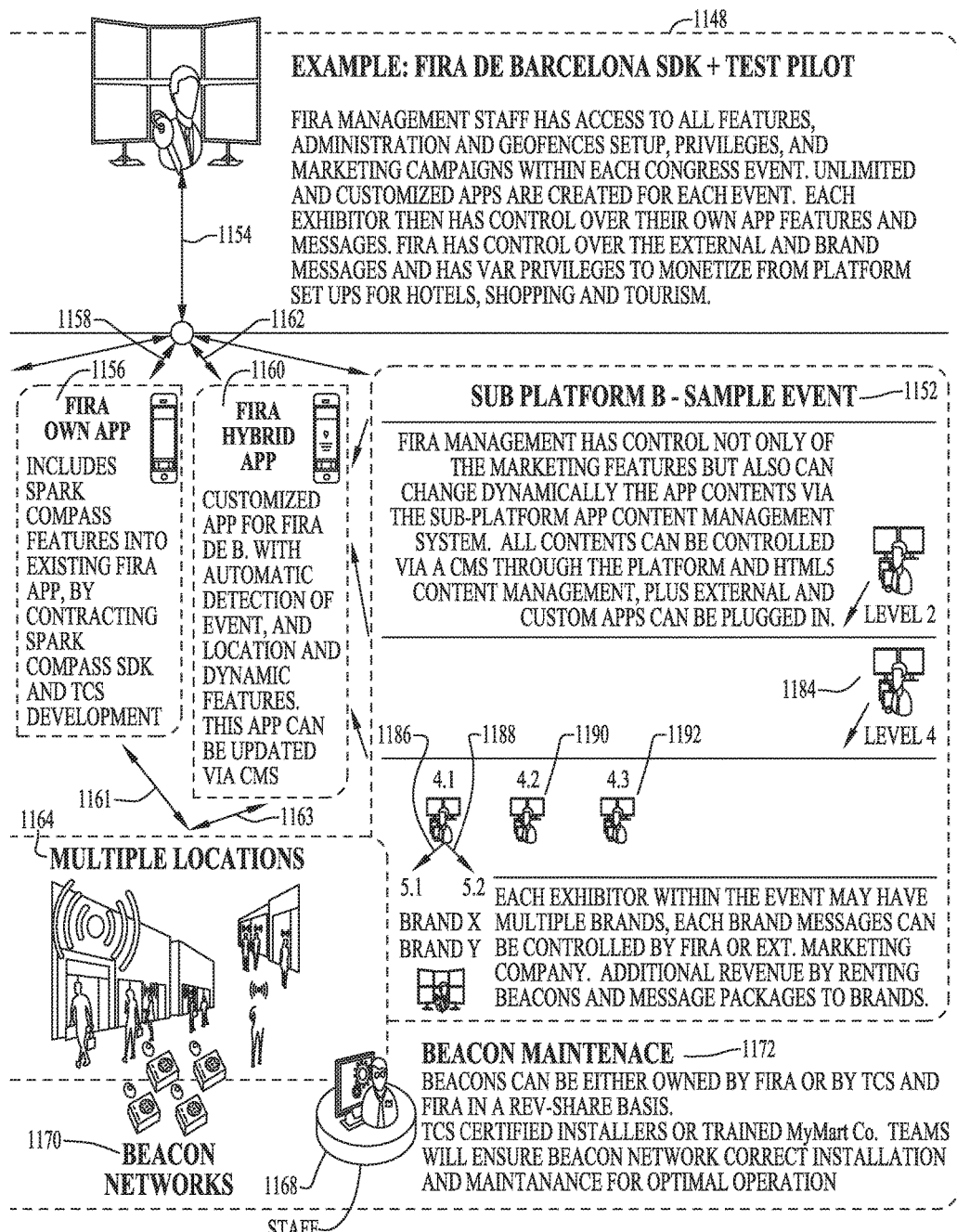
FIG. 45B depicts the second partial view of the FIG. 45 subset.

FIGS. 45, 45A and 45B depict a subset of the complete SHCICP-MTCICP 1148 infrastructure for a Smart City that incorporates a convention center "FIRA" as shown in FIGS. 44, 44A, 44B and 44C. In this infographic figure, the master tenant is indicated as "Uber Platform A(I)" 1148. In this case the show manager, that is, the company putting on an event at a convention center "FIRA" is denoted at "Sub Platform level 2—MWC 2015" at 1150. Another event organizer can also be allowed to use the system as indicated by "Sub Platform B—Sample Event" as shown on FIG. 45B, at 1152. The SHCICP-MTCICP infrastructure enables the master tenant, FIG. 45B at 1154 to provide additional mobile applications that the master tenant directly controls. These applications are indicated as "Fira Own App", shown in FIG. 45B at 1156 controlled and communicating via FIG. 45B, shown at arrow 1158 and "Fira Hybrid App", FIG. 45B at 1160, controlled and communicating as shown in FIG. 45B at arrow 1162. These can be used by the public, depicted as end users in FIG. 45A shown at 1166, the event staff, shown at 1168 in FIG. 45B, and exhibitors depicted as an "EXHIBITOR WITH FEW BOOTHS" 1174" and as a "SINGLE EXHIBITION BOOTH" 1176 in FIG. 45A across multiple locations as indicated by "Multiple Locations", FIG. 45B at 1164, with bi-directional communication between these and the locations as depicted by FIG. 45B at 1161 and 1163. These multiple locations can incorporate beacons and beacon networks as indicated by the "Beacon Networks" 1170. As an added service layer, a third party or dedicated subcontractor, or division of the master tenant that the master tenant has granted administration rights to can maintain the beacon network, indicated by "Beacon Maintenance"-1172. The sub tenants 1174 and 1176 can also further sublease access to the SHCICP-MTCICP infrastructure. This is shown in "Level 3" where a sub licensee 1174 has multiple sub-licenses below him, shown as "Level 4.1" 1178, "Level 4.2" 1180 and "Level 4.3" 1182. The sub tenant can also lease to single licensees that have no further sub-licensees, as shown in "Level 3.1", at 1176. The same infrastructure can enable other tenants as indicated by "Level 4", FIG. 45B at 1184 under "Sub Platform B—Sample Event", FIG. 45B at 1152. In both sub-licensees, brands and producers of merchandise or content that exhibit across any and all, can be enabled to access the system as indicated by the Brand X and Brand Y and "5.1", FIG. 45B at 1186 and "5.2", FIG. 45B at 1188, and multiple other authorized users as indicated by 4.2, FIG. 45B at 1190, by 4.3, FIG. 45B at 1192 and so on to 4.n+1, where n is a positive integer.

Figure 46:
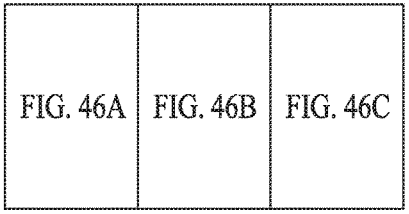
FIG. 46 is a three part infographic depiction showing a more detailed version of the FIG. 45 subset.
Figure 46A:
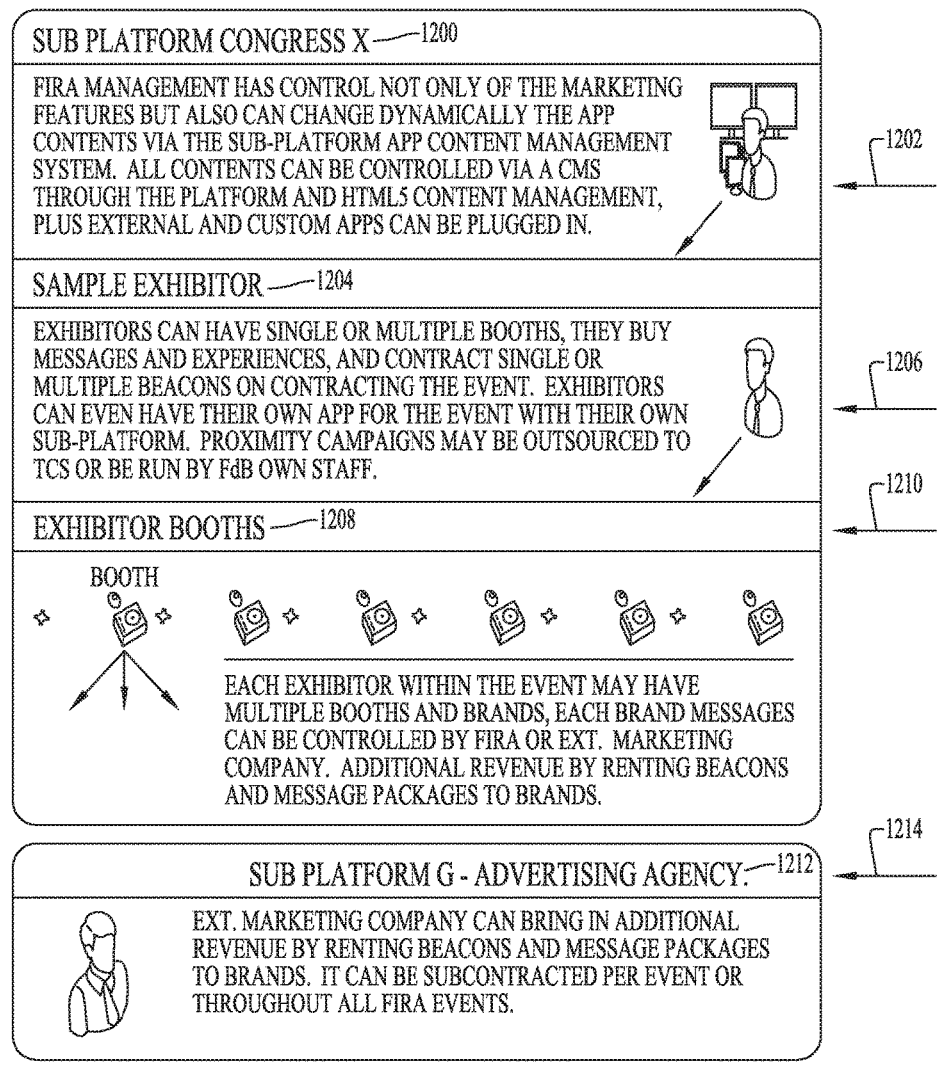
FIG. 46A depicts the first partial view of the FIG. 46 infographic.
Figure 46B:
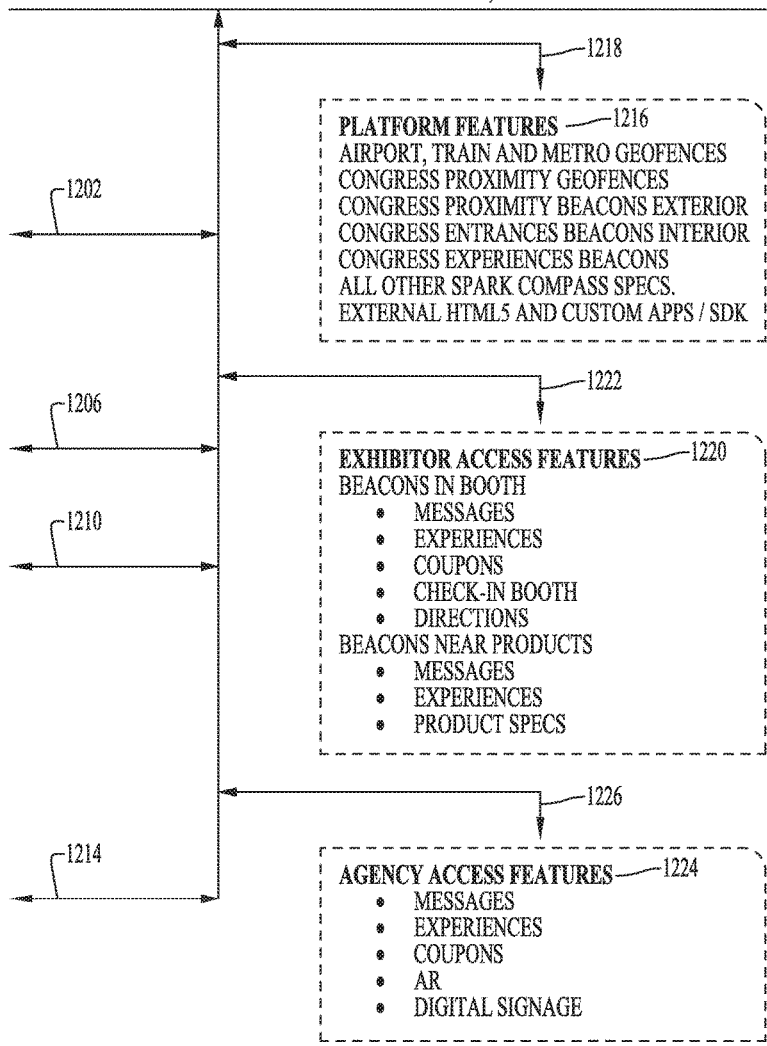
FIG. 46B depicts the second partial view of the FIG. 46 infographic.
Figure 46C:
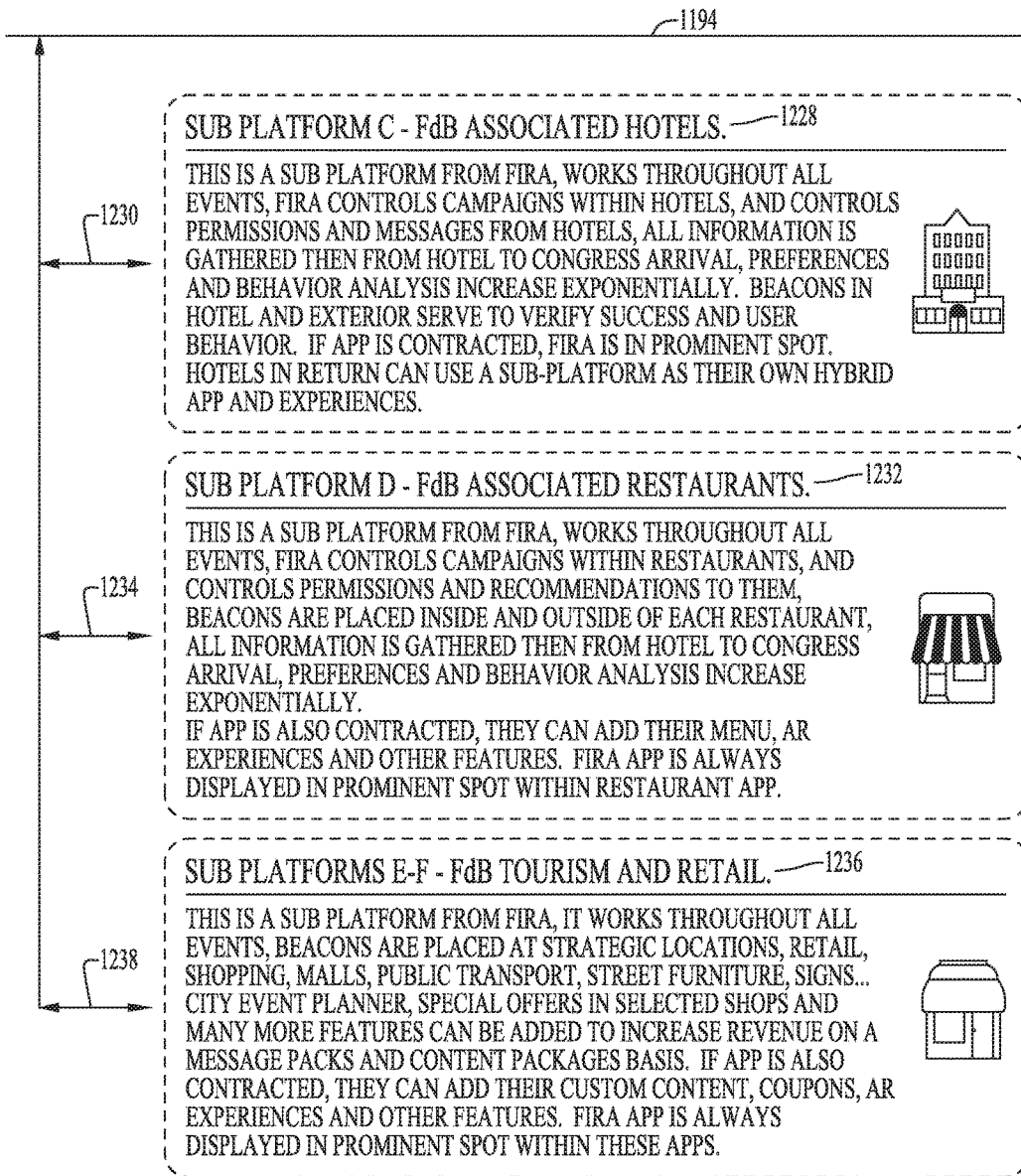
FIG. 46C depicts the third partial view of the FIG. 46 infographic.

FIG. 46A, FIG. 46B and FIG. 46C depict an infographic that shows another view of the SHCICP-MTCICP for the convention center "FIRA" also described here within as "congress", at 1194 and depicted in FIG. 45A, FIG. 45B and FIG. 46C as 1148. This forms that basic architecture for a detailed architecture with use cases, features, sub-licensees, third party vendors and member statuses. Parties outside of the congress have also been included as indicated by Sub-Platforms C, D, E & F. The SHCICP-MTCICP communicates with the various entities by delivering content, curated content, experiences, curated experiences, commands, offers, activation of triggers and content, instructions, coupons, unlocking features, access to locations, activating sensors, displaying content and more in FIG. 46B at 1196. Feedback on the results of the delivery of the communication of FIG. 46B, shown at 1196 and any calculations, sensors feedback, actions, feedback, instructions, commands, activations, unlocking of content or access to locations are presented back into the SHCICP-MTCICP via communications shown in FIG. 46B at 1198. The data communications include information to and from the "Sub platform Congress X" 1200 and 1202. At Congress X 1200 an exhibitor "Sample Exhibitor", FIG. 46A, 1204 is in bidirectional communication with the SHCICP-MTCICP as shown in FIG. 46A, at 1206 and FIG. 46B, at 1206. At Congress X 1200 exhibitors with booths, "Exhibitor Booths", FIG. 46A 1208 is in bidirectional communication with the SHCICP-MTCICP as shown in FIG. 46A, at 1210 and FIG. 46B, at 1210. In addition, an Advertising Agency is granted access and control to Congress X and those that exhibit there, shown as "SUB PLATFORM G-ADVERTISING AGENCY", FIG. 46A at 1212 and is in bidirectional communication with the SHCICP-MTCICP as shown in FIG. 46A at arrow 1214 and FIG. 46B at arrow 1214. Suggestions and overviews of the various functions and features, solutions, controls and other information relevant to each of these sub users, is described in FIG. 46A. Select features and functions of the SHCICP-MTCICP platform are activated at other locations associated and integrated into the FIRA SHCICP-MTCICP, FIG. 46B at 1216 and in bi-directional communication with the SHCICP-MTCICP as shown by FIG. 46B at arrow 1218. Select features and functions of the SHCICP-MTCICP platform are activated at other locations associated and integrated into the FIRA SHCICP-MTCICP with access to these granted to Exhibitors, FIG. 46B at 1220 and in bi-directional communication with the SHCICP-MTCICP as shown by arrow 1222. Select features and functions of the SHCICP-MTCICP platform are activated and granted to advertising agencies associated and integrated into the FIRA SHCICP-MTCICP, FIG. 46B at 1224 and in bi-directional communication with the SHCICP-MTCICP as shown by arrow 1226. Furthermore, select features and functions of the SHCICP-MTCICP platform are activated at other locations associated and integrated via sub platforms into the FIRA SHCICP-MTCICP. These interactions are also depicted as "Sub platform D FdB Associated Restaurants" in FIG. 46C at 1232 for restaurants that are in bi-directional communication with the SHCICP-MTCICP as shown by arrow 1234. These interactions are also depicted as "SUB PLATFORMS E-F—FdB TOURISM AND RETAIL" 1236 for retailers and tourism agencies and related enterprises, venues, locations, museums, parks and others that are related to tourism and these are in bi-directional communication with the SHCICP-MTCICP as shown at arrow 1238. This is all part of the context intelligence gathering capability of a complete SHCICP-MTCICP infrastructure, as well as the contextually intelligent distribution of content and experiences by the same complete SHCICP-MTCICP infrastructure. This is intended to be illustrative and not all encompassing.

Figure 47A:
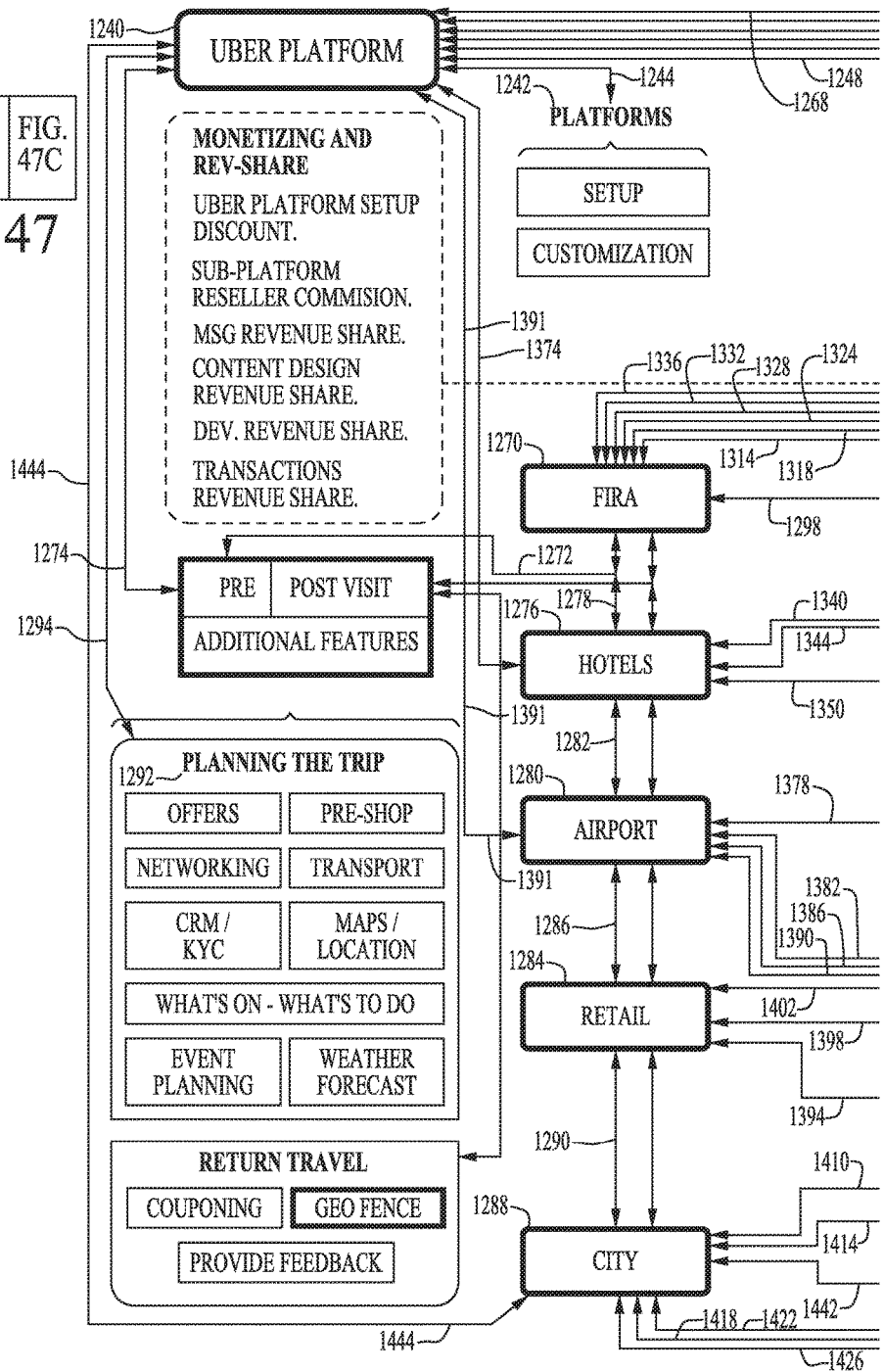
FIG. 47A depicts the first partial view of the FIG. 47 overview.
Figure 47B:
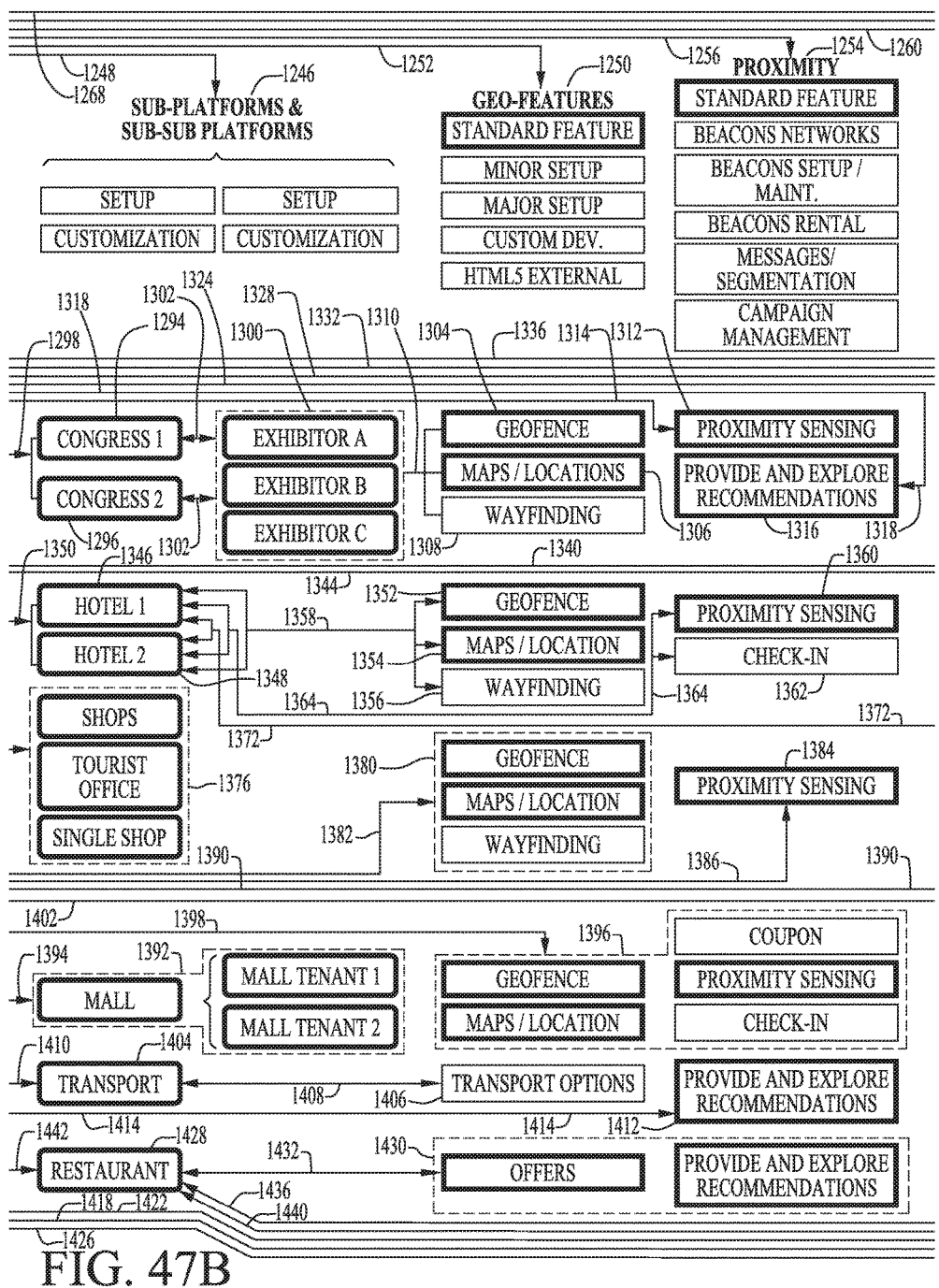
FIG. 47B depicts the second partial view of the FIG. 47 overview.
Figure 47C:
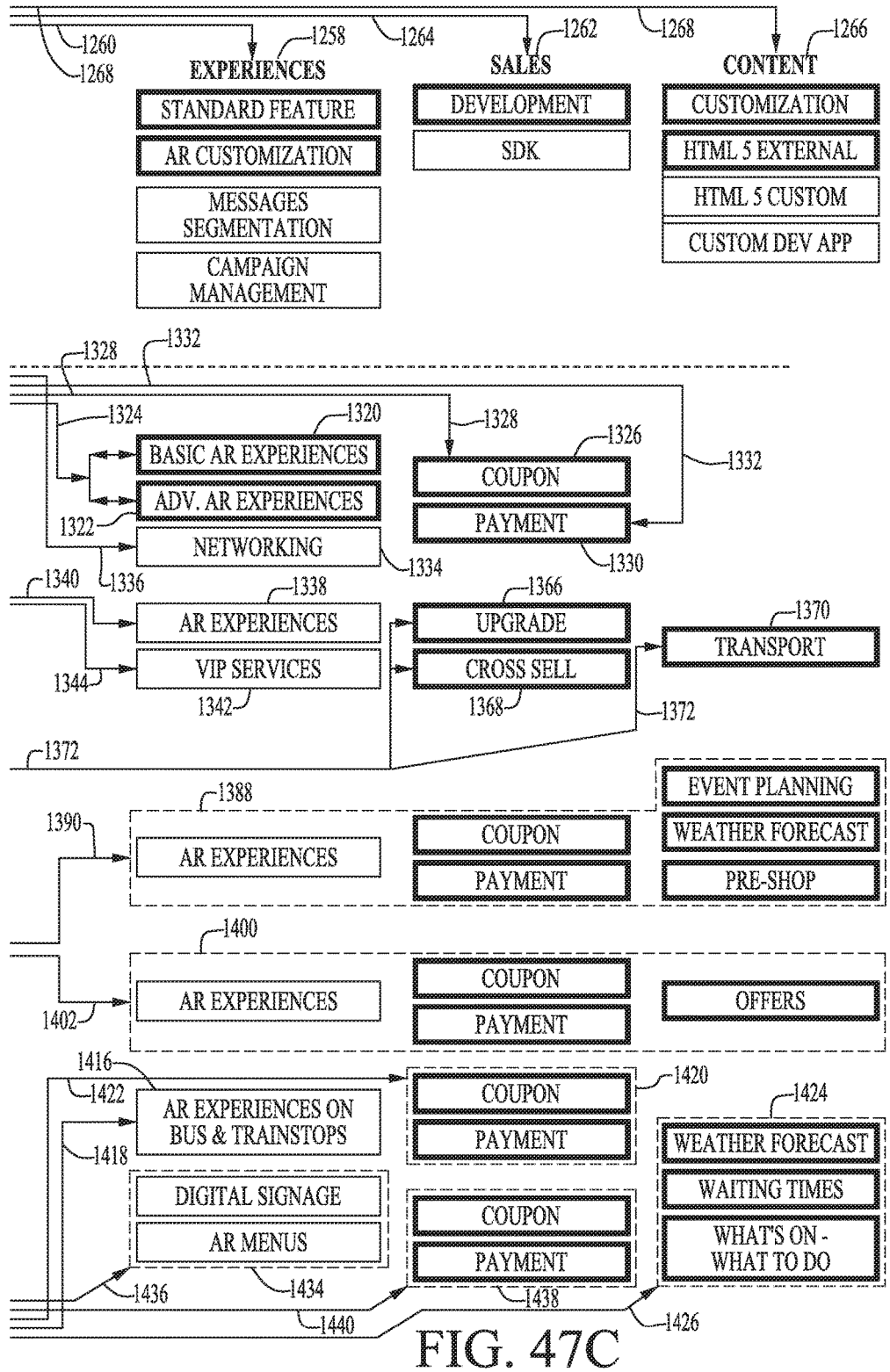
FIG. 47C depicts the third partial view of the FIG. 47 overview.

FIG. 47A, FIG. 47B and FIG. 47C depict a schematic overview of the complete SHCICP-MTCICP infrastructure described in FIG. 44, FIG. 45 and FIG. 46. It shows the hierarchy of a sample layout of master and sub licensees for a city management of a SHCICP-MTCICP infrastructure, platform and sub platforms, clients and licensees, features, use cases, experiences, sales/commerce, and content across all the suggested uses cases and installations described in FIG. 44, FIG. 45 and FIG. 46. In this embodiment, the complete control of the SHCICP-MTCICP infrastructure, platform and sub platforms is depicted as "UBER PLATFORM" 1240. This Uber SHCICP-MTCICP platform 1240 controls the Platforms 1242 that are setup and customized while in bi-directional communication with Uber Platform 1240 as shown with arrow 1244. Additional SUB PLATFORMS AND SUB-SUB PLATFORMS 1246 can be set up and customized while in bi-directional communication with the Uber SHCICP-MTCICP Platform 1240, as shown with arrow 1248. Geo-features 1250 can be set up, activated, developed and customized while in bi-directional communication with the Uber SHCICP-MTCICP Platform 1240 as shown with arrow 1252. Proximity features 1254 including beacons, beacon networks, beacon set-up and maintenance, rental with messaging, segmentation and campaigns can be set up, activated, developed and customized while in bi-directional communication with the Uber SHCICP-MTCICP Platform 1240 as shown with arrow 1256. Experiences 1258, both standard and Augmented Reality (AR) can be customized with messages, segmentation and campaign management can be set up, activated, developed and customized while in bi-directional communication with the Uber SHCICP-MTCICP Platform 1240 as shown with arrow 1260. Sales efforts 1262 of the platform, its use the development of which can be undertaken and which may include Software Development Kits (SDK) to $3^{rd}$ parties (not numbered), can be set up, activated, developed and customized while in bi-directional communication with the Uber platform SHCICP-MTCICP 1240, as shown with arrow 1264. Content and curated content 1266 can be set up, with customization using standard or custom HTLM5, with internal resources or external partners, suppliers or contractors with the ability to customize existing apps and interfaces or develop custom apps, as shown at 1266 while in bi-directional communication with the Uber SHCICP-MTCICP platform 1240, shown with arrow 1268. This set-up enables the users of the UBER platform 1240 to assist and enable communication pre-visit for the FIRA venue, shown at 1270 via bi directional communication pre-travel shown with arrow 1272 to the Uber SHCICP-MTCICP 1240 as shown with arrows 1268 and 1274. It also enables users of the UBER platform 1240 to assist and enable communication pre-visit for the hotels 1276 via bi directional communication pre travel shown at arrow 1278 to the Uber SHCICP-MTCICP Platform 1240, as shown with arrows 1268 and 1274. It also enables the users of the UBER platform 1240 to assist and enable communication pre-visit for the airport 1280 via bi directional communication pre travel shown with arrow 1282 to the Uber SHCICP-MTCICP Platform 1240 as shown with arrows 1268 and 1274. It also enables users of the UBER platform 1240 to assist and enable communication pre-visit for retailers 1284 via bi directional communication pre travel shown with arrow 1286 to the Uber SHCICP-MTCICP Platform 1240 as shown with arrows 1268 and 1274. The users of the UBER platform 1240 to assist and enable communication pre-visit for the city manager and operators, utilities, security, law enforcement, health, medical, transportation, traffic, pollution, parks & rec, waste and others involved in the city, shown as "CITY" 1288 via bi directional communication pre travel 1290 to the Uber SHCICP-MTCICP Platform 1240 as shown with arrows 1268 and 1274. The Uber SHCICP-MTCICP Platform 1240 can enable and activate bi-directional communication with end users planning the trip, shown at 1292 with pre-travel content and information delivery with direct feedback response of content, information and communication delivered pre-travel as depicted in with arrow 1294 with suggestions of type of information and content that can be delivered shown at 1292. The convention center FIRA can have multiple show managers/clients depicted as "Congress" such as "Congress 1" shown at 1294 and "Congress 2" shown at 1296. They have bi-directional communication with FIRA 1270 as shown with arrow 1298. There can be several exhibitors 1300 under each of the Congresses, 1294 and 1296, and each exhibitor can have bi-directional communication with these Congresses, as shown with arrows 1302, 1302. Each exhibitor and Congress can have features such as Geofences 1304, Maps/Locations 1306 and Wayfinding 1308 as bidirectional communication to any and each of the exhibitors as shown at 1300. Other features in the FIRA congress venue such as Proximity beacons and sensors, individually or in networks or mesh configurations, clusters or segmented, shown at 1312 can have bi-directional communication directly with the FIRA 1270 as shown by arrow 1314. This can enable communication back to the Congress 1 and Congress 2 as shown with arrow 1298 and with the exhibitors as shown with arrows 1302, 1302. Likewise, recommendations 1316 can be provided and explored via bi-directional communication to FIRA 1270 as shown with arrow 1318. This can enable communication back to Congress 1 and/or Congress 2 as shown with arrow 1298 and to the exhibitors as shown with arrows 1302, 1302. Curated experiences can be created, distributed, delivered and experienced such as Basic AR experiences shown at 1320 and Advanced AR experiences" shown at 1322. These can be delivered and responses recorded via the bi-directional communication as shown at arrow 1324 back to FIRA 1270. Curated content presented may include Coupons and offers—"coupons" shown at 1326, with a bi-directional communication back and forth to the FIRA 1270 as shown at 1328. Actions by the end users such as payments 1330 can be enabled, presented, captured, processed, tendered and closed by FIRA 1270 via bi-directional communication as shown with arrow 1332. Other end user activities such as networking 1334 can be enabled with bi-directional communication to the FIRA 1270 as shown by arrow 1336. Multiple hotels can also be connected to the system. A master hotel 1276 can communicate with multiple hotels, depicted as "Hotel 1" 1346 and "Hotel 2" 1348 in bi-directional communication as shown with arrow 1350. Each hotel has a Geofence or geofences associated with it, as shown at 1352, maps and locations 1354 and can have enabled wayfinding on their premises, as shown at 1356—all of which are in bi-directional communication with the hotels, as shown at 1358. Additional features and functions can be enabled at each hotel, such as with proximity beacons delivering hyper location services, such as to un-lock doors and hotel rooms, provide proof of presence, locate guests and staff members, provide or deny access, deliver and verify rewards for attending events at the hotel or staying at the hotel via beacons and other types of proximity sensors, shown at 1360 as well the ability for guests to check in, shown at 1362. These features and functions are in bi-directional communication with the hotels as shown with arrow 1364. experiences can be created, distributed, delivered and experienced such as AR experiences 1338 for hotels and for use by their guests and staff. These can be delivered and responses recorded via bi-directional communication shown at 1340 back to the Hotels 1276. Curated experiences can be created, distributed, delivered and that provide VIP services 1342 for hotels and for use by their guests and staff to provide these services for the VIP guests. These can be delivered and responses recorded via bi-directional communication shown at 1344 back to the Hotels 1276. Furthermore, options to "upgrade" 1366, and present options and upsell/cross sell offers 1368 and offers, coupons, bookings, payments and information about transportation 1370 can be presented to the hotels in bi-directional communication, shown with arrow 1372. All of the communications about the features, functions, benefits, offers, coupons, payments, instructions and information between the hotels are bi-directional, with a combined, aggregated, or singular bi-directional data steam and communication to the Uber platform 1240 as shown with arrow 1374. For the airport 1280, similar bi-directional communications can be enabled that can provide instructions, features, offers, functions, information, payment enablement, access controls, wayfinding and directions. Individual shops, groups and chains of shops as well as tourist offices may be located at the airport, as shown at 1376 and are in bi-directional communication with the airport as shown with arrow 1378. Features such as Geofences 1304, Wayfinding 1308 and Maps/Locations 1306 are activated and enabled at the airport with bi-directional communication as shown with arrow 1382. Other features in the airport, such as Proximity beacons and proximity sensors, individually or in networks or mesh configurations, clusters or segmented, shown as "Proximity Sensing" at 1384 can have bi-directional communication directly to and from the airport 1280 as shown with arrow 1386. Numerous experiences and curated content, features, functions, coupons, payments and augmented reality solutions, including the ability to pre-shop the retailers and/or participating airlines, shown at 1388 can be activated, enabled, delivered, controlled, completed and initiated via bi-directional communication to the airport as shown with arrow 1390. The complete process can be reversed and repeated as needed, with all relevant data and instructions, content, commands and other bi-directional communication enabled between the airport and the Uber platform 1240 as shown in with arrow 1391. Similarly, Retail 1284 can have bi-directional communication across one retailer, a mall or multiple retailers in the mall, as shown at 1392 back and forth to the main retailer 1284 as shown with arrow 1394. Features, functions, actions, proximity sensing via beacons, proximity sensors and/or networks, clusters, mesh setup or segmented units across the mall, the stores, inside and outside, geo-fencing of the mall and individual tenants stores, individually or in clusters, with maps and locations identified to deliver automatic check-in for offers, coupons, rewards or other curated content, shown at 1396 can be enabled via bi-directional communication as shown with arrow 1398. Further offers and coupons can be presented, curated content and AR experiences enabled, activated, delivered and displayed with payment options enabled, activated with payment tendered and closed, as shown at 1400 via bi-directional communication as shown at arrow 1402. As before, the platform extends across the city 1288. In this instance, the city interacts with the transportation, referred to as "TRANSPORT" 1404 and offers of transportation options, shown at 1406 with real-time bi-directional communication for real-time updates on options, shown at arrow 1408 that is communicated to the city via bi-directional communication as shown with arrow 1410. Recommendations can be presented and explored, as shown at 1412 with a feedback on the user's response to the recommendations via bi-directional communication to the city, shown at 1414. Augmented Reality experiences on bus signs and stops can be activated, enabled, delivered with curated content triggered and presented at these locations on these signs and posters, as shown at 1416 via bi-directional communication as shown by arrow 1418. Furthermore, payments can be enabled, activated and completed, coupons can be presented and redeemed as shown at 1420 and can be enabled and completed via bi-directional communication as shown with arrow 1422. Curated information such as weather forecasts, waiting times and what is on and what to do recommendations can be presented, as shown at 1424 via bi-directional communication arrow 1426. Within the city, participating restaurants, one of which is referred to at 1428 can be enabled with the platform also. They can present offers and provide recommendations that their guests can explore and rate, as shown at 1430 with bi-directional delivery and gathering of feedback as shown with arrow 1432. The restaurants can have interactive digital signage and menus that are AR triggers, shown at 1434. The content on these signs and the curated experiences delivered on these menus in AR can be delivered, enabled, activated, presented, consumed and shown by the restaurant via bi-directional communication, as shown with arrow 1436. Offers and coupons can be delivered and payment options presented, suggested, enabled, activated, redeemed and completed, as shown at 1438 with bi-directional communication to the restaurant to verify, comply, complete and secure any delivery and or payments as shown with arrow

1440. The restaurant will communicate the results of all these actions and receive instructions from the city via bi-directional communication as shown with arrow 1442. The City reports to and receives information from the Uber SHCICP-MTCICP 1240 via bi-directional communication as shown with arrow 1444. All of the data transmitted via the bi-directional communications to and from the Uber SHCICP-MTCICP 1240 is recorded and retained, and used to improve the next communications delivered. This is intended to be illustrative and not all encompassing.

Personalized Messaging Example

Figure 48:
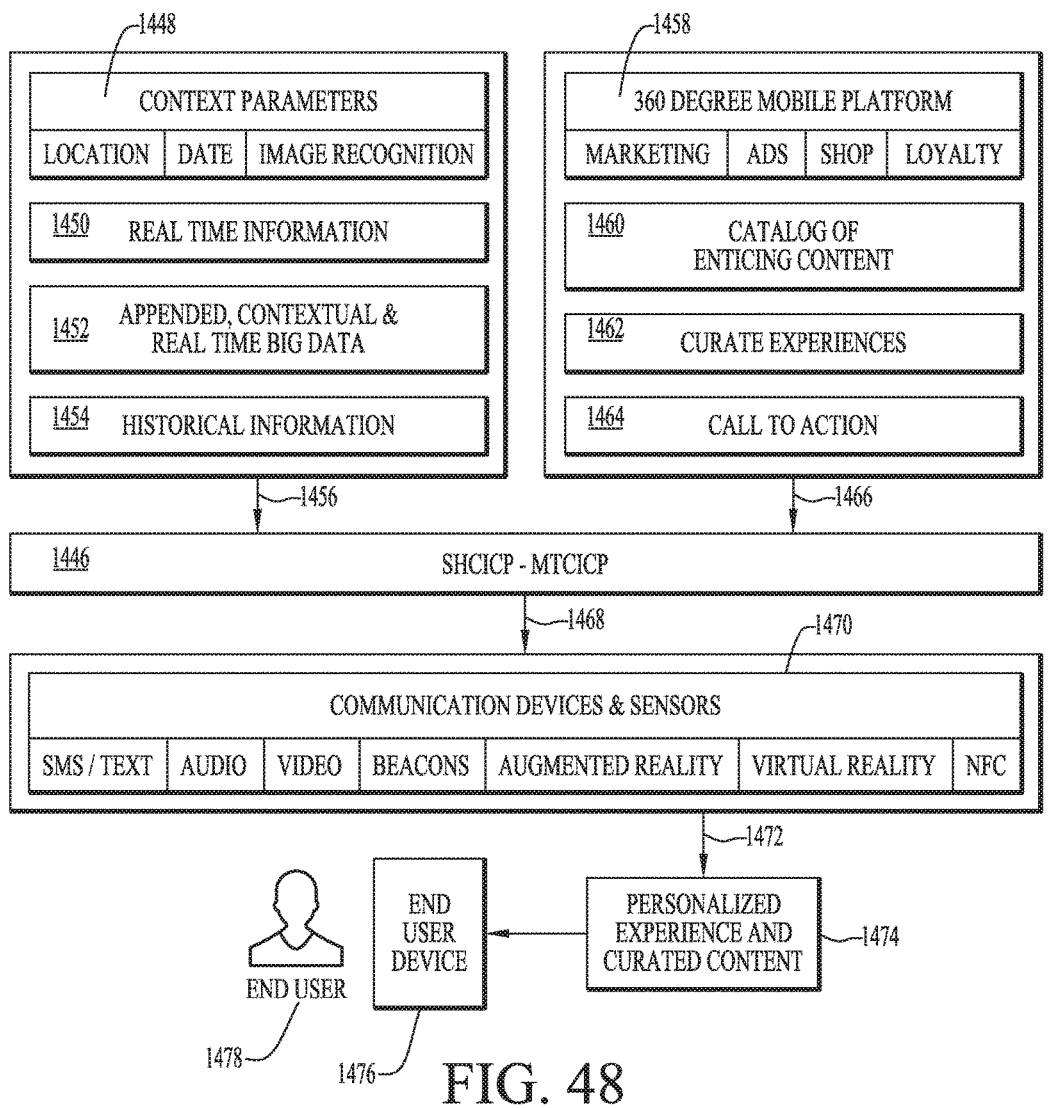
FIG. 48 is an infographic representation showing how content and contextual parameters can be combined in an SHCICP-MTCICP infrastructure.

FIG. 48 is an infographic representation of an alternate embodiment that shows how content and contextual parameters can be combined in a complete SHCICP-MTCICP infrastructure to deliver content based on content delivery mechanisms on a mobile device to deliver personalized experiences and messages that are appropriate for the end user. The data are recorded and retained to improve future communication with others that have a similar profile. In this embodiment, SHCICIP-MTCICP 1446 receives input such as "Context Input" 1448, namely "Location", "Date" and "Image Recognition", and/or a combination thereof, with associated "real time information" 1450 providing a time stamp. This input is combined into "appended, contextual & real time big data" 1452 and combined with "historical information" 1454 and transmitted to the SHCICIP-MTCICP 1446 as shown at arrow 1456. An ad service, network, mobile ad network, programmatic ad placing platform or combination thereof denoted as "360 Degree Mobile Platform" serves up "marketing", "ads", retail capability denoted as "shop" and provides a "loyalty" platform as shown at 1458. A catalog of content, such as products, offers, merchandise, and other products that can be marketed, promoted and sold is shown at 1460. The platform delivers a catalog of content with a combination of experiences that can be customized and curated, referred to as "Curate Experiences" 1462 and that are combined with offers and "calls to action" content 1464 and are all transmitted and communicated to the SHCICIP-MTCICP 1446 as shown with arrow 1466. The SHCICIP-MTCICP 1446 then communicates the results of this combined information, which has been computed with the on-device computation and algorithms used by the SHCICIP-MTCICP 1446, and with communication of the results of the calculations based on the content, instructions, code, curated content, curated experiences, time, location, history and content catalog, the appropriate instructions, codes and commands as shown with arrow 1468 to "Communication devices and sensors" 1470. These devices have a combination of many, single, and/or all of the sensors and functions, display and communication modes such as "SMS/Text" capability, "Audio", "Video", interaction capability with "Beacons" and/or onboard "Beacons", ability to trigger, recognize and render "augmented reality" and/or "virtual reality" and the ability to interact and be triggered by NFC, all as shown in FIG. 48, but not individually identified with a reference number. The output from the device is a result of the combination of and/or computation done by the communication device to deliver the curated content and experiences as an output, shown at arrow 1472 and that can be used and consumed as "personalized experiences and curated content" 1474 on the end user's device 1476 to provide information and offers, curated content and experiences that are customized and personalized for the "end user" 1478. The description of this embodiment is intended to be illustrative and not all encompassing.

Fee-Based Membership Hierarchy Example

Figure 49:
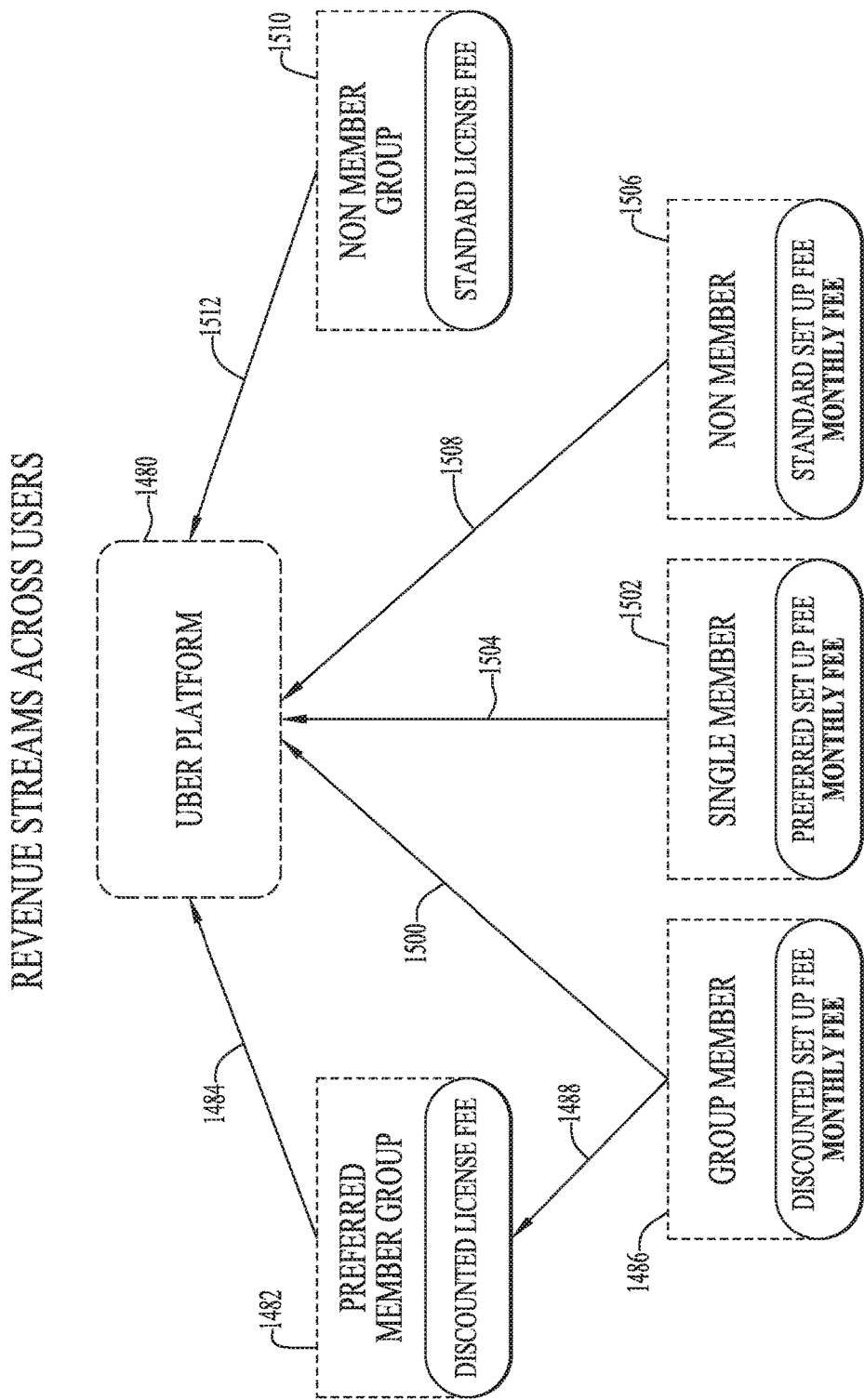
FIG. 49 depicts multiple revenue streams enabled across an SHCICP-MTCICP infrastructure.

FIG. 49 shows how multiple revenue streams can be enabled across a complete SHCICP-MTCICP infrastructure, with various levels of members paying a monthly fee to the master licensee "Uber Platform" based on their level of membership. Here, the Uber platform SHCICP-MTCICP is denoted as 1480. A preferred member group 1482 pays a discounted license fee for the use of the platform as shown at 1484. A member 1496 of the preferred group 1482 pays a discounted set-up fee and/or a discounted monthly fee as a benefit of being a member of the group to the preferred member group, 1482. The group member pays a monthly fee to the Uber platform that may be full price or discounted based on the business agreements and benefits the preferred membership group has negotiated with the Uber platform, with the negotiations shown at 1500. Another entity may be a single member, 1502 and who pays a preferred set-up fee and monthly fee directly to the Uber platform, as shown at 1504 and that is more than the group member pays. Another individual entity 1506 is not a member. This individual entity pays the standard set-up fee and monthly fee, shown with arrow 1508, the highest amount of fees. A group of entities, shown at 1510 are combined, but do not have a preferred status. They may be offered to pay standard license fees, but no monthly fee due to the number of members in this group, as shown at 1512. This embodiment is intended to be illustrative and not all encompassing.

Integrated Digital Website with Mobile Interactions and Controls Example

Figure 50:
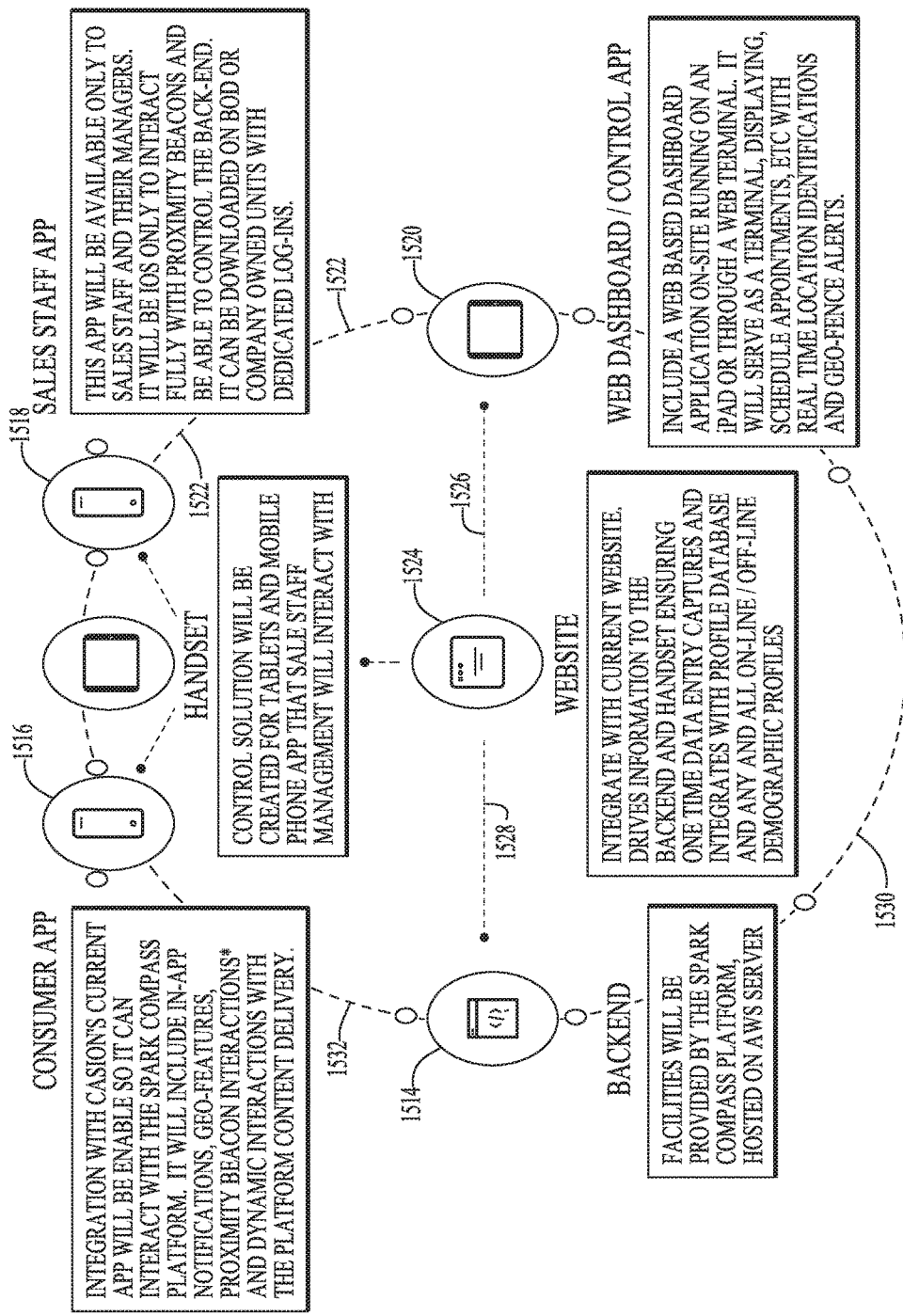
FIG. 50 is a schematic overview showing how a SHCICP-MTCICP infrastructure could incorporate "consumer apps" on mobile "handsets", and integrated with a "website".

FIG. 50 is a schematic overview showing how a complete SHCICP-MTCICP infrastructure incorporates "consumer apps" on mobile "handsets", and is integrated with a "website". The SHCICP-MTCICP is denoted as "backend" 1514. Output is sent to "Consumer App" 1516 and to "Sales Staff App" 1518. The platform is controlled via a "Web Dashboard/Control App" shown at 1520 that controls the web site, takes information from and sends information to the web site and communicates with the Sales Staff App 1518 with bi-directional information shown at 1522, and with the website 1524 via bi-directional communication, shown at 1526. The "Sales Staff App" 1518 is also controlled directly via the "Web Dashboard/Control App" 1520 and communicates bi-directionally between the two as shown at dashes line 1522. In some instances these above described consumer apps can be one and the same. The website 1524 communicates with bi-directional communication to the back-end 1514 via link 1528. The web dashboard 1520 also communicates directly with the back-end 1514 via bi-directional communication link 1530. The Consumer App 1516 is in bi-directional communication with the backend 1514 via link 1532. Data from all of these apps go into the "Backend" server 1514 and is recorded and retained there. This embodiment is intended to be illustrative and not all encompassing.

Sporting Events Example

Figure 51:
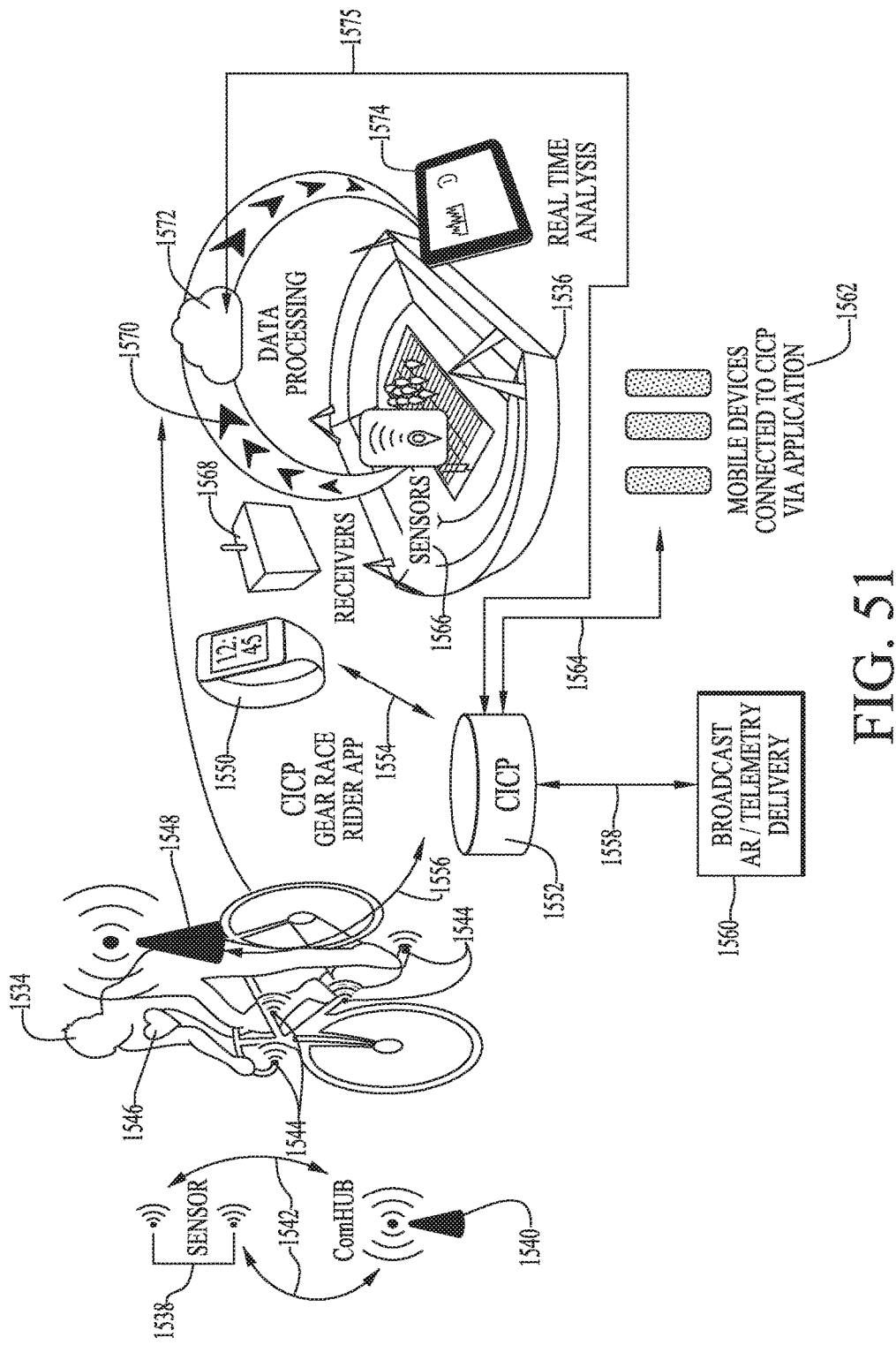
FIG. 51 depicts a SHCICP-MTCICP infrastructure for sporting events and competitions, in stadiums, outside of stadiums or both in and out of a stadium.

FIG. 51 depicts a complete SHCICP-MTCICP infrastructure for sporting events and competitions, in stadiums, outside of stadiums or both in and out of a stadium.

Contestants, in this case bicycle riders, one of which is shown at 1534 are competing along a track outside a stadium 1536. There are sensors along the track, one of which is shown as "Sensor" 1538 and there are sensor communication hubs "ComHUB" 1540 that are in bi-directional communication and/or receiving data only with the sensors, as shown with arrow 1542. There are also sensors on the bicycle as indicated on the pedals and handle bars 1544, 1544, 1544. The rider 1534 is wearing a heart monitor as indicated by heart 1546 and a sensor communication hub 1548. The rider can also wear a wearable device, such as watch 1550 with an app referred to as "CICP Gear Race Rider App" that gathers data and receives data via the app that is connected to the SHCICP-MTCICP 1552 via bi-directional communication shown at arrow 1554. The sensor hub 1548 is in bi-directional and/or is transmitting data only to the SHCIC-MTCICP as shown by arrow 1556. Data that has been aggregated and recalculated as shown with arrow 1558 can be transmitted to Broadcast AR/Telemetry Delivery 1560, enabling reproduction of the rider along the track in augmented reality and used to overlay data from any of the sensors on the bike or rider in augmented reality on the broadcast delivery denoted as "Broadcast AR/Telemetry Delivery" 1560. For systems and mobile devices that include sensor feedback from the viewers, as shown at 1562, of the content and for dynamic interactive virtual reality, sensor data can be transmitted back into the SHCICP-MTCICP 1552 in bi-directional communication as shown at arrow 1564. Stadium 1536 can also be connected via sensors 1566 positioned in the stadium and that communicate data with "receivers" and "transmitters" that receive the sensor data and transmit sensor data that can be used to deliver data, shown with arrows 1570 to a central cloud based data processing device 1572 with real time analytics, shown on a receiving device, such as a tablet 1574. The cloud processing device 1572 is in bi-directional communication with the SHCICP-MTCICP, 1552 as shown by arrow 1575. This can be a standard off-the-shelves system such as Cisco Stadium Vision platform or Hopscotch's or VenueNext app and platform systems, or it can be a complete SHCICP-MTCICP infrastructure. A commercially available "Spark Compass" brand SHCICP-MTCICP can also be delivering and receiving data and sensor input/feedback from connected devices as depicted by "Mobile Devices" 1562, delivering content and curated experiences with and without the telemetry data received and re-transmitted by the sensors, sensor hubs, transmitters and receivers on the rider, his bike, along the track and/or in the stadium. This embodiment is intended to be illustrative and not all encompassing.

Figure 52:
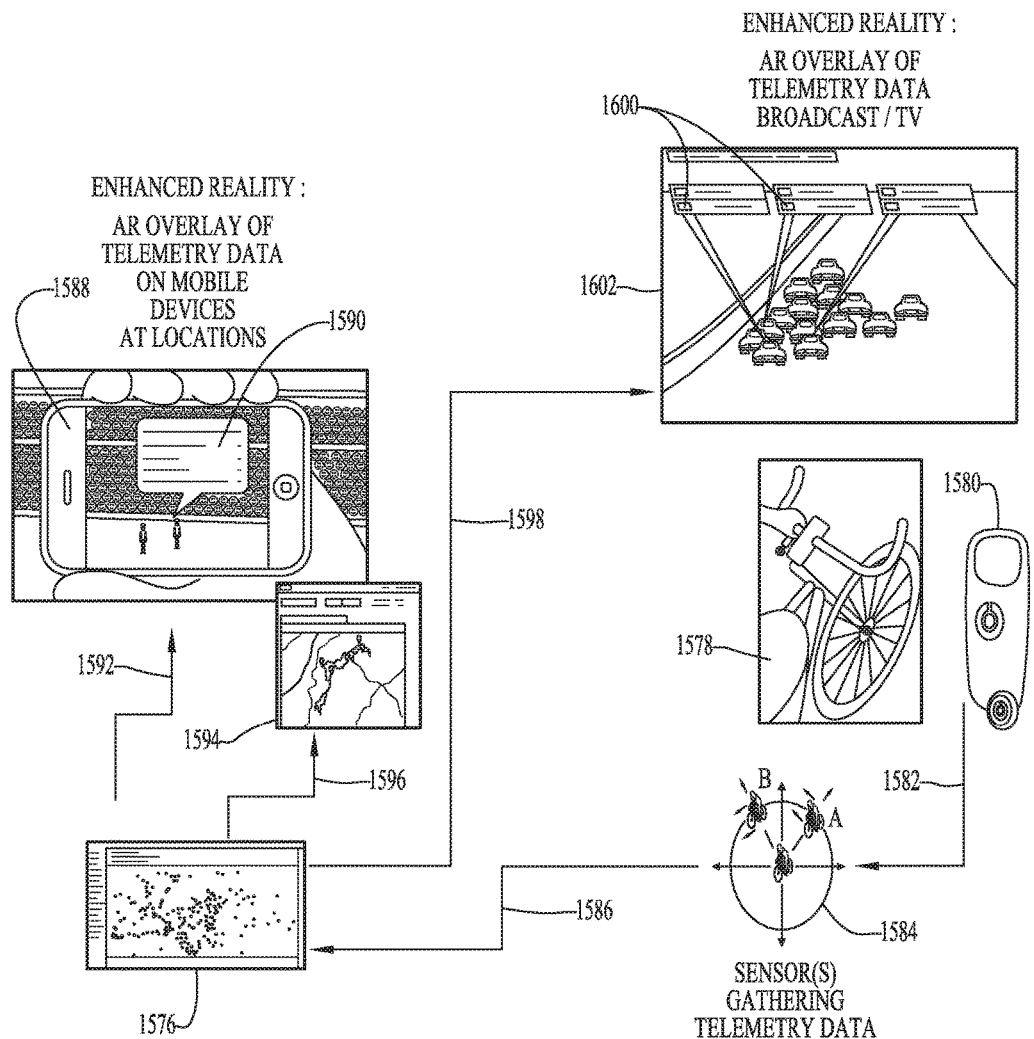
FIG. 52 is an infographic depicting a sensor system that can gather data from sensors, and combine it with geo-locations to deliver content that is relevant to specific participants.

FIG. 52 is an infographic depicting more details about a sensor system that can gather data from sensors, combine the data with geo-locations to deliver content that is relevant to specific participants during a contest such, as for example, a bicycle race with presents a map viewable on a device, a football game that super-imposes a football player's stats in an augmented reality representation, and telemetry data from race cars as shown in video overlays in a TV broadcast. This new type of blending of telemetry and augmented reality is for the purpose of the presently described inventions, here named "Enhanced Reality". In this infographic, SHCICP-MTCICP 1576 is receiving sensor data from a bike 1578 via a sensor communication hub 1580. Numerous sensors are placed on the bike as shown, for example in FIG. 51 with the aggregated data transmitted as shown at 1582. Additional bikes and bike riders "A" and "B" are in the same race as shown in area 1584. The data from each of the bikes and riders are all communicated to the SHCICP-MTCICP 1576 via arrow 1586. Telemetry data gathered from the bikes and/or participations of the race are gathered, recorded and retained by the SHCICP-MTCICP 1576 and can be sent to various devices to provide a telemetry overlay on augmented reality curated content, namely "Enhanced Reality" experiences. A mobile device 1588 is shown displaying such data as an Augmented Reality overlay in camera view finder 1590 on the device. This telemetry data display 1590 displays data transmitted as shown via arrow 1592. Location data of the various riders can also be transmitted and displayed on tablets, monitors, laptops, computers, TV screens, digital displays 1594. They receive the real time data from the SHCICP-MTCICP 1576 as shown by arrow 1596. In instances where a race is broadcast or real-time video feed is used to display the race and the positions of the various contestants, telemetry data can be superimposed in these instances also from the same SHCICP-MTCICP 1576 which thereby serves content and telemetry data to multiple outlets, devices, communication channels, and broadcasters at the same time. In this instance, the data are transmitted to correspond with broadcast, streamed services or other types of communications showing live video feeds as shown with arrow 1598. The "Enhanced Reality" data overlay in this instance can be telemetry data such as speed, heartrate of the driver/rider, g-forces in turns, fuel, RPM and other data such as position of racers relevant to other racers as shown in the "Enhanced Reality" overlay, 1600 on the depicted monitor 1602 displaying the "Enhanced Reality" video feed. This embodiment is intended to be illustrative and not all encompassing.

Connected Vertical Industries Example

Figure 53:
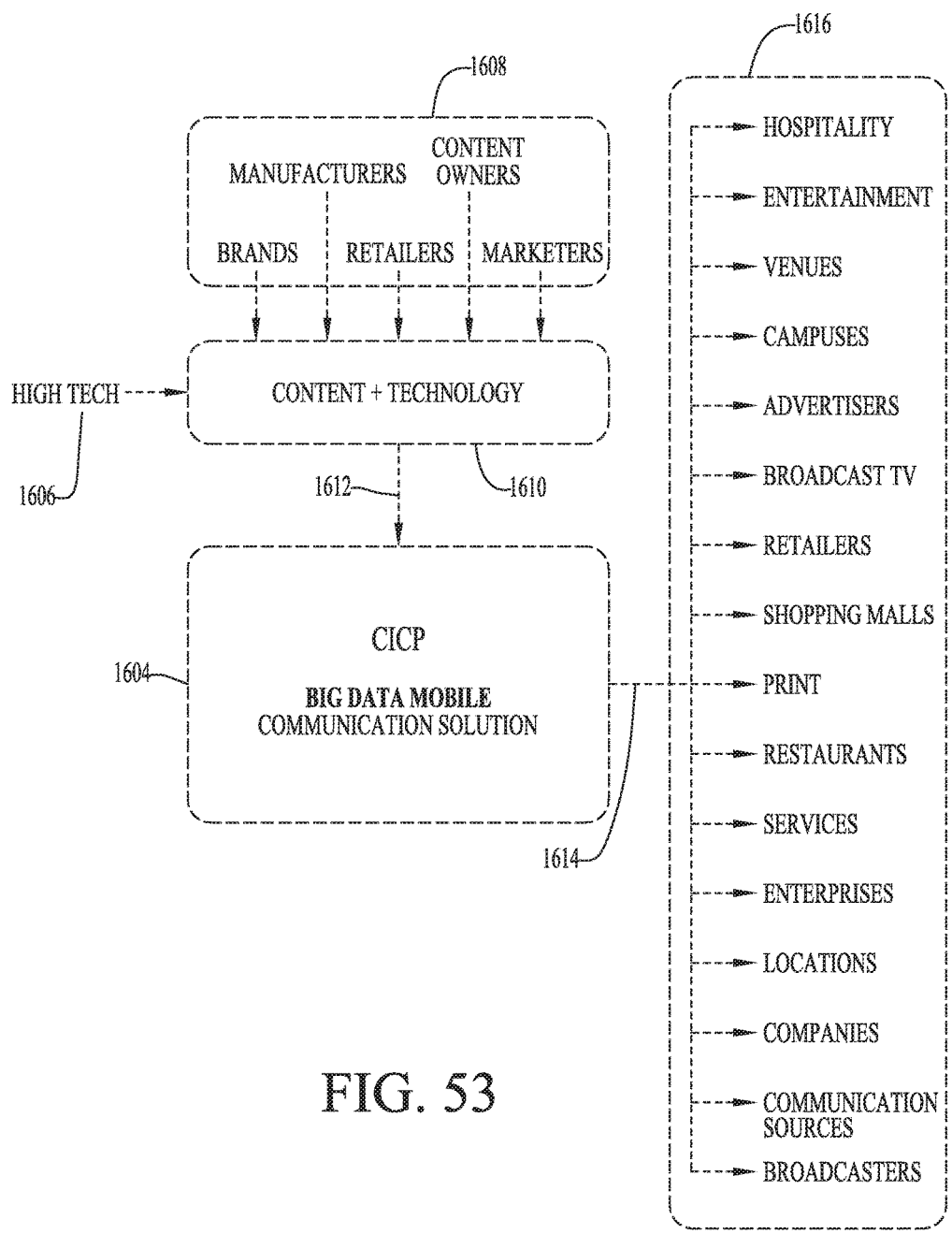
FIG. 53 is an infographic depicting how various vertical industries can provide content and information into a MTCICP, process big data and provide communications to numerous vertical markets.

FIG. 53 is an infographic depicting how various vertical industries can provide content and information into a MTCICP, as depicted as "CICP Big Data Mobile Communication Solution Platform" 1604, which can process the big data and provide communication to numerous vertical markets. New technologies, denoted as "High Tech" 1606 are integrated with content from "brands", "manufacturers", "retailers", "content owners" and "marketers" 1608, who combine and deliver "content+technology" 1610 to the MTCICP solution 1604 as shown with arrow 1612. This combination of the technology driven curated content communication shown with arrow 1614 is then used to deliver the right communication to hospitality sources, entertainment sources, venues, campuses, broadcast TV, retailers, shopping malls, print sources, restaurants, service sources, enterprises, locations, companies, advertisers, communication sources and broadcasters as listed at 1616. This embodiment is intended to be illustrative and not all encompassing.

Figure 54:
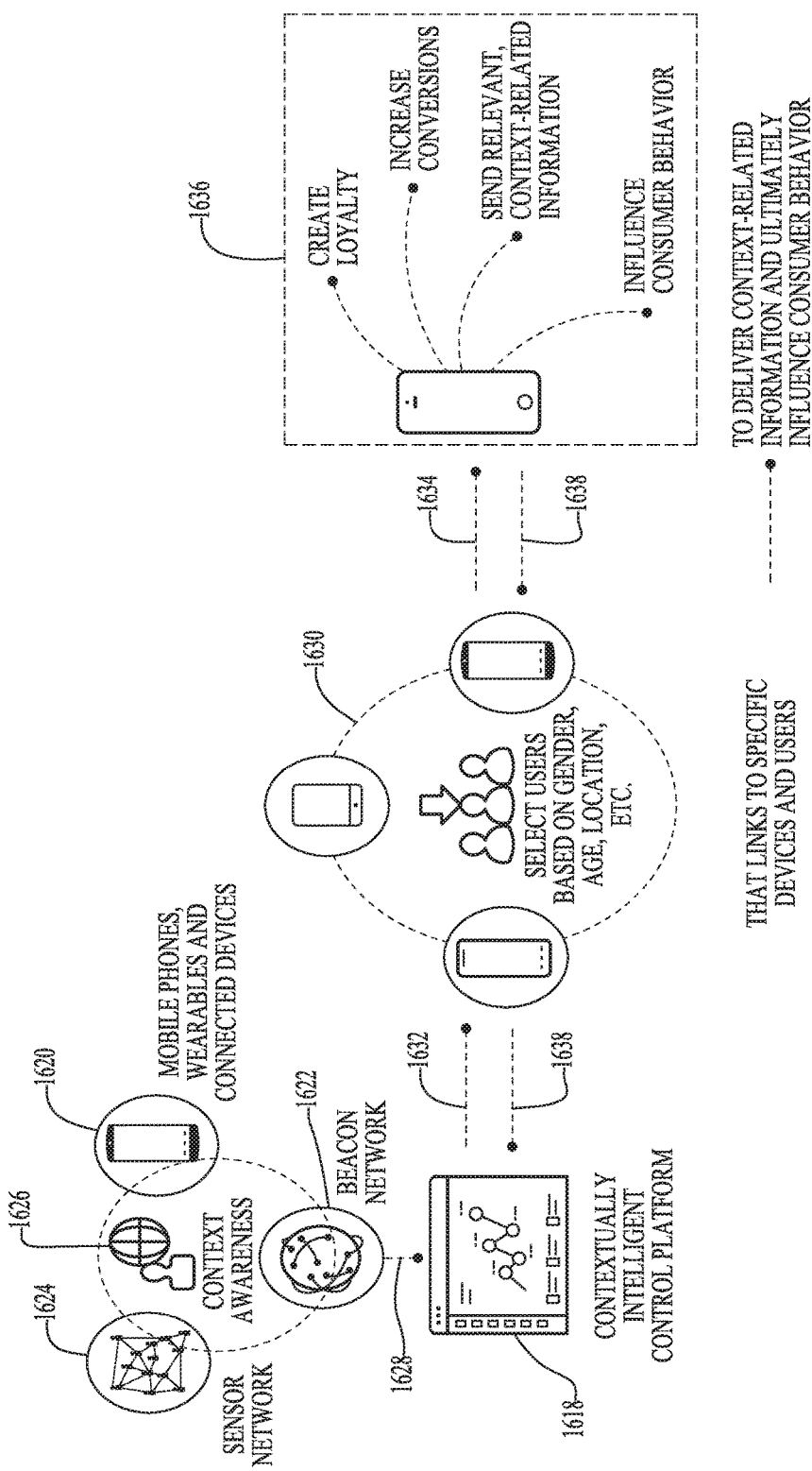
FIG. 54 depicts data flow from sensors, mobile devices and associated sensor and beacon networks to create "Context Awareness" as indicated in FIG. 53.

FIG. 54 depicts the data or information flow from sensors, mobile devices and associated sensor and beacon networks to create "Context Awareness". The information is then sent into a Contextually Intelligent Control Platform 1618 with on-board algorithms for artificial intelligence, augmented intelligence and enhanced intelligence calculations, with these algorithms being a subset of or included as part of MTCICP 1618. A user's mobile device 1620 is shown interacting with beacon network 1622 and sensor network 1624, together with onboard computation to derive context awareness for the user 1626. These data are sent to and from the CICP 1618 device via link 1628. In a setting where a group of users are connected to the CICP 1630, the CICP 1630 has bi-directional communication, shown at link 1632 to end users and content is linked to specific devices based on their users' gender, age, location and other known parameters identifying the specific user as shown at 1630. This information is then delivered specifically to a user on that user's device to provide results and conversions, prove value, provide return of investment, measure against key performance indicators and create loyalty, increase sales, send relevant information and or influence consumer behavior as shown at 1636. The results, actions, activities, conversions, decisions and results of the user's interactions with these are communicated back to the CICP 1618 via link 1638 identifying the end users based on the gender, age location etc. This embodiment is intended to be illustrative and not all encompassing.

Reward-Based Behavior Modification Example

Figure 55:
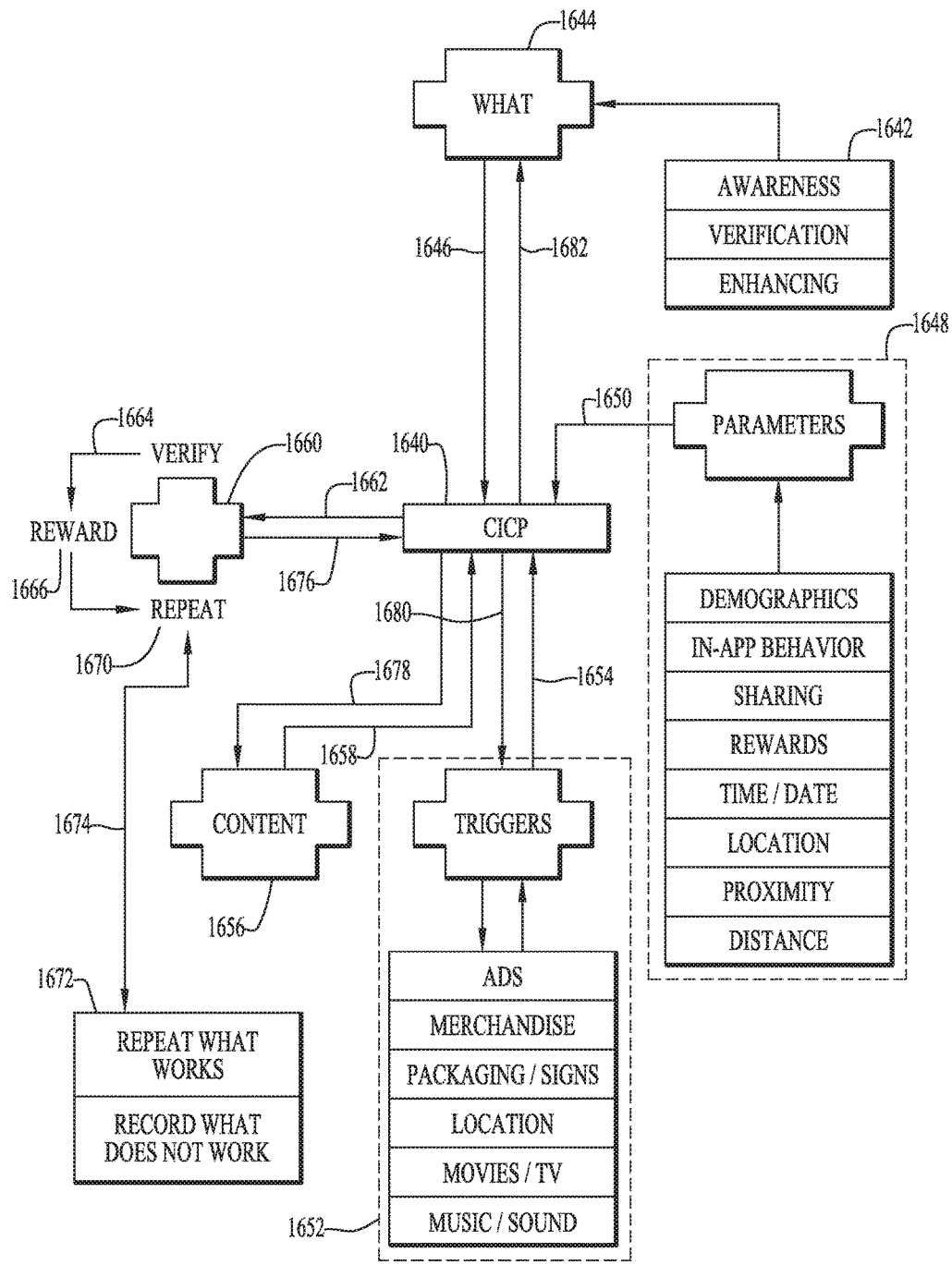
FIG. 55 is a schematic infographic of a platform that incorporates various parameters for content delivery.

FIG. 55 is a schematic infographic of a complete platform that incorporates parameters for content delivery such as "what" 1644, "parameters for offers" 1648, "triggers" 1652 that initiate "content delivery" 1656, with the ability to "Prove or Verify" 1660, "Reward" and "Encourage" 1666, to "Validate and Verify a Close of Sale" (not shown), to present a "Reward" 1666 and "Repeat" 1670, and "Repeat What Works and Record What Does Not Work" 1672 as shown with arrow 1674 to device 1660, as described in more detail as follows. Here, a CICP 1640 receives bi-directional communication about context with results of such awareness, as shown as "Awareness", "Verification" and "Enhancing" at 1642 that is aggregated into a knowledge base labelled "What" 1644 that is in bi-directional communication with the CICP 1640 as shown with arrows 1646, 1682. A series of "Parameters" 1648, such as entitled Demographics, In-App Behavior, Sharing, Rewards, Time/Date, Location, Proximity and Distance, and which include the type of information identified in their titles, are described and communicate with information to the CICP 1640 as shown with link 1650. A series of triggers (not numbered) that can be detected via image recognition such as Images on Ads, Merchandise, Packaging/signs, Location that can be detected via a series of various sensors, the content on displayed on or communicated to a TV or displayed as a movie, and or audio based triggers such as music or any type of sound are shown at 1652. These triggers communicate a command identifying the recognition of the trigger to the CICP 1640 as shown with arrow 1654 and receive communications from the CICP as shown with arrow 1680. Content 1656 is made available to and selected by the CICP 1640 as shown with arrows 1658, and 1678. A device 1660 receives and sends information in bi-directional communication shown at 1662 and 1676, based on the calculations of the CICP 1640, which are based on the computations of "What" 1644, "Parameters" 1648, "Triggers" 1652 and the "Content" 1656. This device 1660, then "Verifies" as shown at 1664 the communication, provides an "Reward" if warranted, as shown at 1666, and determines if it should be "Repeated" as shown at 1670, based on the responses. A decision to "Repeat What Works" and Record What Does Not work shown at 1672 is sent to the device 1660 as shown with arrow 1674. The results of these actions on the device 1660 are then communicated to the CICP 1640 via link 1676 and recorded and retained. Communication is transmitted to the relevant parts of the platform as determined by the CICP 1640, such as "Content" information 1656, which is in bi-directional communication with CICP 1640 as shown with arrows 1678, 1658; to "Triggers" mechanisms 1652, as shown with arrows 1654, 1680; and to the context relevant aspects to "What" 1644, in bi-directional communication as shown with arrows 1646, 1682. This embodiment is intended to be illustrative and not all encompassing.

Rich-Media Content Delivery Management Example

Figure 56:
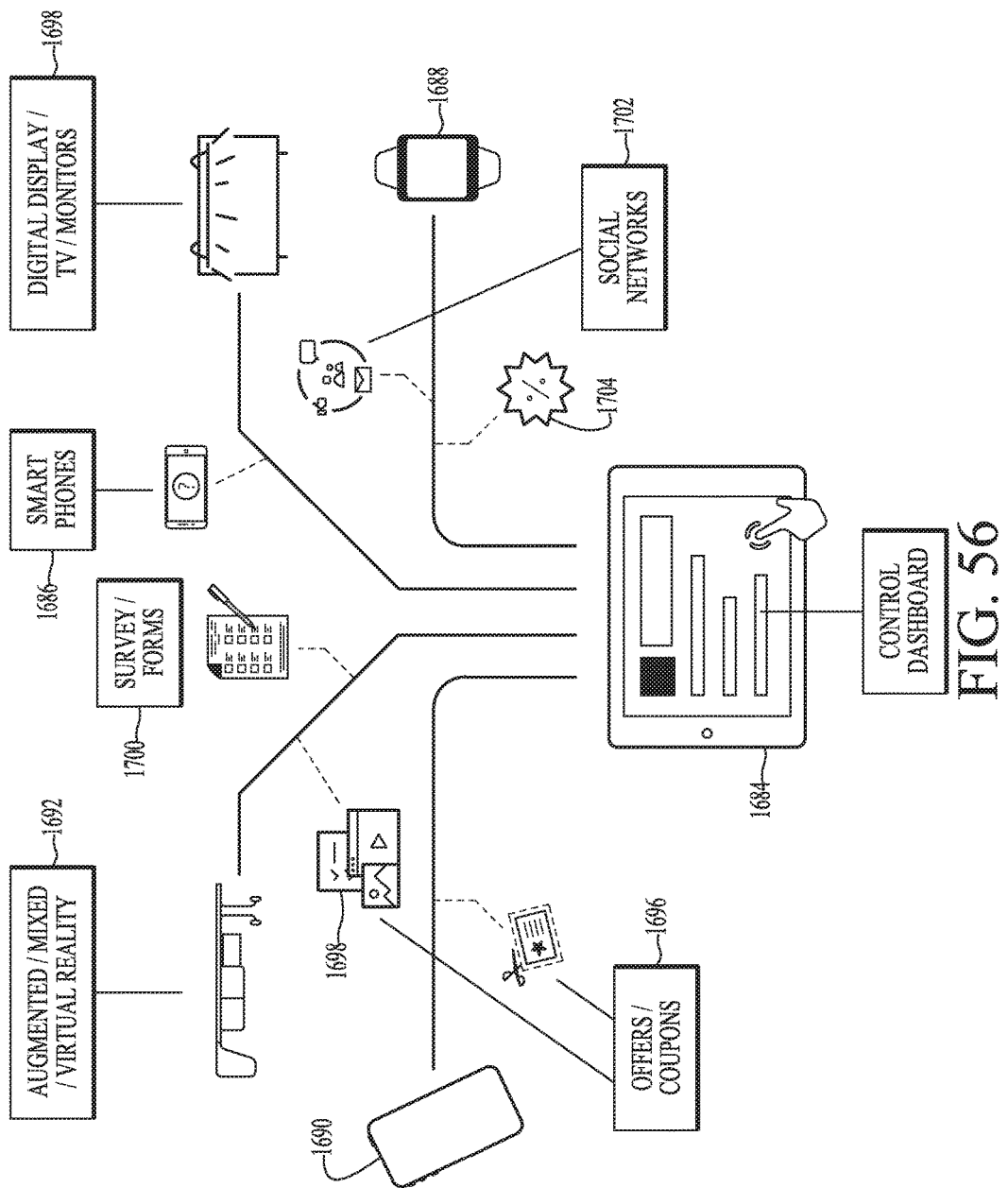
FIG. 56 is a schematic representation of a content management solution part of a CICP, MTCICP and/or a SHCICP-MTCICP and in which content can be displayed on a variety of devices.

FIG. 56 shows a schematic representation of the content management solution part of a CICP, MTCICP and/or a SHCICP-MTCICP, shown as 1684 with a control dashboard interface. Content can be displayed on a magnitude of devices from phones 1686, wearables 1688, tablets 1690, on augmented reality glasses or in devices showing augmented reality or in virtual reality or on devices capable of displaying mixed reality 1692 to digital displays 1694. Content can be interactive and present coupons and offers 1696, data and video overlays 1698, surveys and forms including questionnaires 1700, social media and networks 1702 and other sensors 1704. This embodiment is intended to be illustrative and not all encompassing.

Patient Care Example

Figure 57:
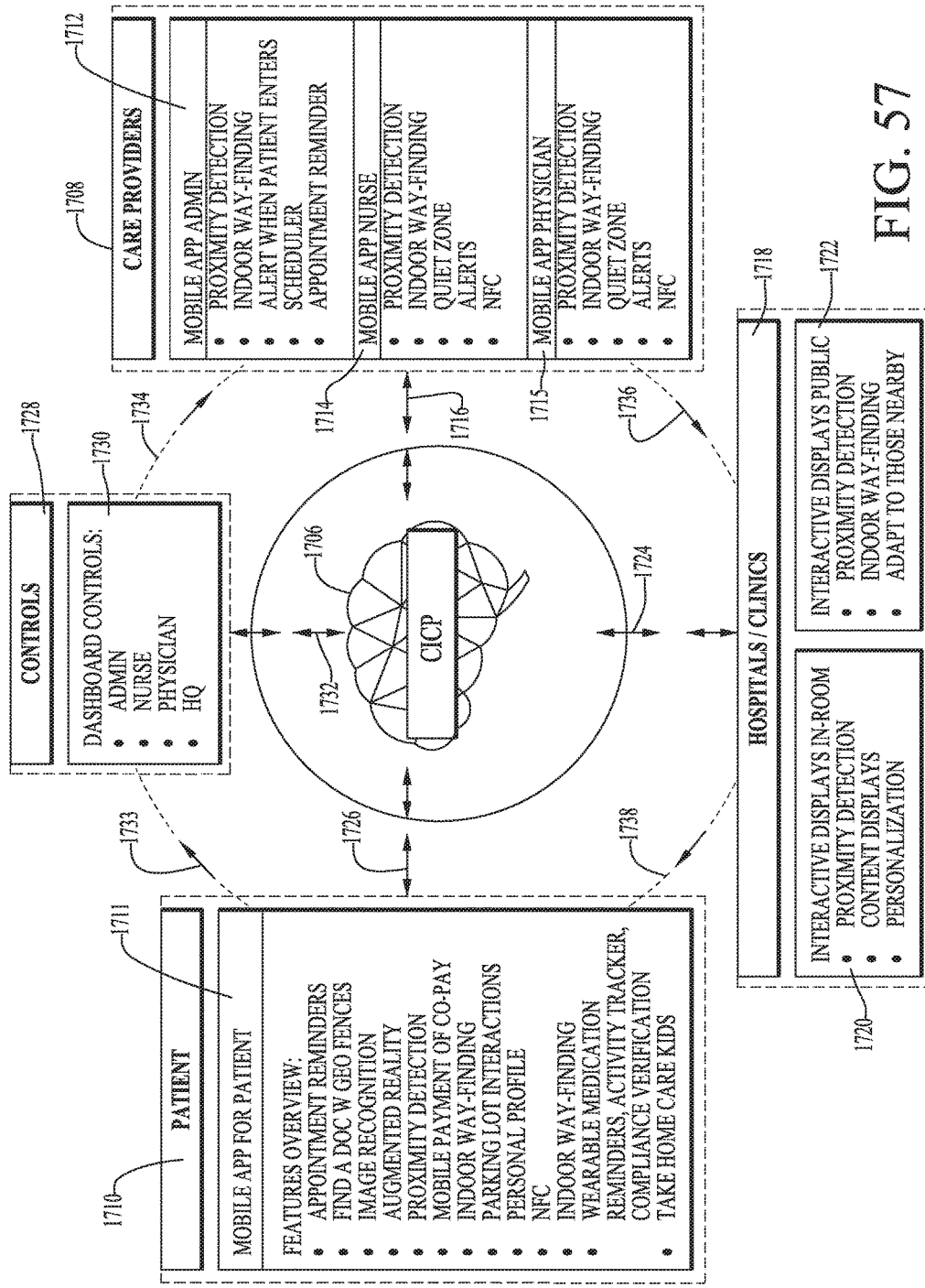
FIG. 57 is a schematic representation of a content management solution part of a CICP, MTCICP and/or a SHCICP-MTCICP and in which a patient receive care from a group of care providers via their connected mobile devices.

FIG. 57 shows a schematic representation of the content management solution part of a CICP, MTCICP and/or a SHCICP-MTCICP, denoted as "CICP" 1706 in a situation where a patient 1710 is receiving care from a group of care providers 1708 via their connected mobile device and the on-board/installed mobile app/apps and/or connected on-device programmed interfaces 1711. The care providers 1708 interface via various interfaces such as connected "Mobile App Admin" 1712, "Mobile App Nurse" 1714 and "Mobile App Physician" 1715 used by and controlled by the "Admins", "Nurses" and "Physicians" respectively. They are all in bi-directional communication with the CICP 1706, as shown with arrow 1716. Hospitals and clinics 1718 can use the system to interact with the patent directly in the rooms, shown as "Interactive Displays In-Room" 1720 and with less sensitive information that has been scrubbed from personally identifiable information (PII) in "Interactive Displays Public" 1722. The information is in bi-directional communication with the CICP 1706, as shown with arrow 1724. All of the information can be displayed for the patient in the "Mobile App For Patient" 1711 via bi-directional communication from with the CICP 1706, as shown at arrow 1726. Controls of the system and content, shown at 1728 can be administrated via "Dashboard Controls" 1730, by authorized users, such as an Administrator, Nurse, Physician or Head Quarters. The Controls are in bi-directional communication with the CICP 1706 as shown with arrow 1732. All is controlled and centered on the MTCICP depicted as "CICP" 1706 which controls and collects data from all communications. Each separate unit can also be in direct communication with each other when appropriate and more efficient. Such communications can be verbal or direct from device to device. Each interaction will be collected and communicated by one of the sources—receiver or transmitter, with the result of the dialog communicated to the CICP 1706. For instance the Patient 1710 may tell the Nurse via a control interface on App 1711 that he needs more medication, as shown with arrow 1732. This request is recorded by the Controls 1728 and communicated to the CICP 1706 and to the Care Providers as shown with arrow 1734. This request is transmitted by the Controls 1728, and communicated to the CICP 1706, as shown with arrow 1732. It is received by the Care Providers 1708 and recorded and communicated to the CICP 1706, as shown with arrow 1716. A decision is made and transmitted to the Hospital 1718, as shown with arrow 1736 and the decision and transmission details to the Hospital are retained and recorded, and transmitted to the CICP 1706 via link 1716. The Hospital 1718 receives the instructions, retains this information and the details associated with the communication received as shown with arrow 1736, and transmits the details to the CICP 1706 as shown with arrow 1724. Once a determination to administer or distribute medication to the patient per the instructions received by the transmission shown at 1736, the determination is transmitted to the CICP, via the link shown at 1724. The admin tells the patient that the medication is on way via verbal communication and bi-directional communication to the patient's device 1711 and/or in-room displays 1720. The transmissions and interactions are recorded and retained and transmitted with instructions to the CICP 1706. The CICP then alerts the control dashboard 1730 as shown via arrow 1732 which, via the CICP 1706 instructs the Nurse on her mobile app 1714 via the link shown at 1716 to administer the medication. The nurse administers the medication and confirms on her device 1714 that the procedure is completed to the CIPC via link 1716. Each transmission, time, originator and recipient, content, instructions, acceptance, proof of presence, action, confirmation and verifications are collected on each of the devices and collectively transmitted from the devices to the CICP 1706 for safe keeping within rules, laws and regulations such as privacy laws, HIPPA and other regulatory directives. Encryption on each device such as Samsung's KNOX containers on each device, encrypted communication protocols between the devices and secure storage of the data on the CICP are enabled and expected as standard procedure. Some use cases and device/platform features are listed in FIG. 57. This embodiment is intended to be illustrative and not all encompassing.

Figure 58B:
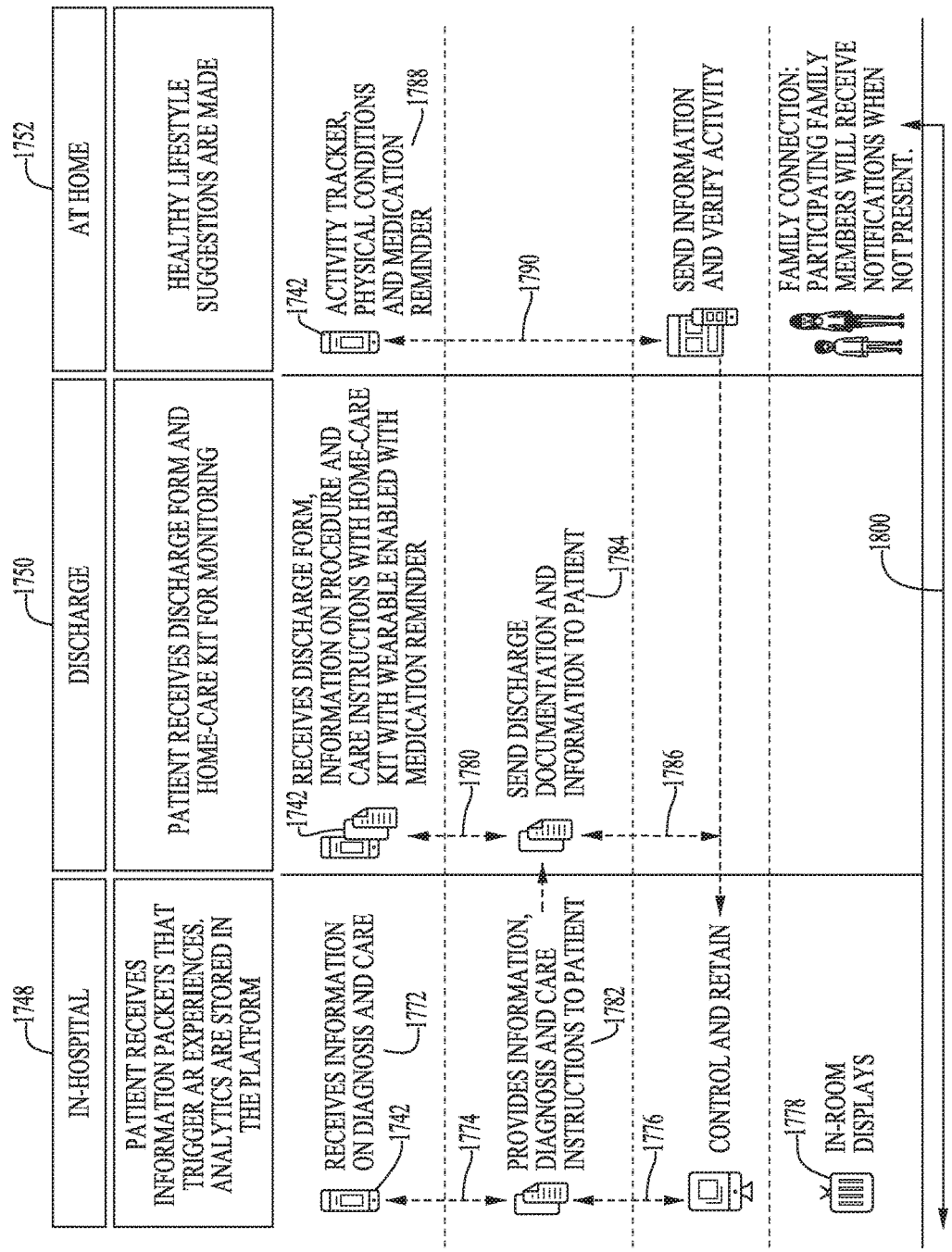
FIG. 58B depicts the second partial view of the FIG. 58 overview.

FIGS. 58, 58A and 58B depict an overview of a journey as the patient interacts with a facility, gets checked in, stays in the facility for a period of time, when the patient leaves and how the patient is communicated with after leaving the facility. The journey is enhanced, activated and controlled via a SHCICP-MTCICP 1739 shown in FIG. 58A but that functions as described in regard to FIG. 57, with all interactions, communications, instructions and actions captured, recorded and retained in compliance with all laws, policies and regulatory instructions. While described in this exemplary embodiment for use with a patient's journey, the platform and the journey could be for a person checking into a hotel, boarding a plane, ship or train, or entering a stadium or convention center. In this instance illustrated in FIGS. 58, 58A and 58B, the journey depicted is that of a patient 1740 with his mobile device 1742, while arriving at a hospital to receive care, shown at 1744, during the check in process, shown at 1746, during the stay in the hospital, shown at 1748, during discharge from the hospital, shown at 1750 and after the patient arrives back home, shown at 1752. The participants depicted in this patient journey overview are the "Patient" 1740, the "Care Providers" 1754 and their connected devices 1756, the staff and admins at the "Hospital/Clinic" 1758, and their communication devices including terminals connected to the CICP, mobile devices such as mobile phones and tablets, PCs, laptops or wearables 1760, and the oversights and "controls" of the process, features and content 1762 that monitors all communication devices connected to the platform via the CICP 1739. The SHCICP-MTCICP solution and infrastructure in this embodiment would be used to verify user, enable controls, and enable curated content delivery, instructions and verifications, with check-in, check-lists and content presented to controllers, care givers and facilities with processes and procedures as described with reference to FIG. 57. Some use cases are listed in regard to the platform shown in FIGS. 58, 58A and 58B. In this instance, the patient 1740 is arriving at the hospital as described at 1764. The hospital clinic administrative employee 1758 is looking at and verifying the patients records on her interface device 1760 and sends information to the patient's device 1742 via bi-directional communication shown at 1766. As part of the check in process 1746, the patient receives directions for and completes the forms as shown at 1768, and these are transmitted to the hospital admin 1758 as shown with dashed arrow 1766. This interaction is recorded and retained by the controls as shown in 1770. The patient is now in the hospital and receiving care, 1748 with diagnosis and care information transmitted to his device 1742 as shown in 1772 from the care providers as shown in 1774. This is also transmitted to the controls and retained as shown at 1776. The control unit presents and displays information, content and instructions 1782 on the in-room displays 1778. As the patient is being discharged 1750, the patient receives discharge form(s), information, post-care instructions and a home-care kit, shown at 1742 as described from the care givers via bi directional communications shown at 1780, from the care givers that includes the care instructions, 1782 as well as discharge documentations, 1784. All of this information is transmitted to, recorded and retained by control as shown in bi-directional communication 1786. Once the patient is back home, shown at 1752, he receives medication reminders, his activity is tracked and recorded while his physical conditions are monitored, recorded and retained on his device as shown in 1788. The information sent and retained is sent via bi-directional communication, 1790. All interactions are retained and recorded by the CICP 1739 which is in constant bi-directional communication with the patient's device 1740 as shown at 1792, the care providers' devices 1756 as shown by arrow 1794, the hospital/clinic's devices and terminals 1760 as shown with arrow 1796, and the controls system 1762 as shown with arrow 1798. When an alarm is activated, an action is taken, and/or messages are sent that are deemed to be relevant and important, any of the steps above described are completed, decisions made, activity reached and this has been approved to be shared with family members or other care givers that are not present at any of these locations, and as approved by local laws, rules and regulations, they will be in bi-directional communication with the CICP as shown by 1800. This embodiment is intended to be illustrative and not all encompassing.

Figure 59:
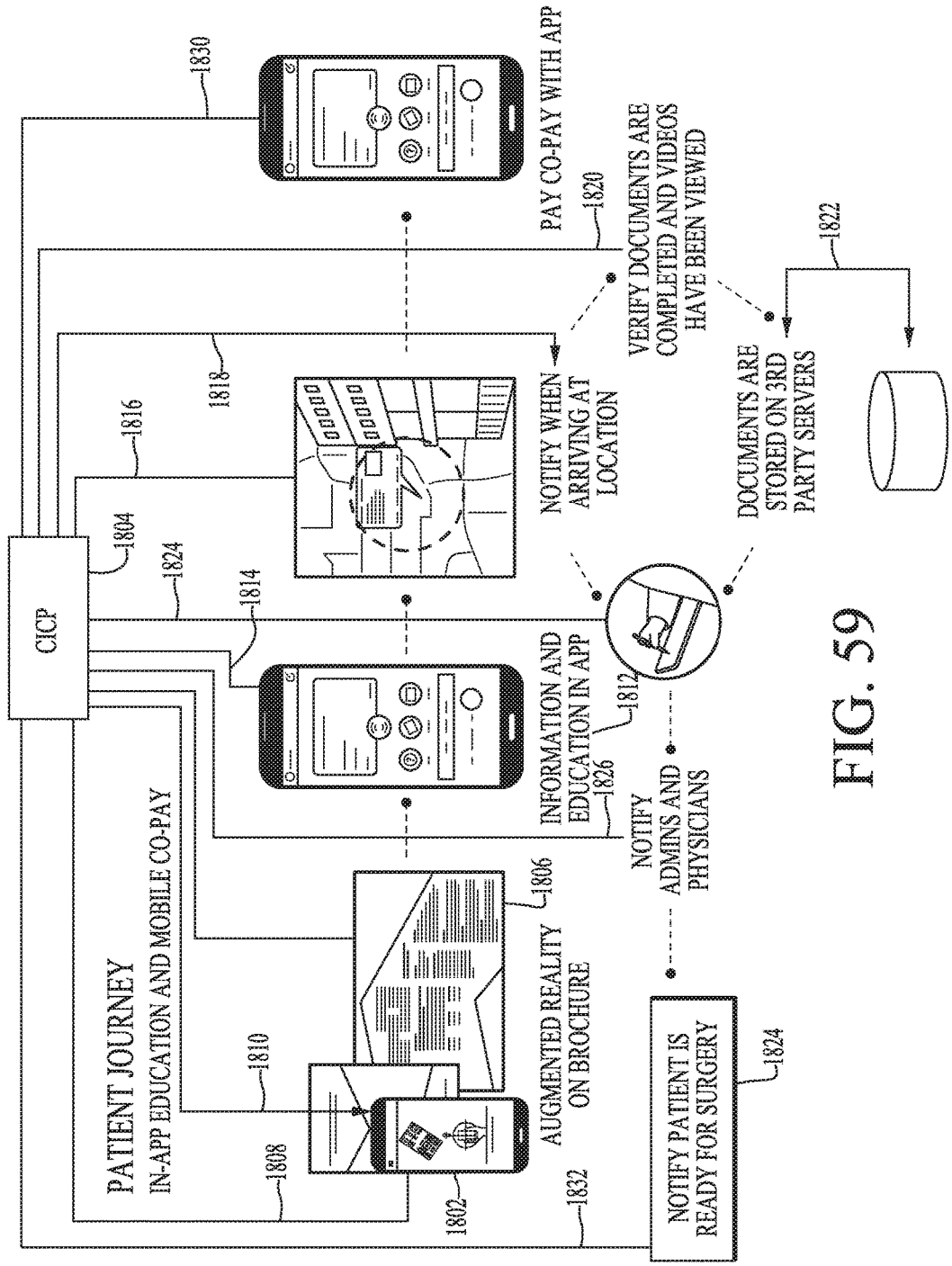
FIG. 59 is an infographic overview of a "Patient Journey", content delivery, form verification, geo-location based messages and alerts, and a mobile application that enables co-payment.

FIG. 59 is an infographic overview of a "Patient Journey", content delivery, form verification, geo-location based messages and alerts and mobile app that enables co-payment. This can be a sub-set use of the system described in FIG. 58 or a stand alone system. The patient has a connected mobile device 1802 that is connected with a CICP 1804. The patient is about to undergo a procedure and receives printed information 1806 and a mobile app on his device that is connected to a SHCICP-MTCICP as shown with link 1808 that incorporates delivery of educational information in augmented reality as curated content displayed on the printed materials as shown with arrow 1810. The action of triggering the AR in the app unlocks education and information in the app as shown at 1812. The app can also unlock verification forms, pre-op consent forms, surveys, check-lists and instructions via bi-directional communication, as shown at link 1814. When the patient arrives on the facility grounds, the SHCICP-MTCICP's geo-fence feature will trigger an alert to the SHCICP-MTCICP that the patient is on the premises, as shown at 1816. An alert will be sent to the appropriate staff, nurses, physicians, administrators, care givers, and immediate family member who have been granted access to receive the information via the SHCICP-MTCICP, as shown at 1818. When this alert is sent, a verification request is triggered to ensure that the proper forms presented via link 1814 are completed as shown at 1820. Such documents can be presented from and stored on separate third party vendors and suppliers should the operator of the SHCICP-MTCICP so desire, as shown at 1822. The result of these queries for completed forms is sent to the nurses and physicians as shown at 1826, and if complete the patient is declared clear for surgery. A mobile payment option is then enabled in the mobile device ensuring the patient pays any co-pay prior to procedure start, as shown at 1830. Once confirmed that payment has been tendered, the patient is notified that he/she is ready for surgery, as shown at 1824, 1832. This embodiment is intended to be illustrative and not all encompassing.

Lifestyle—Health Management Example

Figure 60:
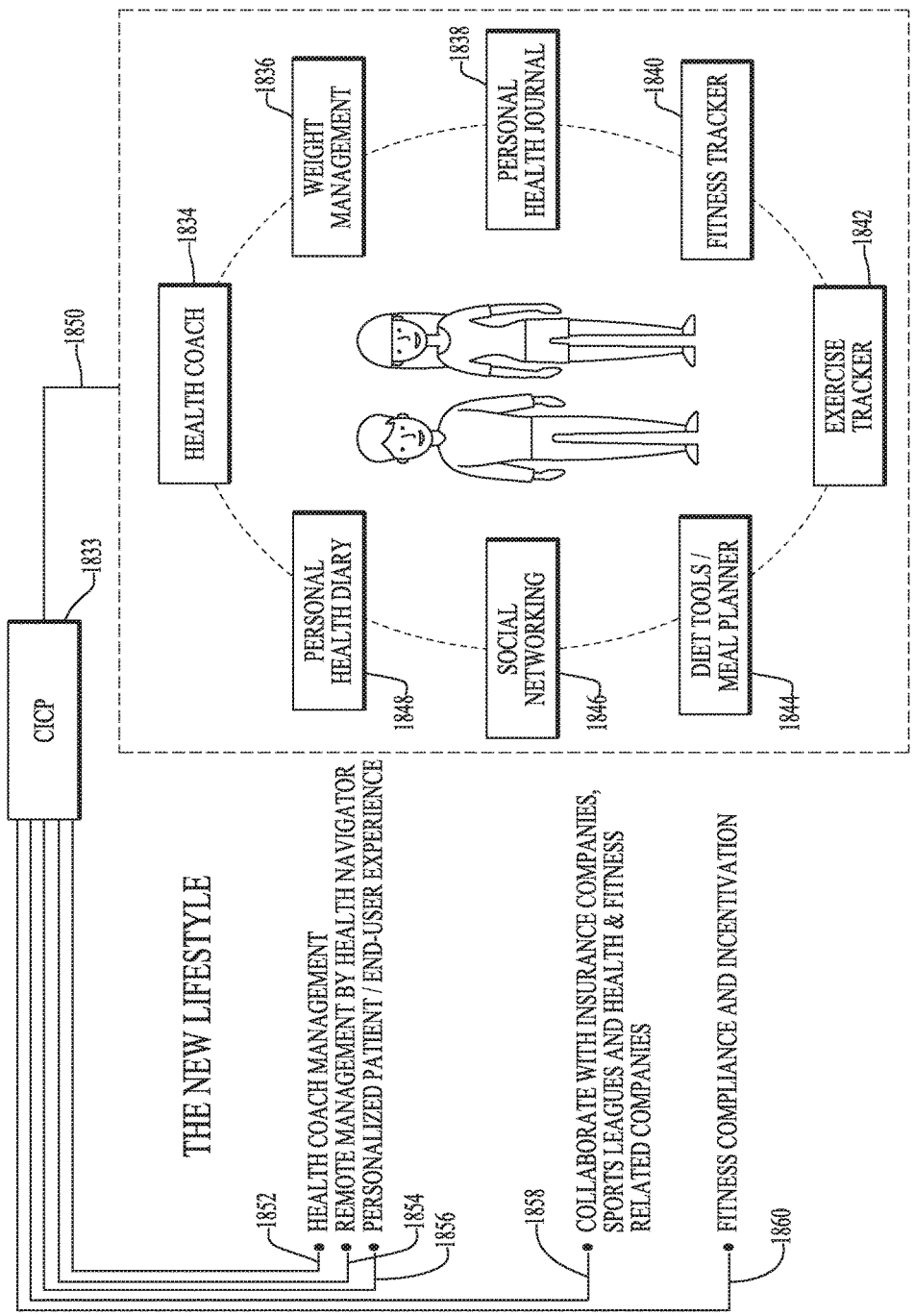
FIG. 60 is an infographic of a new lifestyle using a series of devices that deliver content, trigger and suggest healthy behavior via a series of devices that deliver content and experiences via a central SHCICP-MTCICP.

FIG. 60 depicts a new lifestyle using a series of devices that delivers content, triggers and suggests healthy behavior via a series of devices that deliver content and experiences via a central SHCICP-MTCICP 1833. Use cases such as "Health coach" 1834, "Weight Management" 1836, "Personal Fitness/Health Journal"—1838, "Fitness Tracker" 1840, "Exercise Tracker" 1842, "Diet Tools/Meal Planner" 1844, "Social Networking" 1846 and "Personal Health Diary" 1848 are use cases that can be enabled via such a system and are in bi-directional communication with the CICP as shown by link 1850. Users of the platform authorized to deliver the content and experiences can be "Health Coach Management" 1852 or "Health Navigator" 1854 or the end users themselves, 1856, all of whom that can have bi-directional communication as shown. The platform can be connected with insurance companies, sports leagues and fitness/health companies via bi-directional communication, as shown at 1858. The platform can be used to ensure compliance with fitness programs and to provide incentives as shown at 1860. This embodiment is intended to be illustrative and not all encompassing.

Figure 61:
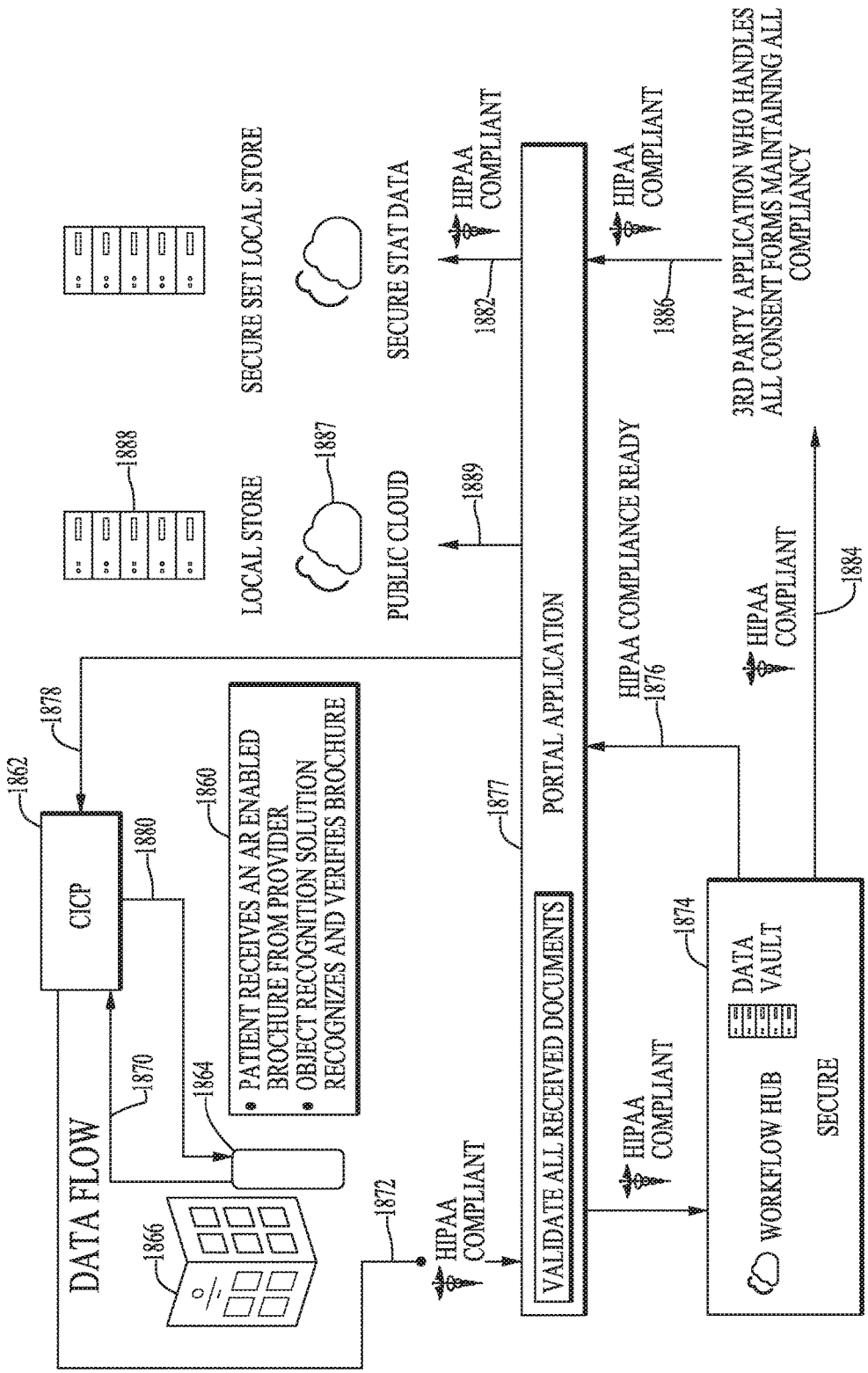
FIG. 61 illustrates the data flow for a MTCICP system used for a pre-check verification of a patient filling in pre-operation consent forms prior to having a procedure performed as described in FIG. 59.

FIG. 61 depicts the data flow for a MTCICP system denoted as CICP 1862, and used for a pre-check verification of a patient filling in pre-operation consent forms prior to having a procedure performed, as described in regard to FIG. 59. The patient is using a mobile application that is on a device 1864 that is connected with the MTCICP 1862. The mobile device 1864 triggers a video or information on the printed materials, shown at 1866 and that the patient is given to be informed about the operation or procedure. This trigger and consequent playing of the video or display of the content is recorded and verified by the MTCICP 1862 via the connected mobile app, as shown with arrows 1870 and 1880, and summarized at 1860. This video is a public video and requires neither personal identifiable information nor a HIPPAA compliant data transfer. The trigger and re-play of the video is also transferred and recorded as an event by the MTCICP 1862 that is sent to a HIPPAA compliant data base via an approved data transmission, shown at 1872. Based on these events, the MTCICP 1862 then enables a third party vendor 1874 to present the pre-op consent forms to the via communication 1876 to an approved portal application, 1877 which then communicates to the CICP 1862 the appropriate documents and approves the release of these, as shown with arrow 1878. The MTCICP 1862 then presents these documents and/or links via HIPPA compliant communication channels 1872 to the patient within the MTCICP connected mobile app on the patient's phone 1864, as shown with arrow 1880. Each data set, communication verification is sent to secure HIPPAA data storage, as shown with arrow 1882. Select and approved $3^{rd}$ party entities that are approved for HIPPAA compliant communication are alerted and communicated with, as shown at 1884 with notifications sent to the portal application, as shown at 1886. Select data that may be accessible for use in non HIPPAA compliant manners are stored in separate data storage, such as public cloud 1887, shown with arrow 1889, local data storage 1888, as shown with arrow 1889. "HIPPAA" can be replaced by other agencies, rules, laws and regulations and is meant as an illustration of a set of regulatory rules and regulations. This embodiment is for illustrative purposes and not intended to be all encompassing.

Figure 62:
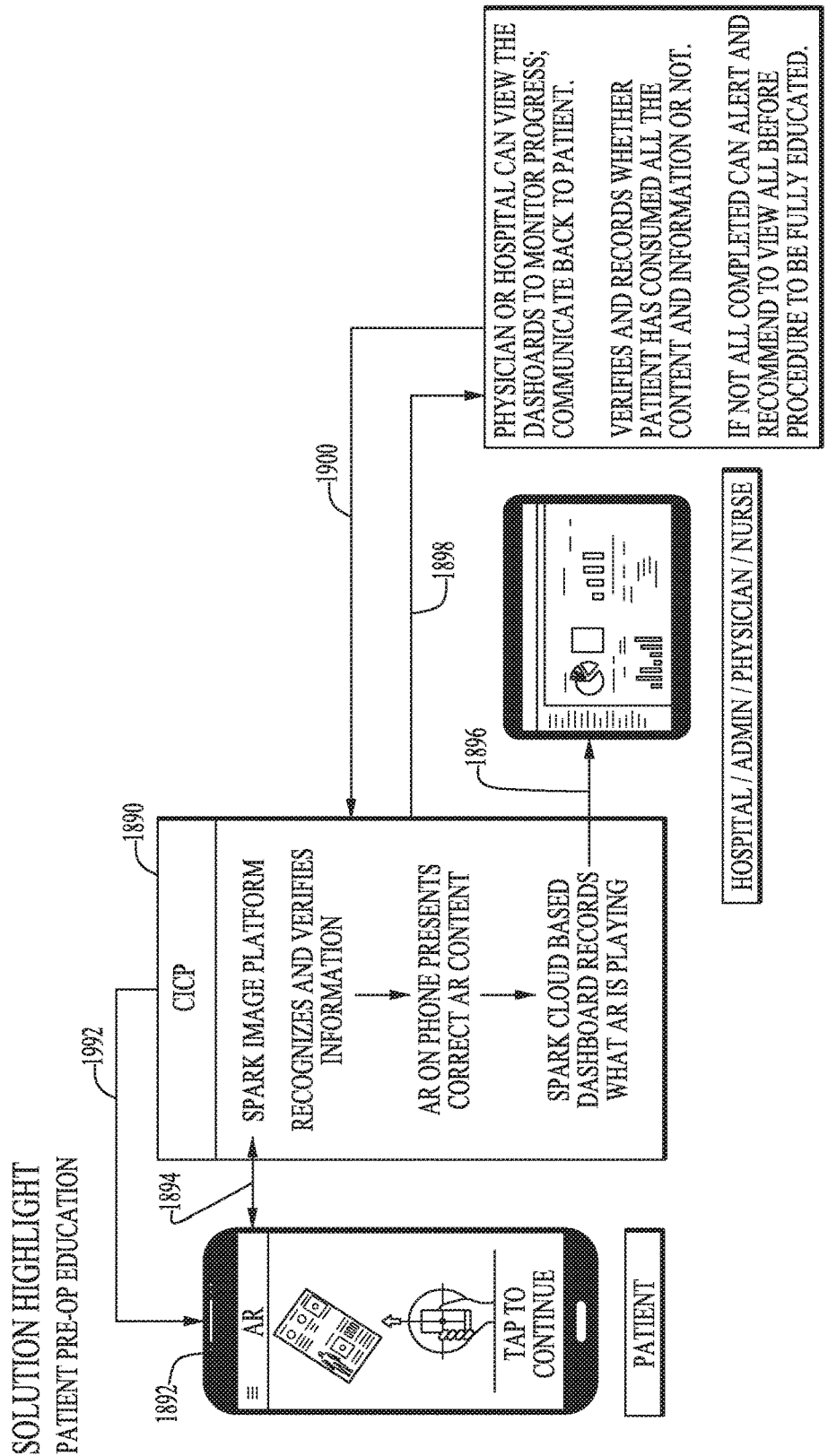
FIG. 62 illustrates an extension to FIG. 61 providing an alert presented via the MTCICP that the patient has viewed the education information and has completed the pre-operation consent forms.

FIG. 62 depicts an extension to FIG. 61, and provides an alert presented via MTCICP 1890, that the patient has viewed the educational information and has completed the pre-operation consent forms. The patient's mobile device 1892 is connected to the CICP as shown by arrow 1894 and is enabled with an augmented reality application that is controlled via the CICP 1890. The application verifies and recognizes the content the patient is looking at and verifies that the patient has viewed and interacted with the AR content such as educational videos as described. This verification of the patient consuming the curated content delivered is captured by the CICP 1890 and the verification of the patient's actions are captured, recorded and retained by the CICP. This verification, shown by arrow 1896, is sent to staff, admins, check-in personnel, hospital administrators, physicians, care givers and any others that have been granted permission to know, to be alerted or to control the information by the MTCICP. The approved staff members will be informed about the patient status, as shown at 1898, and, if the patient has failed to complete any of the above, the system will alert the appropriate personnel so that corrective actions can be taken. The staff then can send instructions to the CICP 1890, as shown with arrow 1900 which then records and retains these instructions, then sends communications and suggested corrective measures, information, and/or instructions to the mobile device 1892, as shown with arrow 1992. This embodiment is for illustrative purposes and not intended to be all encompassing.

Figure 63:
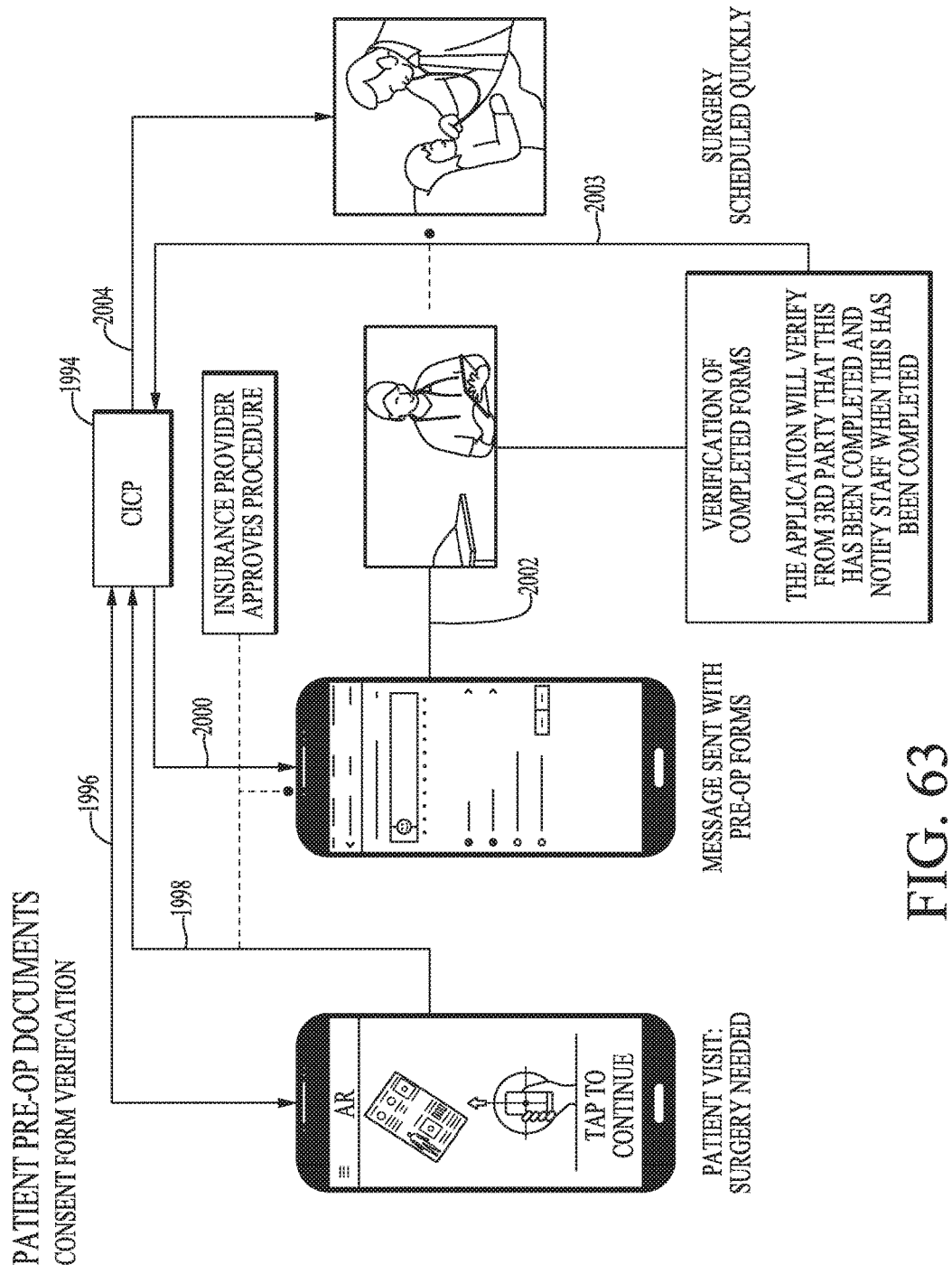
FIG. 63 is an extension of the data flow shown in FIG. 62, FIG. 61 and FIG. 59, showing that an insurance company has been granted access to the MTCICP that controls the patient's mobile app.

FIG. 63 extends the data flow shown in FIG. 62, FIG. 61 and FIG. 59. In this FIG. 63 illustration, an insurance company has been granted access to the MTCICP 1994 that controls the patient's mobile app with bi-directional communication, as shown at 1996. The MTCICP 1994 will alert the insurance company when the patent has viewed the education information, as shown at 1998 and presented the appropriate forms to the patient and informs the insurance company, as shown at 2000, and 2002 based on this event. Once these forms have been sent and completed, the alert is sent to the CICP, as shown at 2003. The MTCICP 1994 can then also send the pre-op form alerts and integration/verification as described above regarding the transmission in 2003, with a confirmation that the surgery is approved as shown in the figure at the end of arrow 2004. This is a use of the MTCICP event-action-verify-record architecture. This embodiment is for illustrative purposes and not intended to be all encompassing.

Figure 64:
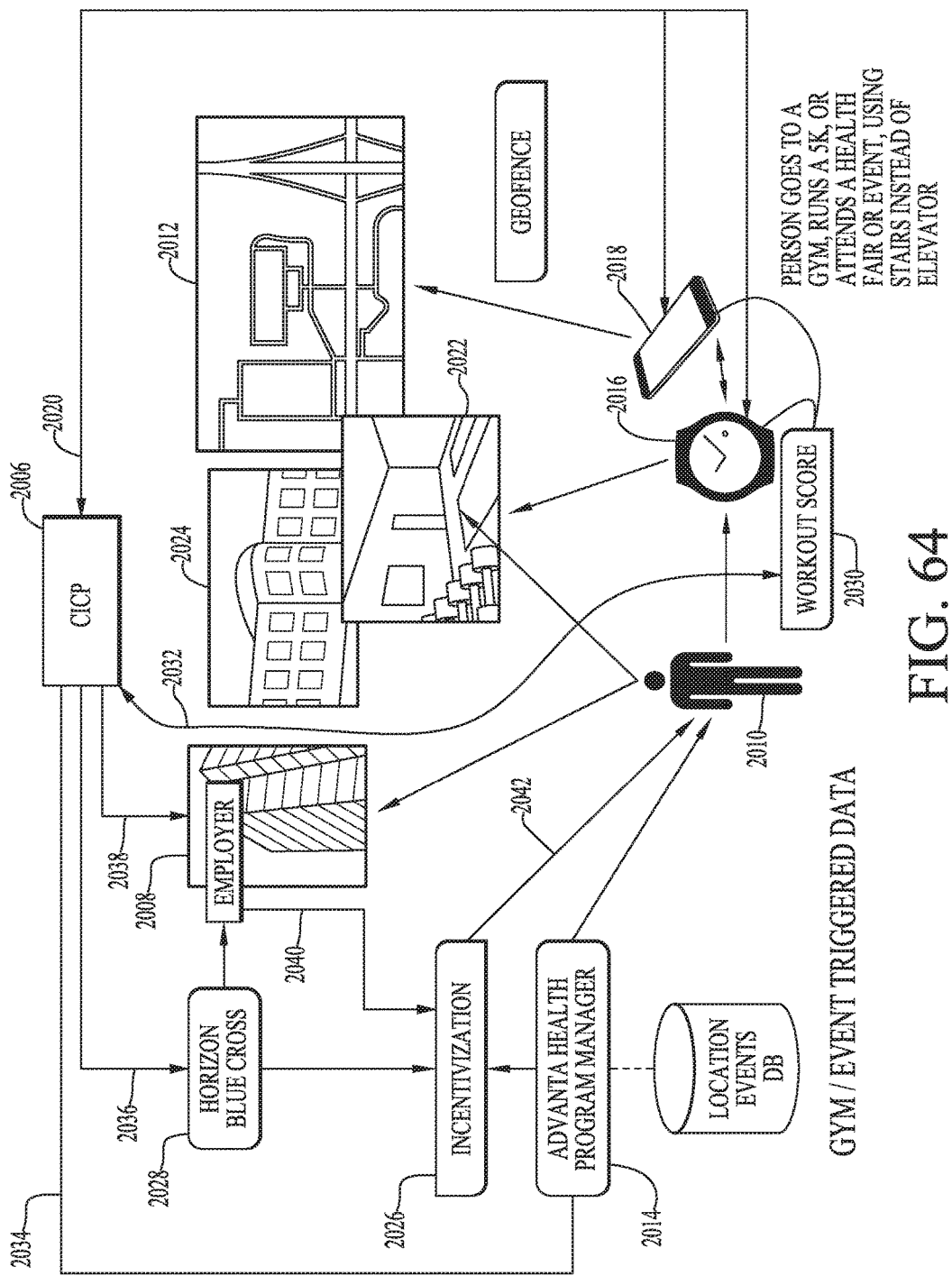
FIG. 64 is a schematic overview illustrating a SHCICP-MTCICP installation in a fitness gym or similar facility as operated by a corporation—depicted as "Employer"—that is interested in maintaining a healthy staff.

FIG. 64 is a schematic overview that illustrates a SHCICP-MTCICP, depicted as CICP 2006 as an installation in a fitness gym or similar facility as operated by a corporation 2008—depicted as "Employer" that is interested in maintaining a healthy staff, shown at 2010. The facility can also be any geographical location 2012 that is preprogrammed in the SHCICP-MTCICP 2006. The master tenant administrator of the SHCICP-MTCICP 2006 can be the corporation, or the program operator might be a third party, in this exemplary embodiment depicted as "Advanta Health" 2014. The end user 2010 is performing a series of exercises that are captured by wearable sensors such as a smart watch 2016 and/or a mobile phone 2018 that have an application that integrates and has bi-directional communication with the SHCIP-MTCICP 2006 and records the user's activities as shown by arrow 2020. The devices can include verification of attendance at, for example, locations 2012, physical gyms, 2022, the corporate offices or facilities, 2024, and/or basically any location that has been defined or programmed into the SHCICP-MTCICP 2006. The "Program Manager" 2014 may have employed an incentivization algorithm or command or campaign alone, 2026 or with the help of a medical insurance company or health care organization or any other qualified and approved third party, here depicted as "Horizon Blue Cross" 2028. Information regarding the work out that the user is/was performing during a workout out in any of the identified locations, fitness gyms, and/or activities that are related to fitness such as going for a long walk, attending a health fair, using stairs instead of elevators and other physical activity, is aggregated into a "workout score" 2030 that is transmitted to the CICP, as shown with arrow 2032. The user's score is shared with the health program manager, 2014, with the medical insurer 2028, as shown at 2036 and with the employer 2008, as shown with arrow 2038 in accordance with privacy laws and regulations. The employer can then send incentive instructions, shown at 2040 to incentivization program 2026 as shown with link 2040 with personalized incentives sent to the end user, as shown with arrow 2042. This can be used to enable the SHCICP-MTCICP 2006 to deliver messages, incentives, rewards, encouragement, motivation or other messages to encourage the user 2010 to have a healthy lifestyle with the capability to offer rewards for such compliant behavior. This embodiment is for illustrative purposes and not intended to be all encompassing.

Figure 65:
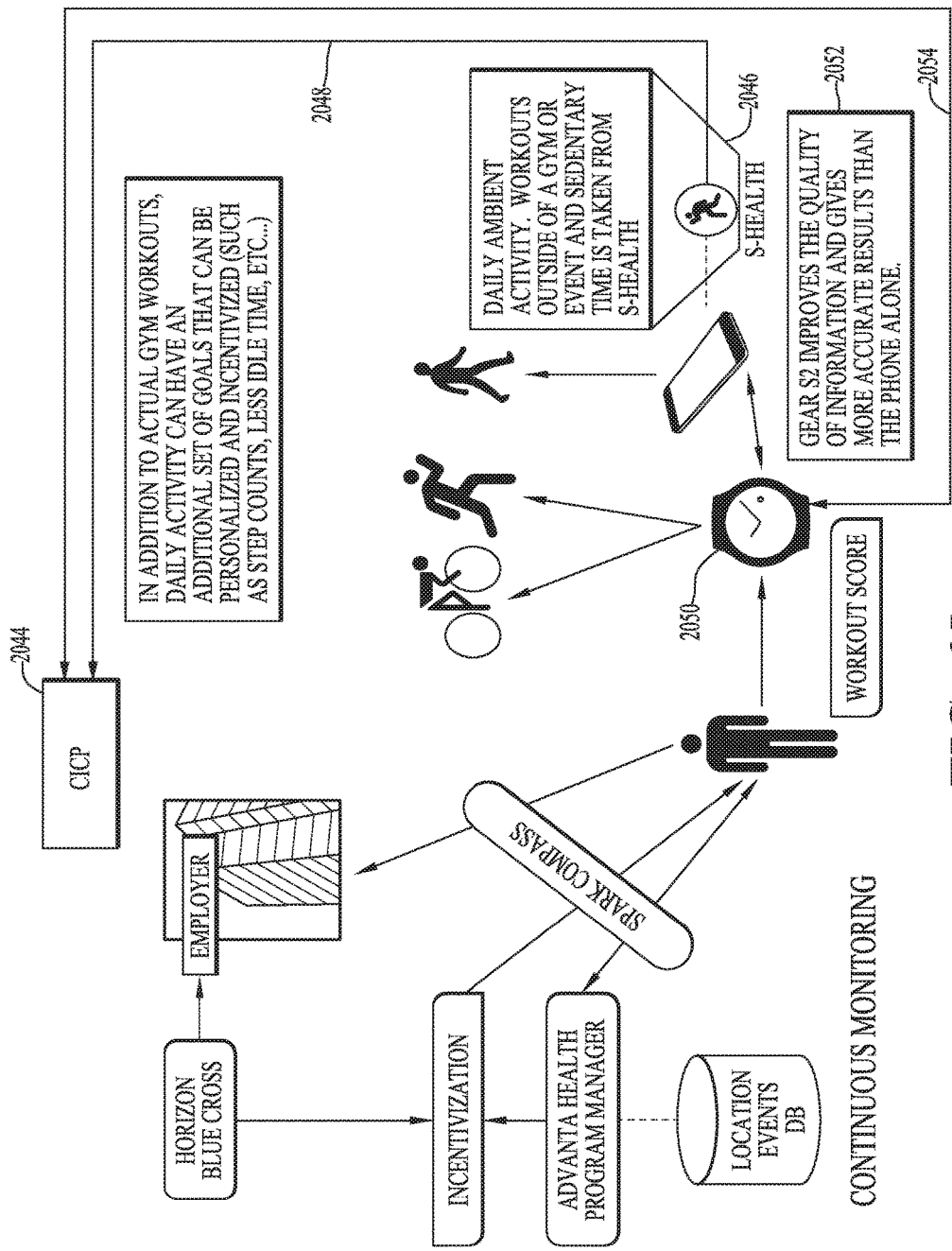
FIG. 65 illustrates an extension to the architecture shown in FIG. 64, and in which the SHCICP-MTCIP enables continuous monitoring upon user approval.

FIG. 65 is an extension of the architecture described in FIG. 64. In this FIG. 65 embodiment, the SHCICP-MTCIP 2044 is enabling continuous monitoring should that be desired and approved by the user. A total overview of the user's lifestyle and fitness level can then be monitored as information is captured by the devices, depicted as "S-Health" 2046. These data are transmitted to the CICP 2044, as shown with arrow 2048. Mobile wearable devices depicted as "Gear S2" 2050 can be integrated with the SCHICP-MTCICP, as shown with arrow 2054 to provide accurate data regarding user motions and activities, as shown at 2052. The data can be used to enhance the information about the user in the FIG. 64 and/or FIG. 65 embodiment. This embodiment is for illustrative purposes and is not intended to be all encompassing.

Airport Example

Figure 66:
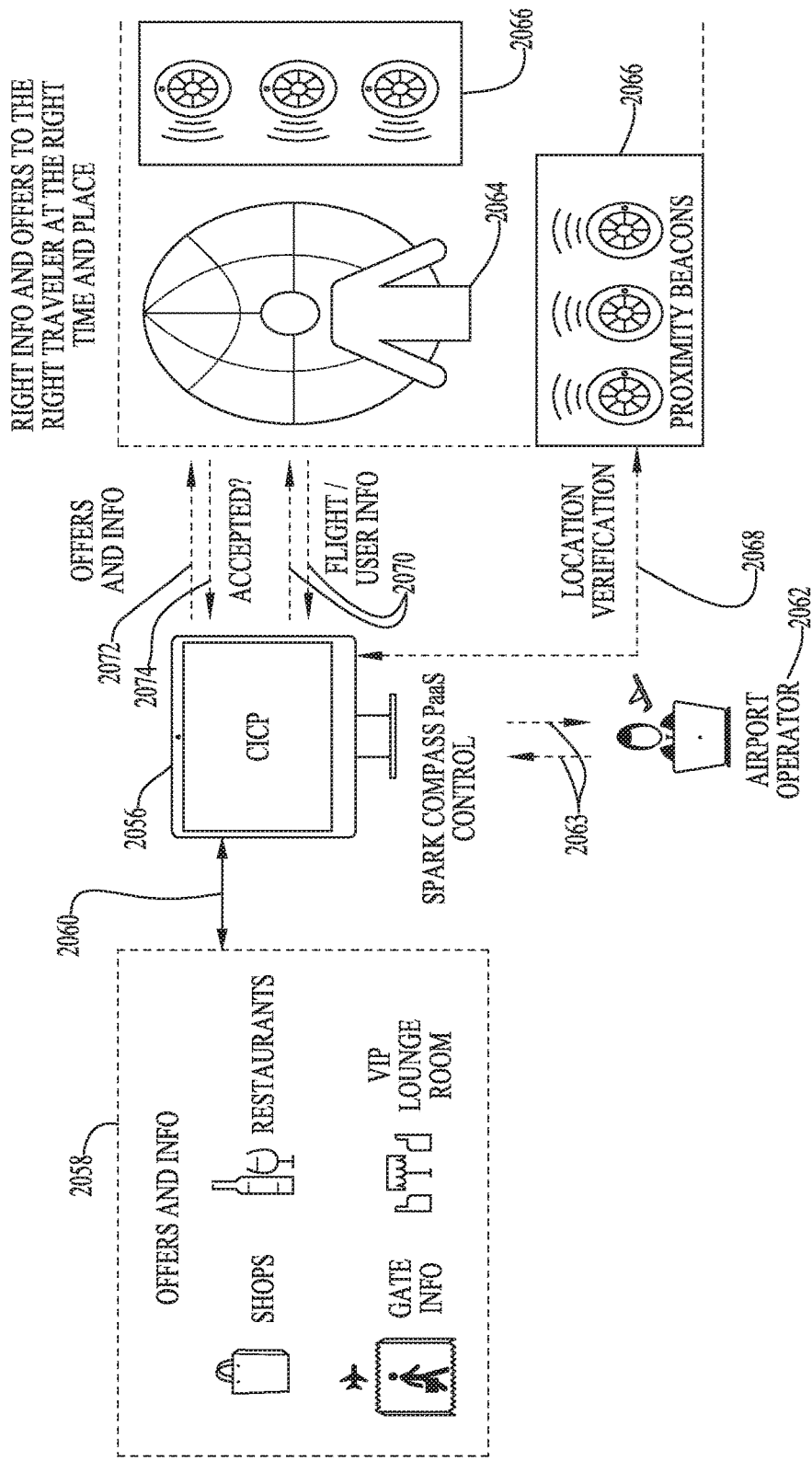
FIG. 66 depicts the SHCICP-MTCICP infrastructure as installed in an airport, and in which offers and information from various tenants as well as facility information such as lounge location and other relevant information such as gate information are presented into the SHCIP-MTCICP depicted as "Spark Compass PaaS" control.

FIG. 66 depicts SHCICP-MTCICP 2056 with infrastructure as installed in an airport. Offers and information 2058 from various tenants as well as facility information such as lounge location and other relevant information such as gate information, are presented into and from the SHCIP-MTCICP 2056, depicted here as "Spark Compass PaaS" Control 2056 and which is in bi-directional communication with the offers and information 2058, as shown with link 2060. The system and over-all control of the SHCICP-MTCICP 2056 is the Master Tenant, depicted as "Airport Operator" 2062 as shown with bi-directional communication, input and feedback at 2063, and that enables the operator real time controls and real time feedback on curated content communicated throughout the platform. Travelers 2064 moving across the airport facility are in contact with sensors such as proximity beacons 2066 as the travelers move across the facility. These interactions provide location identification and proximity verification shown with link 2068 of a user as he moves across the facility, and this is communicated to the SHCICP-MTCICP 2056 and verified. Gate and flight information can then be sent to the user based on the data provided to the SHCICP-MTCICP and based on the location of the user, as shown with arrows 2070. If the user is at the right location, such as the gate that the user's flight is departing from, gate information will not be transmitted. Similarly information and offers can be presented based on location and their relevance. Some information that is nearby may be highlighted and sent first, while other information about things further away may be presented in a discovery/search mode. This presentation of curated content offers and experiences is shown with arrow 2072. Any offer accepted can be transmitted back to the SHCICP-MTCICP 2056 for further processing, as shown with arrow 2074. This embodiment is for illustrative purposes and not intended to be all encompassing.

Smart City Example 2

Figure 67:
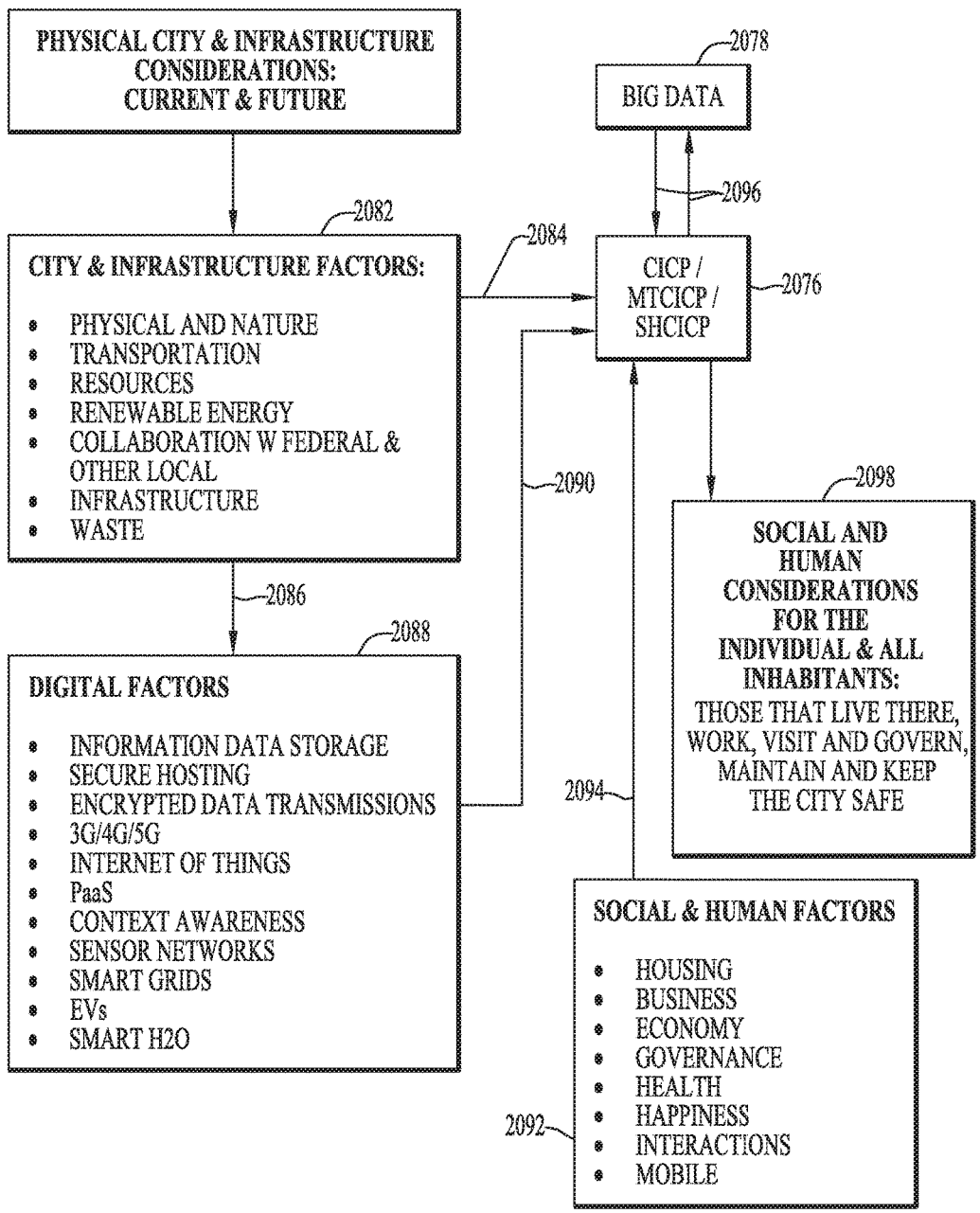
FIG. 67 depicts a high level overview of an "Intelligent Platform for a Smart City" that incorporates a control platform powered by a SHCICP-MTCICP that incorporates Big Data to ensure social factors while defining the SHCICP-MTCICP infrastructure across the city.
Figure 68A:
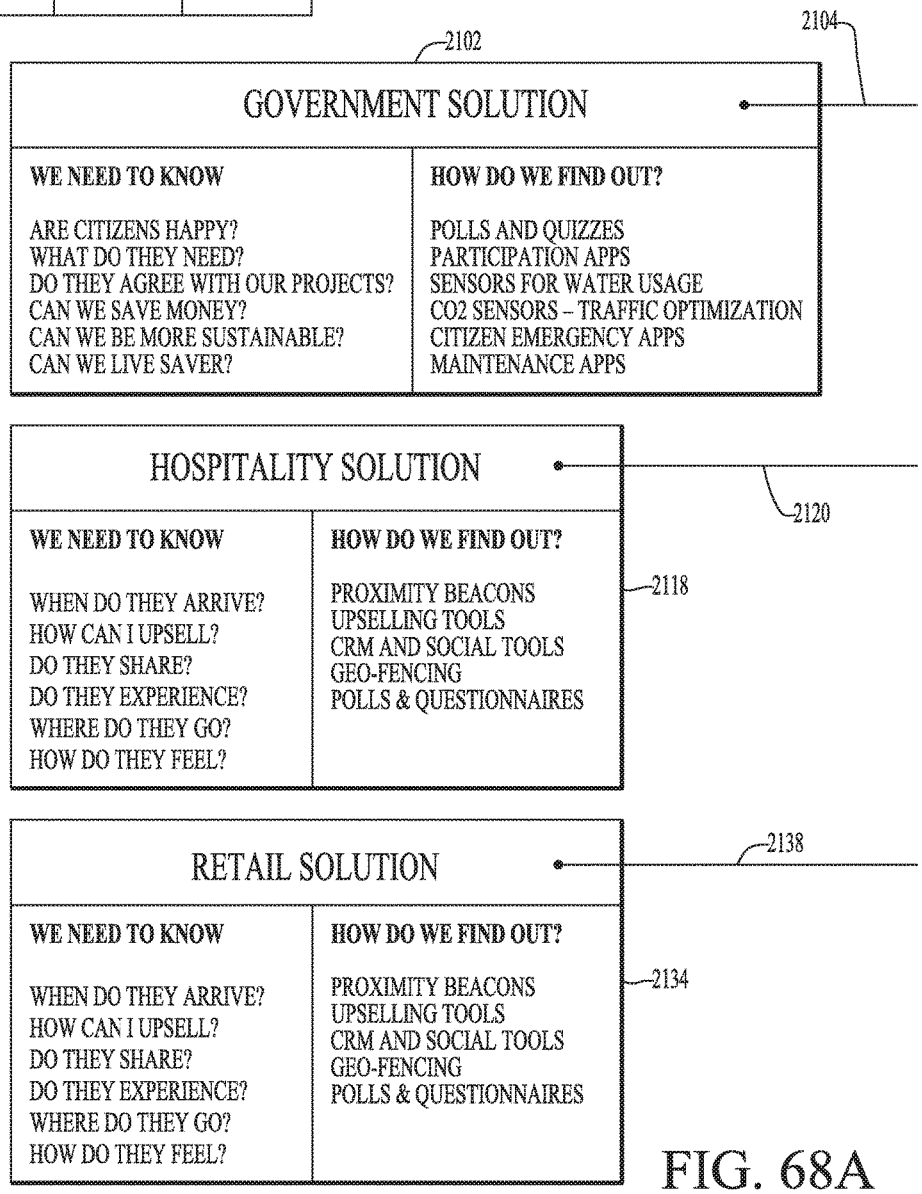
FIG. 68A depicts the first part of the FIG. 68 extended flow.
Figure 68B:
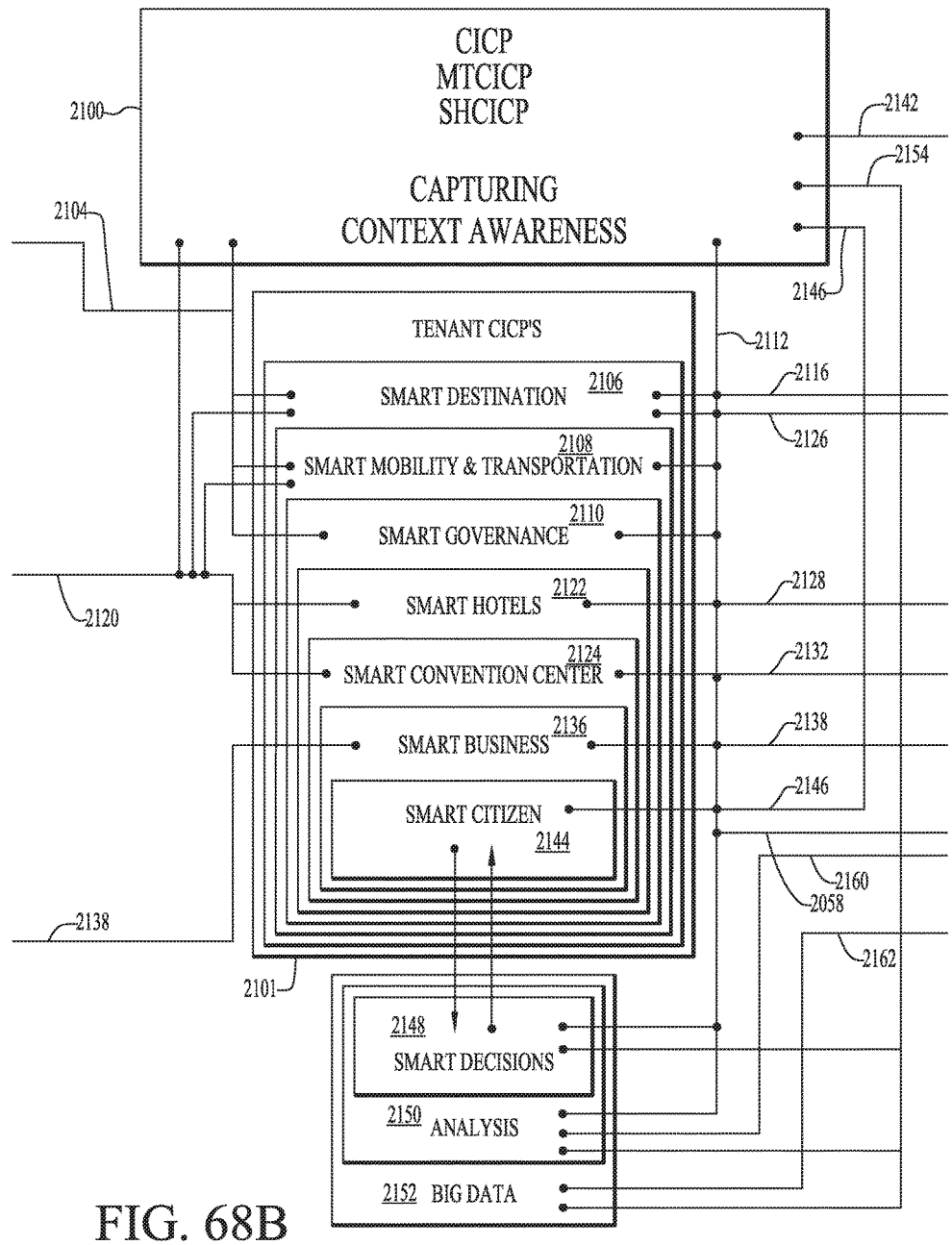
FIG. 68B depicts the second partial view of the FIG. 68 extended flow.
Figure 68C:
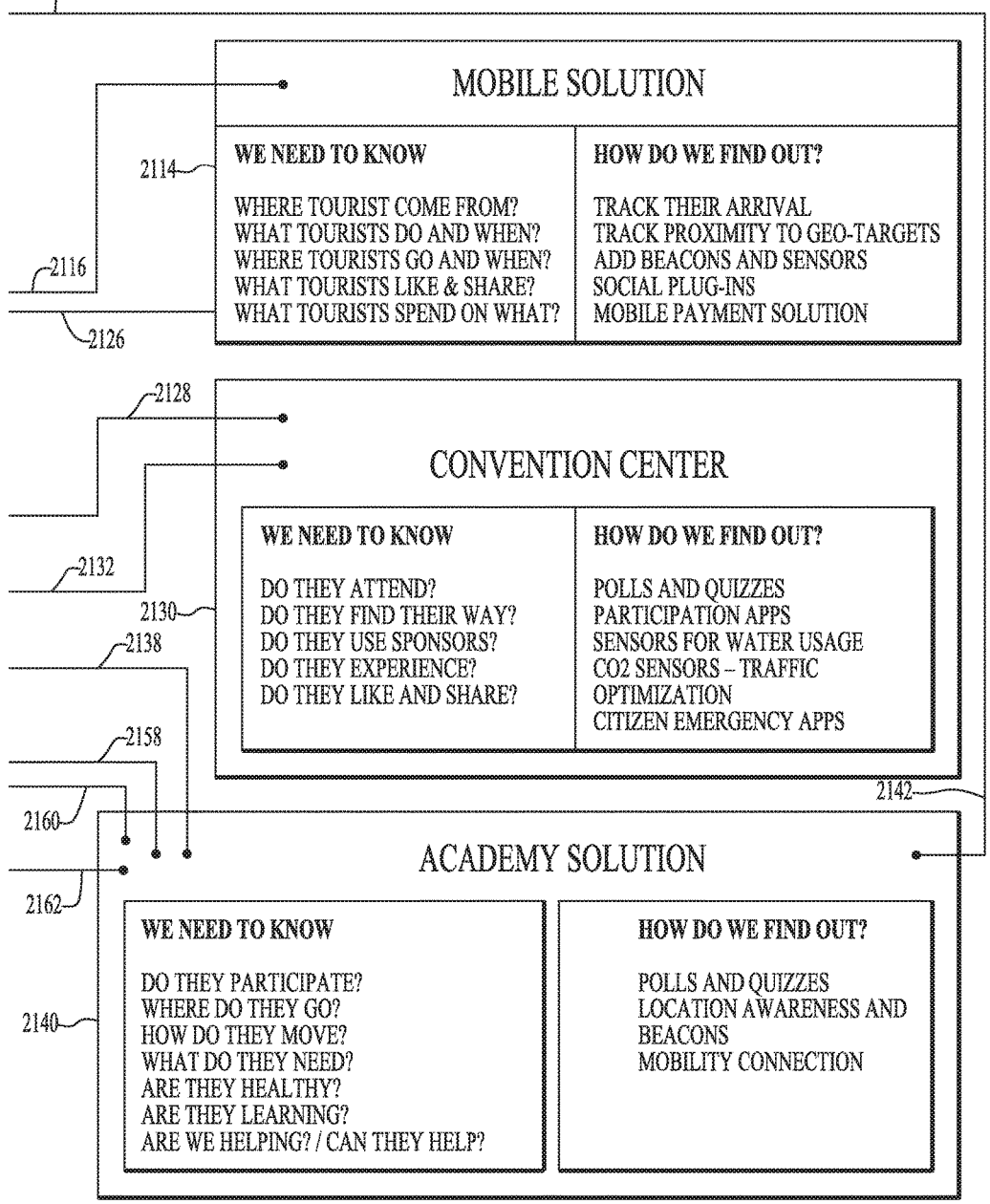
FIG. 68C depicts the second partial view of the FIG. 68 extended flow.

FIG. 67 depicts a high level overview of an "Intelligent Platform for a Smart City" that incorporates a decision and evaluation platform powered by a SHCICP-MTCICP 2076 that incorporates Big Data 2078 to ensure social factors while defining the infrastructures such as SHCICP-MTCICP 2076 deployments across the city. This flowchart identifies the variables, features, technologies, considerations, parameters and factors that might go into consideration to define the sensors, both physical and digital, work and data flow for a SHCICP-MTCICP infrastructure installation. In this embodiment the city's current and future infrastructure needs are under consideration, referred to as "City & Infrastructure Factors 2082. The factors are defined, and used as input to the CICP 2076, as shown with arrow 2084, and also as considerations for the digital factors for infrastructures and physical build out, referred to as Digital Factors 2088 that are in communication with the City & Infrastructure Factors as shown with arrow 2086. The digital factors are then presented to the CICP 2076, as shown with arrow 2090. Social and Human Factors, 2092 are separate considerations and also communicated to the CICP as shown with arrow 2094. Combining all this data and CICP computation with input and feedback from big data is shown with the bi-directional communication to and from the CICP at 2096. The output of these combined considerations and computations drives output, 2098 that is referred to as "Social and Human Considerations for the Individual & All Inhabitants" 2098, that is, those who live there, work there, visit and govern there, and maintain and keep the city safe. This embodiment is for illustrative purposes and not intended to be all encompassing.

FIG. 68, FIG. 68A, FIG. 68A, FIG. 68B and FIG. 68C extend the flow illustrated in FIG. 67 by depicting the considerations and interactions between the various vertical use cases for a master city wide SHCICP-MTCICP-CICP 2100 with sub-tenant SHCICP-MTCICP system installations 2101 in various areas that capture context awareness to deliver contextually intelligent curated experiences across the city. In this illustration, a government solution 2102 is in bi-directional communication with the CICP 2100 as shown with link 2104 as well as with a series of sub-tenant CICPs 2101, such as, Smart Destination 2106, Smart Mobility and Transportation 2108, and Smart Governance 2110. The needs and desires, as a sampling on how these are determined for the government are shown at 2102. The output from the sub-tenant CICPs, such as, for example Smart Destination 2106, Smart Mobility and Transportation 2108, and Smart Governance 2110 are aggregated and transmitted in bi-directional communication with the CICP 2100, as shown by link 2112, and with the Mobile Solution 2114 as shown with link 2116. The needs and desires, shown as a sampling of how these are determined in the Mobile Solution, for example are shown at 2114. A Hospitality Solution 2118 is shown with its needs and desires. The Hospitality Solution 2118 is in bi-directional communication with the CICP 2100 as shown with link 2120 as well with a series of sub-tenant CICPs 2101, such as Smart Destinations 2106, Smart Hotels 2122, Smart Mobility and Transportation 2108 and Smart Convention Center 2124, for example. The needs and desires, as a sampling on how these are determined for the hospitality are shown, for example at 2118. The output from the sub-tenant CICP Smart Destination 2106 is in bi-directional communication with the Mobile Solution 2114 as shown with link 2126. The output from the Smart Hotels 2122 to the Convention Center 2130 is shown with link 2128. The output from the Smart Convention Center 2124 is sent in bi-directional communication to the Convention Center 2130 as shown with link 2132. The aggregated data and all relevant information is also communicated in bi-directional communication to the master CICP 2100 as shown with link 2112. The needs and desires for the Convention Center 2130 are shown as a sampling of how these are determined for example, as shown in 2130. A Retail Solution 2134 is also connected to the CICP 2100 and is shown with its needs and desires. The Retail Solution 2134 is in bi-directional communication with the sub-CICP "Smart Business" 2136 as shown with link 2138. The output from the sub-tenant CICP Smart Business 2136 is communicated in bi-directional communication to the Academy Solution 2140 as shown with link 2138. The aggregated data and all relevant information is also communicated in bi-directional communication to the master CICP 2100 as shown at link 2112. The needs and desires for the Academy Solution 2140 are shown as a sampling on how these are determined, at 2140. The Academy Solution 2140 is providing knowledge and information and receiving data from the CICP 2100 in bidirectional communication as shown at 2142. Smart Citizen(s) 2144 are in bi-directional communication with the CICP 2100 as shown at link 2146. They also have access to and are in bi-directional communication with Smart Decisions 2148, Analysis 2150 and Big Data 2152, which are in bi-directional communication individually and collectively with the CICP 2100 as shown with link 2154. These are in bi-directional communication with the Academy Solution 2140 also, with Smart Decisions 2148, as shown with link 2158, Analysis 2150, as shown with link 2160 and with Big Data 2152, as shown with link 2162. Complete feedback loops for each and every solution, sub-CICP and master CICP are enabled at every level by the bi-directional communications. Each interaction, communication, action, content, offer, instruction, result, action, activity and location is captured, recorded and retained at the appropriate level to continue to improve the next communication thereby creating augmented intelligence for the contextually intelligent communications of the curated content presented. This embodiment is for illustrative purposes and not intended to be all encompassing.

Big Data Aggregation Example

Figure 69:
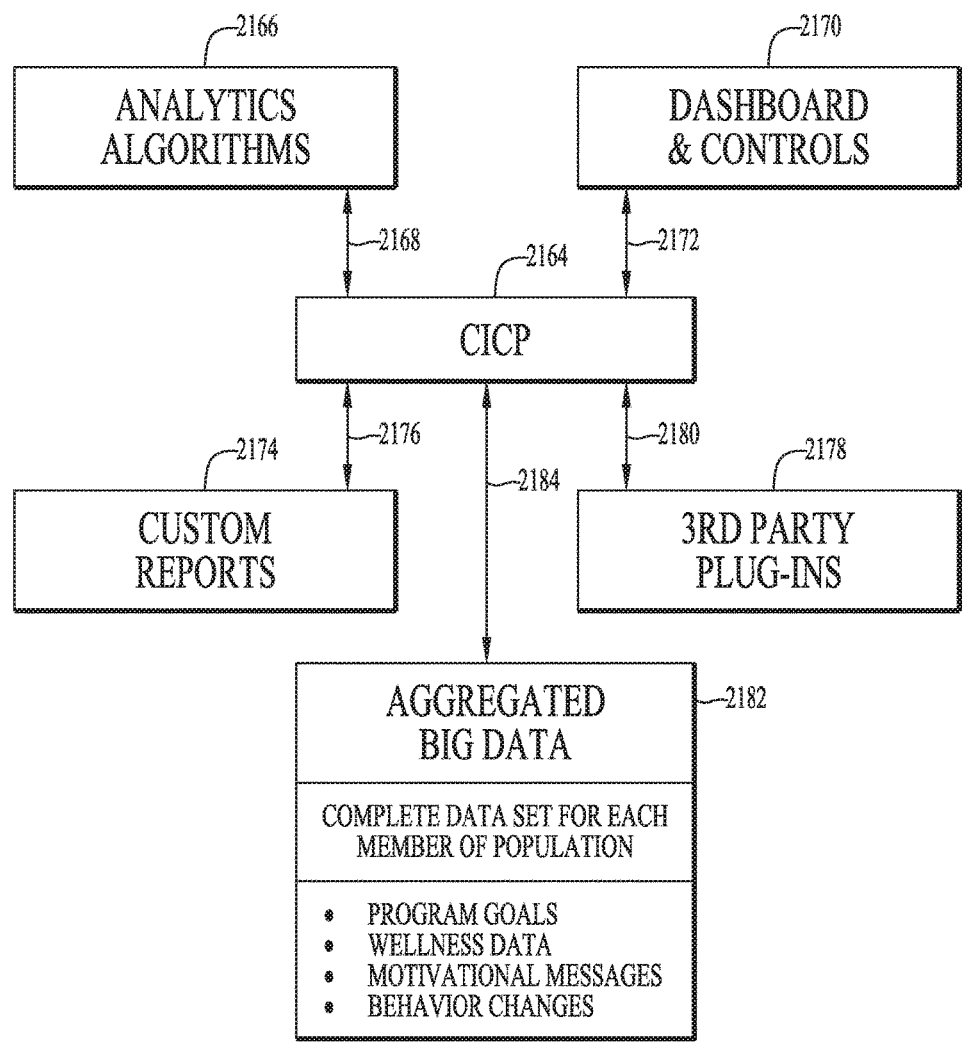
FIG. 69 depicts a way in which a CICP-MTCICP or SHCICP-MTCICP can aggregate "Big Data" to prepare custom reports, can be used to power or integrate with $3^{rd}$ Party Plug-ins, can presented in on-line dashboards and can also be integrated with additional data sets to provide data insights.
Figure 70:
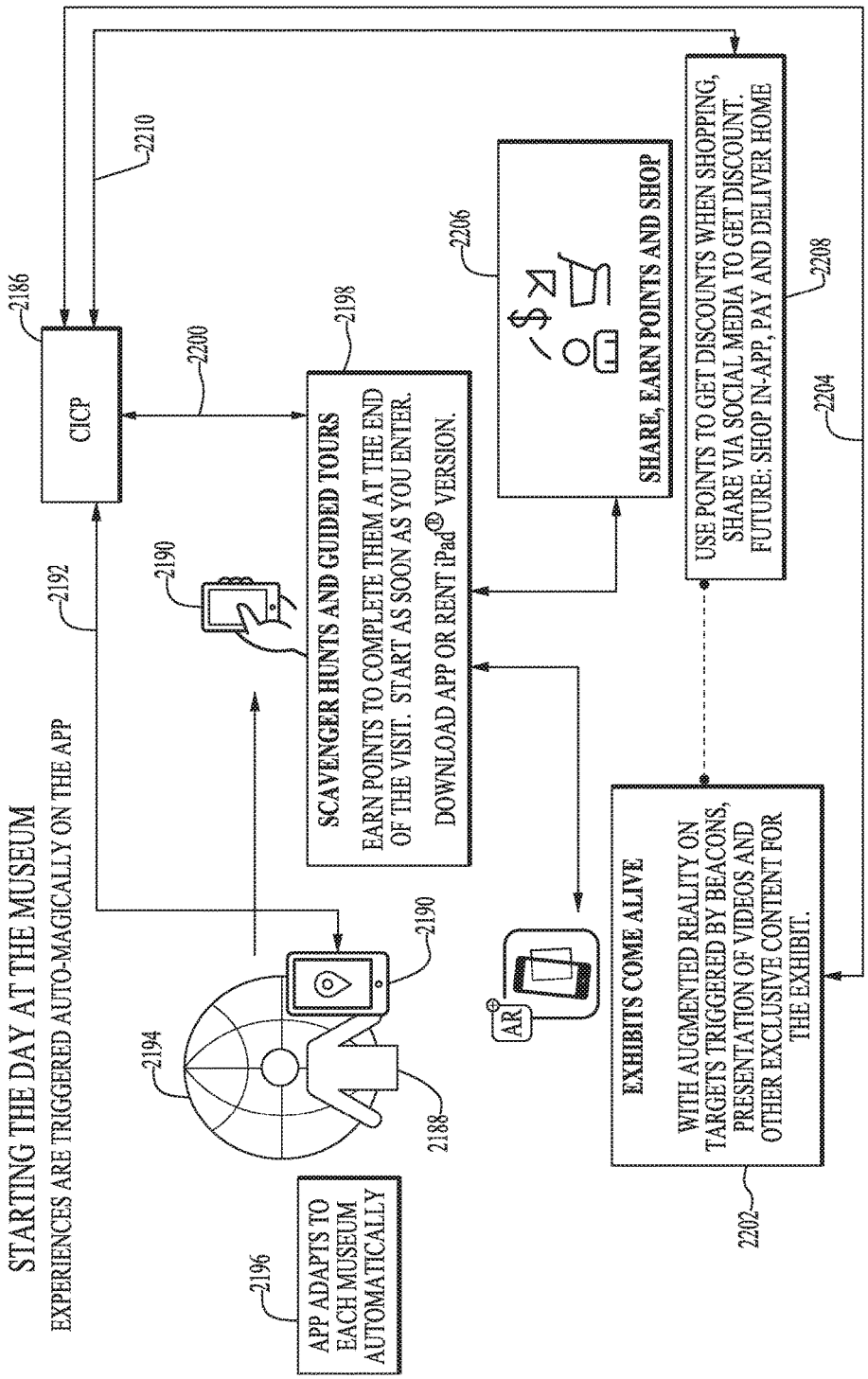
FIG. 70 depicts a use case where a museum has installed a SHCICP-MTCICP infrastructure.

FIG. 69 depicts the way a CICP, MTCICP or SHCICP-MTCICP can aggregate "Big Data" to prepare custom reports, can be used to power or integrate with $3^{rd}$ Party Plug-ins, can be presented in on-line dashboards and can also be integrated with additional data sets to provide data insights. Here, the CICP 2164 has a series of analytical programming algorithms as well as computational algorithms incorporated, on-board and on connected devices and on sensors and other associated computers together shown at 2166. They are in bi-directional communication with the CICP 2164, as shown with arrow 2168. The CICP 2164 is controlled and observed real time via "Dashboard & Controls" 2170 with bi-directional communication as shown at 2172. In addition to the real time dashboard reporting and interfaces, Custom Reports 2174 can be generated and integrated in bi-directional communication with CICP 2164, as shown with arrow 2176. In addition to the on-board CICP computation and the Algorithms and Analytics 2166, $3^{rd}$ party plug-ins, shown at 2178 can be integrated in bi-directional communication, shown with arrow 2180. The CICP 2164 can provide output calculations, preserve and record data and information, record and retain data and communications, actions and events, results, activities and interactions individually or aggregated as noted as Aggregated Big Data 2182. The data can be personal and a data set can be retained for each individual member of each population with some examples shown at 2182. The data will be updated and dynamic by the bi-directional communication shown with arrow 2184. This embodiment is for illustrative purposes and is not intended to be all encompassing Museum Example FIG. 70 depicts a use case where a museum has installed a SHCICP-MTCICP infrastructure in a CICP 2186. A visitor 2188 has installed a mobile app on his mobile device 2190 that is connected to the SHCICP-MTCICP 2186 with bi-directional communication as shown with arrow 2192. This app opens automatically when crossing the geo-fence 2194 around the museum as set by the SHCICP-MTCICP 2186 and as noted at 2196. Various experiences across the museum can be automatically triggered and enabled within the app such as noted at 2198 and 2202 and as defined and programmed from the SHCICP-MTCTCP 2186, all of which are in bi-directional communication shown as links 2200 and 2204. These experiences can range from AR experiences showcasing exhibits with curated content, to providing information or creating games such as scavenger hunts, as shown at 2198. As the visitor moves across the museum the system can award points, shown at 2206. If the user performs tasks such as completing quizzes or surveys, shares photos of the experience on social networks or does other actions based on messages transmitted from the SHCICP-MTCICP 2186, he can earn points, shown at 2198, via bi-directional communication shown at, for example, 2204. He can then use these points for prizes or use the app to purchase products in the museum shop, shown at 2208, all enabled via the app as controlled and managed by the SHCICP-MTCICP 2186 and the known location of the visitor, via bi-directional communication shown at 2210.

This embodiment is for illustrative purposes and not intended to be all encompassing.

Transportation Company Example

Figure 71:
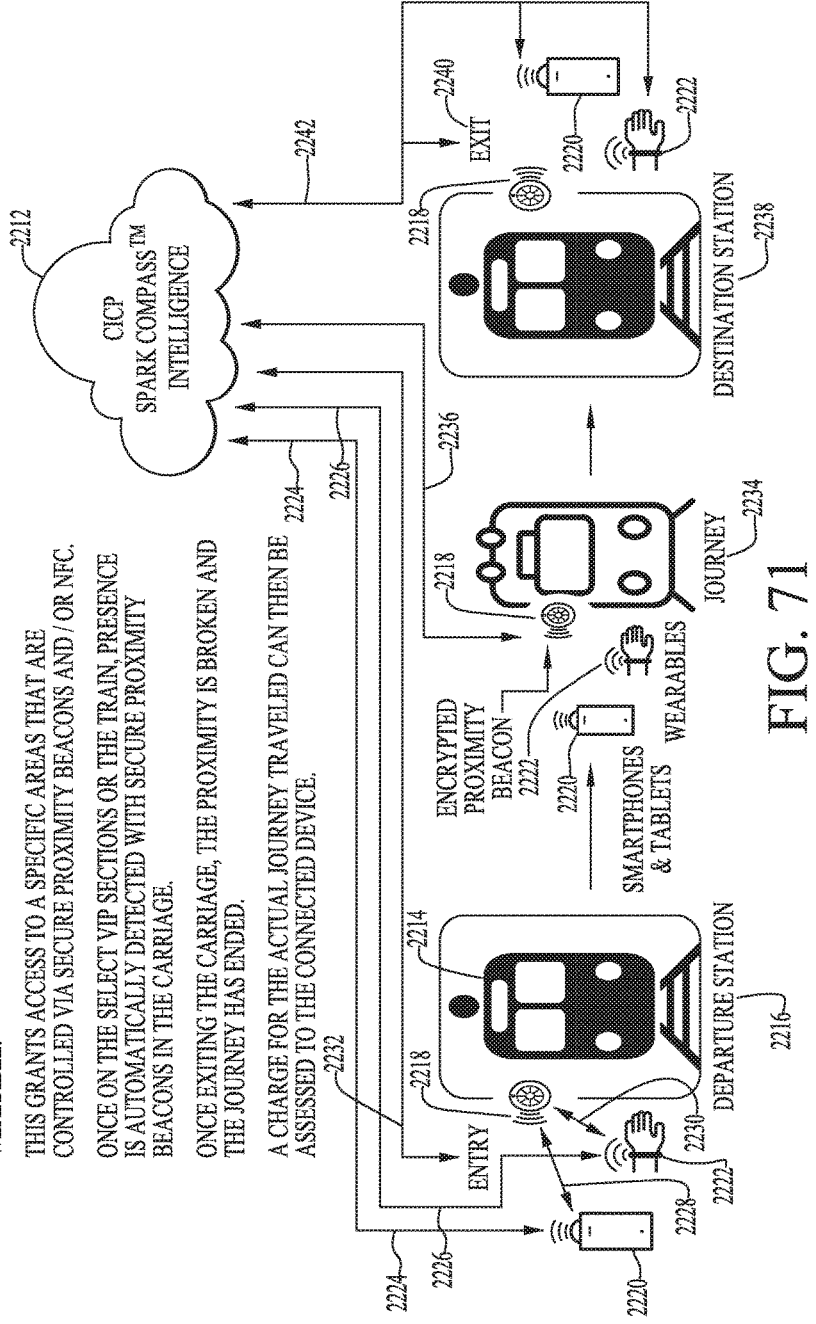
FIG. 71 depicts the use of a SHCICP-MTCICP for automatic payment by travelers using a train/trolley transportation system.

FIG. 71 depicts the use of a SHCICP-MTCICP 2212 used by a transportation company for the automatic payment for the travelers using their transportation system, in this case a train/trolley system. The SHCIC-MTCICP 2212 is depicted as "Spark Compass™ intelligence" 2212. A train 2214 arrives at a station "Departure Station" 2216. This train has beacons and sensors 2218 installed and that are identified and integrated into the SHCICP-MTCICP 2212. A traveler enters the train and his "Smartphones and tablets" 2220 and/or "Wearables" 2222 that have an application installed and that integrates with the SHCIC-MTCICP 2212 come into proximity to the beacon on the train via bi-directional communication, respectively, shown with arrow 2224 for the mobile device 2220 and with arrow 2226 for the wearable 2222. This interaction can include an interaction with an "Encrypted Proximity Beacon" 2218 for the mobile device 2220 as shown with arrow 2228, and for the wearable as shown with arrow 2230. This interaction is recorded as an action by the SHCICP-MTCICP 2212 as the beginning of the journey via the established bi-directional communication, shown at 2224 for the mobile device and at 2226 for the wearable. Time, date, location and user identity can be recorded as well and transmitted to the SHCICP-MTCICP 2212, retained and recorded there as well using the same bi-directional communication. The total number of travelers on the specific wagon or section of the train can also be recorded and retained via door sensors, on-board video systems, beacon interaction or other means to count people, and communicated via direct and/or bi-directional communication to the SHCICP-MTCICP 2212, as shown with arrow 2232. The proximity between the beacons 2218 and the devices 2220 and wearables 2222 will remain during the trip and time the train is travelling as they are within range of each other with the travel denoted by "Journey" 2234, with on going bi-directional communication occurring as needed and when needed as shown with arrow 2236. As the traveler arrives at the "Destination Station" 2238 he leaves the train and the proximity between the sensors and beacons 2218 on the train and the traveler's device 2220 and/or 2222 is broken. This event is denoted as "Exit" 2240 and denotes the end of the journey for the traveler. As is well known, this information is transmitted to the SHCICP-MTCICP 2212 by communicating sensors on the train 2218, the mobile device 2220 and/or the wearable 2222 in bi-directional communication as shown by arrow 2242. A charge can then be assessed by the pre-programmed SHCIC-MTCICP 2212 based on the distance between the "Departure Station" 2216 and the "Destination Station" 2238, which is the current normal fare structure. A dynamic charge can be added to, or replace this fee based on length of time of the journey, time of day, day of the week, specific date, number of travelers, weather, and any other parameter that the SHCIC-MTCICP 2212 has been programmed to recognize, calculate, predict or in other ways consider, or it can be displayed by the SHCIC-MTCICP 2212 for an operator to select, program or otherwise influence. This embodiment is for illustrative purposes and not intended to be all encompassing.

Figure 72B:
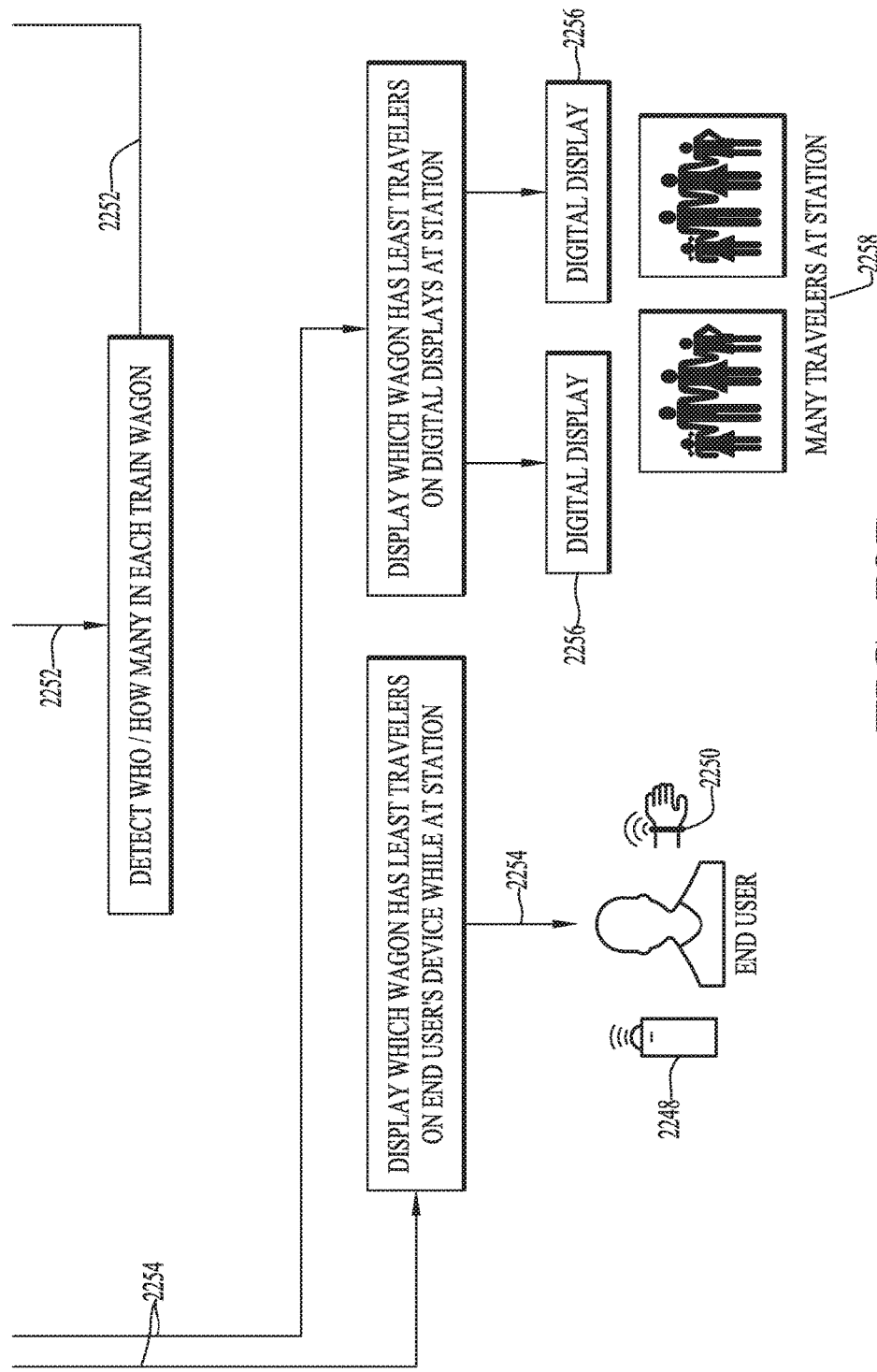
FIG. 72B is the second partial view of the FIG. 72 schematic.
Figure 73:
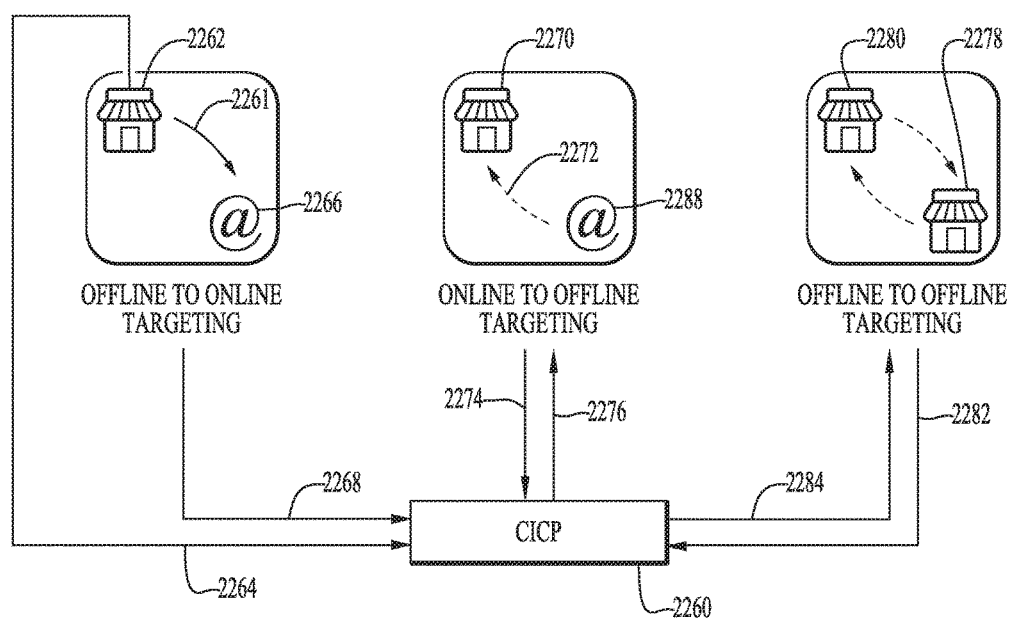
FIG. 73 illustrates a re-target ad and content use of a CICP.

FIG. 72, FIG. 72A and FIG. 73B are extensions of the platform described in regard to FIG. 71. The data can also be used to determine how many people enter each individual car or wagon 2244 as shown in FIG. 72A. The information about each car/wagon and how many are in each car/wagon is transmitted to the CICP 2212, as shown by arrow 2252, including an alert before entering the car/specific wagon. The number of travelers on each wagon is reported to the SHCIC-MTCICP as shown with arrow 2252. The information about which wagon has the fewest passengers can then be displayed on the user's devices 2248 and/or wearables 2250 as shown with arrows 2254. This can be before the passenger enters any wagon 2244. The same information can also be presented to a digital display or multiple digital displays 2256, 2256, located at the "Departure Station" 2216. This information can then be presented to numerous travelers on digital displays throughout the station and elsewhere, as shown at 2258. This embodiment is for illustrative purposes and not intended to be all encompassing Re-Targeting Advertising Example FIG. 73 shows how a re-target ad and content use of a CICP 2260 can be enabled. An offline interaction 2261, with a real physical location as depicted by the schematic "house" 2262 is triggered and recorded by the CICP 2260 as shown with arrow 2264. This interaction drives an on-line event as depicted by the "@" symbol 2266, and triggers an online retargeting of content, advertisements, experiences or information online as shown by 2268. This series of interactions is transmitted, registered, recorded and retained by the CICP 2260. At a later time the process is reversed when an on-line event as depicted by the "@" sign, 2288 drives an interaction with a physical location as depicted by the house FIG. 2270 with the interaction shown as dashed arrow 2272 and with the interaction confirmed and transmitted to the CICP 2260 as shown with arrow 2274, which then drives the delivery of content, shown with arrow 2276. These interactions are initiated and transmitted, registered, recorded and retained by the CICP 2260. At a later stage, physical location interactions between multiple locations as indicated by "houses" 2278 and 2280 and the two dashed-line arrows, can also be initiated and transmitted, registered, recorded and retained by the CICP 2260, with bi-directional communication capturing the events and interactions transmitted to the CICP, as shown with arrow 2282, and with the delivery of relevant information and content transmitted to the offline physical location, based on these previous interactions as shown with arrow 2284. Based on any one of, or any combination of some or all of these interactions, the CICP 2260 can then create new or related or independent interactions between offline to online retargeting of content, advertisements, experiences or information, thereby creating online and offline interactions and communications based on previous online and/or offline interactions. This embodiment is for illustrative purposes and not intended to be all encompassing.

Trade Show Booth Example

Figure 74:
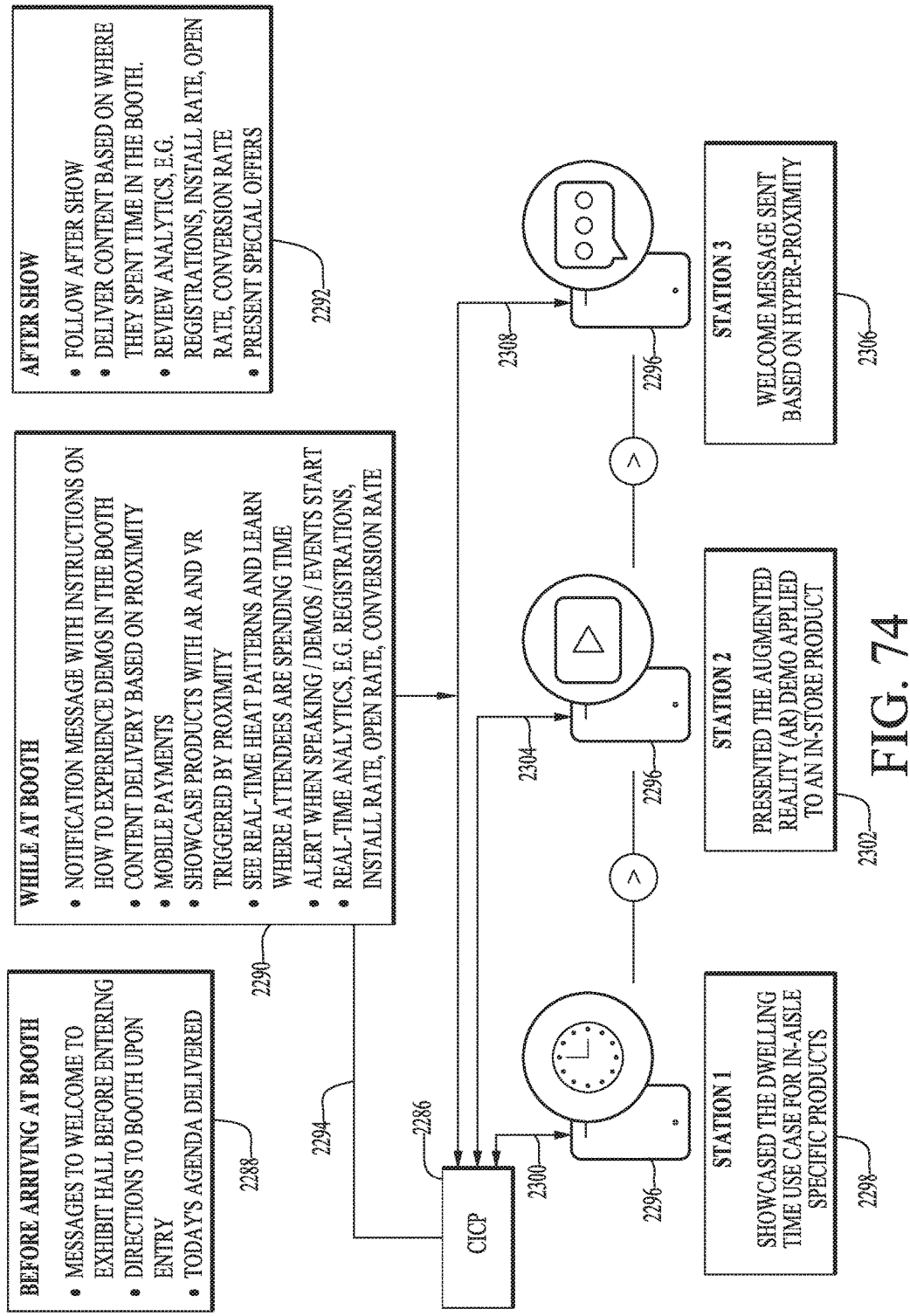
FIG. 74 is a schematic overview of an exhibitor at a trade show using a SHCICP to enhance a visitor's experience while at the exhibitor's booth

FIG. 74 is a schematic overview of an exhibitor having a booth at a trade show, and who is using a MTCICP-SHCICP 2286 to enhance the visitor's experience while at the booth. This figure illustrates a series of experiences and features before attending the show and before arriving at the booth 2288; while at the booth 2290; and after leaving the booth, the show and/or both 2292. A series of experiences are shown to take place at the booth as the visitor moves across the various stations in the booth, with bi-directional communication as shown at link 2294, based on this proximity and location. Curated experiences across the booth can be enabled via bi-directional communication on a visitor's connected device 2296 as the visitor moves around in the booth, such as at "Station 1" 2298, which experience is delivered, recorded and retained via bi-directional communication shown at 2300; as the visitor moves to "Station 2" 2302, where that experience is delivered, recorded and retained via bi-directional communication 2304; and as the user moves to "Station 3" 2306, where that experience is delivered, recorded and retained via bi-directional communication 2308. This embodiment is for illustrative purposes and not intended to be all encompassing.

Traveler Example

Figure 75:
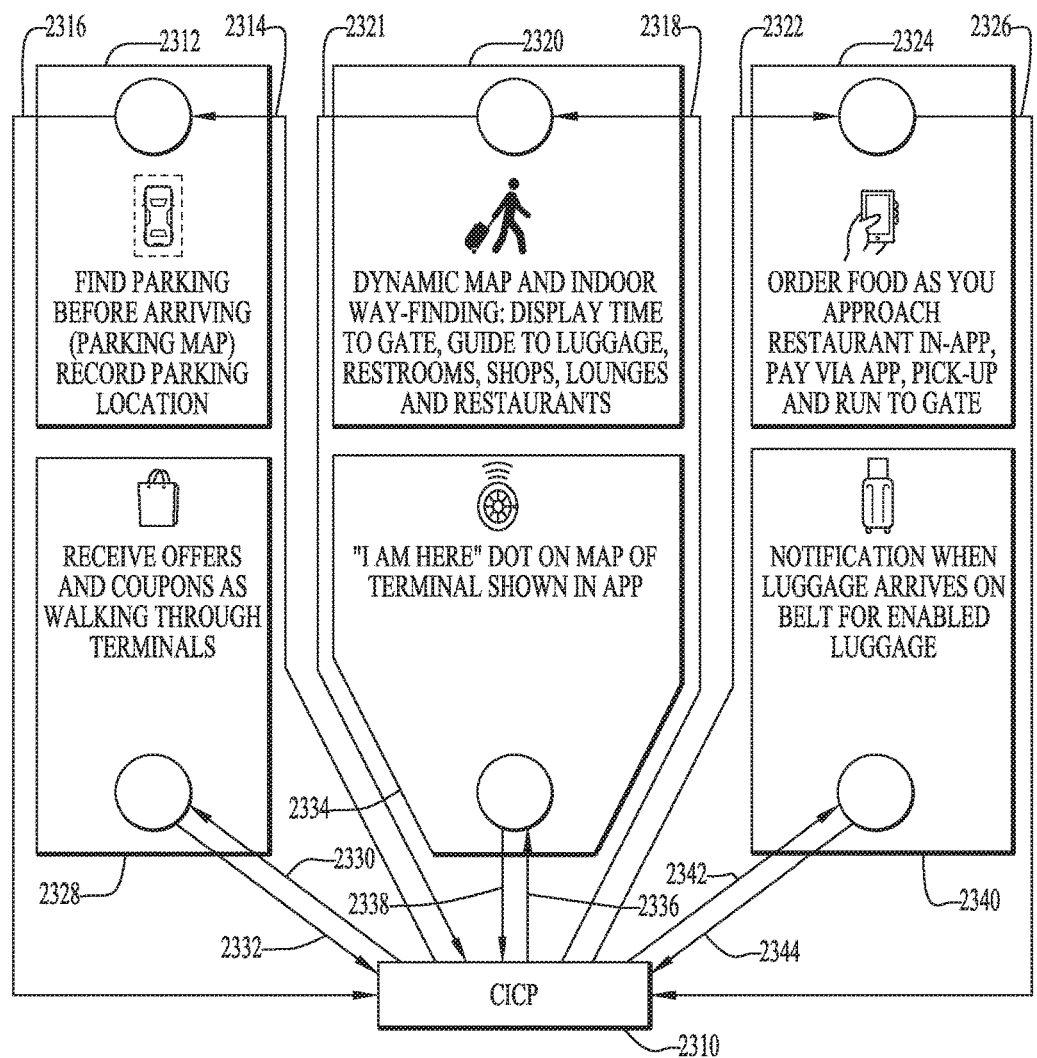
FIG. 75 depicts how an airport can use a CICP to enhance a traveler's journey as the traveler move across the facilities.

FIG. 75 depicts how an airport can use a CICP 2310 to enhance a traveler's journey as the traveler moves across the airport facilities. While driving to the airport, the CICP 2310 system can present travel information such as traffic updates and can provide directions to parking 2312 as delivered via communication 2314, while recording the location of the car when it has been parked as shown via communication 2316. This information is transmitted, registered, recorded and retained by the CICP 2310. As the traveler arrives in the airport, the CICP 2310 can enable and present various features and functions as shown, for example, at 2318 such as indoor maps, gate information and more as illustrated at 2320. This information is transmitted, registered, recorded and retained by the CICP 2310, as shown with arrow 2321. As the traveler moves across the facilities, the CICP 2310 can enable and present information and curated content, shown by arrow 2322, such as menus, ordering and complete sales transactions such as shown at 2324. This information and content are transmitted, registered, recorded and retained by the CIPC 2310, as shown with arrow 2326. As the traveler moves across the facilities, information, offers and coupons, shown at 2328 can be presented by the CICP, as shown with arrow 2330. This information is transmitted, registered, recorded and retained by the CICP, as shown with arrow 2332. Throughout the traveler's movements across the facility, the user's location 2334 can be detected and recorded by the CICP 2310, and presented to the traveler on the traveler's mobile device, as shown by arrow 2336. This information is transmitted, registered, recorded and retained by the CICP 231, as shown with arrow 2338. Should the traveler arrive at this airport or an airport with a similar CICP that is programmed to interact with the initial CICP or sensors or proximity beacons are on the travelers luggage that are programmed into the CICP, then the CICP can enable the traveler to be alerted when the traveler's luggage arrives above the ground onto the conveyor belt, shown at 2340 via communication shown as arrow 2342. This information is transmitted, registered, recorded and retained by the CICP 2310 as shown with arrow 2344. This embodiment is for illustrative purposes and not intended to be all encompassing.

User Behavior Capture Example

Figure 76:
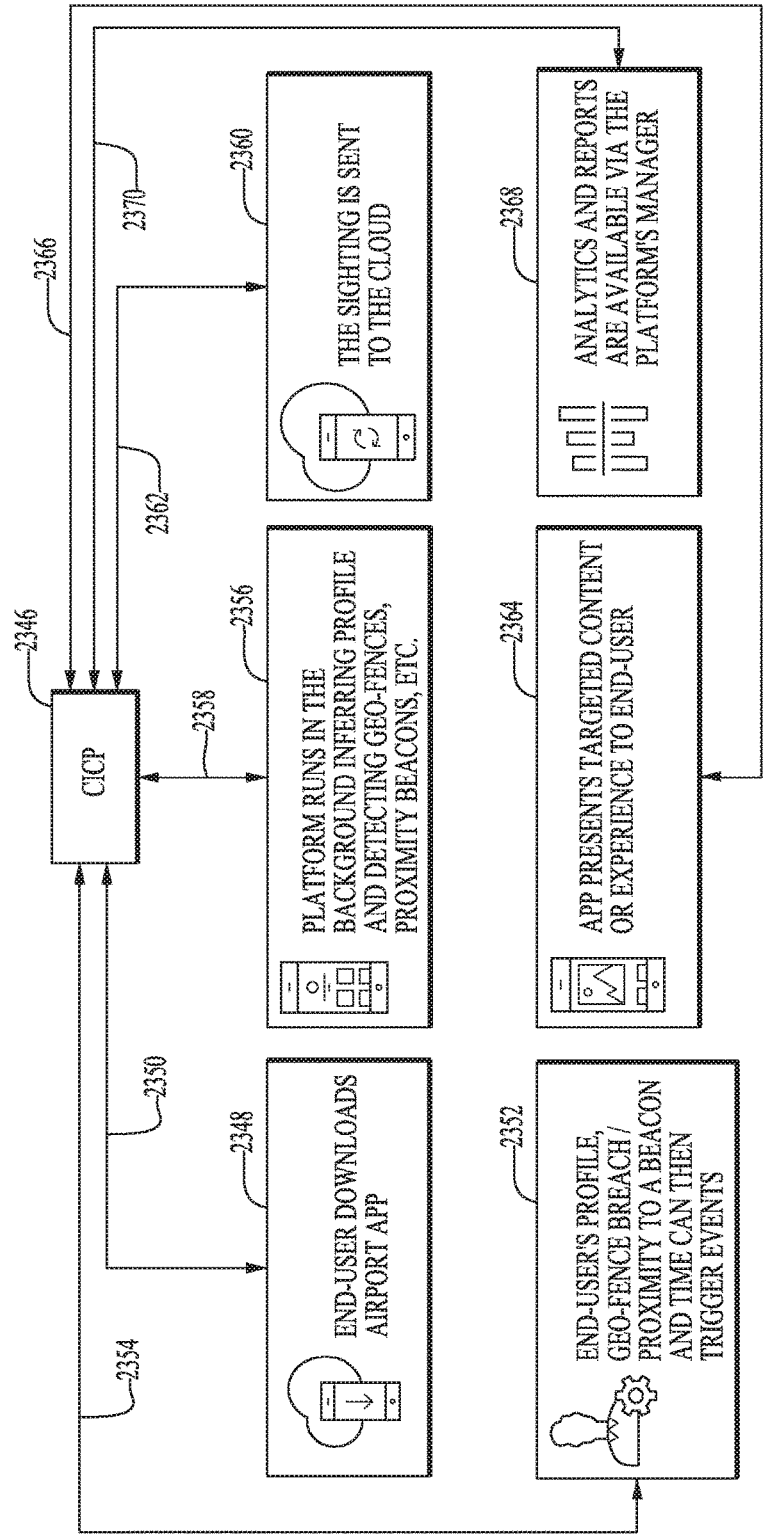
FIG. 76 is a schematic overview of showing how an exemplary CICP, MTCICP, SHCICP and/or a SHCICP-MTCICP system captures, monitors and records user behavior.

FIG. 76 is a schematic overview showing how a CICP, MTCICP, SHCICP and/or a SHCICP-MTCICP system 2346 captures, monitors and records user behavior. An end user installs an app depicted as "Airport App" on their device, shown at 2348. The CICP platform 2346 captures information, records and retains information, performs calculations, combines and integrates information about current behavior, context, location as well as past behavior, profiles and more, via bi-directional communication with the device as shown with arrow 2350. Interactions and real-life offline interactions are captured as shown at 2352, and transmitted and recorded by the CICP 2346 in bi-directional communication, shown with arrow 2354. Further context triggers offline in the physical world can trigger events as shown at 2356 are transmitted in bi-directional communication with the CICP, as shown with arrow 2358. Interactions, triggers, connections, "sighting" of beacons, sensors and/or object recognition of targets, shown at 2360 are transmitted in bi-directional communication with the CICP 2346, as shown with arrow 2362. Based on the calculations done in the CICP 2346, which are based on the communications from 2348, 2352, 2356 and 2360, the app presents information and content, triggers experiences and presents features, based on the above, to the end user as shown at 2364 via bi-directional communication as shown with arrow 2366. All is retained, recorded and can be presented by the CICP 2346 via reports, analytics and data, shown at 2368, presented to the platform administrator in bi-directional communication with the CICP 2346, as shown with arrow 2370. This embodiment is for illustrative purposes and not intended to be all encompassing.

Monetization Example

Figure 77:
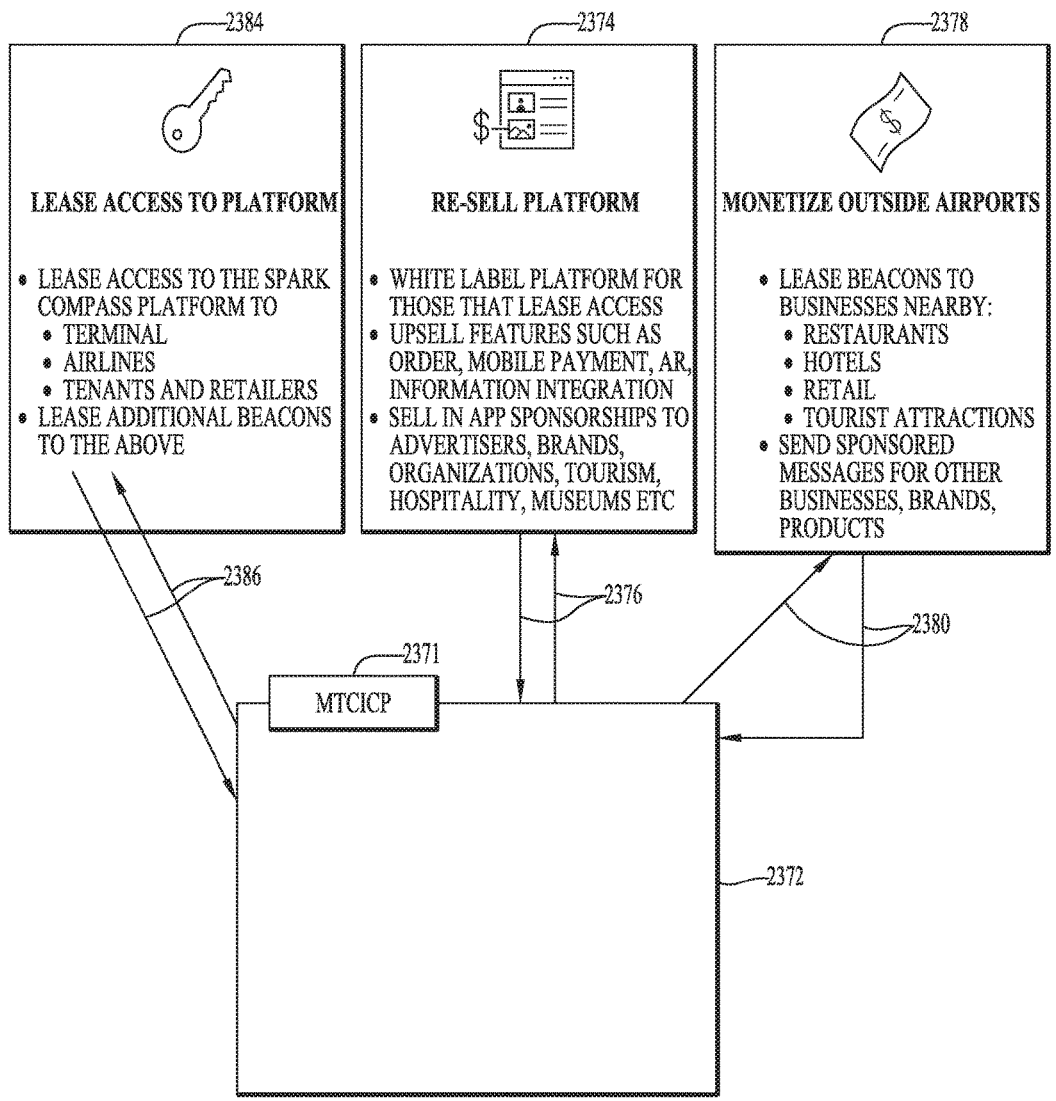
FIG. 77 is a high level overview figure illustrating the ability to monetize a MTCICP, such as an MTCICP system at an airport programmed for leasing access based on selected parameters.

FIG. 77 is a high level overview showing the ability to monetize a MTCICP in numerous ways. In this instance, MTCICP system 2371 is located at an airport and is enabled and programmed to enable leased access based on a selection of parameters. A simultaneous, parallel, complete or partial, or alternative and exclusive way to monetize the same MTCICP platform can be Re-Sell Platform shown at 2374, with bi-directional communication between the CICPs 2371 and 2374, as shown with arrows 2376, 2376. Alternatively, a simultaneous, parallel, complete or partial, or alternative and exclusive way to monetize the same MTCICP platform can be to "monetize outside the airport" as shown at 2378. This alternate embodiment will also include bi-directional communication between the CICPs 2378 and 2371, shown at arrows 2380, 2380. Access to the platform 2372 can also be granted for a fee as referred to 2384, 2374 and 2378, with bi-directional communication, shown at arrows 2386, 2386, 2376, 2376 and 2380, 2380. This embodiment is for illustrative purposes and not intended to be all encompassing.

User Location Detection Example

Figure 78:
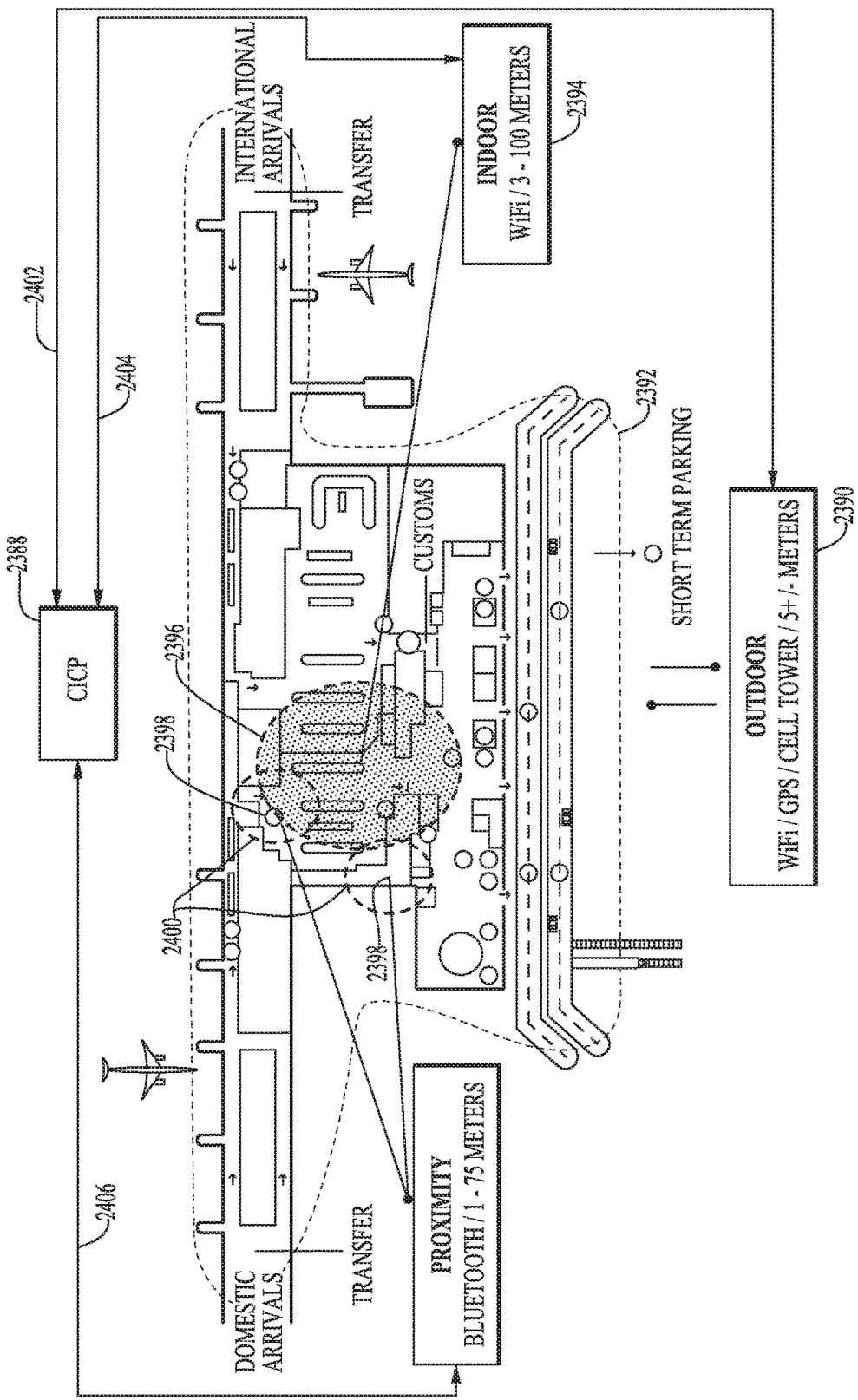
FIG. 78 is an overview of various, exemplary technologies that can be used by a CICP, MTCICP, SHCICP and/or a SHCICP-MTCICP to detect location of a user or group of users.

FIG. 78 is an overview of various technologies that can be used by a CICP, MTCICP, SHCICP and/or a SHCICP-MTCICP to detect location of a user or group of users. In this instance, an airport has a CICP based system 2388 in place and that enables outdoor locations to be detected via geofences based on a variety of location based technologies 2390, such as Wi-Fi, GPS and Cell tower (assisted GPS), with accuracy expectation in the range of +/−5 meters, as indicated by location boundary 2392, shown with dashed lines. Indoors, the same CICP based system 2388 can be programmed to automatically use Wi-Fi triangulation, shown at 2394 to detect location with accuracy in the range of 3 to 100 meters as indicated by dashed lines 2396. Further proximity and location detection can be enabled by the CICP 2388 to be provided, detected and confirmed via Bluetooth Proximity Beacons 2398 with accuracy expectation to be 1 to 75 meters as indicated by radial coverages areas of interactions within the range of the beacons as indicated by dashed lines 2400. These are based on current standard technology solutions and will be improved by the vendors providing these various solutions. The cell tower/GPS location solution 2390 is in bi-directional communication with the CICP 2388 as shown by arrow 2402, the Wi-Fi indoor location solution 2394 is in bi-directional communication with the CICP 2388 as shown by arrow 2404, and the Beacons and Proximity solution 2398 is in bi-directional communication with the CICP 2388 as shown by arrow 2406. This embodiment is for illustrative purposes and not intended to be all encompassing.

Figure 79:
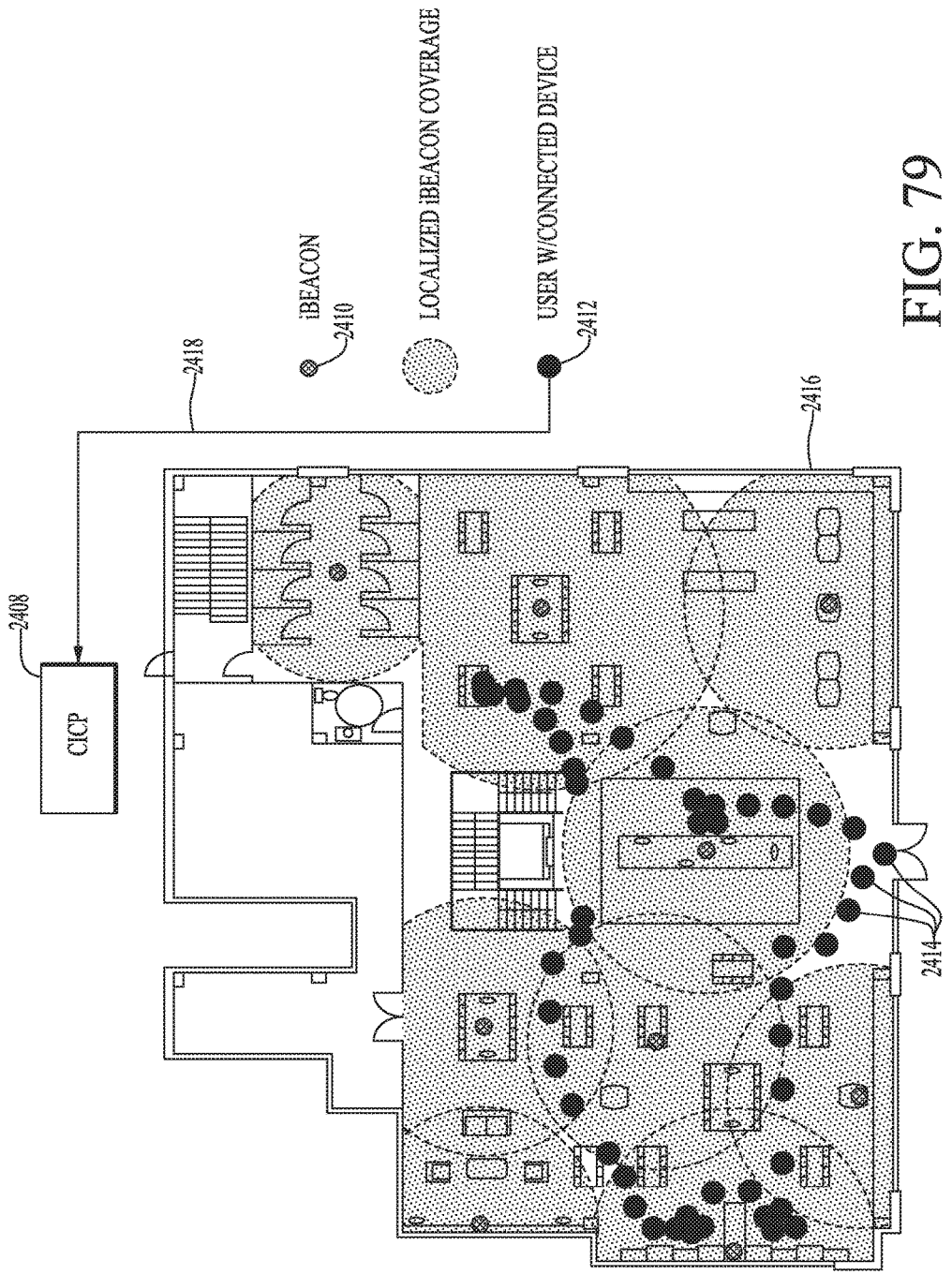
FIG. 79 illustrates how a CICP, MTCICP, SHCICP and/or a SHCICP-MTCICP detect the location of a user or group of users inside of an airport.

FIG. 79 shows how a CICP, MTCICP, SHCICP and/or a SHCICP-MTCICP 2408 can be used to detect location of a user or group of users inside an airport. Proximity beacons denoted as "iBeacons", one of which, shown at 2410, is installed in the facility and provides signal coverage as indicated. As a user 2412 or users move across the facility, their interactions with the various beacons can be depicted as a series of dots 2414, 2414, 2414 on a map 2416 of the facility presented by the CICP system 2408. This is a rendering of the input of beacon signals and strengths as communicated to the CICP in bi-directional communication with the CICP 2408 as shown with arrow 2418. The CICP 2408 then can perform standard triangulation calculations on these signals to detect location and then representation of this calculation or calculations regarding the detected locations in a dashboard connected to the CICP 2408 with the results of those calculated locations displayed on the dashboard as depicted by dashed lines 2416 showcasing a representation of the locations of each connected user as a standard "heatmap" rendering. This embodiment is for illustrative purposes and not intended to be all encompassing.

Enhanced Pay-to-View Example

Figure 80:
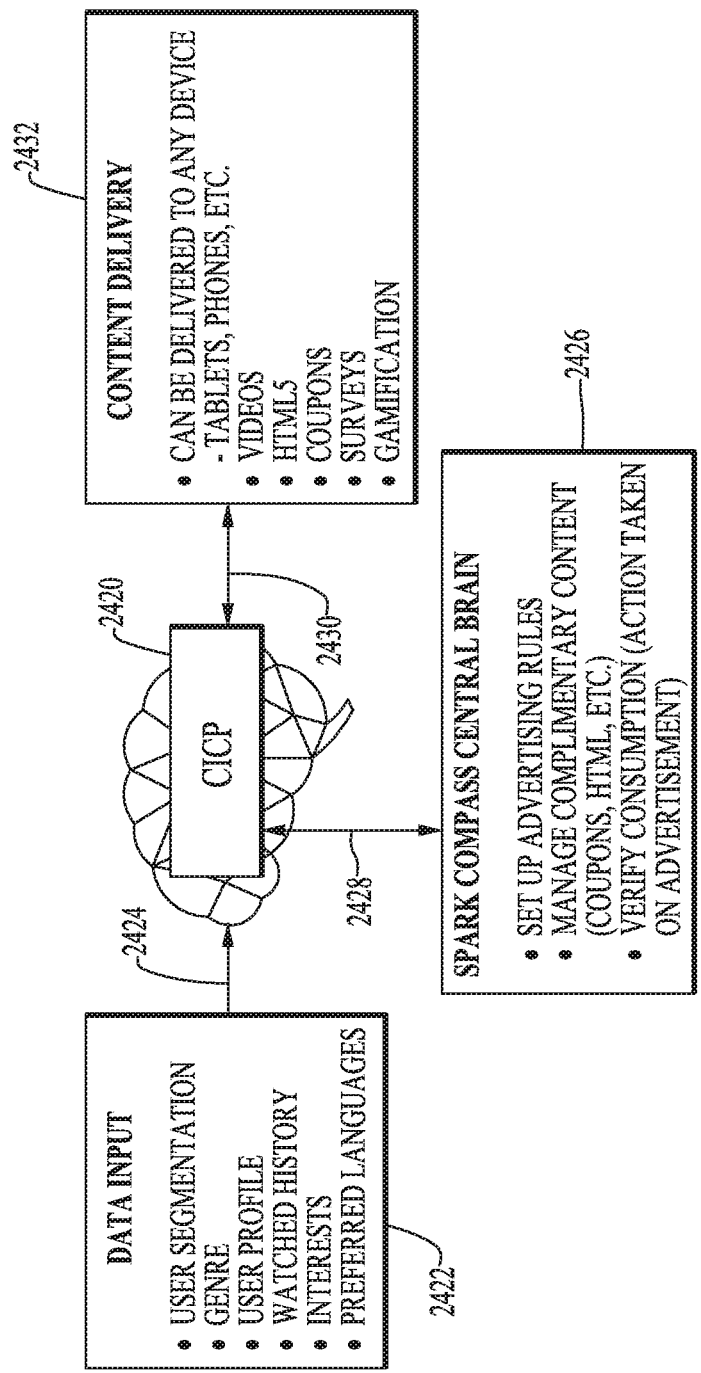
FIG. 80 depicts an exemplary method for delivering content based on use of a central CICP control platform.

FIG. 80 depicts a method to deliver content based on a central CICP control platform 2420. Data input can detect who the user is and his/her interests and past behavior, as shown at 2422 that is communicated to the CICP 2420 as shown with arrow 2424. The central CICP 2420 can be programmed with algorithms and rules as summarized at 2426 to calculate what is relevant and appropriate based on the data input 2422 in bi-directional communication as shown by arrow 2428. The content as illustrated at 2432 is delivered via bi-directional, broadcast, forward communication only and/or a combination of all which is shown by arrow 2430 and is thereby curated and based on the intelligence provided by the CICP 2420. This embodiment is for illustrative purposes and not intended to be all encompassing.

Gym Use Example

Figure 81:
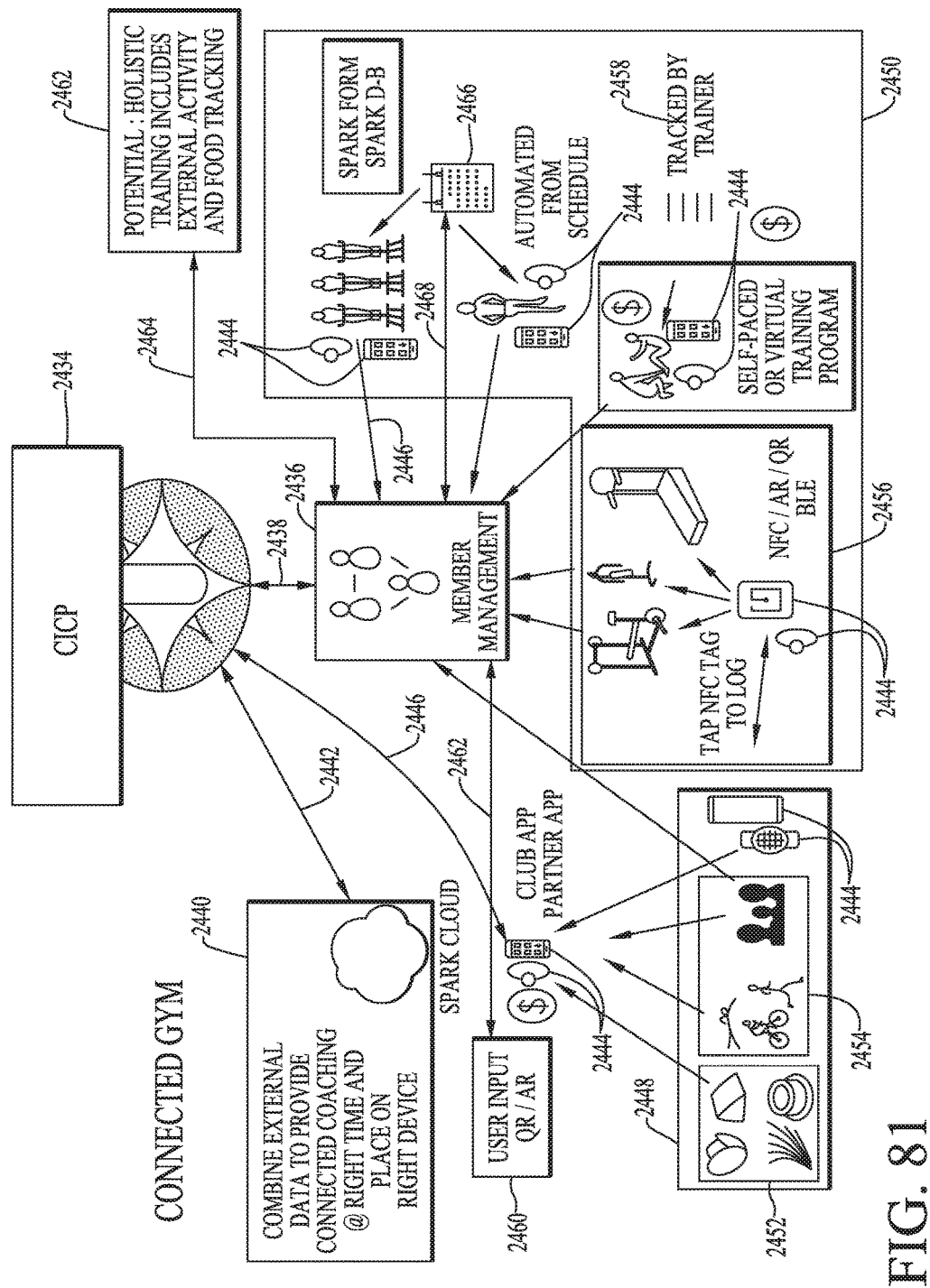
FIG. 81 is an overview of an exemplary, connected gym that uses a SHCICP-MTCICP and infrastructure controlled by a member management user.

FIG. 81 depicts an overview of a connected gym that features a SHCICP-MTCICP 2434 and infrastructures controlled by the "Member Management" shown at 2436 and who can control and communicate with the CICP 2434 via bi-directional communication as shown with arrow 2438. This SHCICP-MTCICP 2434 is connected to an external database or combination of databases 2440 with bi-directional communication shown with arrow 2442. Each of the members in the gym is using a mobile app that is installed on mobile devices and wearables, such as shown at 2444, 2444 and 2444, that are connected to the SHCICP-MTCICP 2434 with bi-directional communication that is always or intermittently on based on the available communication protocols available such as cell coverage or Wi-Fi, as shown with arrows 2446, 2446, but available across all the interactions the member has across the gym. This app can capture the member(s) activities outside, shown at 2448 and in the gym, shown at 2450 and be used to manually or automatically capture information about the food they consume, shown at 2452. It can also detect when they are sedentary and provide other context information, as shown at 2454. All of this information is recorded, retained and communicated to the SHCICP-MTCICP 2434 via the connected apps on the mobile devices 2444, 2444, 2444 and communicated by said device(s) via a communication link, as shown for example by arrow 2446, 2446. While the user is in the gym 2450, the user's interactions with the various equipment within the gym can be detected via sensor interactions such as BLE beacons, NFC, QR codes or Augmented Reality (AR) among the user's wearables and mobile devices, as shown at 2456. These interactions are captured and transmitted to the SHCICP-MTCICP 2434 via the user's connected devices 2444 in bi-directional communication as depicted with exemplary arrows 2446, 2446 and captured, recorded and retained by the SHCICP-MTCICP 2434. The user can be trained by a trainer or staff members, shown at 2458 or presented automatic or list-based exercise routines and schedules shown at 2466. All the activities in the gym are captured, retained and transmitted to the gym Member Management 2436 who controls the SHCICP-MTCICP 2434 via bi-directional communication shown with arrow 2438. User input to the management can also be collected via the member's devices when they interact with QR codes or AR experiences and instructions across the gym, shown at 2460 in bi-directional communication as shown with arrow 2462. The Member Management can present holistic and personalized training instructions based on all the information provided as shown at arrow 2462, and that can be set up manually by the management and their trainer staff and presented as curated content in bi-directional communication as shown by arrow 2464. Specific lists, instructions, training schedules and calendars shown at 2466, can also be set up to be generated automatically and presented in bi-directional communication via arrow 2468. All and every communication, interaction, action, command, response, output and input generated by the system is captured, recorded and retained by the CICP 2434 and controlled by and via the Member Management 2436. This embodiment is for illustrative purposes and not intended to be all encompassing.

Figure 82A:
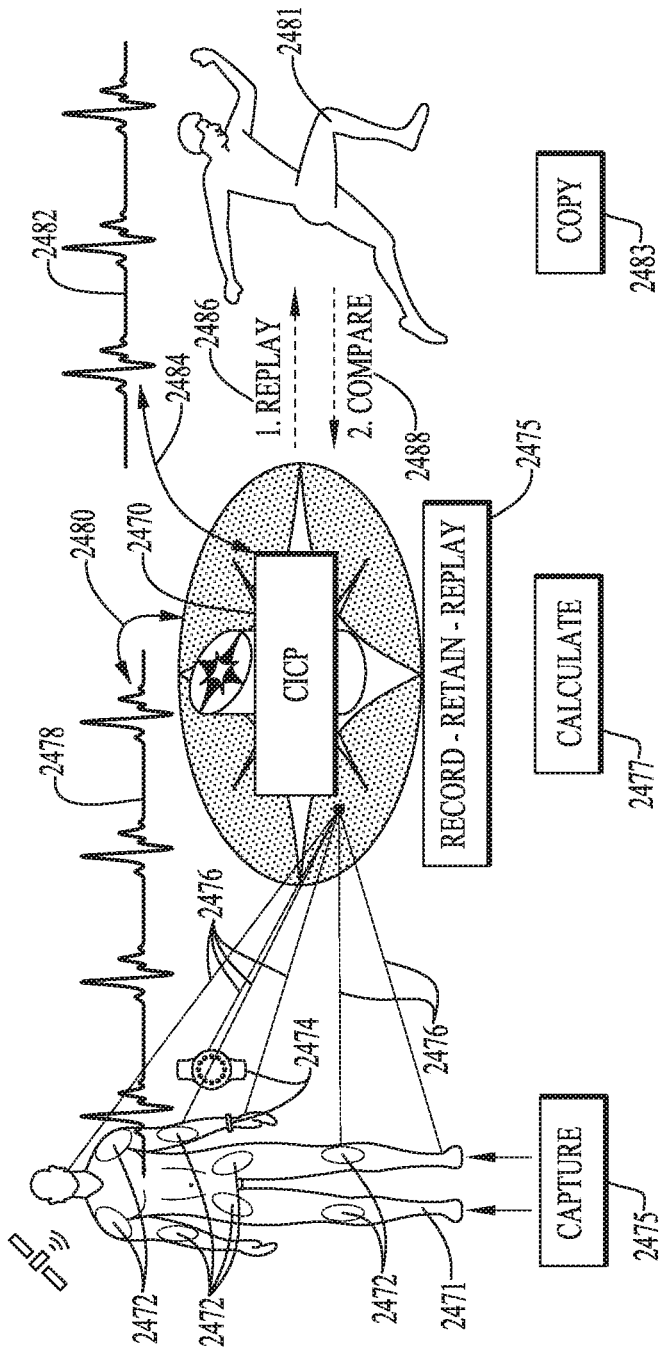
FIG. 82A illustrates an SHCICP capturing the motions and actions of a person such as a trainer who has been outfitted with sensors that capture the trainer's motions and actions.
Figure 82B:
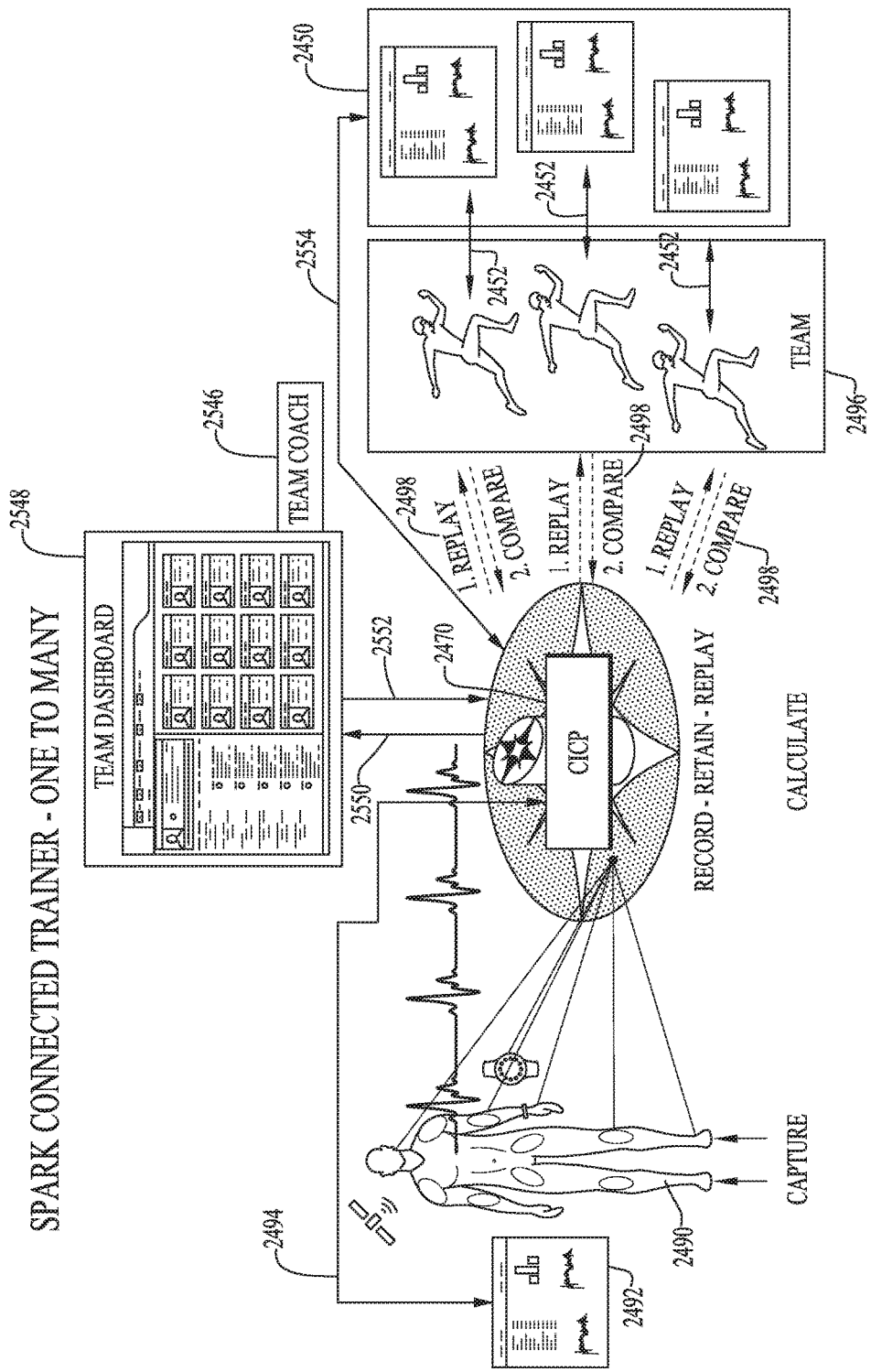
FIG. 82B illustrates the FIG. 82A SHCICP where the trainer's motions and actions are applied to the members of a team.

FIG. 82A and FIG. 82B depict how a SHCICP 2470 can be used to capture the motions and actions of a person 2471 such as a trainer that has been outfitted with a sensor or a multitude of various on their body, in devices or clothing, shown at 2472, 2472, 2472 and/or wearables 2474 that captures his or her motions and actions 2475. The data from these sensors are captured, recorded and transmitted to the SHCICP 2470, as shown with links 2476 in FIG. 82A. The SHCICP 2470 records the data, retains it and performs calculations, shown at 2477 to create a complete recording of the actions of the trainer, shown at 2478 and enables this to be transmitted in a bi-directional manner, as shown with arrow 2480. It then replays these actions, as shown at 2482 and transmits this recording on devices worn by another person 2481, who is trying to copy actions, shown at 2483 of the trainer, shown with arrow 2484 and transmitted on bi-directional communication devices to be replayed, as shown by arrow 2486. This is captured and compared with the original motions, as shown at 2488, and communicated to the SHCICP 2470. The SHCICP 2470 can then transmit instructions for adjustments to the person 2481 so that he or she can more closely replicate the motions and actions captured, recorded and retained by the SHCICP from sensors and wearables on the trainer. Referring to FIG. 82B, the same system can be used to gather information from a trainer 2490 of a team and his captured data is aggregated and in a dashboard 2492 shows what the trainer has access to and that is in bi-directional communication with the CICP 2470, as shown with arrow 2494. The trainer can thereby observe his data in real time as it is captured, recorded, retained and then displayed by the CICP 2470. A team, represented at 2496, is also in communication with the CICP 2470 and each member is attached to the CICP 2470 as described before with bi-directional communication as shown with arrows 2498. Each member has access to his/her own dashboard, three of which are shown at 2450. Each of theses dashboards display the data for that specific team member as illustrated by the three pairing connections 2452, 2452 and 2452. Each display is shown displaying data from the CICP 2470 for the specific team member as shown with arrow 2454. A team coach, represented at 2546 has access to a Team Dashboard 2548 that is receiving data from the CICP 2470, the trainer and the team members, as shown at arrow 2550. The coach can communicate with the trainer, each individual team member and/or all team members and/or all team members and the trainer via the CICP 2470 as shown by arrow 2552. This embodiment is for illustrative purposes and not intended to be all encompassing.

Figure 83:
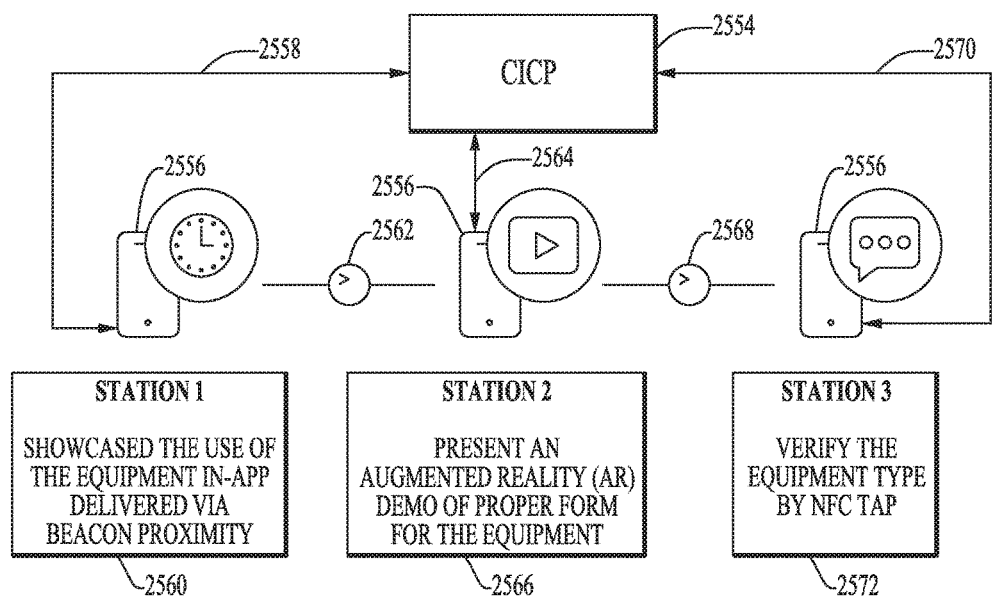
FIG. 83 illustrates an interactive and guided work-out routine incorporated into a fitness gym that has an installed SHCICP platform.

FIG. 83 depicts how an interactive and guided work-out routine can be incorporated into a fitness gym that has a SHCICP platform 2554 installed. Here an action and routine is showcased at Station 1 shown at 2560, in an app and is delivered to a user's device, 2556, 2556, 2556 at each of three different times via a proximity beacon interaction that triggers the experience as the user moves from one station to the next, with the movement from Station 1 at 2560 to Station 2 at 2566 shown at 2562; and the movement from Station 2 to Station 3 at 2572 shown at 2568. At "Station 2" 2566 a demonstration of the proper use of the equipment is presented in Augmented Reality. At "Station 3" 2572 the platform/system 2554 verifies that the user is on the equipment via a NFC tap. All the interactions, events and actions are captured and transmitted to the SHCICP 2554, recorded and retained. This embodiment is for illustrative purposes and not intended to be all encompassing.

Figure 84:
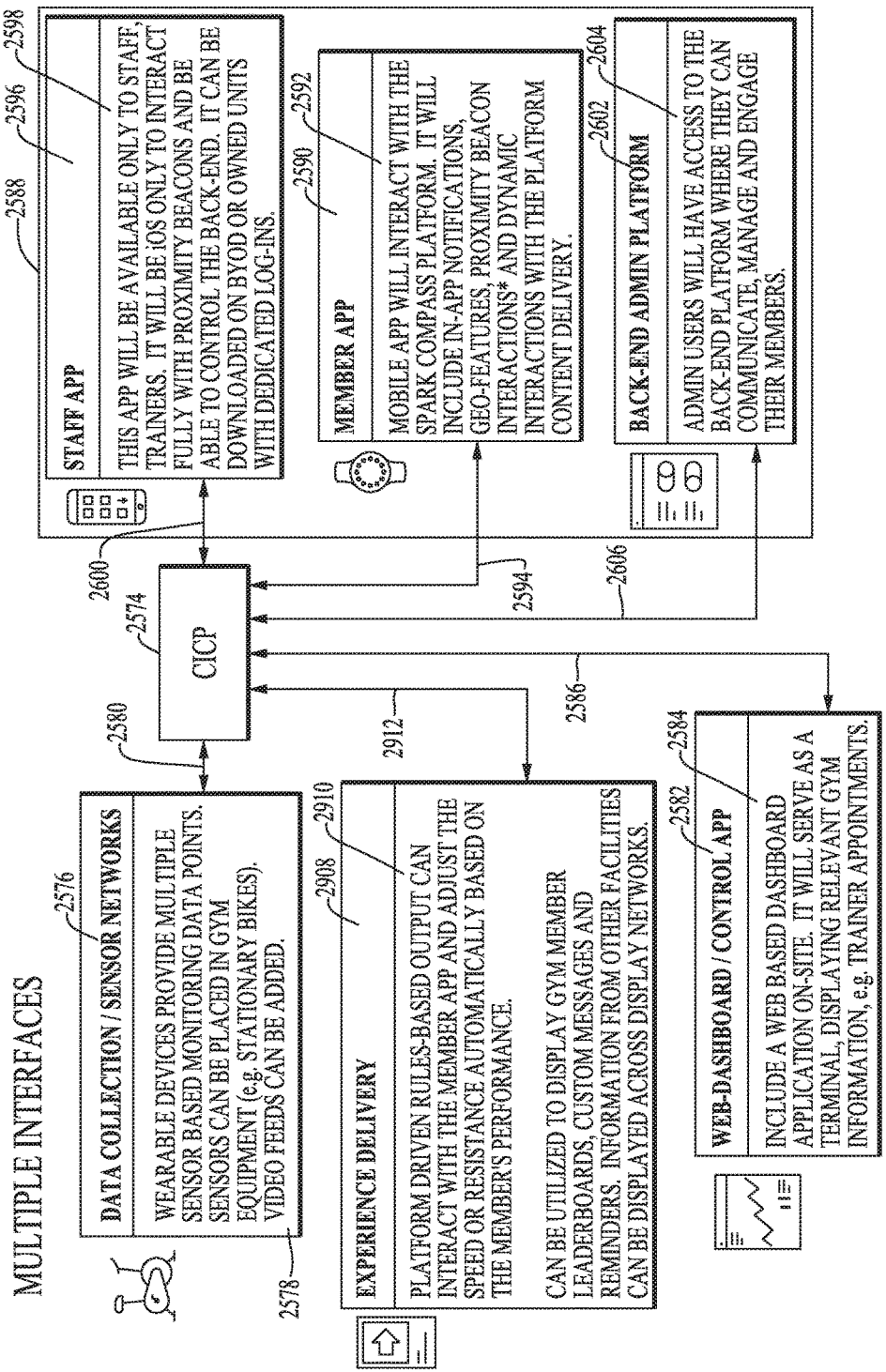
FIG. 84 is an exemplary overview of the interfaces that can be used for the FIG. 81 CICP.

FIG. 84 depicts an overview of multiple interfaces a CICP 2574, such as the one depicted in FIG. 81 can have. These include the data capture via sensors and sensor networks, shown at 2576, and the subsequent experiences that it can deliver, shown at 2908 and 2910. Included also are web interfaces with control dashboards, shown at 2582 and 2584 that can also be mobile apps that control the CICP 2574, that are in bi-directional communication, as shown with arrow 2586. Also included are administrative controls and data gathering capability in a Back-End Admin Platform, shown at 2602 and 2604, which is in bi-directional communication with the CICP 2574, as shown with arrow 2606. Also included are a Member App, shown at 2590 and 2592, and a dedicated Staff App, shown at 2596 and 2598, with descriptions presented in the respective text boxes in FIG. 84. This embodiment is for illustrative purposes and not intended to be all encompassing.

Figure 85:
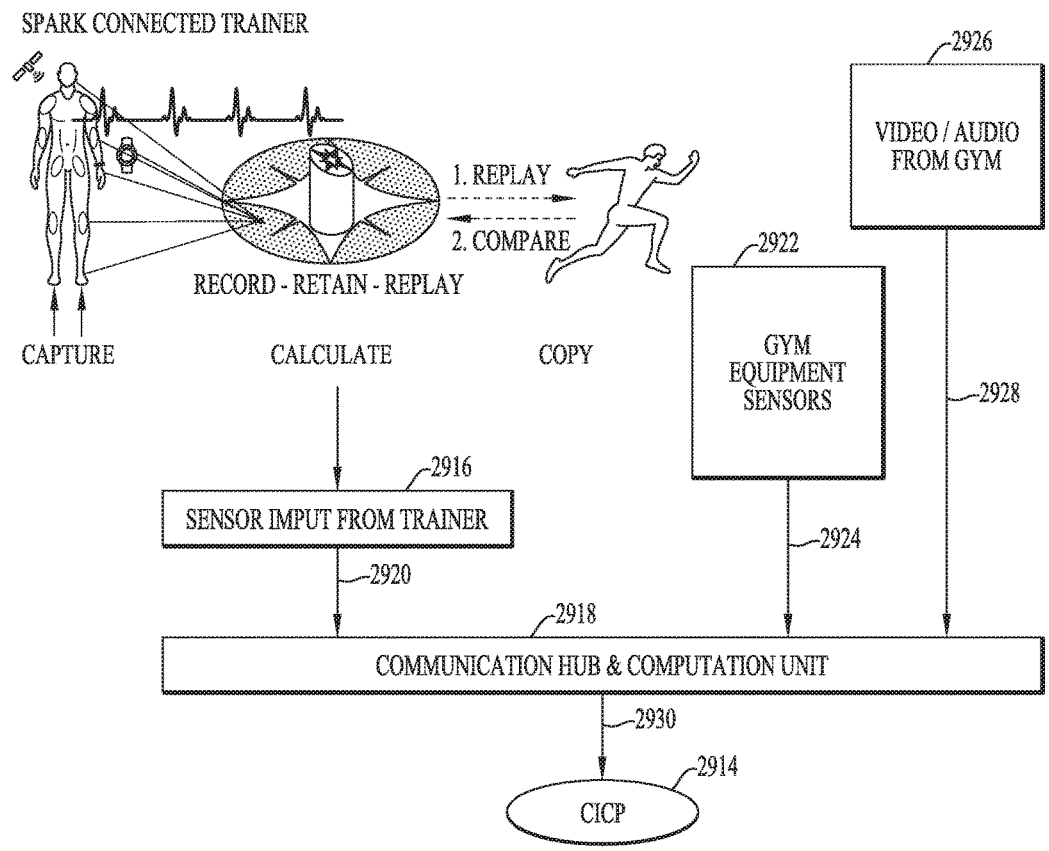
FIG. 85 illustrates integration of the FIG. 82 system into a SHCICP installed in a gym.

FIG. 85 depicts how a system as described with reference to FIG. 82 can be integrated into a SHCICP 2914 that has been installed in a gym. Sensor Input From the Trainer 2916 is captured by the Communication Hub & Computation Unit 2918, via a communication link shown at 2920. Data is captured on Gym Equipment Sensors 2922 with sensors that the trainer is using, and transmitted to the Hub and Computation Unit 2918 as shown with arrow 2924. Video and Audio 2926 from the exercise is captured, and transmitted to the Hub and Computation Unit 2918, as shown with arrow 2928. The data captured from the gym facility is captured by the "Communication Hub and Computation Unit" 2918. This device collects the data and performs any computation on the data to aggregate it and presents it combined or raw to the SCHICP 2914 as shown with arrow 2930. This embodiment is for illustrative purposes and not intended to be all encompassing.

Figure 86:
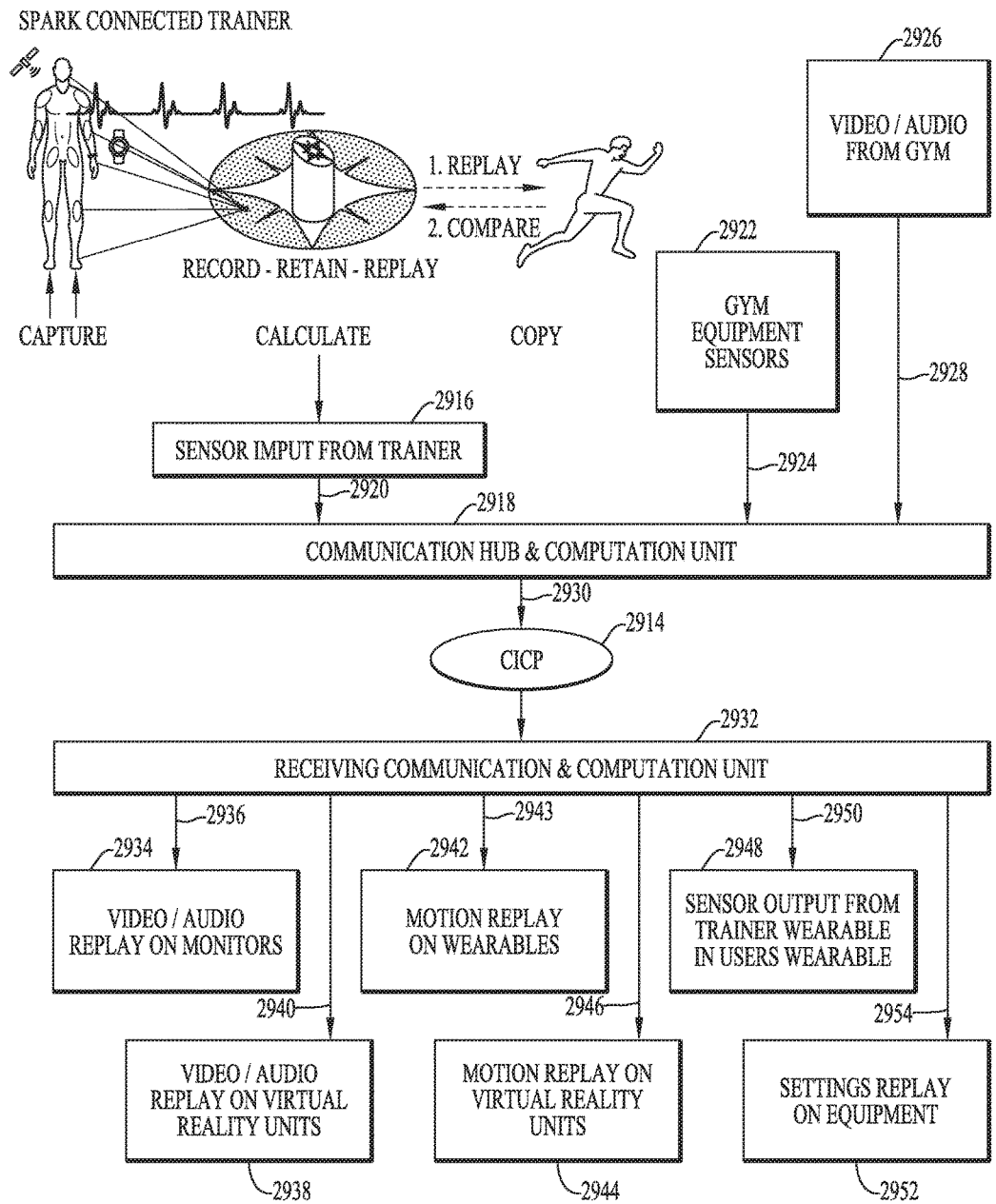
FIG. 86 illustrates how the FIGS. 82 and 85 systems can be replayed.

FIG. 86 depicts how the system described with reference to FIG. 85 can be used to replay the experiences. This replay of the originating experiences captured and illustrated in FIG. 85 is transmitted to a "Receiving Communication and Computation Unit" 2392. This unit calculates this input data and presents it in various output modes based on the equipment it is connected to. These output modes can be TVs and Monitors 2934 replaying audio and video feeds received from Unit 2932, as shown with arrow 2936. This video and audio feed and/or other such captured data can be presented in Virtual Reality on such devices, 2938 via a link shown as arrow 2940. The motion captured can be replayed on wearables 2942, via a link shown as arrow 2943. The motion captured can also be used to control settings and display modes in the Virtual Reality Display Units, shown at 2944, via link 2946. The other data captured by the trainer on his or her wearables, can be replayed on the user's wearables, shown at 2984, via link 2950. The data captured on the equipment the trainer was using can be used to control settings on the equipment the user is using, shown at 2952 via link 2954. This embodiment is for illustrative purposes and not intended to be all encompassing.

Figure 87:
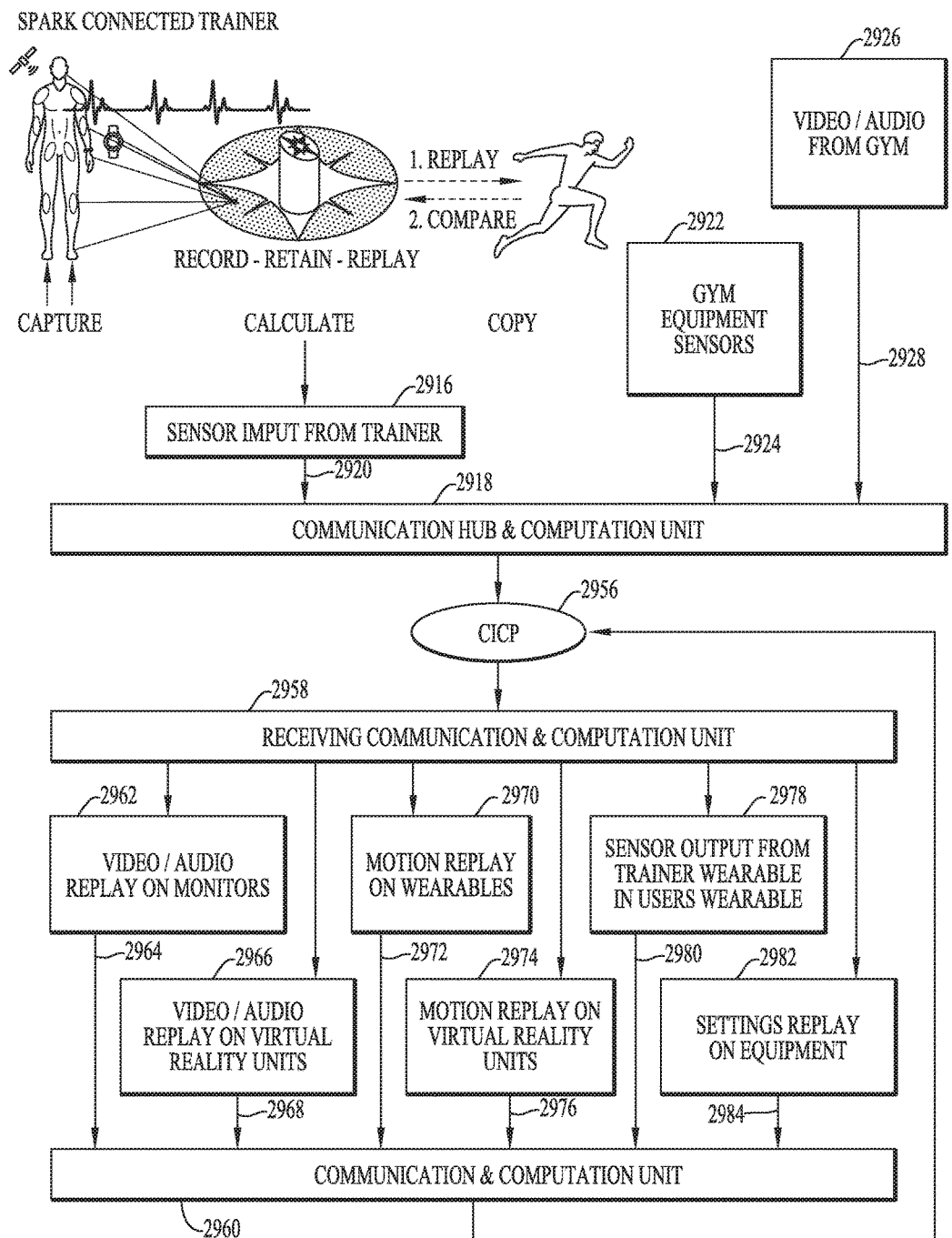

FIG. 87 depicts the system depicted in FIG. 86 with a feedback loop back into the central SHCICP, shown at 2956 in FIG. 87. Here the various devices that received input from the central "Receiving Communication & Communication Unit" 2958, and replayed the data, are now providing feedback and output after the rendering of the experiences back into a "Communication and Computation Unit" 2960, namely Video and Audio presented on monitors with an interactive component, shown at 2962 via link 2964; virtual reality devices with motion feedback, shown at 2966 via link 2968, motion feedback and sensor input feedback from wearables, shown at 2970 via link 2972, motion feedback and sensor input feedback from virtual reality display units, shown at 2974 via link 2976, motion feedback and sensor input feedback from the trainer on wearables worn by user, shown at 2978 via link 2980, sensor input feedback from equipment, shown at 2982 via link 2984. This input is received, processed, calculated and transmitted back to the originating SHCICP 2956, as shown with link 2986. This embodiment is for illustrative purposes and not intended to be all encompassing.

Figure 88:
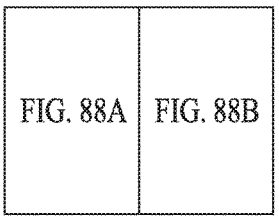
Figure 88A:
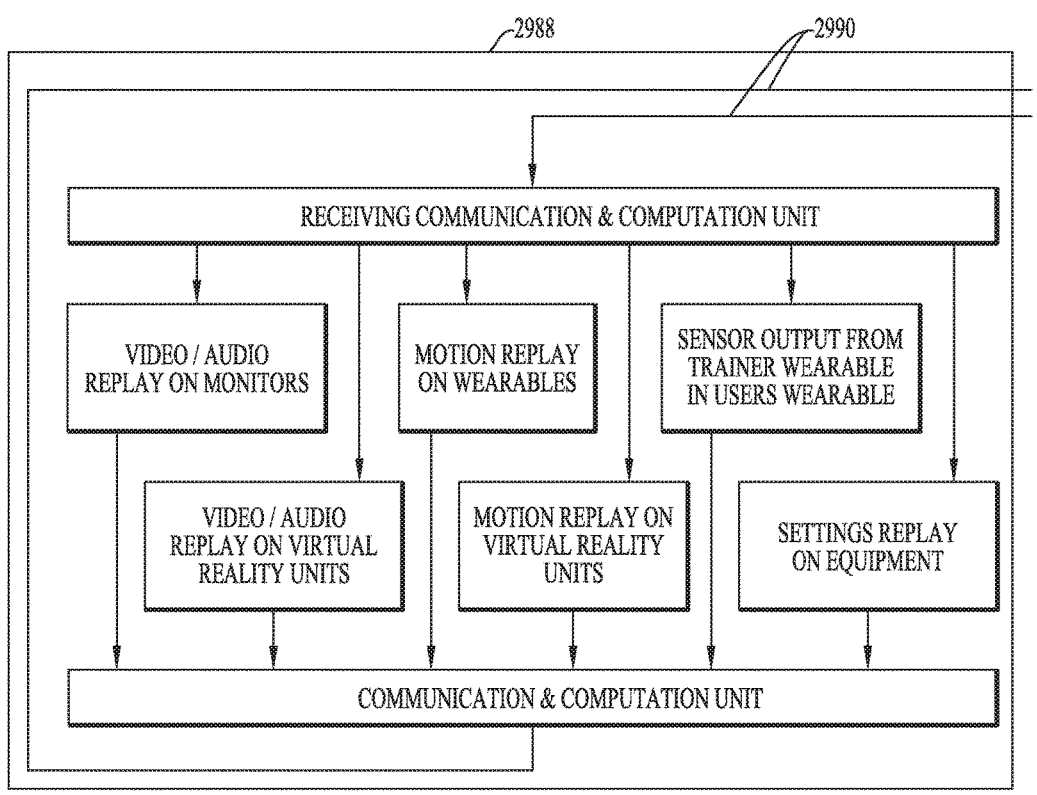
Figure 88B:
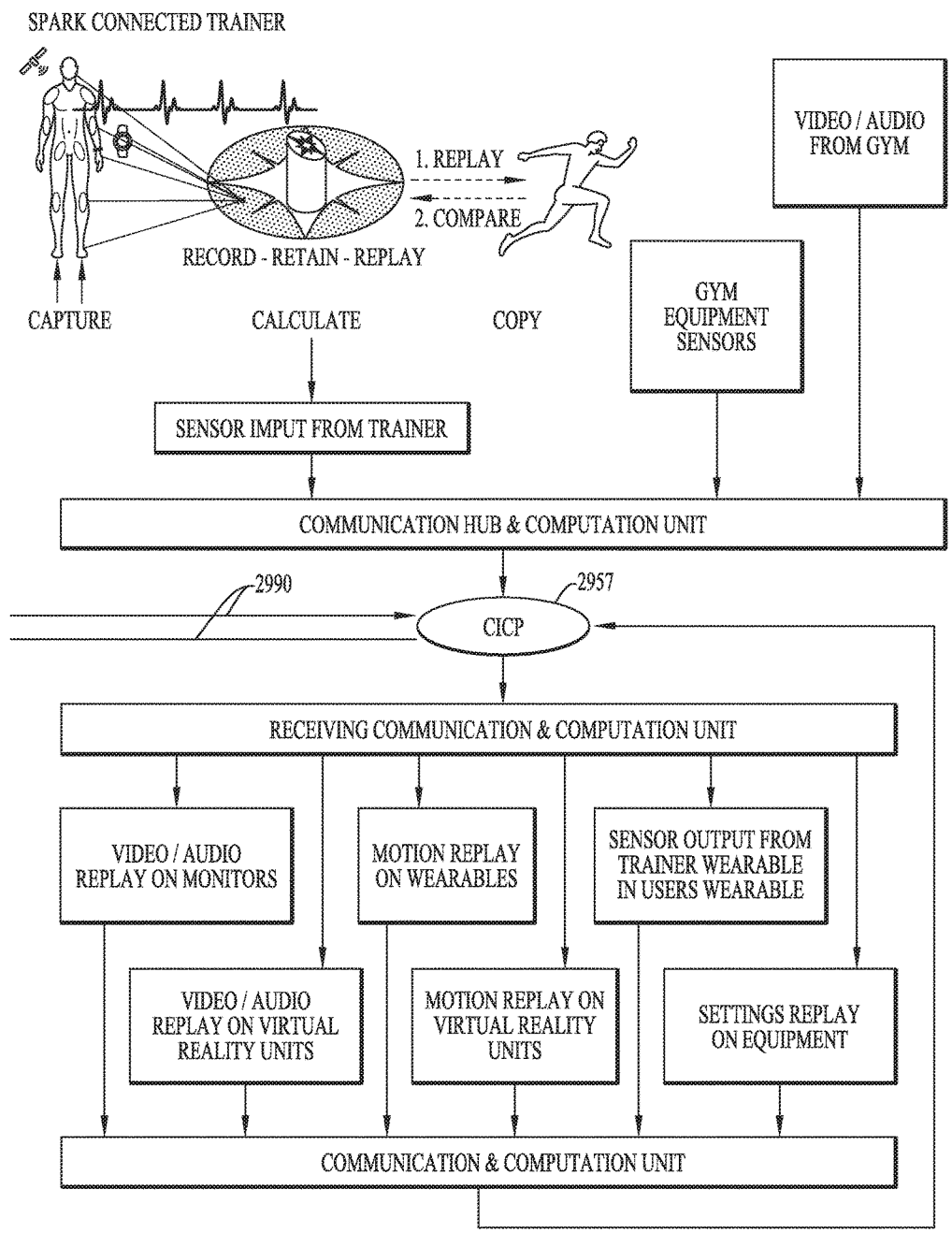

FIGS. 88, 88A and 88B depict an overall system based on the FIG. 87 embodiment, but instead of one replay system with feedback, numerous such systems, 1+n, report back to the originating SHCICP. One such system is shown as 2988 in FIG. 88A, and is in bi-directional communication with the origination CICP (not numbered) shown in FIG. 88B via links 2990, 2990. A second such system (not numbered) is shown in FIG. 88B, and is also in bi-directional communication with the origination CIPC with a link shown but not numbered. Numerous replay systems can thereby be connected to one originating SHCICP controlled facility or system where the motions captured are replayed in numerous locations. This input is received, processed, calculated and transmitted back to the originating SHCICP. This embodiment is for illustrative purposes and not intended to be all encompassing.

Location Detection in a Building Example

Figure 89:
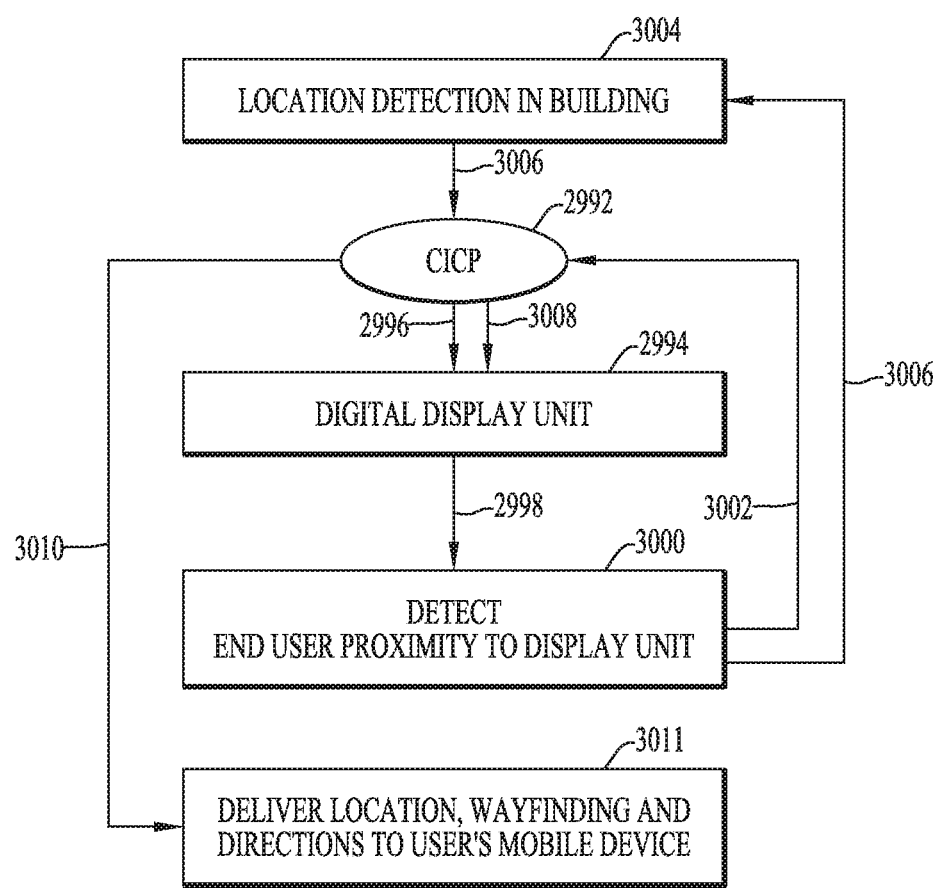

FIG. 89 depicts a CICP system 2992 in a building or venue that is connected with a digital display, monitor or TV 2994 that delivers wayfinding, location, navigation and asset location information on the display that is relevant to the person or persons in front of the display. Location Detection in the building 3004 is transmitted to the CICP 2992. This information is transmitted to the digital display unit 2994 via bi-directional communication shown at 2996, 3008. As the end user is standing in front of the display, this proximity is detected as shown with arrow 2998 via proximity beacon(s) or other sensors such as facial recognition, Wi-Fi signal match, NFC tag or any other such methodology as shown at 3000 and reported to the CICP 2992 via link 3002 and to building devices via link 3006. Based on this complete input and data, the CIPC 2992 can then transmit via link 3010 the location information to the user's mobile device 3011. This embodiment is for illustrative purposes and not intended to be all encompassing.

Figure 90:
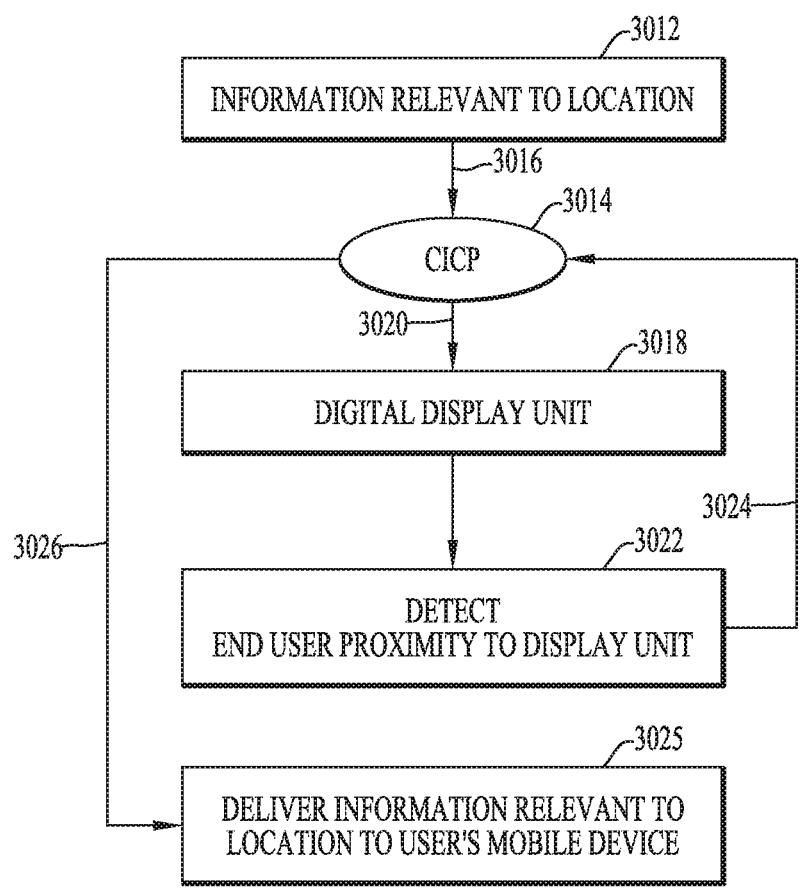

FIG. 90 expands on FIG. 89. Instead of location information, in this instance, the system delivers information that is relevant to a specific location, shown at 3012. This can be in a building, a venue, hotel, airport or any other public/private building, but can also be outside such as a train station platform, at a cruise ship, in a stadium or on a transportation device such as a train. Information about the location is transmitted to the CICP 3014 via link 3016. This information is transmitted to the digital display unit 3018 via link 3020. As the end user is standing in front of the display 3018, this proximity is detected via proximity beacon or other sensors such as facial recognition, Wi-Fi signal match, NFC tag or any other such methodology, shown at 3022, and reported to the CICP 3014 as shown with arrow 3024. Based on this complete input and data, the CIPC 3014 can then transmit the information to the user's mobile device 3025 as shown with arrow 3026. This embodiment is for illustrative purposes and not intended to be all encompassing.

Workflow Enhancement Example

Figure 91:
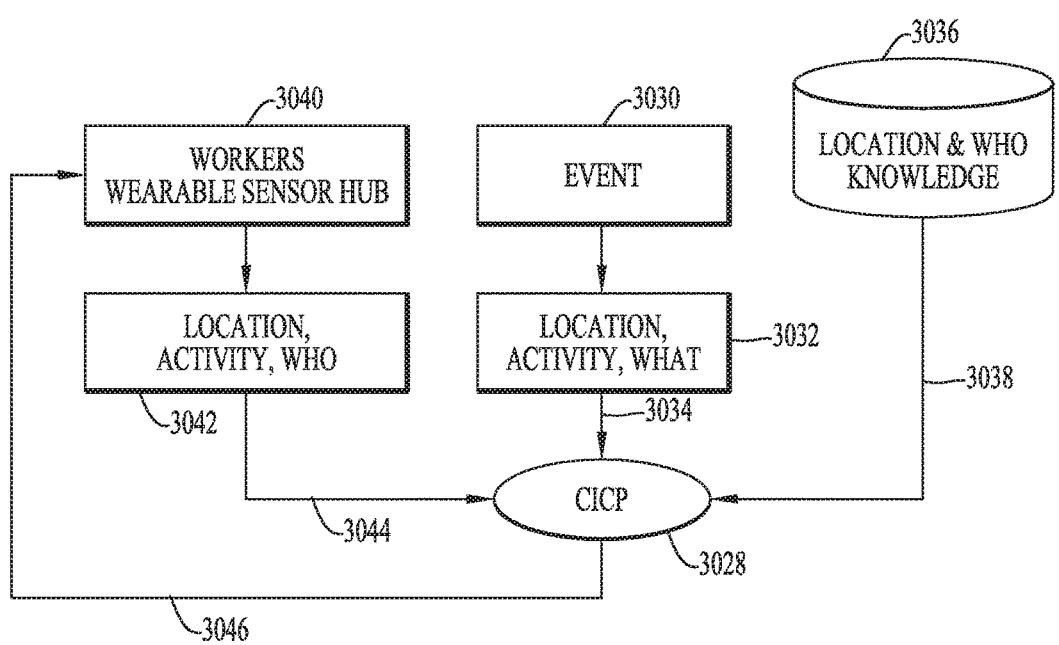

FIG. 91 depicts a CICP based system that can be used to enhance work flow for workers across a facility. In this instance, an Event 3030 happens at the facility. This Event 3030 can be a product or piece of equipment that is malfunctioning, a spill in a convention center, an act of violence, a piece of luggage left un attended, a customer demanding service, a gate agent at an airport with a ticket scanner that is malfunctioning during boarding a plane that is about to depart. The nature of the event, location and any associated activity 3032 is reported to the CICP 3028 as shown with arrow 3034. A cloud based database 3036 has been preprogrammed with knowledge about the location and provides this knowledge to the CICP 3028 as shown with arrow 3038. This database 3036 also knows who may be associated with the location and other associated information about the location such as equipment, features, functions, connectivity, security levels and other relevant information about the facility. This data is also transmitted to the CICP as shown with arrow 3038. Workers wearing wearable sensors and/or hubs such as radios, smart watches, wearables and or mobile phones, tablets or other devices 3040 are identifiable across the facility. The location and activity of these workers are known, as shown at 3042, as well as the knowledge of each worker and his/her capabilities and levels of access, all of which are combined and transmitted to the CICP as shown with arrow 3044. Based on the information about the Event, the location, the activity and the nature of the event, an alert with instructions and details about the event is then sent to the worker via his/her wearable sensor/hub 3040. This embodiment is for illustrative purposes and not intended to be all encompassing.

Figure 92:
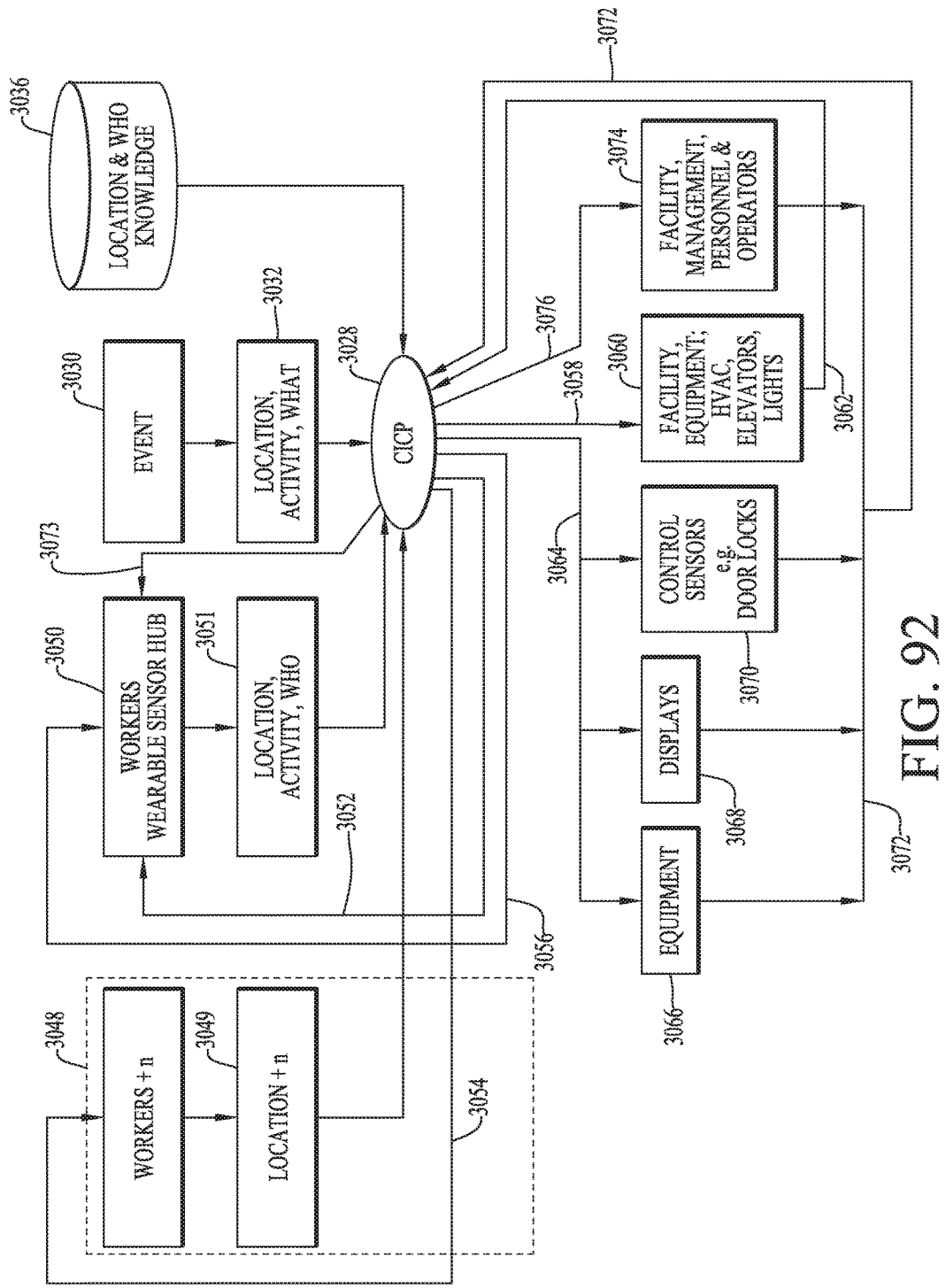

FIG. 92 depicts the system described in regard to FIG. 91, but with multiple workers, shown at 3048 as Workers+n. In addition to FIG. 91, in this instance all of the each of the workers 3048 is identified with the corresponding location for that worker, that is, multiple locations are identified, and shown in FIG. 92 as Location+n 3049. Also, each additional worker's wearable device/sensor hub 3050 is provided with who, activity and location information at 3051, which corresponds to the information provided to the worker referred to in FIG. 91. All this information is transmitted to the CICP 3028. The CICP 3028 determines which worker is the one who will be assigned the task and sends the information to his/her wearable, shown at 3050. The CICP 3029 determines that the other workers, shown at 3048 are not suitable, not at the right location, don't have the right knowledge about the location or event, or are not a match with the activity they are to perform or able or allowed to do, so a message is transmitted that they are not required to attend to event, as shown with arrow 3052. This process is then repeated until a suitable worker has been located. This embodiment is for illustrative purposes and not intended to be all encompassing.

FIG. 92 also depicts a system embodiment as referred to in FIG. 91, but in which the CICP 3028 is also connected to various displays, sensors and equipment across the facility. The CICP 3028 goes through the processes described with reference to FIG. 91 and assigns a task to a worker as shown in FIG. 91 and as described with reference to FIG. 91, and sends this assignment and any associated information to the worker's wearable sensor hub 3050. The CICP 3028 then communicates with all the other connected devices, sensors, systems and functions as shown in FIG. 92 with arrows 3064, 3058 and 3074. These include Equipment 3066, Displays 3068, Control Sensors 3070, Facility Equipment 3060 such as HVAC, Elevators etc. as well as assigned personnel, shown as Facility Management, Personal & Operations 3074. Feedback from the connected devices is sent back to the CICP 3028 as shown with arrows 3062 (from Facility Equipment 3060) and 3072 (from the other connected devices). Based on this input the CICP 3028 then presents further actions, instructions and or commands to the same sensors or the sensor that has been determined by the CICP 3028 to have relevance based on the worker assigned the task and the event and the location of the event, or a combination of sensors or equipment that have been determined by the CICP 3028 to be relevant to the task at hand. The results of these communications and the combined results relevant to the task and the worker as computed by the CICP 3028 are then transmitted to the worker assigned to the task. This embodiment is for illustrative purposes and not intended to be all encompassing.

Figure 93:
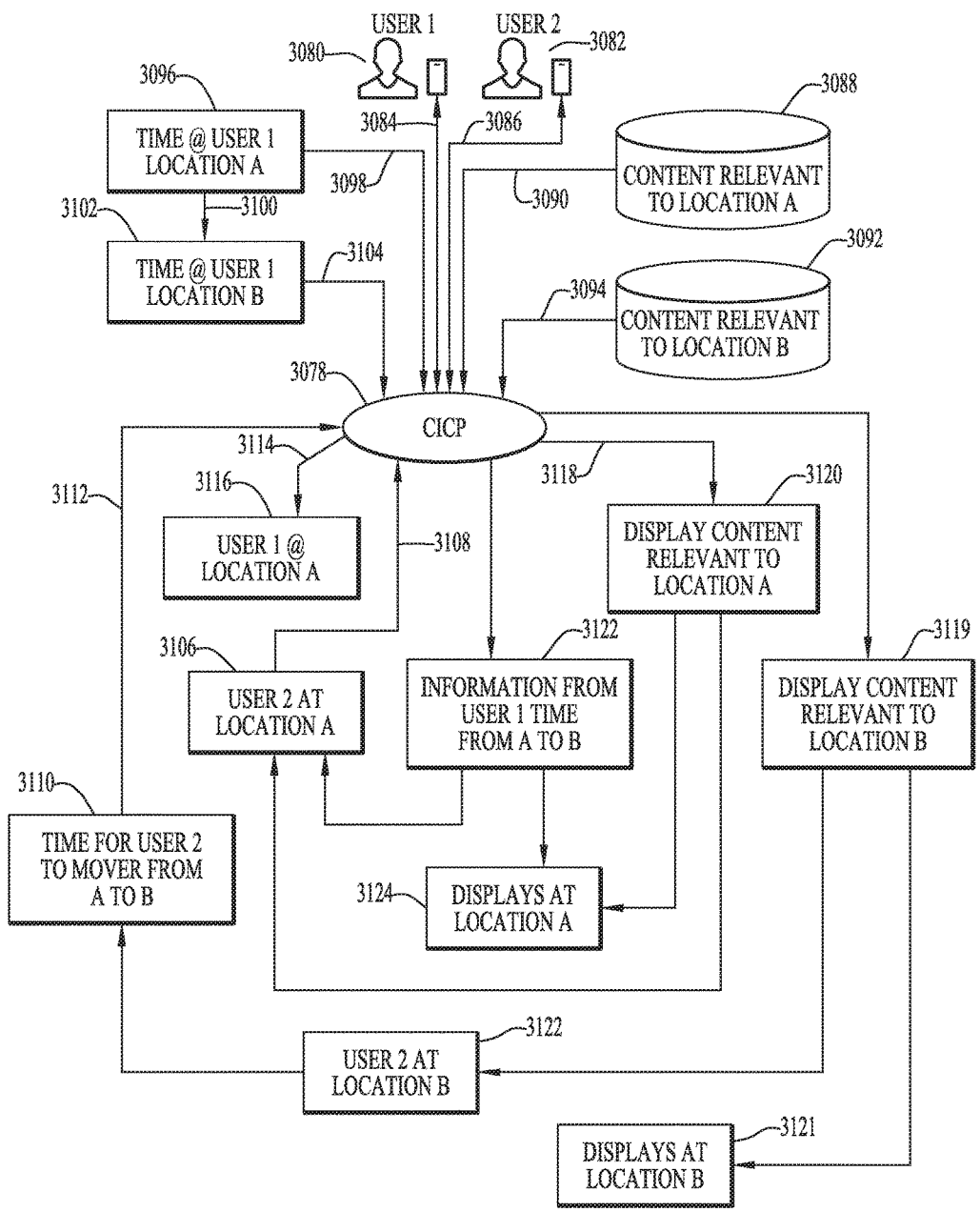

FIG. 93 depicts the use of a CICP system to determine the time it takes for a person, referred to at 3080 as "User 1" to move from location "A", shown at 3096, to location "B", shown at 3102, and provide this information to a second user, shown at "User 2" 3082 with the ability to present information and content at location A, shown at 3088 that is relevant to that location, including the time estimated to travel from location A to location B, then present content relevant to location B, shown at 3119, at displays 3121 at location B. The content relevant to location A is made available to the CICP via link 3090. Likewise, information relevant to location B is made available to the CICP via link 3094. User 1 is at location A at a given time, which is reported, recorded and retained by the CICP, as shown with arrow 3098. The time it takes User 1 to move to location B 3102 from location A is captured and transmitted to the CICP as shown with arrow 3104. Another user or group of users, "User 2" shown at 3082 arrives at location A, shown at 3106, and this is captured, transmitted and recorded and retained by the CICP, as shown with arrow 3108. The information about the time it took user A to move from location A to B is exported from the CIPC, as shown at 3122 and then transmitted to the User 2 at Location A, as shown at 3106. This information is also displayed at a connected display at location A, shown at 3124. The CICP then displays other information that is relevant to location A based on the input it has received about the location and dynamic data collected by the CICP, as shown at 3120. The CICP can also present the content to the User 1, as shown via the links shown with arrows connecting display 3120 to User 2 at Location A 3106 back to the CICP with arrow 3108 and then to User 1 at Location A 3116 via arrow 3114. The CICP will also be able to present content relevant to location B on displays at the location B, shown at 3121 and can present information about location B when the User 2 is there, shown at 3122. The time it takes User 2 move from Location A to Location B 3110 is reported back to the CICP 3078 via communication shows with arrow 3112. The process can then be repeated for new users arriving at Location A thereby providing a dynamic update of the time it takes to move from A to B with the display of this information on users' devices and displays at Location A 3124. The process can be repeated for numerous locations. This embodiment is for illustrative purposes and not intended to be all encompassing.

Athletic Performance Comparison Example

Figure 94:
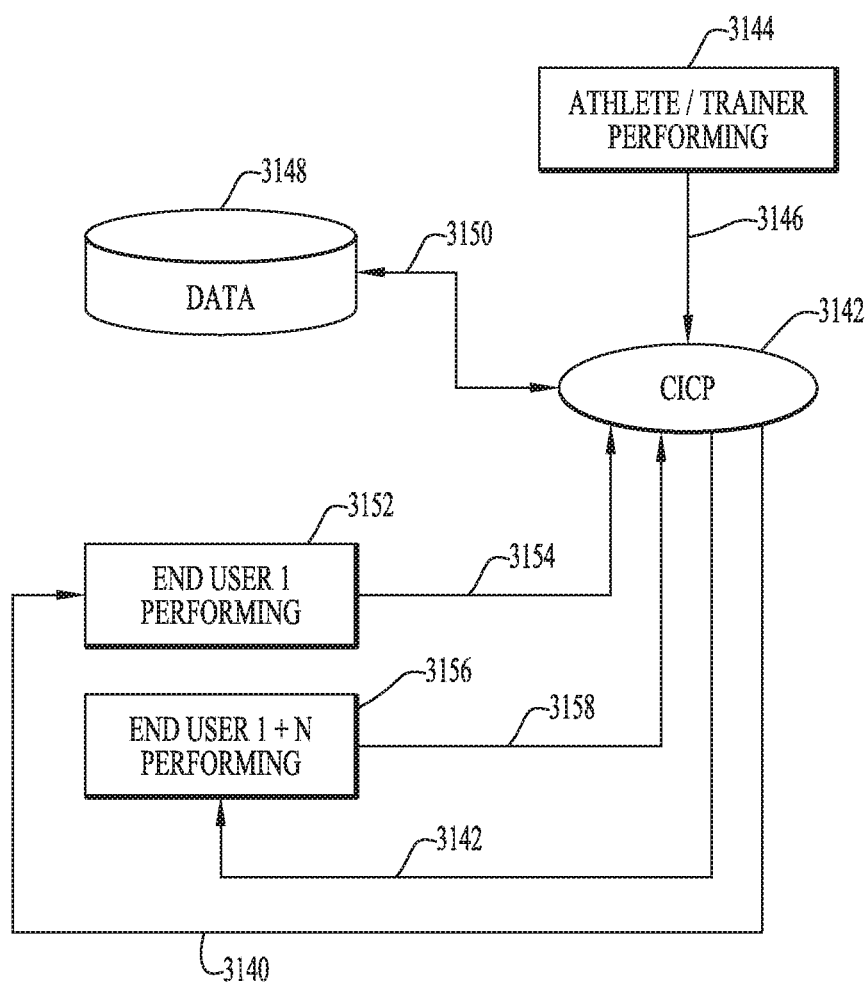
Figure 95:
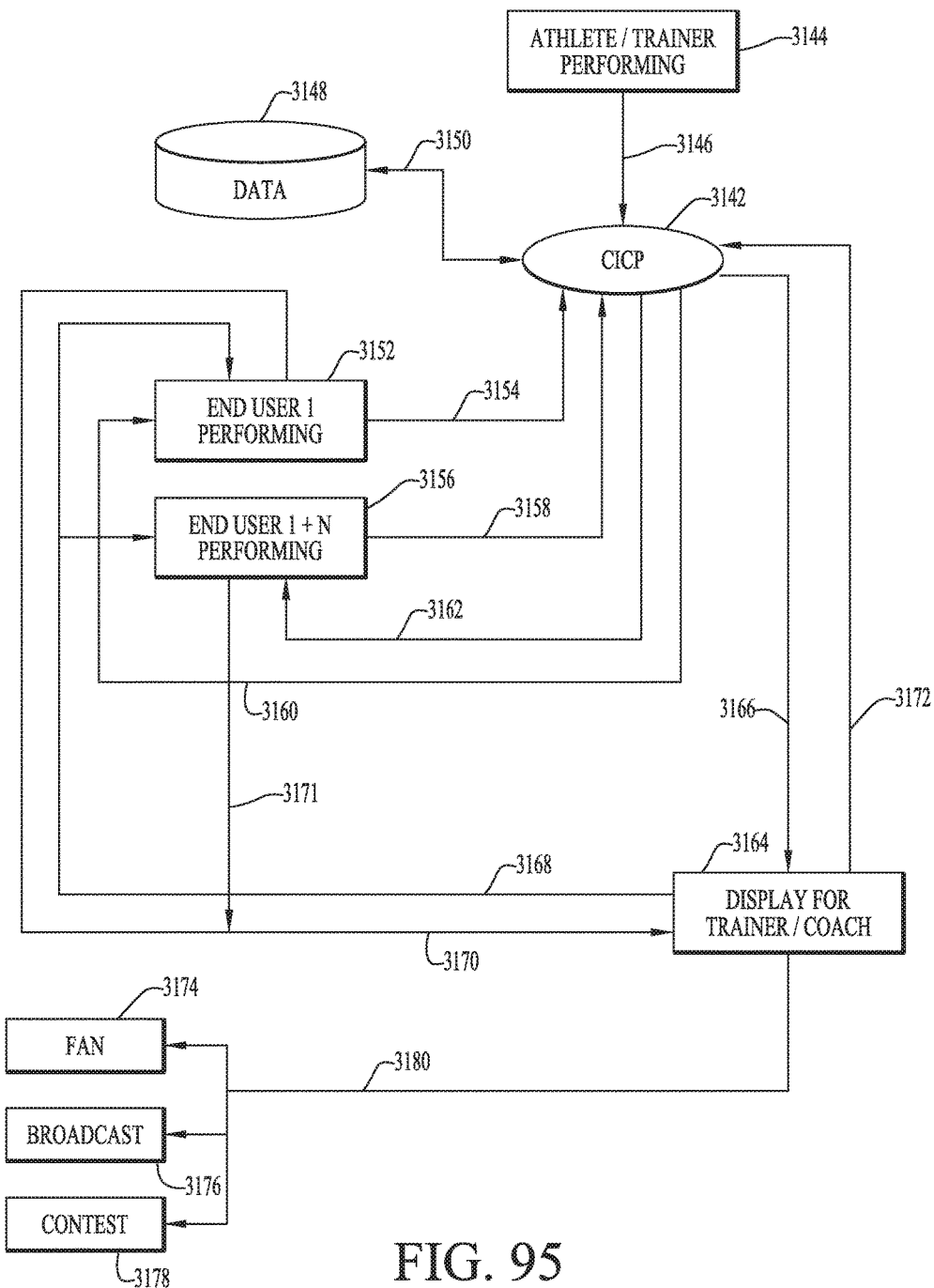

FIGS. 94 and 95 depict a CICP 3142 system used by a sport team or training facility and which compares motion data gathered by one Athlete/Trainer 3144 and compares this data against another end user and/or numerous end users such as members of a sport team. The telemetry data gathered by various sensors and input devices such as wearables, video cameras and other sensors used to track and verify the performance of the Athlete/Trainer 3144 is captured and transmitted to CICP 3142, as shown with arrow 3146. Additional performance and other historical data, 3148 are also presented to the CICP, in bi-directional communication as shown with arrow 3150. Data from End User 1 3152 is collected and transmitted to the CICP, as shown with arrow 3154. Additional users, depicted as "End User 1+N", shown at 3156 also perform and their data is collected and transmitted to the CICP as shown with arrow 3158. The CICP 3142 sends feedback based on the data gathered by all and based on any computation performed by the CICP to End User 1, as shown with arrow 3160. The CICP sends feedback based on the data gathered by all of the devices and based on any computation performed by the CICP, to End User 1+N as shown with arrow 3162. A trainer/coach can also have access to the data for End User 1, End User 1+N and the athlete via Display 3164 that receives this data from the CICP via link 3166. The Trainer/Coach can send individual or collective information, instructions, encouragement or other curated content to the End User 1 and/or End User 1+N as shown in 3168. He can likewise get feedback communication from End User 1 and/or End User 1+N as shown with arrows 3170, 3171. The aggregated data and information from any of these interactions, content and/or results of the communications are reported to the CICP as shown with arrow 3172. The Trainer/Coach has the option to allow only selected data to be presented to the fans, broadcasters and/or be used as part of input into contests. The Trainer/Coach has the option submit content, information, updates, stats, data and curated content to Fans 3174, to Broadcasters 3176 and/or Contests 3178 as shown with arrow 3180. This embodiment is for illustrative purposes and not intended to be all encompassing.

Second Behavior Modification Example

Figure 96:
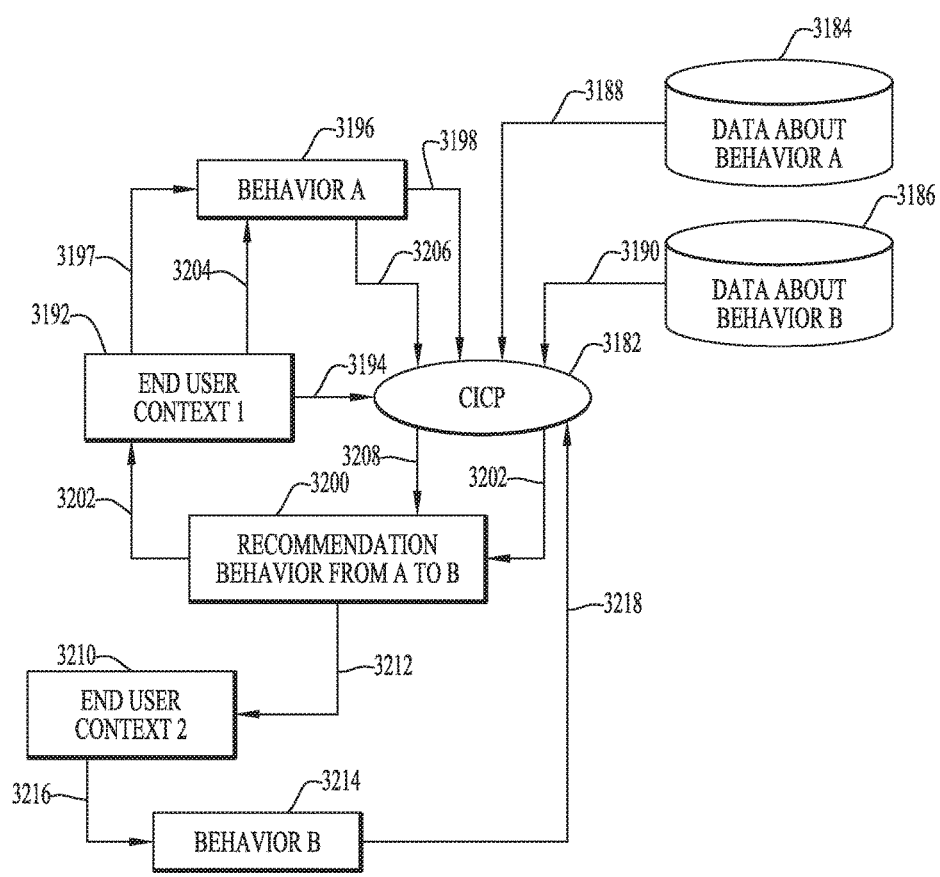

FIG. 96 is a schematic overview showing how a CICP 3182 based system can be used to change behavior based on a user's past behavior and context by sending recommendations and providing a proof if the behavior was changed. Data is known about behavior, in this instance "Behavior A Data" 3184 and "Behavior B" Data 3186. This knowledge is made available to the CICP, as shown with communications 3188 and 3190, respectively. An "End User" is in a known context depicted as "Context 1" 3192 which is captured and transmitted to the CICP via link 3194 and received, recorded and retained by the CICP. The End User is in action of behaving a known way and this is matched with "Behavior A" shown at 3196 through a communication as shown with arrow 3197 and the "Behavior A" is retained, captured and transmitted to the CICP as shown with arrow 3198. The CICP provides to the End User a Recommendation 3200 to change from Behavior A to Behavior B. This Recommendation is transmitted to the End User in Context 1, as shown with arrow 3202. This Recommended action taken is matched up against Behavior A, as shown with arrow 3204 and the result is transmitted to the CICP as shown with arrow 3206. The CICP 3182 then presents the revised behavior recommendation, shown with arrow 3208 to the End User when the user has changed the context to "End User Context 2", shown at 3210 with communication 3212. Once the Behavior B 3214 is confirmed in Context 2 as indicated by communication 3216, this is reported back to the CICP and combined with the Recommendation of the behavior change through communication 3218. This embodiment is for illustrative purposes and not intended to be all encompassing.

Second Smart City Example

FIG. 97 depicts a complete CICP infrastructure as used by a city for managing its interactions and communications in a public/private platform. The exemplary city has numerous current and existing systems and data bases, here denoted as "Legacy" systems, 3220. These will be in communication with and be made available to the Master Public/Private CICP system 3222 as shown by link 3224. The city management 3226 controls the CICP as shown with arrows 3128, 3144, 3146 and 3148. Numerous MTCICP and or SHCICPs systems 3230 are placed across the city and or connected to facilities and systems across the city. They are connected and controlled via bi-directional communication to the master CICP as shown with arrows 3232 and 3146. The CICPs shown in 3230 are connected with numerous Sub CICPs that can be CICPs, MTCICPs and/or SHCICPs as shown at 3234. These include public sensors, public buildings, private buildings, private sensors, private cars, city owned vehicles, transportation systems, mobile devices worn by private citizens working in the city, living there and or visiting, as well as mobile devices for those working in the city for the city and those keeping the city safe and healthy. These CICPs all gather data in connected Sub CICPs that calculate and combine their data with a Communication CICP via link 3142 to select and gather information from various CICPs such as Public Sensor CICP via communication 3136, Private Sensor CICP via communication 3138, Transportation CICP via communication 3140 and Communication CICP via communication 3142. These CICPs aggregate and submit the data to the Master CICP 3222 in bi-directional communication as shown at 3232. This aggregated data is captured, recorded and retained by the master CICP 3222. The data is used to compute and/or present data to the City Management 3226, shown with, for example, arrows 3144, 3148. Commands and decisions are made by the city management, and these commands are captured and retained by the CICP 3222, which calculates commands to go out to the Sub CICPs, as shown with arrow 3146. Feedback from these actions or commands is provided in bi-directional communication 3232, 3146 and is reported and captured by the CICPs 3230. They transmit their aggregated data back to the Master CICP 3222, via the same bi-directional communication link 3232, 3146. These data are then captured, retained and used for calculations with results represented and presented to City Management via link 3148. All interactions, results, data, communications, feedback, and content gathered is recorded and retained via the master CICP 3222 and that is relevant for and communicated into the relevant the legacy system as shown by arrow 3150. This embodiment is for illustrative purposes and not intended to be all encompassing.

Master Enterprise Example

FIG. 98 is a schematic overview of a CICP system that presents a master CICP system including "Master Enterprise CICP" 3152 at a retailer with one or more retail locations. The Enterprise can also be other corporate entities such as airports, grocery stores, hotels, stadiums, hospitals, convention centers, shopping malls, government offices or facilities, factories and other large or small facility. The Enterprise can also be a series of smaller locations such as a chain of retailers, franchises, fast food restaurants or consortiums of any or all of them, connected together. In the exemplary master system includes Master Enterprise CIPC 3152; sub-CICPs designated as Communication CICP 3170; Transportation CICP 3174; Sensor CICP 3180 and Sub CICP 3189. The master system also includes Store Displays 3158; Data Systems 3156; Corporate Management 3154; Customer Devices 3184; Management and Staff Devices that in turn include Store Manager Control Devices 3163; Mobile Devices and Wearables for Corporate Management 3163; Mobile Devices and Wearables on Sales Staff 3164 and Mobil Devices and Wearables on Managers 3200. It has a central management depicted as "Corporate Management" 3154 with Data Systems 3156, Interactive Store Displays 3158, Shelves and Shelf Displays, Vending Machines and Proximity Displays. The system also includes Stocking & Transport Systems 3166, and Point of Sale "POS" System 3162. These systems are in communication with each other directly or indirectly, as shown at for example with arrows 3169, 3169A, 3171, 3173, 3175, 3177, 3179, 3181, 3183, 3185 and 3189. The Master Enterprise CICP 3152, also referred to as MECICP 3152 receives data and is connected with legacy and other data systems referred to as "Customer Data" 3168, "Inventory Systems" 3160A, and has access to "Rewards Programs" 3162A, "Pricing Systems" 3164 and Business Intelligence (BI) and Control Systems, 3167. The Corporate Management controls the MECICP, as shown with arrows 3167A, 3167B, 3167C and 3167D. The MECICP 3152 then provides commands, information, content and calculated instructions to the various sub CICPs, such as commands to the staff's communication CICP 3170 as shown with link 3172, to the Stocking and Transportation Department 3166 via the Transportation CICP 3174 via links 3176 and 3177, the POS System 3162 via link 3178, the Store Displays via Sub-CICP 3189 and Sensor CICP 3180 via links 3159, 3183, 3182, 3191 and 3193 and directly to the Customer's Device 3184 via links 3186 and 3187. These actions are measured, verified, recorded and retained, and presented back to the Corporate Management 3154, through the MECICP 3152 directly or indirectly as shown with communication arrows 3167A, 3167B, 3167C, 3167D, 3157, 3189, 3188, 3193, 3178, 3177, 3176, 3169, 3169A, 3171, 3172, 3173, 3175 and 3177. Further actions are sent to the MECICP 3152 based on this information. Instructions, information, updates, data and business intelligence is presented to the staff Communications CICP 3170. Messages, instructions, information and curated content is then transmitted from the Communication CICP 3170 to the Mobile Devices and Wearables 3164 as shown at arrow 3181 on the sales staff members with feedback sent back to the Communication CICP 3170 via communication link shown at 3179. Messages, instructions, information and curated content are then transmitted from the Communication CICP 3170 to the Mobile Devices and Wearables on the Managers 3200, as shown with arrow 3185 with feedback sent back to the Communication CICP 3170 via link 3183. Messages, instructions, information and curated content is then transmitted from the Communication CICP 3170 to the Mobile Devices and Wearables on the Corporate Management shown at 3163 via link 3165, and to Store Managers Control Devices shown at 3161 with feedback sent back to the Communication CICP 3170 via link 3165. The communication CICP 3170 then communicates all the interactions, data, content, results and feedback to the MECICP 3152 as shown by arrow 3169. Feedback based on all the instructions across the whole infrastructure is gathered and collected by the various sub CICPs and submitted to the MECICP 3152 as shown, for example, for the Sensor CICP 3180 by arrow 3193 and for the Transportation CICP 3174 shown by arrow 3177 and from the Customer Devices 3184 shown by links 3187 and 3191 through Sub-CICP 3189, with the results from the POS System 3162 communicated to the Sensor Hub 3180 via link 3163, the communication, instructions, data and/or curated content from the Transportation CICP 3174 to the Stocking and Transportation systems 3166 as shown with link 3161, and with feedback from the Transportation CICP 3174 sent via link 3177 back to the MECICP 3152. The results are gathered, collected, recorded and retained by the MECICP 3152 and any calculations previously performed are presented to Corporate Management 3154. Further instructions can then be sent back to the staff based on all this information from the Corporate Management 3154 to the Communication CICP 3170 as shown with arrow 3172 with feedback communicated back to the Corporate Management via arrow 3173. All the interactions, results, responses, feedback, data, content, and other curated content with information about who, what and when the transmissions of the data and instructions occurred are transmitted to the appropriate Data Systems 3156 to be captured, recorded and retained. This embodiment is for illustrative purposes and not intended to be all encompassing.

Distribution of CICP Systems Via Software Developer Kits (SDK)

FIG. 99 is a schematic overview of how CICP systems, for example SHCICP 3234, CICP, 3236 and/or MTCICP 3238 can be distributed via a Software Developer Kit (SDK) to various levels of users, implementers, consultants and enterprises. The SHCICP, CICP and/or MTCICP are connected to the control databases such as—but not limited to—Customer Database 3240, the enterprise's own Enterprise Database 3242 and a database or number of databases with information about the relevant experiences, actions, context, locations, merchandise and or event as shown as Experience Database 3244. These databases communicate with the SHCICP, CICP and/or MTCICP as shown with links shown as 3246. Each SHCICP, CICP and/or MTCICP solution has been programmed to be able to be distributed via a dedicated SDK 3248 as is a common and well established distribution model for software and platform solutions that are in communication with the SDK as indicated by links 3250. One advantageous aspect of this embodiment of the invention is that the SDK will be programmed to have features and complexity based on the type of distributor depicted as "Developer" 3252, "Enterprise IT" 3254 or "Small/Midsize Business" 3256 all of which are in communication with the SDK 3248 as shown by link 3258. If the distributer is a "Developer" 3252, there are two ways this "Developer" can distribute the solution to its "End User" 3260: via a single "Business Customer "N"" 3262 with a dedicated solution distributed as shown with arrow 3264 and presented to the End User 3260 as shown with arrow 3266. If the Developer 3252 wants to build a common solution that can be distributed to many business owners, he can create one common solution using the SDK as shown with arrow 3268 for "Business Customer "N+1"" 3270 who will share with numerous End Users 3260 as shown with arrow 3272. An SDK can also be created for an Enterprise, shown as "Enterprise IT" at 3254, which receives a solution as shown with arrows 3258 and 3254. Should a specific Enterprise Unit 3274 be created by the Enterprise 3254, the solution will be transmitted to End User(s) shown at 3278, via arrows 3376 and 3280, or from an Enterprise IT Department 3282 that can use the solution, and can create a specific solution for Enterprise Unit 3274 as shown with arrow 3286. The same Enterprise IT 3254 Department 3282 can distribute solutions to other Enterprise Departments not separately shown, but like that shown at 3282 via links not shown, but like the link shown with arrow 3284, and who can create their own versions to distribute to their Enterprise IT End Users, not shown but like the User shown at 3278 and via links not shown but like the link as shown with arrow 3286. Should a Small/Midsize Business use the SDK, it is likely they do not have the resources to further develop sub-solutions and therefore more likely to create solutions directly for the communications with their End User 3288 and distribute this directly as shown via arrow 3290. This embodiment is for illustrative purposes and not intended to be all encompassing.

Curated, Location Based and Personalized Experiences Delivered in Augmented Reality, Virtual Reality and Mixed Reality Based on Geo & Specific Enhanced Content FIG. 100 depicts a schematic use of an embodiment of the invention blending SHCICP, CICP and MTICIP systems to deliver location based, personalized, localized and experience specific Augmented Reality (AR), Virtual Reality (VR) and/or Mixed Reality (MR) game play. In this embodiment of the invention, a series of databases with known information and data about a player, shown as "Customer Database" 3292, the location of the player, shown as "Location Database" 3294 and the experience that is about to be served, shown as "Experience Database" 3296 are in communication and presenting data as shown via arrow 3298 to individual or a combination of SHCICP 3300, CICP 3302 and/or MTCICP systems 3304. These platforms communicate and transmit their collected, calculated and curated experiences and data as shown with arrow 3306. A database with augmented experiences such as 3-D models, videos, audio, tactile input/output and/or other sensor output is shown at 3308, and exports and communicates it's information, data, commands and curated experiences as shown with arrow 3310, while a database with game play algorithms, rules and game engines, shown at 3312 outputs or exports and communicates it's information, data, commands and curated experiences as shown with arrow 3314. The combined data, commands and curated experiences that is output from the above combinations of curated content through the data and communication feeds 3306, 3310 and 3314 is then communicated and transmitted into AR/MR/VR distribution 3316 and then replayed in Mixed Reality (MR) as indicated by 3318 as communicated as shown with arrow 3320, and/or in Augmented Reality (AR), shown at 3322, as communicated as shown with arrow 3324 and/or in Virtual Reality, shown at 3326, communicated as shown by arrow 3328. This embodiment is for illustrative purposes and not intended to be all encompassing.

FIG. 101 is a schematic diagram of the embodiment shown in FIG. 100, and including a series of feedback loops. The feedback loops further enhance the various curated experiences presented in AR, VR and/or MR. In this embodiment there is a feedback for the Mixed Reality experience presented at 3330. The MR experience is presented as shown with arrow 3332. A feedback loop is created with communication from the MR delivery device as shown with arrow 3334. This feedback will then present a further enhancement of the MR curated content presented as shown with arrow 3336. This feedback loop can continue to improve the curated MR experience as long as the user is engaged with the MR experience. There is a feedback for the Augmented Reality experience 3338, with the initial experience presented as shown with arrow 3340 and with a feedback loop as shown with arrow 3342. This feedback will then present a further enhancement of the AR curated content 3344 presented as initially shown at 3340. This feedback loop 3342 can continue to improve the curated AR experience as long as the user is engaged with the AR experience. There is a feedback for the Virtual Reality experience, shown at 3346. The VR experience is initially transmitted as shown with arrow 3348, and then again transmitted with a feedback loop as shown with arrow 3350. This will then present a further enhancement of the VR curated content presented as shown with arrow 3352. This loop can continue to improve the curated VR experience as long as the user is engaged with the VR experience. In other words, the feedback loops provide for continuous feedback and improvement of the experience with each round of feeding back and processing the experience. This embodiment is for illustrative purposes and not intended to be all encompassing.

FIG. 102 is a schematic diagram overview of an embodiment of the invention in which multiple users are engaged in a variety of curated experiences, game play and/or other content experience in the systems described in FIG. 101. In this embodiment multiple users are experiencing the curated experience individually with each experience delivered and controlled via a central Contextually Intelligent Geolocation and Sensor Experience Replay Game Processor (CIGSERGP) 3354. User A 3356 is experiencing the curated experience served by the CIGSERGP and transmitted to User A as shown with arrow 3358. The feedback from the system as described with reference to FIG. 101 is then transmitted back to the CIGSERGP as shown with arrow 3360. Further enhanced curated content is then sent back to User A via a shown as arrow 3362, and this process is repeated as long as the user is engaged with the curated experience in AR, VR and/or MR. User B 3364 is receiving curated experiences in a similar fashion, that is, curated, personalized and delivered to him based on his location, past user behavior and experiences as delivered by the CIGSEGP via a link shown as arrow 3366. Feedback from the system as described with reference to FIG. 101 is then transmitted to the CIGSERGP 3354 as shown with arrow 3368. Further enhanced curated content is then sent back to User B via a link shown as arrow 3370, and this process is repeated as long as the user is engaged with the curated experience in AR, VR and/or MR. Furthermore, feedback, input and or data collected from User B by the CIGSERGP via link 3368 can be used to further enhance the curated experiences delivered to User A via link 3362. Conversely, input, feedback, results and other data gathered by the CIGSERGP regarding User A via link 3360 can be used to further enhance the curated content delivered in link 3370 to user B. Feedback loops 3358, 3360, 3362, 3366, 3368 and 3370 enable the CIGSERGP 3354 to continue to gather, record, retain and improve information about the curated experiences. This knowledge can then be transmitted by the CIGSERGP 3354 to the various databases and control systems for further enhancement of each component, as shown by the various links that connect the system components, initially starting with the link from the CIGSERCP 3354 as shown with arrow 3372. This will provide feedback to the "Customer Database" 3374 as shown with arrow 3376, "Location Database" 3378 as shown with arrow 3380 and "Experience Database" 3382 as shown by arrow 3384 which all record and retain relevant data for future real-time use, while presenting the relevant information to the relevant SHCICP 3386, CICP 3388 and/or MTCICP 3390 system for further enhancement of content, experiences and/or control commands, while enhancing the "Game-Play Database" 3392 which is in bi-directional communication with all the various CICPs systems as shown with arrow 3394 and the Augmentation Database 3396 which is in bi-directional communication with all the various CICP systems as shown with 3398. This embodiment is for illustrative purposes and not intended to be all encompassing.

FIGS. 103, 103A and 103B are schematic representations of multiple CIGSERGP systems described in regard to the FIG. 102 embodiment. System "CIGSERGP 1", 3400 is in operation as described in FIG. 102 with output delivered to one or many (1+N where "N" is a positive integer potentially of infinite magnitude) other "CIGSERGP" systems, namely "CIGSERGP 1+N" as illustrated at 3402. Feedback from the "CIGSERGP 1+N" system is sent back to the "CIGSERGP 1" system as shown with arrow 3404. Feedback from the "CIGSERGP" 3400 is then communicated back to the "CIGSERGP 1+N" 3402 as shown with arrow 3406. The process can then be repeated between the CIGSERGP systems that are connected until one ends the process. Other systems ("+N") can continue to communicate as long as they are connected. This embodiment is for illustrative purposes and not intended to be all encompassing.

Gathering of Contextual Data by End Users, and the Use of this Data Example

FIG. 104 is a schematic overview of a common database gathering data across multiple CICP, MTCICP and SHCICP systems. In this embodiment of the invention, an "End User A" 3408 is in a context "A" 3410 that is controlled by one or more CICPs, shown as "CICP "N"" 3412 or multiple CICP systems shown as "CICP "N+1"" 3414. The End User interacts with the "CICP "N"" system 3412 and data and enhanced experiences are transmitted, delivered, as described before, and shown at 3416 and 3418 in FIG. 104. The End User can also interact with other "CICP N+1" systems 3414 while in the "A" context, before, simultaneously, coordinated with and/or independently, during and/or after the interactions with the first single CICP 3412, as shown with arrows 3420 and 3422. The aggregated results of these interactions are sent to a database "End User A Data" 3424, where the data is stored and retained for future or current use, as shown with arrow 3426. The data gathered from one of the CICP systems can be used to further enhance the curated experience in context A, hence the bi-directional dataflow back to the components shown in Context A 3410, shown with arrow 3428. Furthermore, "End User A" 3408 may enter another context "B", shown at 3430, that is controlled by "MTCICP "N"" 3432 system and/or multiple MTCICP systems, shown as "MTCICP "N+1"" 3434. End User A interacts with the "MTCICP "N"" system 3432 and data and enhanced experiences are transmitted, delivered, as described before, and as shown with arrows 3436 and 3438 in FIG. 104. End User A can also interact with other "MTCICP 1+N" systems in Context B 3430 before, simultaneously, coordinated with and/or independently, during and/or after the interactions with the single MTCICP, as shown with arrows 3440 and 3442. The aggregated results of these interactions are sent to database "End User Data" 3424 where the data is stored and retained for future or current use, as shown with arrow 3444. The data gathered from one of the MTCICP systems can be used to further enhance the curated experience in context B, hence the bi-directional dataflow shown by arrows 3444 and 3446. Furthermore the "End User A" 3408 may be in a context "C" 3448 that is controlled by a SHCICP system referred to as "SHCICP "N"" 3450 and/or multiple SHCICP systems "SHCICP "N+1"" 3452. The End User A interacts with the "SHCICP "N"" system and data and enhanced experiences are transmitted, delivered, as described before, as shown by arrows 3454 and 3456. He can also interact with other "SHCICP 1+N" systems in the "C" context 3448, before, simultaneously, coordinated and/or independently, during and/or after the interactions with the single SHCICP 3450, as shown with arrows 3458 and 3460. The aggregated results of these interactions are sent to database "End User Data" 3424, where the data is stored and retained for future or current use, as shown with arrow 3462. The data gathered from one or more of the SHCICP systems can be used to further enhance the curated experience in context C, hence the bi-directional dataflow shown with arrows 3462 and 3464. This embodiment is for illustrative purposes and not intended to be all encompassing.

FIG. 105 is a schematic representation showing the FIG. 104 embodiment, and, in addition, where Context A and Context B contain multiple, different types of CICP systems. The "End User's Device", 3466 is connected to the user's database, shown as "End User's Database" 3468 and is in bi-directional communication with the End User's Database as indicated at arrows 3476, 3478, 3486 and 3488. As the End User enters context "A" 3470, his device communicates with the MTCICP "N" 3470A and/or the SHCICP "N" 3470B and/or the CICP "N" 3470C as shown with arrow 3472. The results of these interactions are transmitted back to the user's device as shown with arrow 3474. These data are transmitted back to the End User's Database 3468 as described above. The aggregated, combined, compiled and/or calculated results of the new data from the communication as shown with arrow 3474 is transmitted to the End User's Database 3468, and the previously stored data on the End User's Database is transmitted back to the End User's Device 3466. As the End User enters new context(s), such as "B" 3480 where at least one of multiple MTCTP, SHCICP, CICP, "MTCICP N+1", "SHCIP N+1" and/or "CICP N+1" systems are connected, the End User's Device transmits and communicates with these platforms with the data known from the End User's Database 3468 to the systems in Context B as shown with arrow 3482. The feedback from these systems is transmitted back to the End User's Device as shown by arrow 3484 in the same manner as shown with arrow 3474. The aggregated data is then transmitted back to the End User's Database as shown with arrow 3486. Data from these interactions are then communicated back to the device, as shown with arrow 3488 so the device is ready for the next context interaction with the knowledge from the past interactions with information generated when the End User was in Context A and in Context B. This information flow in the communication loop will then continue as the User moves from Context to Context with the End User's Database gathering, recording, retaining the data gathered, and presenting it back to the CICP, MTCICP and SHCICP systems in new contexts to further enhance the end user curated experiences. This embodiment is for illustrative purposes and not intended to be all encompassing.

FIG. 106 is a schematic overview of an alternate embodiment showing the interactions between the End User (not numbered) via his connected Device 3490, the End User's Database 3492 and CICP 3494 as the user interacts with the CICP 3494 and then the data is used to enhance future CICP 3494 interactions. In this embodiment the End User's device communicates with the User's Database 3492, as shown with arrows 3496 and 3498. This bi-directional communication is then used by the Device 3490 to communicate with the CICP 3494 when the End User's Device 3490 connects with it as shown with arrow 3500 and the results of these interactions are communicated back to the Device 3490 as shown with arrow 3502. The results of these interactions are transmitted back to the End User's Database 3492 as shown with arrow 3504, and with the results of any calculations or computation done on the data by the database system transmitted back to the device, as shown with arrow 3506. The Device 3490 is thereby ready with knowledge of these interactions for use with the next interactions with the CICP 3494 and/or with any other system(s) it connects with in future interactions. This embodiment is for illustrative purposes and not intended to be all encompassing.

FIG. 107 is a schematic overview of an alternate embodiment showing the interactions between the End User's Device 3508 and the End User's data base, Database 3510, as the user interacts with the first CICP 3502. Then the data is used to enhance the next CICP interactions with other CICPs, such as 3504. In this embodiment the End User's Device 3508 communicates with the User's Database 3510 as shown with arrows 3506 and 3508. This bi-directional communication is used to communicate with the CICP 3502 when the End User's Device 3508 connects with it, as shown with arrow 3510 and the results of these interactions are communicated back to the Device, as shown at 3512. The results of these interactions are transmitted back to the end User's Database, as shown with arrow 3514 and with the results of any calculations or computation done on the data by the database system transmitted back to the Device, as shown at 3516. As the End User's Device 3508 comes into communication with a new or different CICP system, such as "CICP+N" 3504, the data known by the End User's Device 3508 as transmitted to it from the End User's Database 3510 as shown with 3516 is transmitted to the CICP+N as shown with arrow 3518. The results of these interactions are sent back to the End User Device, as shown with arrow 3520. The results of these interactions are transmitted to the End User's Database 3510 by the End User Device 3508, as shown with arrow 3522, with the results of any calculation or computation done on the data by the database system transmitted back to the Device shown at arrow 3524. This embodiment is for illustrative purposes and not intended to be all encompassing.

FIG. 108 shows an alternate embodiment that expands on the FIG. 107 embodiment. In this embodiment, the CICP systems, shown at 3528 and 3530, are connected and communicate bi-directionally, as shown with arrows 3540 and 3546. These communications can occur before the end user interacts, via his mobile device 3526 with either "CICP" 3528, and/or while he interacts with "CICP+N" 3530 during "CICP" interactions, before "CICP+N" interactions, simultaneously with all or separately, individually with the "CICP" or the "CICP+N" systems or with any combination of any interconnected CICP systems as described with reference to FIG. 107. In this embodiment, the CICP enables communication with the End User's Device 3526, as shown with arrows 3530, 3532, 3538 and 3548 as described before with communication to the End User's Database 3533, as shown with arrows 3534, 3536, 3550 and 3552, and as described with reference to the FIG. 107 embodiment. In this instance the results of these interactions are communicated to the CICP 3528, which is in bi-directional communication with the "CICP+N", as shown with arrows 3540 and 3546. As the end user connects with the CICP+N, as described before with reference to the FIG. 108 embodiment, shown with arrow 3542, the aggregated information from the "CICP+N 3530, that includes the information from the CICP 3530 is transmitted to the End User's Device 3526 as shown with arrow 3544, and to the CICP 3528 as shown with arrow 3546, which can also communicate this interaction with the End User Device 3526 if the connection is still active, through connection shown at 3548. The net results of these interactions are communicated from the End User's Device 3526 to the End User's Database 3533, as shown with arrow 3550 with the results communicated back to the device as shown with arrow 3552 for future CICP interactions. This embodiment is for illustrative purposes and not intended to be all encompassing.

Use of CICP Systems to Identify Registered Users in a Crowd Embodiment

FIG. 109 is a schematic overview of another embodiment of the invention where a CICP 3554 system is used to identify specific users in a context setting. In this instance, "End User A" 3556 has a condition as identified by the "Condition Database" 3558, a database with known information about the user from "End User A Database" 3560, a care team that is known, as shown as "Care Team Database" 3562 and is in a context with numerous other users such as "End User A, End User B, End User C and End User N+1, collectively shown at 3564. There is also a database used by an organization such as a police department or rescue team, shown as "Police/Rescue Team Database 3566. End User A's Device 3568 communicates with the CICP 3554 as shown with arrows 3570 and 3572. The CICP 3554 communicates bi-directionally with the Condition Database 3558 about the End User's condition, as shown with arrows 3574 and 3576. The CICP 3554 also communicates with the Care Team Database 3562 in a bi-directional manner, as shown with arrows 3578 and 3580, as well as with the Police/Rescue Team Database 3566 as shown with arrows 3582 and 3584. Continuous bi-directional communications with the end user's personal database, shown for example at End User A Database 3560 and with arrows 3589 and 3590. The combined, computed and aggregated data is then communicated back to the End User's device, as shown, for example at End User A Device 3568 and arrow 3572. This embodiment is for illustrative purposes and not intended to be all encompassing.

FIG. 110 is an alternate embodiment that is an extension on the FIG. 109 embodiment and where a police officer or other authority person with a device, shown as, for example, Police Device 3594 that is connected to the CICP 3608, which is like the CICP 3554 as described with reference to FIG. 109. As a police officer enters an area, location and/or context where, for example End User A referred to in the FIG. 109 embodiment is located with his connected Device 3596 and with Other Users 3598 and the devices of the Other Users. In this instance, the system is established and operating as described in FIG. 109 when the police officer enters with his connected device, shown as "Police Device" 3594, which communicates with the CICP 3608 as shown in bi-directional communication with arrows 3600 and 3602. This Device 3594 is programmed to identify the End User A and/or his device when in proximity, as shown with arrows 3604 and 3606. This programmed identification can be via BLE, WiFi signature, and/or a series or combination of readily available peer to peer protocols that are available when authorized by End User A and enabled on police devices. Once the connection is established, the End User A Device 3596 can authenticate the matching, as shown for example by a communication shown with arrow 3606. Alternatively, the presence of the police officer in the same context as the End User can be detected by the CICP 3608, as follows: the End User A's Device 3596 is connected to the CICP 3608 as shown with arrow 3610 and the context integration is confirmed via this communication. The Police Device communicates with the same CICP 3608, via the communication shown by arrow 3600 and the CICP 3608 detects the context of the Device 3596 and which context is confirmed by the CICP 3608 and the information is transmitted to the Police Device 3594, as shown with arrow 3602. The CICP 3608 will therefore be able to detect when the Police Device and the End User A Device are in the same context, i.e., same location, proximity, area etc. Once the CICP 3608 has confirmed that they are in the same context via the proximity detection method between the two, as shown by arrows 3604 and 3606 or by cloud based pairing performed by the CICP 3608, as shown with arrows 3610, 3600 and 3602 this information about the interaction can be communicated to all parties. The police officer can receive collected information from the CICP 3608 as shown with arrow 3602. This information can include data about the user 3612, his condition 3614 as well as information about the user's care team 3616. The police officer can also learn more information about other interactions with the end user that the Police/Rescue Team may have, as shown at 3618. Any interaction with the police and information that is relevant and of value to the end user can also be delivered to the end user, as shown with arrow 3620. Any, all and/or select information about the interactions between the police and the end user, can be retained, recorded and delivered to the Care Team and its Database 3616, as shown with arrow 3622, and any results of such communications can be communicated back to the CICP as shown with arrow 3624. Any information relevant to the condition can be used to learn and study aspects of the condition, as shown with arrow 3626, and the results can be communicated back to the CICP as shown with arrow 3628. Conversely, information and data that are relevant to any of these interactions can be transmitted to the Police/Rescue Team Database 3618, as shown with arrow 3630 and any relevant results can be transmitted back to the CICP as shown with arrow 3632. Any and all information that is relevant to End User A can be recorded and retained by End User A in his Database 3612, as shown with arrow 3634 with the ability to provide this information in future interactions with the CICP 3608 as shown with arrow 3636, where the process can be repeated and the results and actions improved in future interactions when summary or aggregated information from the CICP 3608 can be transmitted to the End User A's Device 3596, as shown with arrow 3638. This embodiment is for illustrative purposes and not intended to be all encompassing.

FIG. 111 is a schematic overview of an extended system embodiment as shown in FIG. 110, but which also includes a Location Database 3640, a SHCICP 3642 and Sensors 3644 in the area. In the FIG. 111 embodiment of the invention, there is a database with known information about a location, shown as "Location Database" 3640, that communicates and provides bi-directional communication with a SHCICP 3642, as shown with arrows 3646 and 3648. SHCICP 3642 also bi-directionally communicates with CICP 3608 that was described in FIG. 110 as illustrated by arrows 3650 and 3652. It also communicates with multiple Sensors 3644, shown as "Sensors N" and "Sensors N+1" as illustrated by arrows 3654 and 3656. In this embodiment the system is functional and operational as described with reference to FIG. 110. An end user enters an area or location where there are Sensors 3644, End User Device 3658, which triggers interactions and bi-directional communications, pairing and/or other one-way interactions between the Device 3568 and the Sensors 3644, as depicted by arrows 3660 and 3662. This triggers bi-directional communication with the End User Device and the CICP, 3664 and 3666, which then communicates with the SHCICP 3642, as shown with arrows 3650 and 3652. The SHCICP 3642 also is in communication with the sensors that the end user's device has been in communication with, as shown with arrows 3654 and 3656. The SHCICP 3462 is also in bi-directional communication with the Location Database 3640 as shown by arrows 3648 and 3646, with the results of all these communications and the results of any computation initiated as a result of these interactions communicated between the SHCICP and the CICP, as shown by arrows 3652 and 3650. The CICP 3608 communicates back to the User's Device 3658, as shown with arrow 3666 and the sensor(s) 3644 will communicate back to the User's Device, as shown at arrow 3662. These aggregated content, data and/or computed commands are then communicated to the CICP 3608, as shown with arrow 3664. The complete process with its feedback loops and distribution of content, experiences, data, instructions, results, knowledge and other information as described with respect to FIG. 110 across all the effected and integrated users, systems and databases are then repeated per the descriptions provided with reference to FIG. 110. This embodiment is for illustrative purposes and not intended to be all encompassing.

FIG. 112 is a schematic overview of an extended system described with reference to FIG. 111 and FIG. 110. In the FIG. 112 embodiment, a "Monitoring Device" 3668 as used by Monitoring Personnel or those tasked with a need to provide an overview of a location, of users or of activities is integrated into the system. This Device 3668 is in bi-directional communication with the CICP 3670, as described with reference to FIG. 111, and as shown with arrows 3672 and 3674, and can be in bi-directional communication with End User A's Device 3676, as shown by arrows 3678 and 3680. The interaction processes with the Sensors 3682, the SHCICP 3684, the various Databases 3686 and the End User Database 3688 via the CICP 3670 as described with reference to FIG. 111 is repeated and results, interactions, content, instructions, curated content, results, data, feedback and communications as described for the end users and the monitoring personnel as shown in FIG. 112 are now repeated for the monitoring personnel and end user(s) on their devices 3668 and 3676. This embodiment is for illustrative purposes and not intended to be all encompassing.

Use of Multiple CICP Systems in Various Facilities to Provide Extended Care and Support for Users Embodiment FIG. 113 is a schematic representation of an extension of the system described with reference to FIG. 109, with additional CICP systems, shown as CICP N+1 at 3270 interacting with the End User A's Device 3690 and with an Integrated Facility Database 3738. In this embodiment, the same type of structures and interactions described with reference to FIGS. 109, 110, 111 and 112 will apply with the addition of a database that contains information about the facility, shown as Facility Database 3688 the end user is within. End user A has a device, referred to as "End User A Device" 3690 that communicates with CICP N 3692 as illustrated with arrows 3694 and 3696. This CICP 3692 is in bi-directional communication with "Condition Database" 3698 as shown with arrows 3700 and 3702, "Care Team Database" 3704 as shown with arrows 3706 and 3708 and a database that contains information about the facilities associated with "CICP N", shown as Facility Database 3688, and communicates with it as shown with arrows 3710 and 3712. Any and all data and interactions between these and the CICP N 3692 that are associated with End User A are captured, recorded and retained by End User A database 3714 as shown by bi-directional communications shown at arrows 3716 and 3718. These interactions are described with reference to the FIG. 109 embodiment, but with inclusion of facility information as stored in Facility Database 3688. The End User then enters into another facility where another CICP is in operation or where numerous CICPs are in operation, shown as "CICP N+1" 3720 and the end user's device starts bi-directional communication with CICP N+1 3720, as depicted with arrows 3722 and 3724. This CICP 3720 communicates with a "Condition Database" as shown at 3726 that is in bi-directional communication as shown with arrows 3728 and 3730, communicates with a "Care Team Database", 3732 as shown with arrows 3734 and 3736 and communicates with a database that contains information about the facilities associated with "CICP N+1" 3720, shown as Integrated Facility Database 3738, and with the communications as shown by bi-directional arrows 3740 and 3742. Any and all data and interactions between these and the CICP N+1 3720 that are associated with End User A are captured, recorded and retained by End User A Database 3714 as shown with bi-directional communication arrows 3744 and 3746. These interactions are described with reference to FIG. 109, but modified to provide that the facility information is included in the communications. The information from interactions with CICP N+1 3270 transmitted as shown with arrow 3744 to the End User A Database 3714 can be used by the CICP N 3692 as illustrated with communication arrows 3716 and 3718. Conversely, the information gathered by the CICP N 3692 and transmitted to the End User A Database as shown with arrow 3716 can be used by the CICP N+1 3270 as shown by communication arrow 3746. This embodiment is for illustrative purposes and not intended to be all encompassing.

Example Embodiment of Use of a Common CICP Using Various End User's Databases to Present Curated Content FIG. 114 presents a schematic overview of a CICP system used to present curated content to end users based on their end user databases. In this embodiment of the platform, a CICP, shown as CICP N 3748 is used to present a series of curated experiences, herein illustrated as "Product/Offer/Service", "Time", "Availability", "Quantity", "Promotional Value" and "Upsell Opportunity" 3750 as a series of suggested features/parameters/quantifiers of the curated content and the way to assign values to each feature/parameter/quantifier that communicate with CICP N 3748 in bi-directional manner as shown with arrows 3752 and 3754. When, for example End User A 3576 enters into an area that activates communication between End User A Device 3777 and CICP N 3748 in bi-directional communication shown with arrows 3836 and 3838. This entry triggers CICP N 3748 to communicate with End User A Database 3782, as shown with bi-directional communication arrows 3784 and 3786. Based on this information, the CICP N 3748 will then communicate with "Product Offer/Service Database" 3788 in bi-directional manner as shown by arrows 3790 and 3792. Based on computations performed by CICP N 3748, based on parameters presented and communicated as shown with arrows 3752 and 3754, and queries sent back and forth via communication links 3790 and 3792, and 3784 and 3786, curated content and experiences are presented to End User A Device 3777 as shown by arrow 3838 with a feedback loop to the CICP N 3748 with the results of how the End User A reacted to the curated content as shown with arrow 3836. This result is then communicated to the End User A Database 3782 as shown with arrow 3786. End User B, 3794 enters into an area that activates a communication with his Device 3790 and the same CICP N 3748 as shown with bi-directional communications 3796 and 3800, simultaneously or after the communication between the CICP N 3748 and End User A. The results of presenting this curated content is then sent via link 3786 to End User A Database 3782, recorded and retained for future use by End User A Database 3782. The same process is performed by CICP N 3748 for End User B 3794 by connecting with End User B Database 3795, instead of End User A Database 3782, as shown with arrows 3802 and 3804 for End User B Database Communication. The results of the process and computation performed by the CICP 3748 as described for End User A, but now performed for End User B based on End User B Database communication, present curated content that is personalized for End User B as shown with communication arrows 3796 and 3800 to End User B's Device 3790. The results of presenting this curated content is then recorded and retained for future use by User B Database 3795, communicated as shown with arrows 3802 and 3804. This embodiment is for illustrative purposes and not intended to be all encompassing.

Referring to FIG. 115, an alternate embodiment, schematic overview shows how a CICP as shown and described with reference to FIG. 114, but referred to in FIG. 115 as CICP N 3806, can be used to broker transactions between End User A 3808 via End User A Device 3810 and End User B 3812 and End User B Device 3814. CICP N operates as described with reference to FIG. 114, but in the FIG. 115 embodiment, End User A Database 3822 has received additional information from End User A, here illustrated as "Desire", "Need", "Funds", "Promotional Value" and "Perceived Value" as shown at 3816. This additional information is entered into and communicated bi-directionally with End User A Database 3822 as shown by arrows 3818 and 3820 and is further communicated to and from the CICP N 3806 as shown with arrows 3824 and 3826. End user B 3812 has information/parameters as well, and is illustrated as "Desire to Sell", "Need to Sell", "Promotional Value", "Funds" and "Perceived Value", collectively shown at 3814. These parameters are transmitted to the End User B Database 3834, in bi-directional communications as shown with arrows 3830 and 3832. End User A 3808 is in communication with CICP N 3806 as shown with arrows 3836 and 3838 and has a desire to purchase, acquire, trade or otherwise obtain something of value or experience or consume curated content from End User B, as communicated to End User A Device 3810 and bi-directional communications with the CICP N 3806 as shown with arrows 3836 and 3838. End User A has described his desires and other aspects of the communications referred to at 3816. The CICP N 3806 then will match these parameters with the data received from the End User B Database. Prior, simultaneous or later communications based on parameters then in CICP N 3806 will evaluate the data presented by End User B 3812 to End User B Database 3834 as shown with communication arrows 3830 and 3832, and as transmitted to the CICP N 3806 as illustrated in bi-directional communications 3840 and 3842. CICP N 3806 will then perform computations to present offers to End User A, as shown with arrow 3838. The response from End User A is presented back to the CICP N, as shown with arrow 3836. Should the response be an acceptance of the offer, this acceptance is communicated to End User B via the CICP N as shown with arrow 3844, and the acceptance of the offer is presented to the CICP N via a communication shown with arrow 3846, with a confirmation send to End User A via a communication shown with arrow 3838. Should End User A not accept the offer, his counter offer can be submitted via communication shown with arrow 3836, and then transmitted to the End User B via a communication shown with arrow 3844, with the End User B responding back with acceptance or counter offer via a communication shown with arrow 3846. This process can repeat until End User A and End User B arrive at acceptable transaction terms. The uniqueness of this alternate embodiment of the invention is the use of a common CICP to pair an entity/user that has something to sell or have something to offer and a user that has a desire to purchase something. This can translate to other transactions without the actual purchase of a product such as for services such as transportation where ride share and taxi services can use the same system. This embodiment is for illustrative purposes and not intended to be all encompassing.

FIG. 116 is a schematic overview of the embodiment described with reference to FIG. 115, but where the transaction between End User A 3848 and End User B 3870 in the FIG. 116 embodiment is for medical care. In this embodiment the system operates as described for the FIG. 115 embodiment, but End User A 3848 is someone who can perform or provide care, medical care, support or other tasks that may be of value to others, and who has a connected device, shown as End User A Device 3850 that is in bi-directional communication with the CICP N 3852 as shown by communication links 3854 and 3856. These exemplary transaction categories 3858 for End User A are illustrated as "Physician", "Medical Care", "Information", "Behavior" and "Compliance", in which a series of parameters are presented and communicated to End User A Database 3864 with which it is in bi-directional communication as shown by arrows 3860 and 3862. The End User A Database 3864 is in bi-directional communication with the CICP N 3852 as shown with arrows 3866 and 3868. End User B 3870, with his connected Device 3872, is someone who is in need of or requests services, herein depicted with topic headings such as "Desired to Get Well", "Need to Have Care", "Reminders", "Self-Care" and "Information" 3874. These parameters are presented to End User Database B 3880 as illustrated with bi-directional communications as depicted with arrows 3876 and 3878. The End User B Database 3880 communicates with CICP N 3852 as shown via bidirectional communication arrows 3882 and 3884. A third party, or numerous third parties, shown at 3886 also communicate with the CICP-N 3852 in a bi-directional manner as depicted by arrows 3888 and 3890. These third parties can, in this example be entities such as hospitals, clinics, venues, spas, senior living facilities, ERs, operating rooms, pharmaceutical companies, medical insurance companies, doctors, physician groups, assisted living organizations, nurses, or $3^{rd}$ party operators or providers of any such facilities, goods, services, etc., with the understanding of what they have to present; that is, a "Product/Offer/Service"; when it is available; that "Time" and "Availability" can refer to the number; that is, the time that it is available; the "quantity" to refer to how much is available; promotional value to refer to whether there is any "promotional value" associated with the offer at that time; and "upsell opportunity" to refer to whether there is any opportunity to provide additional services or products for it at that time. In this instance, End User B is in need of care, while End User A can provide services such as care. The process CICP-N uses to match the needs and offers for the users and the third parties; to transmit a recommended curated experience and services to End User B; and to broker, negotiate and facilitate the communication of such offer(s) is described with reference to FIG. 115. This embodiment is for illustrative purposes and not intended to be all encompassing.

Example of Use of Multiple CICP Systems by Government Entities to Teach and to Educate FIG. 117 is a schematic overview of an alternate embodiment as used by a series of government agencies to provide Contextually Intelligent Communicated Education in a system named IDEAL: "Individualized, Differentiated Education & Arts Learning". In this overview, 3 levels of, or different governments are involved: "Central Government" 3892, "State Government" 3894 and "Local Government" 3896. The Central Government controls a MTCICP 3898 that is connected with the Central Government Curriculum 3900, with bi-directional communications as illustrated by link 3902. An individual state, "State N" 3894, has its own MTCICP 3904 that is connected to the Central Government MTCICP 3898 with bi-directional link 3906. There are more states and there are common systems in addition to the individual state as depicted by "State N+1" Government MTCICP" 3908, all of which communicate with the Central Government MTCICP 3898 with bi-directional communications shown with link 3910. Each individual state has its own curriculum, "State "N" Curriculum" 3912 that provides information to the State N MTCICP 3894, as shown with arrow 3914. Each other state has its own curriculum, shown as "State "N+1" Curriculum" 3916 and each other State N+1 government either collaborates with one or many state governments, and the curriculum of each such government provides information to the State N+1 MTCICP 3908 via link 3918. Each individual state, such as "State N" controls and communicates with its local governments, shown as "Local "N" Government" 3896 that has its own MTCICP and/or SHCICP 3920, that is connected to the state government MTCICP 3894 via bi-directional communication link arrow 3922. There are more local governments and there are common systems in addition to the individual local government, with the additional local governments and additional systems as depicted by "Local N+1 Government MTCICP/SHCICP" 3924, which additional local governments and systems are also in bi-directional communication with each of their corresponding the State N+1 Government MTCICP 3908, as shown with arrow 3926. The individual Local N Government 3896 has its own curriculum, Local "N" Curriculum 3928 that provides information to the Local "N" MTCICP and/or SHCICP 3920 via link 3930. The other local governments each have their own "Local "N+1" Government MTCTCIP/SHCICP" 3924 and have their own curriculum, shown as "Local "N+1" Curriculum" 3932, and either collaborate with one or many others, and the curriculum provides information to the Local N+1 MTCICP/SHCICP 3924 as shown with arrow 3934. This embodiment is an example of the overall multi-tenant architecture in which various curricula are presented to the various CICP systems with controls and oversights enabled at various levels. Curated experiences and content can be delivered by any of the CICP systems to end users such as teachers or students, to operators such a parents or school administrators with oversight and controls of performance at all levels. This embodiment is for illustrative purposes and not intended to be all encompassing.

Example of Use of Multiple CICPs, Expanded Teaching System

FIG. 118 is a schematic overview of the system described with reference to FIG. 117, and expanded to include student devices, student databases, teacher devices and in-school sensors. In this embodiment, the system described with reference to FIG. 117 is operational, but with modifications as described here. A teacher 3936 works for a local government and has a device 3938 that is connected to a school's CICP system identified as "School SHCICP/MTCTCIP" 3940, with bi-directional connections shown with arrows 3942 and 3944. The "School SHCICP/MTCICP" 3940 is shown connected to a database for the teachers and identified as "Teacher Database" 3946. The Teacher Database 3946 which is shown to be in direct bi-directional communication with School SHCICP/MTCICP 3940 via links 3948 and 3950 as well as indirectly with the "Local "N" Government MTCICP/SHCICP" 3952 as shown with bi-directional communication 3954 and 3956. This enables the local "School SHCICP/MTCTCIP" 3940 to operate as the implementation explained with reference to the FIG. 117 embodiment. The "School SHCICP/MTCTCIP" 3940 is also connected to and communicates with a database for the students shown as "Student Database" 3958, and with which it is in bi-directional communication as depicted with arrows 3960 and 3962. A series of students are shown to be in the same context as the teacher and to be in communication with the "School SHCICP/MTCTCIP" 3940 and with their communication devices, one of which is shown as "Student Device" 3966, and in bi-directional communication with the "School SHCICP/MTCTCIP" 3940 with arrows 3968 and 3970. This does not mean that the devices need to be in the same location. A series of additional curated education experiences have been created and stored in a database; "Experience/Motion Capture, AR/VR/MR Database" 3972, which communicates with the "School SHCICP/MTCTCIP" 3940 in bi-directional communication as illustrated with links 3974 and 3976. This same database is also in bi-directional communication with the "Central Government MTCICP" 3980 as shown with arrow 3978, with the "State "N" Government MTCICP" 3982 as shown 3984 and with the "Local "N" Government MTCICP/SHCICP" 3952 as shown with arrow 3988. When "Student N" and the Teacher 3936 are in proximity, a verification of this proximity can be detected in two manners: one is via direct proximity detection between the two devices 3966, 3938, as depicted by links 3990 and 3992. This proximity also can be determined via a series of known technologies such as BLE and/or other proximity/peer-to-peer technologies. A methodology to detect that the student and teacher are in the same context but not at the same location, i.e., they are not in proximity, for instance, they are in a distance learning situation with the teacher in one location and the student(s) is/are in another location is that the "School SHCICP/MTCTCIP"3940 detects that both are in the same context and makes the pairing between the student and the teacher. Once the connection is made, the "School SHCICP/MTCTCIP" 3940 will alert the teacher as depicted with communication link 3944. The teacher can then use her device to communicate and control the curated content delivery from the "School SHCICP/MTCTCIP" 3940, from her device as depicted with arrow 3942. The "School SHCICP/MTCTCIP" 3940 will then compute the curated content to be delivered by combining the data and input from the systems connected to it as described with reference to FIG. 117, as well as from the "Experience/Motion Capture, AR/VR/MR Database" 3972, the "Teacher Database" 3946 and the "Student Database" 3958, and serve this content to the student as depicted with arrow 3970. The response to this curated content delivery is transmitted back to the "School SHCICP/MTCTCIP" 3940, as shown with link 3968. The content is recorded and retained by the "Student Database" 3958, as shown with links 3960 and 3962, by the "Teacher Database" 3946 as shown with arrows 3948 and 3950 and the system described with reference to FIG. 117 via the connection illustrated with arrows 3954 and 3956 to the MTCICP/SHCICP 3952. The results are also presented to the Teacher Device 3938 as depicted with arrow 3944. Should grading, feedback, comments, corrections, encouragement or other feedback be needed or warranted, the Teacher 3936 can communicate this via the "School SHCICP/MTCTCIP" 3940 as depicted through communication link 3942, and with communication to the Student Device 3966 as shown with arrow 3970, and transmission of the data/content to the Student Database 3958 via arrow 3960, and to the Teacher Database 3946 via arrow 3948 as well as to the system described with reference to FIG. 117 via the link shown with arrow 3954. Should the curated content that the "School SHCICP/MTCTCIP" 3940 determines a need to deliver to, or is instructed to deliver to the student needs additional functionality such as motion, movement, actions and body movement, exercises, AR/VR/MR experiences or any combination thereof, such content is stored on the "Experience/Motion Capture, AR/VR/MR Database"3972 and will be communicated to the "School SHCICP/MTCTCIP" 3940 as shown with link 3974. The "School SHCICP/MTCTCIP" 3940 will transmit this information to the Student Device 3966 as illustrated with arrow 3970, with feedback delivered back to the "School SHCICP/MTCTCIP" 3940 as shown with arrow 3968. The results are also presented to the Teacher Device 3938 as depicted with arrow 3944. Should grading, feedback, comments, corrections, encouragement or other feedback be needed or warranted, the Teacher can communicate any of these to the "School SHCICP/MTCTCIP" 3940, as depicted with arrow 3942, with communication to the student through the Student Device 3966 via link 3970 and transmission of the data/content to the Student Database 3958 as shown with arrow 3960 and to the Teacher Database 3946 via link 3948 as well as to the system described with respect to FIG. 117 via link 3954. Should Student N be in an environment where there are Sensors installed, these sensors can interact with the student's device (s), such as shown at 3966, in bi-directional manner when enabled and possible, as depicted with arrows 3994 and 3996. Any results of such interactions can be transmitted to the Student Database 3958 as shown with links 3998 and 4000. The results are also presented to the "School SHCICP/MTCTCIP" 3940 as depicted with arrow 3962 and onwards by the "School SHCICP/MTCTCIP" 3940 to the Teacher 3936 via Teacher Device 3938 as depicted with arrow 3944. Should grading, feedback, comments, corrections, encouragement or other feedback be needed or warranted, the Teacher can communicate this via the "School SHCICP/MTCTCIP" 3940 as depicted with link 3942 from Teacher Device 3938, and then with communication to the student, via link 3970 and transmission of the data/content to the Student Database 3958 via link 3960 and to Teacher Database 3946 as shown with link 3948, as well as to the system described with reference to FIG. 117, as shown with arrow 3954. All of the interactions can be captured and stored on the Teacher Database 3946 and Student Database 3958, both of which are accessible by the School SHCICP/MTCICP 3940. Data can be computed, condensed or truncated or otherwise summarized by the School SHCICP/MTCICP 3940, and transmitted to the "Local "N" Government MTCICP/SHCICP" 3952, as depicted with link 3954. Data can be computed, condensed or truncated or otherwise summarized by the Local N Government SHCICP/MTCICP 3952, to be transmitted to the "State "N" Government MTCICP/SHCICP" 3982, as depicted with arrow 3922. Data can be computed, condensed or truncated or otherwise summarized by the State "N" Government MTCICP 3982, to be transmitted to the "Central Government MTCICP" 3980, as depicted with arrow 3906. Comparisons and calculations on performance at the local level for Local N Government MTCICP/SCHICP 3952 against "Local "N" Curriculum" 4002 can be performed via communications as shown with link 4004. Similarly, comparisons and calculations on performance at the state level for "State N Government MTCICP/SCHICP 3982 against "State "N" Curriculum" 4006 can be performed via communications as shown in 4008. Similarly, comparisons and calculations on performance at the Central level for "Central Government MTCICP/SCHICP 3980 against "Central Curriculum" 3960 can be performed via communications as shown with arrow 3902. The results from this process can be shared with other schools and systems under the Central Government MTCICP 3960 across multiple state schools as depicted by bi-directional communication 3910 between the Central Government MTCICP 3980 and each "State N+1 Government MTCICP 3908, and matched up against each of their "State 'N+1' Curriculum" 3916 as shown by link 3918. The results from this process can be shared with other schools and systems under Local Government MTCICPs across multiple local schools as depicted by bi-directional communication 3926 between the State N+1 Government MTCICPs 3908 and the "Local 'N+1' Government MTCICP's 3924 and matched up against each of their "Local 'N+1' Curriculum" 3933 as shown with arrow 3934. This embodiment is for illustrative purposes and not intended to be all encompassing.

Convention Center Example

In such an embodiment, the convention center operator is in control of the MTCICP. Show managers will lease the physical location for a certain specific time and organize a show such as the ComiCon event at the San Diego Convention Center.

This organizer then controls the MTCICP during the period they have agreed to pay for or otherwise compensate for.

This show manager can now use the multi-tenant feature and further sub-lease access to the MTCICP system to exhibitors that are showcasing their products or content as a paid exhibitor. This exhibitor can then use the portion of the MTCICP they are granted access to. This can enable them to send messages and present content to those attendees that are in the exhibitor's booth at the time they are physically there.

Likewise, a concessionaire that has a permanent installation in the convention center can be granted access to the MTCICP. Instead of a time restriction, they can be granted access to use only a portion of the MTCICP that accesses and interacts with attendees while they are in a predetermined area or granted access to control a specific area within the convention center where they can interact with attendees that have devices that are connected with the MTCICP. They can then offer content such as their food and drink menu to the attendees. This will be controlled by their access to the MTCICP and delivered from the MTCICP to the attendee's mobile device when the attendees are within the geographical area or specific area within the convention center. Such menu message can be programmed to launch an order system within the mobile device. The attendee can then place an order on their device. This order is sent to the MTCICP which then will transmit this order to a device in the concessionaire stand or a mobile device one of the staff members carry that is also connected to the MTCICP or to the Point of Sale system the concessionaire is using. A mobile payment for the order can also be accommodated through the same system in the same fashion. Systems such as Apple Pay, Google Pay, Samsung Pay, MasterCard Pass or other payment systems can be incorporates into the MTCICP to handle the financial transaction portions.

Similar to the concessionaire retailers, shops, restaurants, hotels, shopping malls, night clubs, tourist attractions, museums, private transportation, public transportation, airlines, taxi companies, tour organizations and others close by the convention center or otherwise associated with the attendees, tourism or safety, traffic, or city planning or management, can be granted access to communicate with the attendees by accessing the MTCICP. This access can be granted based on time, location or other per-determined parameters agreed upon by the master licensee of the MTCICP and the sub licensee. This access can be granted against no compensations, for compensation or for a participation of any commerce generated via the use of the MTCICP by all parties.

A brand may also be interested in having access to the attendees while they are in town for the convention. Such access can be granted via access to the MTCICP. This access can then be granted for a limited time, but can work across all the geographical areas, including within the range of other sub-leases. The access can be limited to parameters in other fashions such as based on gender, age, interests, profession, position, wealth, type of car owned, level of authority, national origin for tourists and other parameters known within the MTCICP and its extended and connected databases.

A service provider such as an organization or an airline or a cruise ship operator or an operator of a software or mobile app service can also be granted access to the attendees. Again, they will be granted access to control aspects of the MTCICP agreed upon by the parties in the same fashion as the brands described above.

It will be very important to the owner of the MTCICP that all these entities do not inundate the attendees with offers and content in an intrusive, obnoxious or disruptive manner. Numerous ways to leverage and select the most relevant offer to present exists and can be incorporated into the MTCICP to ensure a limited number of offers and content are presented. Reverse "Dutch" auctions can be used and pre-programmed in a manner to programmatically present the offers that are most relevant and paying most to be displayed first.

Such a platform can work for owners and operators of facilities such as the convention center mentioned, airports as described later, shopping malls, universities, stadiums, venues, hotels, city buildings, airlines, tourism agencies, city management, federal government, government agencies, web site and mobile service providers and law enforcement.

Airport Example

Another embodiment of the MTCICP is for an airport operator. Modern airport operators have turn into landlords, leasing space to concessionaires and earning a percentage of their sales in addition to the lease they charge for the space. Airlines lease access to gates and typically no longer own these. In most modern airports, parking is one of the top revenue generators if not top. It is therefore in the interests to have happy travelers that spend as much time as possible walking in the airport, shopping and dining/eating/drinking after they have parked their car. A happy traveler spends a lot more than one that is stressed and rushed to get to their gate. The MTCICP can enable the airport to create a series of new revenue streams. It can lease access to the system to airlines, concessionaires, stores and restaurants, to tourism agencies, amusement parks, transportation companies, hotels, convention centers and any other entity that wants to communicate with travelers. This can be the advertisers and brands that pay for display ads in the airport, it can be products that are beings sold or the owners of the companies providing services for the airport.

Regardless of the location that has the MTCICP the same functionality will be deployed and enabled.

The MTCICP will record all messages and content sent to the attendees, all the messages viewed, all the messages opened, all the messages acted upon. Should there be a call to action in the message such as open a message, follow a link to another page or to go to a physical location, the MTCICP system will record such an action and retain it.

The system architecture of the MTCICP is based on the CICP "event-action-verify and record" method where all interactions with the systems are named as an event. This event is logged and it is determined if an action is warranted. Such actions can be a control command back to the system component that triggered, recorded and transmitted the event. If and when warranted the control command is sent to the appropriate device. This device can be the originating device, or any other connected device that has been associated with the originating device. In certain events, no action is warranted and no control commands are sent. In all instances, the event and any actions taken are verified to have been performed. The whole process is recorded and retained. The commands sent will trigger new events. These events are then matched against the desired outcome of the action. If the desired outcome was produced another event has occurred and the desired outcome has been verified. If the desired outcome was not produced, another event has occurred and the failure to achieve the desired outcome has been verified. All events and actions are recorded. What produces the desired outcomes will be repeated as needed and desired. The actions that do not result in the desired outcome will be retained and used by future similar events where other actions will be presented. The gathering of this date is the core of the intelligence component of the MTCICP.

The events can be the gathering of data from individual set of sensors, a combination of sensors independently or numerous sensors combined into a device such as a mobile smart phone, the interactions between multiple sensors in geographical physical locations, the interactions of a connected device with one of multiple sensors, the interactions of a multiple connected mobile devices with a single sensor and/or the interactions of multiple sensors with multiple mobile devices, and/or the interactions between multiple mobile devices.

The events can be based on proximity between a sensor and other sensors, the sensor and a mobile device, multiple sensors and a mobile device, the sensor and multiple mobile devices and/or multiple sensors and multiple mobile devices, and/or between multiple sensors, and/or between multiple mobile devices.

The events can be based on time of the proximity of a sensor and other sensors, the sensor and a mobile device, multiple sensors and a mobile device, the sensor and multiple mobile devices and/or multiple sensors and multiple mobile devices, and/or between multiple sensors, and/or between multiple mobile devices.

The events can be based on the location of the interactions of a sensor and other sensors, the sensor and a mobile device, multiple sensors and a mobile device, the sensor and multiple mobile devices and/or multiple sensors and multiple mobile devices, and/or between multiple sensors, and/or between multiple mobile devices.

The events can be based on the person who is involved at the time, location or in the proximity of the sensor and other sensors, the sensor and a mobile device, multiple sensors and a mobile device, the sensor and multiple mobile devices and/or multiple sensors and multiple mobile devices, and/or between multiple sensors, and/or between multiple mobile devices.

The event can be based on the person's background, shared profile, demographic profile, age, gender, interest, current behavior, past behavior, wellness, health, activity level, mood, the rate of travel, level of exercise, level of interest, personal danger, products around the person, the location of the person, other connected devices in proximity to the person, facilities such as buildings, homes, museums, venues, bars, restaurants, convention centers, hospital, stadiums, universities, airports, master planned communities, hotels and any other building structure, equipment around the person, equipment the person is using, riding, operating, driving, controlling, flying as the connections between any associated sensor and other sensors, the sensor and a mobile device, multiple sensors and a mobile device, the sensor and multiple mobile devices and/or multiple sensors and multiple mobile devices, and/or between multiple sensors, and/or between multiple mobile devices.

The event can be based on the product the user is interacting with based on interactions between sensor and other sensors, the sensor and a mobile device, multiple sensors and a mobile device, the sensor and multiple mobile devices and/or multiple sensors and multiple mobile devices, and/or between multiple sensors, and/or between multiple mobile devices The event can be based on the user described above becomes in connection with another person who has another device connected to the MTCICP.

This "event-action-verify-record" architecture enables the right messages to be delivered based on the context as described in the original description of the MTCICP.

The actions that the MTCICP will deliver to the devices that are connected to it will be controlled and programmed by those that the master licensee has granted access to within the parameters that the master licensee and sub licensee have agreed upon for the compensation the parties have agreed upon during the time frames the parties agreed upon to the users and devices that the parties agreed upon, delivering the experiences, content, information and offers the parties agree upon within the parameters the parties agreed upon.

The actions that the MTCICP can send can be offers to purchase, coupons for such offers, access, tickets, offers for service, special access or privileges, advertisements or alerts, alarms or encouragements. Actions can also be launching functions within communication device such as sounding an alarm, opening a camera view finder, launching a video, launching an AR browser, launching a QR code reader, trigger an NFC based event, launch a function within a software, trigger an event on the device. Actions can also be interactions with other equipment such as opening a door, grant access, punch a ticket stamp, trigger a video on a video display, dispense a product from a vending machine, trigger a payment, turn on a device, turn off a device, adjust music volume, adjust temperature settings and connect with any other connected devices.

The content can be in-app, graphics, photos, images, videos. Content can be displayed as videos or photos, in augmented reality or virtual reality. Content can be displayed on the device, on equipment or video screens. All will be controlled, launched and triggered via commands from the MTCICP.

The experiences, content and actions can be on the user's mobile devices or wearables that are connected to the MTCICP. They can be displayed on connected devices such as kiosks, vending machines, video screens or other connected display mediums.

Where a facility has been installed with a complete MTCICP with numerous sensors or access points such as Wi-Fi access points and routers, beacons and other transmission devices such as LED lightbulbs with BLE, way finding solution can be implemented. In such an installation, the access points can be used to triangulate the location of any device that is connected to the MTCICP. Numerous system currently exists that can provide accurate locations based on such sensors. Solutions that detect location, wayfinding and solutions that enable guided navigation from one point to another point within the facility are also available. Integration of these into the MTCICP enables the various users of the MTCICP to present offers within the navigation and guides presented back to the users of the system as they progress through the facility.

Since the MTCICP can detect the location of the users of the system within the geographical reach of the system which can range from global to precise in-door locations, if can guide interested parties to meet each other. This feature can be used by attendees at convention centers that are trying to locate and meet peers or co-workers, by a single person trying to locate another single person in an amusement park, a mother looking for her son at a university campus. Permission for such discovery will need to have been granted by both parties prior to such pairing. The MTCICP is the central hub and will retain such permission. The match making will only be enabled and allowed when both parties have consented to such pairing.

When the pairing occurs between two or more consenting people who have devices that are connected to the MTCICP, an exchange of information between the two parties can be enabled by the MTCICP. The action of the connection of the two can be recorded and retained by the MTCICP as well as the transmission and sharing of the content.

Retail Chain Example

One such implementation of the MTCICP can be in a retail environment. Here the retail chain has purchased a master MTCICP. They have installed a MTCICP system in each retail location. Each sub set of the MTCICP is controlled by the master MTCICP at the corporate HQ. The local store management has been granted limited access to control aspects of the system that is installed only in its physical location. Its sales staff has devices that are connected with the MTCICP. The devices that the staff carries in the store will transmit their location to the sub MTCICP. The store manager can then see the location of his staff from his device that has been granted another layer of access than the staff's devices. When a customer with a device that has a software or mobile app or otherwise has granted the retailer access to contact the customer enters the retail location, the event of this entry is recorded by the system. The MTCICP will then match this customer who has granted approval to be identified to the retailer and operator of the MTCICP with their profile that the retailer has on the customer. This profile can be a loyalty or reward program, a store credit card, a frequent buyer card, or other sources of user profiles the retailer retains on its customers. The MTCICP can also go to other connected databases to seek more information about the customer. Numerous sources for demographic data exist, as well as buying patterns from activities both on-line and off-line. This data will be aggregated by the MTCICP. The sum of this data will then be presented to the sub MTCICP system in the retail location. The location of the customer in the store will be monitored, recorded and retained. Should the customer stop at any place indicating that they have intent to understand, experience, touch, feel or try a product at that particular location within the premises; the MTCICP will detect such an action. Based on the dwell time the customer has at this location, a message can be sent from the MTCICP to a staff member or a number of staff members that are near-by. This message can be sent with back-ground information gathered by the MTCICP so that the staff member is well prepared when they initiate the verbal communication with the customer. When the staff member comes into proximity of the customer, the MTCICP system records this. Messages can be sent out to the other staff members that they do no longer need to look for the customer. Content that is relevant to the location can be presented by the MTCICP to the staff member so that the staff member can present stats or other features. The MTCICP can also send message and present content to the customer via his or her device that is connected to the MTCICP. Information such as comparisons, inventory level, options, features and functions can be presented in a sales promotional manner to the customer, while information about the product sent to the staff member has been created to assist in closing the sale. Thereby, the MTCICP is sending the right message to the right person, at the right time while they are both close to each other. All the data, the interactions, the customers dwell time at the product before the staff arrives, the time it took the staff member to arrive, the content sent to the customer and the content sent to the staff member will all be recorded and option to be displayed on the HQ and store manager level MTCICP. Digital displays can also be connected to the MTCICP. These can be programmed to present advertisements from brands that have paid to use the MTCICP. These ads can be displayed when a specific type of customer is in front of the display. The displays can also be movable, preprogrammed and connected. These can be tablets that are placed on fixed or movable display units that incorporate pre-programmed image recognition solutions. This image recognition solution can be connected to the MTCICP. The targets it is looking for can be selected and determined via the MTCICP by the store manager or the HQ or the brand owner who has been granted access against a fee. Once the image recognition system has made a match, content that is preloaded on the device can be triggered and displayed on the device. This interaction is an event and recorded as such by the MTCICP. The event can trigger an augmented reality representation of a product showcased in the target image, or it can be a promotional video, or an advertisement, a link to a web page, an interactive fact sheet, a presentation, photos, reviews, comparisons, data and fact sheets or any other aspect related to the image. All interactions are recorded and retained by the MTCICP. All results can be displayed as real time interactions on the store MTCICP or the HQ MTCICP.

The data can be anonymized on the option of the MTCICP should this be need to comply with the retailer's privacy policies.

Healthy Lifestyle Promotion System

Preferred embodiments of the MTCICP may be configured to function to promote a healthy lifestyle, wellness encouragement, and verification and reward for healthy behavior while improving medical care, including pre- and post-surgical operation care with verification of medication and activity compliance.

The invention can also be used to encourage behavior and actions, activity or purchases, verify that the desired action has been performed and then record and or reward for the desired behavior. If the desired behavior has not been achieved, corrective action can be presented, and the process repeated until the desired action has been taken. Additional messages, content delivery, alarms to send others to intervene, activity stop can be delivered as needed should it be needed to intervene.

In another application of the central CICP, the MTCICP is extended beyond the delivery of content and experiences, it can be used to encourage healthy habits, drive wellness and improve the effectiveness of medical care and medication.

This invention is not dependent upon or based on the features and functions in a CICP platform, but it is preferred to be used in conjunction with such a CICP solution.

This invention is a Health and Wellness CICP—HW-CICP—which is to be used to connect and communicate with wearables such as the Samsung GearS2 watch, the Apple Watch, or other connected fitness and wellness tracking devices via a central CICP and or other connected mobile devices, sensors and connected equipment, display units and other equipment.

This HWCICP is used to send specific health and wellness related messages. The objectives of such messages is to drive healthy behavior by sending motivational messages at the right time and on the right device, encouraging the user to make the right choices. These messages can then be answered by devices that can determine if the action was taken. This action can be to run faster, lift a weight, flex and arm or kick a ball. When the action has been completed, it can be recorded and if a reward is appropriate it can be awarded. A point can be collected and retained in a loyalty database connected to the CICP.

It is an established fact that it takes more than 21 days to make a habit permanent. With this system, reminders can be sent at the right time. Rewards can be granted for the right behavior. This will then be repeated until a decreasing number of scheduled reminders are omitted. If the behavior remains, then the habit has been established. Rewards can be used as incentives along the process. Games can be used to encourage the right behavior. Such games can be made public or shared with a select group to instill competition.

In certain settings and facilities such as office buildings, it can be of benefit to the owner and or operator of the facility that those that are in the facility are as healthy as possible. In office settings, an in active work in front of a compute can cause obesity. Simple reminders to stand up and be active are common features on wearable devices and mobile phones such as S-Health by Samsung and Apple Health by Apple. Such a device can be connected to the HWCICP which can then be connected with sensors in the facility. Now messages can be directed to those that are standing in front of an elevator. These messages can be to take the stairs instead. Only those that are standing by the elevator will get the message, while those that are walking by and continue on will not. Those that actually climb the stairs or walk down the stairs can be awarded. This action can be determined and recorded via proximity beacons in the stairwell, or by the activity sensors on the devices. The HWCICP will record and award rewards and points according to set parameters. These parameters can be defined and included in the message about taking the stairs.

Likewise, the same system can be used to detect if a person is in front of a water cooler or water fountain. If they walk by, nothing happens. If they stop by the fountain or water cooler for a given period of time, the system can detect this and send a message to drink water. The action of standing by the water cooler or water fountain for a period of time—dwell time—can be used as verification that the person is drinking water. Such an event will be recorded by the HWCICP and points awarded.

Likewise, the same system can be used to make healthy food choices while in front of a snack food vending machine or in line to order food in the cafeteria at the facility. Suggestions on what to order can be presented on the users connected device by the HWCICP which detects the actual location. Message can be to present the menu of the cafeteria or option to connect with the vending machine. Should the user select an item from the cafeteria menu, the order will be gathered by the HWCICP. The event is recorded and the action will be to send that order to the Cafeteria system. This can be the cafeteria ordering system, a POS system, a dedicated device at the cafeteria or on the connected device of some of their staff. Such devices will be connected via the HWCICP with whatever connectivity they have. IN the case of the vending machine, the connection can be made directly or via cloud based servers and control system that can connect with the HWCICP.

Near Field Communication (NFC) tags can be placed at specific locations. When such a tag is triggered by a HWCICP connected device, the system can detect that an action related to that NFC tag has occurred and be recorded by the HWCICP in the user's profile. This tag can be placed by a certain food in a cafeteria, by a turn still at an entry to a facility or on specific exercise equipment. The pairing of these tags can be used to determine what food the user is selecting in a cafeteria, what entry to the building they use (stairs or elevator) or what type of exercise the user is engaging in—is it a leg lift or arm curling machine.

Connected displays in the facilities can also present the messages as the users move past and stand in front of these devices. Special motivational messages can be displayed personalized to the person standing in front of the display. The user's personal communication device that is connected with the HWCICP will detect that the user is in proximity to the display. The display is also connected to the HWCICP. Once the pairing between the two connected devices has occurred, appropriate messages based on the programming of the HWCICP and any past demographical data and or profiles of the user, the location of the display and the activity around it.

The system can also present motivational messages delivered by respected people such as athletes, at the right time and place. Audio messages such as the famous Eye of the Tiger from the Rocky movies can be triggered on mobile devices as the user comes to the $3^{rd}$ floor in a flight of stairs.

Directional messages and both the display and the user's connect devices can offer the user to take the stairs to the $2^{nd}$ floor rather than the elevator.

As today's young generation is heading to be the first generation in recorded history to have a shorter life expectancy than its parents based on lifestyle choices, the HWCIC can be used to motivate activity, encourage healthy eating habits and monitor sleep. Using HWCIC to create gamification away from video games and TV screens that drives sedentary life style in the younger generation can be enabled to counter sedentary lifestyle. The same gamification can be used for today's office workers also sit at long period in front of computers. The ability to create messages such as encouraging activities and assigning points to these is a simple way to gamify—scavenger hunts that requires walking is a simple aspect. A more detailed and engaging feature can be to fit professional athletes or action movie stars with sensors and then track them as they perform their routines, shoot their baskets, score goals, run, ski, jump or do action movie motions. These actions can be recorded via body sensors and or video capture systems and captured in a HWCIC enabled platform. These actions then are recorded and retained. A user with a device such as a wearable, set of wearables, and or other sensors, can then try to replicate the movements, actions and or motions. Their performance is recorded and retained by their HWCIC connected devices. The user can then see how she or he compares in their motions against the expert. This can be against a set time, number or repetitions, speed, strength or accuracy that the expert achieved. The match and score against the expert can be presented on the user's HWCIC device real-time with an encouragement to repeat and improve. The experience can also be replayed or acted with virtual reality googles to create an immersive experience. The expert could have been filmed in a real world environment using one of the numerous 3D cameras with 360 degree capture. The same methodology can be used to enable participants to compete with each other. In such an instance each player has a device or devices connected to the HWCIC. Each player is identified in the HWCIC to compete against each other and each other have granted permission to the HWCIC and each other to participate and influence the game. The same methodology can be used to improve one's own game or performance. The initial run-through of the process can be completed using sensors that capture the motions such as motion capture sensors, and the actions and motions are recorded into the HWCIC. At a later time, the same motions are performed and the way these are performed can be matched real-time against what had been captured by the HWCIC in the previous instance. This can be used to improve a user's own performance, or the HWCIC can be a multi-tenant CICP where a sports team has the controls. They can then grant access to their trainers, medical, sports agents and others to monitor performance, monitor and verify improvements and detect where there may be problems. Corrective actions, suggested improvements and other actions can be programmed into the HWCIC to assist in behavior change.

The HWCIC can also be used to suggest and recommend healthy eating habits. Time to consume food and drinks, vitamins, medications, supplements and the frequency and amounts of these can be programmed into the HWCIC. The HWCIC can then send messages and alerts about what to consume, and when and how much via HWCIC connected devices that the user has with him, is wearing or are within his context. He can confirm via the HWCIC connected devices that he has consumed the products or performed the actions. The HWCIC will retain and record this confirmation. Points can be assigned for the positive actions and retained by the HWCIC. Points can be deducted for failure to perform. Point status can be displayed on the user's device, on a public device or devices that are connected via the HWCIC and are permitted to see this information by the user, his team, his boss or employers, agents, teams, trainers, medical staff, supporters. As the action has been verified by the HWCIC, in addition or in-lieu of awarding points, the HWCIC can send an action to a sensor on the user to take a reading of his condition. This can be vital stats such as taking a heart rate pulse, moisture levels to measure sweat, blood sugar, glucose levels, oxygen levels or rate of speed of travel direction, height above ground, length of time airborne, power in turns and/or any other performance data and/or other stats on the conditions of the user. This can be used to measure levels of performance, accuracy or if the user may appear to have fallen, is there a pulse.

Consumption of the right food groups can also be encouraged via the HWCIC. When a user with a HWCIC connected device enters a grocery store, a restaurant, hotel, venue, airport or other place where he is likely to consume food and drinks, he can be reminded to select what is healthy. Confirmation that he chooses correct can be automatically in instances where a product packaging has a feature that includes an image recognizable by the HWCIC or a NFC tag that is associated with the product when this match is done in a manner recognized by the HWCIC. Offers to purchase healthy food can be provided with manual or automatically points awarded for right choices. This confirmation can be via object recognition systems, QR codes on the product packaging, NFC tags on the product. It can be confirmed via integration into the retailers POC system. It can be via product confirmation from devices such as Samsung fridge system that detects what products are in the fridge.

The same HWCIC can also be used to connect to devices and or sensors that the user wears while sleeping or have placed in his bed, in his room or in his proximity where he sleeps. Alerts and reminders to start to rest and slow down can be imitated via the HWCIC before the person needs to go to sleep. This can be motivational messages, turning on soothing audio sounds, running a hot bath, preparing a warm tea—all triggered and controlled via the HWCIC system that has been integrated into the user's home or hotel room or wherever he is sleeping.

The sensors can determine the quality of the sleep, the length and effectiveness. There are numerous solutions in the marketplace from wearables, to sensors in beds, to units to place on night stands. Any and all that are connected via Wi-Fi and has permissions via protocols to connect with other systems can be connected to the central HWCIC. The HWCIC thereby creates a multi-tenant HWCIC Smart home integration and master system.

Points can be assigned at each step of the process from waking up in the morning, eating breakfast, exercise, drive to work, take stairs at work instead of elevator, snack at work at certain times, drink water at certain times, stand at certain times, choose healthy food at lunch, remain active, drink more water, eat a snack, take stairs, walk to car, eat healthy dinner, stretch, relax before bed, go to bed at the right time, sleep well—and repeat.

The ability to monitor lifestyle and encourage healthy choices is also of great value to medical insurance companies, employers and educational institutions. Once such embodiment of the invention is for a medical insurance company that encourages their members to go to a fitness gym. Such a program may give a discount to the member if he goes to the gym twice a week and are quite common place. When the insurance company implements a HWCIC to manage this program, the verification that the member goes to the gym can be automatically recorded. Each time and the number of times he enters the gym can be detected via geofences around the gym, beacon in the gym or NFC or other sensors in their facilities. These will interact with the member's mobile devices or wearables or sensors that are connected to the HWCICP. These interactions are recorded and retained as a proof of presence. The HWCICP can also be used to verify that the member is actually exercising by opening a heart right sensor or motion sensor that records movement and activity take a recording, record and retain this. This data can be retained by the HWCICP in the user's profile and or can be retained and recorded in a manner that remains anonymous. The action of going to the gym, the frequency, the times entering and exiting, the time there can all be recorded and retained by the HWCICP. Equipment, shoes, wearables and other sports and exercise tools can be fitted with sensors such as NFC tags or QR codes to validate, verify and record the use of these by the member via a connected wearable or mobile device that can communicate with the HWCICP or can retain the information for a period of time while out of range for communication with the HWCICP and transmit the collected, recorded and retain information and data when the connection is re-established with the HWCICP.

The rewards for the activity at the gym can be a reduction in monthly medical insurance bills. The HWCICP can grant access to the gym attendance information, and the performance data there if user has granted rights to this to the accounting department of the insurance company. Alternatively, the HWCICP can be integrated into the insurance company accounting department database systems triggering a reduction in premiums for the user.

Hospital Example

The same MTCICP system can be used in a hospital facility. In such an instance, the customer is a patient, the staff is nurses, and the store admin is replaced by the hospital admin staff. Instead of recording when standing in front of products, the patient's location will be mapped as he moves from examination room to examination room to laboratory and other facilities across the hospital. Instead of presenting content about a product, the MTCICP can present information about the patient. Should the hospital have a HIPPA compliant version of the MTCICP, electronic health records can be presented to the nurses, admins and physicians who have HIPPA compliant mobile devices that are connected to the MTCICP when they are in proximity to the patient. The path and movement of the patient can be recorded and retained by the HIPPA compliant MTCICP platform.

This system can also be extended to patient care post operations. There is a big issues currently regarding re-admit within 30 days of discharge. It is of great importance to the physicians to ensure that patients make the follow up appointments with their primary care physician within 48 hours of discharge. It is also of great importance that the patient follows the routines and regiments of care required and prescribed by the discharge physicians and nurses. The proper intake of the prescribed medicine in right dosage at the right time is also vital. Finally, there is a need to inform and educate the patient about the procedure the just had performed, with a mean to contact the right care give should the patient have any concerns or if problems occur.

The use of a MTCICP system can enable these things to happen. A patient that is being discharged will typically receive a print out of the their prescribed medications, paper forms with instructions, phone directory on a paper or phone book and other written notes and documents printed on paper. A MTCICP solution can add to this with a tablet that has been pre-programmed with all the relevant information around the procedure. Links to websites, videos and other information can be pre-programmed into this tablet. The user interface can be customized for easy navigation for seeing impaired people, elderly or those with limited dexterity in their hands and arms. Voice or gesture controls can also be included in this tablet.

The tablet is connected with the MTCICP via cellular network so it is always connected. Easy to use tabs to connect the patient with the care team can also be included. Once the patient makes a request for connection, the connection will be made via the MTCICP or in such a fashion that the MTCICP captures and records the connection attempt. It can ensure that the right care giver is connected. If that care giver is also part of the MTCICP, he or she can have a mobile device that is connected to the MTCICP and alerts the care giver when the request for contact has been made by the patient. As part of the discharge kit a wearable such as a Samsung Gear S2 watch can be given, lent, sold or leased to the patient. This device is also connected via cellular network to the MTCICP. As part of its preloaded mobile application, the MTCICP can open up sensors on this device upon certain events. These events can be event such as when acceleration is recorded by the device which the on-board chips will calculate to indicate that the wearer of the watch has fallen. Then the watch can sound an alarm to alert the user, it can make a connection to the MTCICP and sound an alarm via its connections, it can open up its heart rate sensor and take 2 readings, and seek any other motions or sounds. If these indicate a fall and that the wearer of the watch is in distress, the watch can send an emergency alert to the MTCICP and call 911. Since the unit has a cell unit and SIM card in it, the MTCICP can route a voice call to the unit and the 911 operator can also engage a voice call. Since the unit operates on the cell network, location can be detected and ported to the 911 service. The unit can also present medication alerts and reminders in non-emergency situations. These can be triggered by the MTCICP and displayed on the watch face with an alarm and vibration trigger. The patient can acknowledge that he is taking the medication. Such a response can be retained by the MTCICP as an indication that the patient is complying with the medication regiment prescribed. If of interest to the prescribing physician or discharge team, the watch can be programmed to take a hear rate reading before the message is sent, and after the patient has confirmed that he has consumed the medication. All such recordings will be recorded and retained by the MTCICP. Should the patient want to contact some of his care givers, the connections can be presented via the MTCICP. Such a message can be similar to a "nurse call" button in the hospital room, with the direct connection to on-staff nurses enabled. It is of great interest to the medical team, the hospital administrator and other care givers and family members that the patient can get the appropriate care at the right time. Early warning signs of a worsening condition can be detected earlier and prevented. One such issue is rapid weight gain post heart operation. Should a scale with the ability to be connected via WiFi or cellular network be prescribed as part of the discharge kit, reminders to measure weight and recording of these can detect warning signs before they become life threatening. Any other connected device that measures health statics or data can be connected with the MTCICP. Nearly equally important to the hospital operators, owners and admins is to intercept patients that are returning to the hospital or any other care giver within the 30 days without a critical need. The hospital that performed the operation may in such an instance forfeit the payment for the original operation and or be subject to a fine. In many instances, it may be more economical to send a trained professional nurse or doctor or other care giver to the location that the patient is at. The MTCICP can assist in administrating and coordinating such efforts to preemptive intercept an early re-admit. Any such staff member that has a device that is connected to the MTCICP and is on duty can be directed to go to the location of the patient to ascertain if the patient really needs to be readmitted. The MTCICP can also be used to enable additional uses of the discharge kit components such as smart home controls via gesture controls of the Samsung Gear S2 with the MTCICP capturing all interactions, with the ability to detect trends such as diminishing activity levels or weaker movements. Such trends can cause the MTCICP to send an alert to care givers.

While the MTCICP can interact with people and their devices, it can also be used to track, locate and detect proximity of products, assets, equipment and other items of value that can be moved or are designed to be moved.

In the hospital setting, asset tracking is a big issue. Equipment is mobile and often needed in an emergency resulting in no actual tracking of where it was taken from, how long it was used and where it was placed after it was no longer needed for that particular situation.

Such equipment can have a sensor placed on it. This sensor could be a Bluetooth LE sensor. This sensor is associated with the equipment in the MTCICP. Whenever a member of staff that has a device that is connected with the MTCICP comes in proximity to that specific piece of equipment, that interaction is recorded and retained by the MTCICP. It will retain the information about the equipment, where the staff member was when the interaction started, the time it occurred, how long it lasted and at what time the proximity ended and where the staff member was at that time. The location of the piece of equipment is thereby detected, recorded and retained by the MTCICP and can instantly or at a later time be displayed in the MTCICP or on any other device connected with the MTCICP that has the right credentials to have access to this information. This 'last known location' is another aspect of the MTCICP.

Such an MTCICP system can also track, locate and alert about assets in locations without the MTCICP infrastructure of sensors. Such an embodiment can be the use of the MTCICP for baggage tracking and alerts. A Bluetooth LE beacon can be placed on a piece of baggage and identified via a mobile device that has an app that communicates with the MTCICP. It can be logged as related to that specific device and the specific piece of luggage and recoded as such in the MTCICP. Once the traveler checks in his luggage at the departing airport, the proximity is broken and recorded and retained by the MTCICP. Once the traveler arrives at is arrival airport, his device will recognize the location as an airport via geo-fences preprogrammed in the MTCICP. It will start listening for the BLE beacon assigned with the person's device. Once the luggage arrives on the luggage conveyer belt, proximity is detected and the mobile device will sound an alarm, shake or otherwise alert the user that his luggage has arrived and is ready to be collected. Should the first airport be a connecting airport, the user will not connect with his luggage and the alert is not sent. All of these events and actions are transmitted to the MTCICP and recorded with location and time—and retained.

Another embodiment of the MTCICP is the ability to present actions such as enabling on-device order of products such as food and beverages when in proximity to a facility that has a MTCICP connection. The mobile device is then also connected to the MTCICP and when the user approaches the facility, the menu can be presented. In app and on the device selection of the products can be recorded by the device and the selection presented as an order on the device. Once confirmed by the user, the order will be transmitted to the MTCICP. The MTCICP will then transmit the order to the facility's connect devices. This can be a display, a mobile device that is fixed or mobile, a mobile device used by some of the staff member or directly into the facility's point of purchase system. Any of these systems will be connected to the MTCICP and will send a confirmation message back to the originating device. Information about the person that placed the order will also be transmitted to the facility via the MTCICP. This can be a photo of the user or the identification of the user's mobile device. A payment for the products ordered can also be facilitated via the MTCICP. Using any of the multiple mobile payment solutions such as Apple Pay or Google Pay, the tender can be closed when the user receives the products ordered. In one such instance, a 27 year old male person visiting from another town has a mobile watch such as a Samsung Gear S2 watch. Once he enters a crowded bar that has access to a MTCICP and installation in place, he is presented an offer to order a Coke and Bacardi on his wrist watch. He presses yes, and the MTCICP transmits the order to the bar tender's personal mobile device that is also connected to the MTCICP. He confirms receipt of the order and sees the FaceBook profile photo of the user. As the user approaches the bar, the bartender recognizes him and hands him his drink. The user acknowledges receipt of his drink on his watch and the tender is closed and payment arranged via the MTCICP. In this instance, Bacardi had access to the MTCICP. They have paid the owner of the system to be allowed to present offers for drinks using Bacardi Rom to male persons travelling that are between age of 25 and 30. This is why the offer for the Bacardi was presented instead of an offer for a Vodka martini. The order includes a handling fee that is automatically included in the cost. This is shared by the owner of the MTCICP and the facility in a predetermined revenue share agreement. The order also includes an automatic % for tip that will be paid to the bar staff. In another impediment of the same MTCICP order solution, a busy mom is travelling with her twin 3 year old boys. She arrives at the airport where the MTCICP has been installed. The MTCICP has guided her through the shortest lines through security. She has signed up for a health and fitness tracker version of the system. Her pulse is recorded as she has passed through security. The struggles with security and 2 unruly three year old boys have caused her stress levels to be elevated. The MTCICP recognizes this elevated stress level. It matches her with her profile of being a mother of young children. A newsstand is located across the gate where she has sat down with her boys trying to calm them. There are no food concessionaires at this area of the airport. Her watch pings her gently. It displays a message on the display asking if she could use a bottle of water and some packages of fruits for her boys that has been sent from the MTCICP. She states yes. This confirmation is now sent to the newsstand that carries both via the MTCICP. The order is confirmed via the system and displayed on the woman's watch. An option to have this delivered to her is offered at a fee, and she confirms she wants this. This request is again sent via the MTCICP to the newsstand. The order is now carried by a staff member or other service provider who has a device that is connected to the MTCICP. The location of the woman is shown on the device this staff member has with her. Once the connection is made, the order is closed and payment procured in the preferred manner of the woman; cash, credit card or via the MTCICP enabled watch.

As this woman is waiting for her flight, the MTCICP enabled watch pings her saying the Southwest airline is delayed and there is a gate change. She now moves to this new gate with her two sons in tow. They are all getting hungry, but she does not want to risk leaving the gate. Now she uses her mobile phone that is also connected to the MTCICP to see what restaurants are close by inside the airport and offer the same delivery service. She can see a couple of fast food restaurants nearby, but the lines are long and boys even more on edge. She finds a healthy alternative in a restaurant in the opposite side of the terminal. She places an order for a salad for herself and two healthy sandwiches and apples for her boys. She selects "deliver to me" and "initiate beacon tracking" on her phone. The order and the action are transmitted to the MTCICP. The "initiate beacon tracking" feature of the MTCICP enabled app opens up the BLE signal transmitter on the phone. The ID of the phone is retained by the MTCICP and included with the order. As the order has been transmitted, placed and processed at the restaurant, all this information is sent to the person carrying the food. His MTCICP connected device has a map of the area where the woman is. But this is a very crowded area with frustrated and delayed travelers. Everyone is on edge because of the two hungry and unruly boys. The server will use his device to see signal strength of the BLE signal being transmitted from the woman's phone. As he gets closer, the signal gets stronger, should he move in the wrong direction, it gets weaker. They meet up quickly despite the crowded area.

The man who ordered the food earlier is also delayed. He is a business traveler and has his entire luggage with him as hand luggage making it hard to reach his phone.

He has his flight details included in his MTCICP connected mobile app on the phone. Now as he approaches the display banks of the flights, the beacon that is associated with that specific display that is also connected to the MTCICP recognizes that he is in proximity to this display. This verification that he is in front of this particular display will be recorded by the MTCICP. It will match him with his flight information that is retained by his mobile device. As he approached his flight number will be instructed from the MTCICP to flash, have a name by it, have his initials by it, have a border around it, be highlighted or some other ways be made to stand out. This will last for a duration programmed and determined by the MTCICP. It can be based on how many other people who also have devices that are connected to the MTCICP are standing in front of that display. It can be flashing as long as he stands there and stop when he walks away. It can be on for a few seconds. His device that is connected to the MTCICP can be programmed to import the flight gate information onto the device. Indoor way finding can then be provided by the MTCICP to guide the user to his gate.

Another embodiment of the MTCIC is in use for operations of facilities, venues, airports, hospitals, restaurants, office buildings, convention centers and other buildings. In such instances, it can be used by the owners or management of the building, staff on site, contracted staff, electricians, managers, sanitation, room service, housekeeping, maintenance, service providers.

This MTCICP can then be used by the operator of the facility with access granted to various contractors and departments. This can be used to communicate with professionals when there is a problem at a certain location. It can be used to alert about equipment failures or damages. This can range from a faulty faucet or overflowing WC, a broken pipe or a spill of liquids on a floor, to faulty escalator, elevator or moving walkway, a broken window, or other structural damages. It can be an issue such as a fire, a person that is hurt or ill, a person that needs service, a person that needs help moving in a wheel chair, temperature that is too high or too low, it can be a piece of electronic equipment or display or tool that is malfunctioning. When such an event is recorded as an issue of concern via sensors that are connected to the MTCICP, or sensors that can alert other devices that are connected to the MTCICP such as a mobile device used by those in the vicinity of the issue, or the user of such a mobile device activates the issue of the concern, the MTCICP records this issue as an event. The event then triggers an action or series of actions. Such an action can be to alert the staff that has devices that are connected to the MTCICP that and are in proximity to the event or has some other interaction or control or authority of the event. This alert will then be displayed on the staff member's mobile device that is connected to the MTCICP. Content, instructions and information about the issue at hand can be delivered as well so that the staff member is fully informed and educated about the issue at hand. When the staff member has acknowledged that he is addressing the issue the MTCICP will also record and retain this information. Should the staff member be unable to fix, correct or handle the issue, he can use his device that is connected to the MTCICP to alert staff members to assist. The MTCICP will then send messages to these via their connected devices with actions to take. The MTCICP can also escalate issues of importance to those with a higher authority or to the master license holder or the owner of the MTCICP based on predetermined algorithms, alert triggers or if-then commands.

The MTCICP can also be used to ensure that personnel are performing the tasks they are supposed to perform. This can be cleaning a room or restroom, servicing a vending machine, maintaining a piece of equipment, checking a certain area for intruders or problems, checking in with a patient, guest or inmate, checking the function of measuring meters, sensors, doors, gates, bridges, areas, roofs, cellars, back-yard, courtyards or other areas. When the personnel are in these areas, the MTCICP can record that the person is there, when the person entered and when the person left. If there is a security issue, the MTCICP can open up the microphone on the connected device to listen to ambience noise or any noise that may indicate danger such as yelling, screaming, breaking of glass, squeals of brakes, gun shots or it can open up camera units on the connected device or it can open up heart monitors on the devices or other sensors on the devices that are connected to the MTCICP to determine the level of danger or threat or security risk. The MTCICP can then send alerts or messages or alarms to the level of reinforcement, repairs, law enforcement, emergency care or supervisor level in case of less urgent or less threat situations. It can be sent to those who are close by the issue event or those far away that need to come to assist such as law enforcement, ambulance or fire brigade.

Aggregated Hub Embodiment

Preferred embodiments of the MTCICP may also be configured to include combinations of CICPs systems with sensors and devices that combine on-board, on-device computation algorithms with calculation results communicated via aggregation hubs. The aggregated CICP computing hubs preferably communicate through a common CICP central data gathering and computation site. The common CICP site is preferably and optionally integrated into a common interface, preloaded onto numerous connected devices and/or included as a part of an operating system that can enable the interactions of the physical world with the digital world.

As described in regard to some preferred embodiments, the CICP gathers data from sensors that communicate with the central CICP. In alternate embodiments sensors are housed within common communication devices such as a mobile smart phone where accelerometers, manometers, gyroscopes, microphones and camera sensors are used to determine numerous aspects of context. In these alternate embodiments and instances, numerous embedded and off-the-shelves algorithm solutions to detect orientation, accelerations, impact, image recognition, ambient noise, walk-run-stand, heart rate and step counters exists. Each device has a series of predetermined and pre-loaded algorithms to determine these.

Another alternate embodiment is a Sensor Hub based CICP (SHCICP) system that provides a communication platform system that incorporates computation hubs based on computers, connected banks of servers and or supercomputers are programmed to detect and learn context and take desired and programmed actions based on the determined context. The system can be program to present recommendations, deliver content, and interact with devices and control environments. The SHCICP collects data from one or numerous connected devices.

As also described herein, alternate embodiments include a sub sensor based hub connected CICP system structure that is used to provide intelligent contextual data detection on a smaller chip, device or equipment and then sends the resulting action as a command to a central communication hub that is connected with to a central SHCICP. This transmitting CICP can collect action commands from numerous sub CICPs. It can use its own computation power to transmit collective results to the master CICP.

This above described alternate embodiment can also include a series of small sensors on a person's body such as on a NFL football player's body during play or practice. In this alternate embodiment each sensor has collections of chips that are connected to a master computational chip that has been pre-preprogrammed with algorithms to take the input from the various chips to detect a predetermined set or sets of action or actions.

This device then can transmit the results of its on-chip on-sensor to the communication component of the sensor. This can be a low power low range low power consumption communication module such as a BLE. This follows the principle of the CICP—take input, select and calculate actions on this input—and then transmit the result.

In this embodiment, the result from this sub SHCICP sensor is transmitted to a central hub. This central hub can take input from numerous other sub SHCICP sensors. This central communication hub SHCICP will then communicate via to a more powerful communication method such as a WAN, WWI or 3G, LTE, 4G, 5G or other communication network to a more powerful SHCICP.

In such an event, the NFL player can have multiple sensors such as on shoes, in his helmet, in knee-braces, woven in the materials of his uniform, heart rate monitor, blood oxygen measurement, moisture sensors, tactile sensors in gloves, pressure sensors in the shoes, camera on his helmet, contact lenses in his eyes, head up display in his visor and any additional new type sensors that might become available.

Each unit calculates its own sensor data and transmits it calculation result to a central communication hub.

This hub can be a larger unit placed in the belt of the player's uniform, in his shoulder pads or on the helmet. Ideally it will be placed in a location that helps facilitate the transmission of the data it calculates.

It will take the input from each of the sensors on the player and combine all of these inputs into its own on-chip SHCICP calculation chip.

The results of this aggregated data will be transmitted to a central SHCICP.

This central SHCICP can be placed in a training facility.

There are numerous other NFL players on the same field at the same time.

Each player has been outfitted with the same system.

Each player's hub communicates its specific aggregated data from its player to the central stadium SHCICP.

This is thereby a fully embedded SHCICP that connects the team in a fashion called "Contextually Connected Team", referred to as a "CCT".

The SHCICP component of the CCT can display results of its calculations on devices that are connected to it such as a tablet, mobile phone or other communication devices.

For deeper and more complicated calculations, the central SHCICP unit of the CCT can transmit its collected data to a cloud based server. This cloud based server can be connected to a super computer for further calculations.

These calculations can be combined with past data collected from the CCP via its SHCICP into a CICP, data relevant to the facility such as weather conditions, data relevant to the individual players from other databases, as well as data from other teams with similar CCT systems installed.

Real time contextual data is thereby collected. Past performance can be matched with today's performance by each individual player and or the team as a whole. Real time input can be created such as changing a line-up, positions of the players, the actual play called to the quarter back and the ways the front line stands. All of these variations will be recorded by the CCT CICP and the master CICP. Real time results of the variations can be showcased on devices that are connected to the CCT CICP and or the master CICP.

While some of the aspects described herein within these individual sensor chip parts are not new, the combination(s) of these hubs—individually or together functioning as a system as a part of a complete SHCICP system is/are new.

This data gathering system can be used in other sports, whether they are performed by one person competing alone, or teams, or numerous individuals against each other or together. It can be used where the person is using equipment or not. In cases where the person is using equipment or other animals, these can also be equipped with sensors that have SHCICP architecture and communications hubs. This can range from devices such as skis, rackets, clubs, mallets, or bicycles, cars, motor cycles, sailboats, row boats or motor boats, skateboards or surf boards. They can be placed on equipment the user is earing such as protective padding, gloves, helmets, cleats, shoes or uniforms. They can be placed on training equipment, on goal posts, or barricades, walls, nets. They can be placed across a field, stadium, and track, course, under water or above. They can measure weather conditions or ambient noise, wind, smell, rain, moisture.

Select hubs can also display the results of these calculations, the actions gathered, and the results achieved. These are devices are connected to a multi-tenant SHCICP (MT-SHCICP) system which grants access to the various information relevant to that specific user. This could be a head coach for a NFL team, the medical doctor, the head of performance data, the defensive coordinator, the coach for the quarterback etc. Each person/team has a set of data points they want to focus on. The MT-SHCICP will collect all the data and present the relevant data to the relevant user on the right device. These devices can be mobile phones, tablets, computers, virtual reality devices or other wearables.

The data recorded and retained can be used to replay actions or event at a later time. This can be used to observe actions and see the results from these actions. The data can be used to render replay modes in video, in data stats, in augmented reality renderings, using 3D avatars of the participants or their equipment, 3D renderings of the physical space, or real life 3D video rendering depending on the data capture process. The replay of the event can be performed on site, real time or off site later. 3D environment and data gathering can be replayed in virtual reality. In all these embodiments, the MT-SHCICP has captured the data and telemetry, recorded it and retained it. It is being used to re-create the event via devices that are connected to and communicating with the MT-SHCICP.

This ability to capture real time data, performance and activity in physical areas, combine this with the activity of a user, record and retain this into the MT-SHCICP with a profile can enable experiences for the user when that user at a later time is on-line. The profile can be used to recommend content and as input to programmatic ad buying and presentation of these ads. The actions take based on these ad placements can then drive interactions in the real-world at a later stage where the MT-SHCICP can present offers or advice on behavior directly on connected devices the user has or on devices that are in the user's context. Numerous services can assist in the presentation of such content such as Unicast. Others can provide services that can provide an artificial intelligence recommendation engine to present the content and offers most likely to be of value to the user such as Xcense.

The MT-SHCICP captures past behavior, records and records this and can then integrate past behavior knowledge with recommendation engines within the MT-SCHICP and the learned understanding of the current context calculated by the MT-SHCICP to deliver the right message, information or replay the right experience via devices connected to the MT-SCHICP Asset Location Embodiment Alternate embodiments of the MTCICP may be configured to include a centralized system that functions to identify the location of devices, products and assets within a physical space through use of listening devices, active transmitters, mobile devices and network-connected equipment, including connections through use of, for example, relatively low cost proximity beacons, NFC tags and/or other sensors.

Another continuation of part of the original CICP is where the connected sensors and infrastructure of a facility that has a CICP enabled infrastructure is used to communicate and locate devices and equipment as well as used to direct attention, dispatch personnel to a location and use the system to direct the closet personnel to a moveable piece of equipment.

Such a location can be a hospital. The hospital has installed a CICP system to communicate with its patients, enabling the hospital to communicate with their patients when they are at the premises, before and after, pre-care and post-operation—via mobile devices that are connected to CICP that they wear or carry with them as they move across the hospital setting. Nurses, administrators, staff, cleaning staff and physicians also carry mobile devices that are also connected to the CICP. These devices function as input units as well as displaying content that is relevant to the individual staff member and relevant to the location they are in, their context or those nearby in proximity. The CICP can also be connected with equipment and digital signage and screens throughout the facility outside the entry, in the lobby, by elevators, outside and inside examination rooms, inside and outside operation rooms, inside and outside recovery rooms and patient rooms, inside and outside nurse stations, inside and outside waiting rooms, inside and outside physician's offices, in hallways, in stairwells, outside, inside and throughout cafeteria, outside, inside, and throughout pharmacy, outside, inside and throughout waiting rooms, outside, inside and throughout gift shops, in operations, in restrooms—throughout the facility wherever a digital sign can provide value. Sensors such as proximity beacons, NFC tags and other sensors can be placed at known locations across each of the same locations. Multiple sensors can be placed in larger areas. Some sensors can be powered by batteries, solar panels or attached to power supply. This power supply can be electrical outlets or USB ports in PCs, TVs or digital displays. These sensors and the displays are connected to the CICP and their unit and location is known by the CICP. Other sensors and proximity beacons will be placed throughout the facilities. These can be low cost Bluetooth low energy proximity beacons. None of these require connectivity or WiFi. The location of all these are known. These locations can be displayed on a digital map presented by the CICP in dashboard accessible via cloud based computers for those that have been granted access. When a person with a mobile device that is connected with the CICP comes into connection with one of these sensors or beacons, then this connected device alerts the CICP that the proximity or connection with that specific device has been established. The CICP can then detect the proximity of that user in relation to this specific sensor. To determine more exact location, triangulation between 3 node points with known location can be achieved using any standard triangulation methods or out of the box indoor navigation solution. The sensors are not connected to the CICP, the connection to the CICP occur via the mobile device the person is wearing. Numerous persons can thereby be displayed on the CICP without the need for connectivity beyond network and/or Wi-Fi that connects the devices. In addition to this system, a movable piece of equipment can be fitted with a proximity beacon. This can be a battery powered beacon or one that is connected to a power supply within the piece of equipment or on a rechargeable battery pack. This beacon's id number is logged into the CICP and assigned with that particular piece of equipment such as a hospital bed. This hospital bed is located in room 1A. A staff member enters room 1A and the CICP records the time and location of the entry of the staff member into room 1A and retains this information. The staff member walks to the bed and starts moving the rollable bed. The proximity beacon on the bed triggers a proximity alert on the staff member's connected device. This connection is transmitted to the CICP which records the interaction, the time and the location of the staff member in room 1A. Staff member moves the bed into the hall way and to the elevators. Proximity beacons along the way records the entry and exit of their range with the staff member's mobile device, which is sending this information to the CICP. At each interaction, the bed is still in proximity to the staff member's mobile device and this proximity is also noted. The staff member enters the elevator and connectivity to his device is lost while in the elevator. The CICP records and retains this lost connection as a last known location. The staff member exits the elevator on the second floor. His device connects with the proximity beacon at the $2^{nd}$ floor elevator lobby, and this connection is recorded and transmitted to the CICP. Location of the staff member is thereby re-established. He is still in proximity to the bed. The beacon on the bed is also in range with the staff member's connected device. This device then communicates the location of the bed to be the same as the staff member. The staff member walks down the corridor and the same procedure as on floor 1 repeats with the mobile device alerting the CICP as it comes in and out of range of the beacons in the corridor. Real time location of the staff member is thereby captured. Each time, the proximity of the staff member's mobile device and the bed is detected, captured and transmitted to the CICP. The location of the bed is thereby also inferred. The staff member arrives at room 2B and enters. The beacon in Room 2B interacts with his mobile device and transmits to the CICP, the location of the staff member in room 2B is thereby detected. The proximity of the bed to the staff member is also detected and transmitted to the CICP. The location of the bed in room 2B can thereby be determined, recorded and retained. The staff member now leaves the bed in room 2B and moves into the corridor. His mobile device connects with the signals from the proximity beacons in the hallway and transmits these interactions with the CICP. At this state he is not in proximity to the bed any longer. The past proximity with the bed beacon is broken and it is recorded as an "exit" between the beacon on the bed and the staff member's device, and this is also included as information sent by the device to the CICP. The location where the last proximity was detected between the bed beacon and the staff member's mobile device will be noted in the CIPC as the "last known location" and retained by the CICP as the most likely location of the bed.

The CICP can then display this last know location on dashboard on displays connected to it to those authorized to view this information. It can then provide information and directions to this last known location directly onto mobile devices of other staff members. This can be provided via active search, or directional instructions, or alphanumerical displays of the location of each asset that has an identifying tag. Displays placed in sections of the hospital can provide lists of the assets that are close to it or on the same floor—with directions to them. This information is provided by the CICP. When a staff member stands in front of the display, this proximity is detected by the CICP and the location and information can be transmitted to the staff member's device that is connected to the CICP.

The last known location can also be verified by the CICP. When another staff member with a device that is connected to the CIPC enters the 2B room, the beacon on the bed will be discovered by the device. The device has connected with the CICP and the sensors in the room 2B thereby alerting the CICP to its presence in room 2B. When the device detects the proximity of the bed beacon, this detection is transmitted to the CICP, recorded and retained by it. The location of this proximity detection is verified to be room 2B and the location of the bed is therefore verified and status of the bed location is "known" and in proximity to the identified staff member. When this staff member leaves the room without the bed, the last know location is recorded. When another member enters the room with another device the process is repeated. When that member leaves the room with the bed, the process from the first staff member leaving room 1a is repeated. The location of the asset—the bed—is therefore active and real-time when in proximity and being actively moved by a staff member, when it is stationary the last known location is displayed.

This methodology can be used to measure traffic patterns and locate assets and staff in a hospitals, factory, venue, hotel, convention center, across a port or airport, in a sports event, during a sporting event, across a stadium or anywhere there is the capability to place sensors in the physical environment, where assets, products, equipment, people, animals or other movable things can move across the physical location.

It can also be extended beyond a physical building and extend into a larger area such as a university campus, port area or entire cities, islands or countries. Combined with a MTCICP and SHCICP the complete interactions between the physical and the people, assets, things and communication devices across a geographical area can be detected, monitored, influenced, recorded and retained, i.e., contextually intelligent city management.

Although specific embodiments of the disclosure have been described, various modifications, alterations, alternative constructions, and equivalents are also encompassed within the scope of invention as set forth in the claims.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

What is claimed is:

1. A multi-level control, variable access, multi-user computer-implemented system adapted for providing on a network, predictably useful, contextually intelligent information among network-connected devices comprising:
    a first control level having a first control level user, first level network-connected devices and the first control level user adapted to control access to said system;
    a second control level having N second control level users, where N is an integer, second level network-connected devices, access to the second control level being controlled by said first control level user and each of N second control level users having access to one or more of said second level network-connected devices;
    a third control level having M third control level users, where M is an integer, and the third control level being controlled by said first control level user and at least one of M third control level users having access to at least one of said third level network-connected devices;
    providing a first user mobile communication device;
    associating said first user mobile communication device with a first user;
    providing a server that is in communication with said first level network-connected devices;
    providing a relationship management system that resides in said server and populating said relationship management system having historical demographic data for said first user;
    providing sensor input data from at least one of said first level network-connected devices when said first user is in a first user current context;
        said sensor input data including data corresponding to a current location of said first user mobile communication device and at least data corresponding to at least one member of the group consisting of:
            current activity of said first user, mental state of said first user, physical state of said first user, mode of travel of said first user, direction of travel of said first user, speed of travel of said first user, level of engagement of said first user in said first user current context, surrounding environment of said first user in said first user current context, identity of one or more persons in addition to said first user and who are nearby said first user in said first user current context, identity of at least one mobile device other than said first user mobile communication device and that is nearby said first user mobile communication device in said first user current context;
    providing said sensor input data from said first user mobile communication device to create acquired first user current data;
    capturing, by said first user mobile communication device through an image recognition application, real-time image data to create first user captured real-time image data for said first user current context;
    generating first user current contextual data for said first user from said acquired first user current data and from said first user captured real-time image data for said first user current context;
    gathering said first user current contextual data to create said first user current contextual data corresponding to said first user's current context;
    uploading said first user current contextual data corresponding to said first user's current context via a wide area mobile communication network to said server;
    matching said first user current contextual data corresponding to said first user's current context with said first user historical, demographic and environmental data;
    combining and processing in the relationship management system the first user current contextual data, current environmental data and historical demographic data to define a message relevant to the first user while the first user is in the first user's current context;
    generating feedback data for said first user that is contextually relevant to said first user's current context and that is predictably useful to said first user as said first user enters a new context to form first user useful feedback data; and,
    transmitting to and displaying on said first user mobile communication device said first user useful feedback data to provide said contextually intelligent mobile information.

2. A multi-level control, variable access, multi-user communication system for communication of real-time contextually relevant information among network-connected devices when communication of information flowing among the network-connected devices changes, comprising:
    multi network-connected devices;
    one or more interactive, contextually intelligent computer software implemented electronic network communication applications, each network communication application configured to deliver real-time contextually relevant content to multiple application users, each application user associated with at least one of the multi network-connected devices;
    the network communication applications and network-connected devices adapted to simultaneously gather and record real-time performance data for each application user when the application user is connected to the network;
    each application user having access to one or more designated application levels and to one or more designated application types of access to the network application;
    each network application further including;
        a master user control;
            x sub-level 1 controls; where x is a positive integer;
            y sub-level 2 controls, where y is a positive integer;
            z sub-level 3 controls, where z is a positive integer;
        each master user control adapted to control each of the x sub-level 1 controls, each of the y sub-level 2 controls, each of the z sub-level 3 controls, and including control of access to sub-level 1 users of the sub-level 1 controls, to sub-level 2 users of the sub-level 2 controls and to sub-level 3 users of the sub-level 3 controls;

each of the x sub-level 1 controls adapted to control each of the y sub-level 2 controls, each of the z sub-level 3 controls, and including control of access to users of the sub-level 2 controls and the sublevel 3 controls; and, each of the y sub-level 2 controls adapted to control each of the z sub-level 3 controls and including control of access to users of the sub-level 3 controls;

the communication system further comprising:

a plurality of network-connected devices, at least one of said network-connected devices including a sensor in at least one of sub-level 1, sub-level 2 and sub-level 3, and at least one of said network-connected devices associated with one or more network-connected users;

at least one of said network-connected devices movable from a current context to a new context;

at least one network-connected server in communication with said network-connected devices;

a relationship management system residing in each of said servers and populated with historical demographic data for each of said network-connected users;

each of said sensors adapted to sense at least one condition in said current context, to generate current context data corresponding to said at least one condition and to input said current context data to each of said servers;

said conditions corresponding to at least one member of the group of conditions consisting of:

real-time image data corresponding to images of objects in one or more user's current context;

current location of one or more of said network-connected devices;

current activity of one or more of said network-connected users;

mental state of one or more of said network-connected users;

physical state of one or more of said network-connected users;

mode of travel of one or more of said network-connected users;

direction of travel of one or more of said network-connected users;

speed of travel of one or more of said network-connected users;

level of engagement of one or more of said network-connected users in said current context;

surrounding environment of one or more of said network-connected users in said current context;

identity of one or more nearby persons in said current context;

identity of at least one additional; and, nearby mobile device in said current context;

whereby the relationship management system is adapted to match said historical demographic data with said current context data for each of said one or more network-connected users, and to provide to each of the network-connected devices associated with each of the network-connected users predictably useful, contextually intelligent mobile information as each of the network-connected users enters a new context.

* * * * *